US011416624B2

(12) United States Patent
Durham et al.

(10) Patent No.: US 11,416,624 B2
(45) Date of Patent: Aug. 16, 2022

(54) CRYPTOGRAPHIC COMPUTING USING ENCRYPTED BASE ADDRESSES AND USED IN MULTI-TENANT ENVIRONMENTS

(71) Applicant: Intel Corporation, Santa Clara, CA (US)

(72) Inventors: David M. Durham, Beaverton, OR (US); Michael LeMay, Hillsboro, OR (US); Ramya Jayaram Masti, Hillsboro, OR (US); Gilbert Neiger, Portland, OR (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 16/722,707

(22) Filed: Dec. 20, 2019

(65) Prior Publication Data

US 2020/0159676 A1    May 21, 2020

Related U.S. Application Data

(60) Provisional application No. 62/868,884, filed on Jun. 29, 2019.

(51) Int. Cl.
*G06F 21/60*     (2013.01)
*G06F 9/30*      (2018.01)
(Continued)

(52) U.S. Cl.
CPC ........ *G06F 21/602* (2013.01); *G06F 9/30043* (2013.01); *G06F 9/30101* (2013.01);
(Continued)

(58) Field of Classification Search
CPC ....... G06F 12/1458; G06F 2009/45587; G06F 21/12; G06F 21/54; G06F 21/556;
(Continued)

(56) References Cited

U.S. PATENT DOCUMENTS 6,570,989 B1    5/2003  Ohmori et al.
7,254,718 B2    8/2007  Kaminaga et al.
(Continued)

FOREIGN PATENT DOCUMENTS

| DE | 102018125786 A1 | 5/2019 |
|---|---|---|
| EP | 2073430 A1 | 6/2009 |
| EP | 3326102 A1 | 5/2018 |
| JP | 2009139899 A | 6/2009 |
| WO | 2017014885 A1 | 1/2017 |

OTHER PUBLICATIONS

USPTO Notice of Allowance in U.S. Appl. No. 16/723,468 dated Oct. 18, 2021 (10 pages).
(Continued)

*Primary Examiner* — Theodore C Parsons
(74) *Attorney, Agent, or Firm* — Alliance IP, LLC

(57) ABSTRACT

Technologies disclosed herein provide cryptographic computing with cryptographically encoded pointers in multi-tenant environments. An example method comprises executing, by a trusted runtime, first instructions to generate a first address key for a private memory region in the memory and generate a first cryptographically encoded pointer to the private memory region in the memory. Generating the first cryptographically encoded pointer includes storing first context information associated with the private memory region in first bits of the first cryptographically encoded pointer and performing a cryptographic algorithm on a slice of a first linear address of the private memory region based, at least in part, on the first address key and a first tweak, the first tweak including the first context information. The method further includes permitting a first tenant in the multi-tenant environment to access the first address key and the first cryptographically encoded pointer to the private memory region.

25 Claims, 38 Drawing Sheets

(51) Int. Cl.

| | | |
|---|---|---|
| G06F 21/72 | (2013.01) | |
| G06F 21/79 | (2013.01) | |
| G06F 21/12 | (2013.01) | |
| H04L 9/08 | (2006.01) | |
| G06F 12/14 | (2006.01) | |
| H04L 9/14 | (2006.01) | |
| G06F 21/62 | (2013.01) | |
| G06F 12/0897 | (2016.01) | |
| G06F 9/48 | (2006.01) | |
| H04L 9/06 | (2006.01) | |
| G06F 12/06 | (2006.01) | |
| G06F 12/0875 | (2016.01) | |
| G06F 12/0811 | (2016.01) | |
| G06F 9/32 | (2018.01) | |
| G06F 9/50 | (2006.01) | |
| G06F 12/02 | (2006.01) | |
| G06F 9/455 | (2018.01) | |

(52) U.S. Cl.
CPC .......... *G06F 9/30178* (2013.01); *G06F 9/321* (2013.01); *G06F 9/45558* (2013.01); *G06F 9/48* (2013.01); *G06F 9/5016* (2013.01); *G06F 12/0207* (2013.01); *G06F 12/0646* (2013.01); *G06F 12/0811* (2013.01); *G06F 12/0875* (2013.01); *G06F 12/0897* (2013.01); *G06F 12/1408* (2013.01); *G06F 12/1458* (2013.01); *G06F 12/1466* (2013.01); *G06F 21/12* (2013.01); *G06F 21/6227* (2013.01); *G06F 21/72* (2013.01); *G06F 21/79* (2013.01); *H04L 9/0637* (2013.01); *H04L 9/0822* (2013.01); *H04L 9/0861* (2013.01); *H04L 9/0869* (2013.01); *H04L 9/0894* (2013.01); *H04L 9/14* (2013.01); *G06F 2009/45587* (2013.01); *G06F 2212/1052* (2013.01); *H04L 2209/125* (2013.01)

(58) Field of Classification Search
CPC .... G06F 21/602; G06F 21/6227; G06F 21/64; G06F 21/72; G06F 21/78; G06F 21/79; G06F 2212/1052; G06F 2212/402; G06F 2221/2107; G06F 9/30178; H04L 9/0822; H04L 9/0861; H04L 9/0869; H04L 9/0894; H04L 9/14

See application file for complete search history.

(56) References Cited

U.S. PATENT DOCUMENTS

| | | | |
|---|---|---|---|
| 7,907,723 | B2 | 3/2011 | Rubin |
| 8,085,934 | B1 | 12/2011 | Bhooma |
| 8,798,263 | B2 | 8/2014 | Pasini et al. |
| 9,213,653 | B2 | 12/2015 | Durham et al. |
| 9,436,847 | B2 | 9/2016 | Durham et al. |
| 9,514,285 | B2 | 12/2016 | Durham et al. |
| 9,811,661 | B1 | 11/2017 | Golovkin et al. |
| 9,830,162 | B2 | 11/2017 | LeMay |
| 9,990,249 | B2 | 6/2018 | Durham et al. |
| 10,216,522 | B2 | 2/2019 | LeMay |
| 10,387,305 | B2 | 8/2019 | Durham et al. |
| 10,585,809 | B2 | 3/2020 | Durham et al. |
| 10,706,164 | B2 | 7/2020 | LeMay et al. |
| 10,860,709 | B2 | 12/2020 | LeMay et al. |
| 2003/0091185 | A1 | 5/2003 | Swindlehurst et al. |
| 2003/0101362 | A1 | 5/2003 | Dia |
| 2003/0126349 | A1 | 7/2003 | Nalawadi et al. |
| 2003/0149869 | A1 | 8/2003 | Gleichauf |
| 2004/0123288 | A1 | 6/2004 | Bennett et al. |
| 2004/0215895 | A1 | 10/2004 | Cypher |
| 2004/0268057 | A1 | 12/2004 | Landin et al. |
| 2007/0152854 | A1 | 7/2007 | Copley |
| 2008/0080708 | A1 | 4/2008 | McAlister et al. |
| 2008/0130895 | A1 | 6/2008 | Jueneman et al. |
| 2009/0172393 | A1* | 7/2009 | Tanik ............... G06F 21/79 713/160 |
| 2009/0220071 | A1 | 9/2009 | Gueron et al. |
| 2009/0254774 | A1 | 10/2009 | Chamdani et al. |
| 2010/0023707 | A1 | 1/2010 | Hohmuth et al. |
| 2011/0099429 | A1 | 4/2011 | Varma et al. |
| 2011/0161680 | A1 | 6/2011 | Grube et al. |
| 2011/0296202 | A1 | 12/2011 | Henry et al. |
| 2012/0163453 | A1 | 6/2012 | Horowitz |
| 2012/0284461 | A1 | 11/2012 | Larin et al. |
| 2013/0275766 | A1 | 10/2013 | Plainecassagne et al. |
| 2014/0173293 | A1 | 6/2014 | Kaplan |
| 2015/0244518 | A1 | 8/2015 | Koo et al. |
| 2015/0378941 | A1 | 12/2015 | Rozas et al. |
| 2016/0056954 | A1 | 2/2016 | Lee et al. |
| 2016/0092702 | A1 | 3/2016 | Durham et al. |
| 2016/0094552 | A1 | 3/2016 | Durham et al. |
| 2016/0104009 | A1 | 4/2016 | Henry et al. |
| 2016/0154963 | A1 | 6/2016 | Kumar et al. |
| 2016/0188889 | A1 | 6/2016 | Trivedi et al. |
| 2016/0285892 | A1 | 9/2016 | Kishinevsky et al. |
| 2016/0364707 | A1 | 12/2016 | Varma |
| 2017/0063532 | A1 | 3/2017 | Bhattacharyya et al. |
| 2017/0285976 | A1 | 10/2017 | Durham et al. |
| 2018/0095812 | A1 | 4/2018 | Deutsch et al. |
| 2018/0095906 | A1 | 4/2018 | Doshi et al. |
| 2018/0109508 | A1 | 4/2018 | Wall et al. |
| 2018/0287785 | A1 | 10/2018 | Pfannenschmidt et al. |
| 2018/0365069 | A1 | 12/2018 | Nemiroff et al. |
| 2019/0026236 | A1 | 1/2019 | Barnes |
| 2019/0042369 | A1 | 2/2019 | Deutsch et al. |
| 2019/0042481 | A1 | 2/2019 | Feghali et al. |
| 2019/0042734 | A1 | 2/2019 | Kounavis et al. |
| 2019/0042766 | A1 | 2/2019 | Pappachan et al. |
| 2019/0042796 | A1 | 2/2019 | Bokern et al. |
| 2019/0042799 | A1 | 2/2019 | Durham et al. |
| 2019/0044954 | A1 | 2/2019 | Kounavis et al. |
| 2019/0045016 | A1 | 2/2019 | Dewan et al. |
| 2019/0050558 | A1 | 2/2019 | LeMay et al. |
| 2019/0095350 | A1 | 3/2019 | Durham et al. |
| 2019/0097794 | A1 | 3/2019 | Nix |
| 2019/0102567 | A1 | 4/2019 | LeMay et al. |
| 2019/0102577 | A1 | 4/2019 | Gueron et al. |
| 2019/0227951 | A1 | 7/2019 | Durham et al. |
| 2019/0347445 | A1 | 11/2019 | Chen |
| 2019/0354726 | A1 | 11/2019 | Critelli et al. |
| 2020/0004953 | A1 | 1/2020 | LeMay et al. |
| 2020/0007332 | A1 | 1/2020 | Girkar et al. |
| 2020/0076585 | A1 | 3/2020 | Sheppard et al. |
| 2020/0117810 | A1 | 4/2020 | Kounavis et al. |
| 2020/0125501 | A1 | 4/2020 | Durham et al. |
| 2020/0125502 | A1 | 4/2020 | Durham et al. |
| 2020/0125742 | A1 | 4/2020 | Kounavis et al. |
| 2020/0125769 | A1 | 4/2020 | Kounavis et al. |
| 2020/0125770 | A1 | 4/2020 | LeMay et al. |
| 2020/0134234 | A1 | 4/2020 | LeMay et al. |
| 2020/0145187 | A1 | 5/2020 | Kounavis et al. |
| 2020/0145199 | A1 | 5/2020 | Kounavis et al. |
| 2020/0159676 | A1 | 5/2020 | Durham et al. |
| 2020/0169383 | A1 | 5/2020 | Durham et al. |
| 2020/0201789 | A1 | 6/2020 | Durham et al. |
| 2020/0257827 | A1 | 8/2020 | Kounavis et al. |
| 2020/0382289 | A1 | 12/2020 | Xue et al. |
| 2021/0058379 | A1 | 2/2021 | Bursell et al. |
| 2021/0117342 | A1 | 4/2021 | Durham |
| 2021/0149825 | A1 | 5/2021 | Durham et al. |
| 2021/0150040 | A1 | 5/2021 | Durham et al. |
| 2021/0218547 | A1 | 7/2021 | Weiler et al. |

OTHER PUBLICATIONS

USPTO Notice of Allowance in U.S. Appl. No. 16/723,927 dated Dec. 24, 2021 (13 pages).

USPTO Notice of Allowance in U.S. Appl. No. 16/724,105 dated Nov. 16, 2021 (9 pages).

(56) References Cited

OTHER PUBLICATIONS

USPTO Non-Final Office Action in U.S Patent Application Serial No. 16/723,977 dated Aug. 3, 2021 (37 pages).
USPTO Non-Final Office Action in U.S. Appl. No. 16/740,359 dated Sep. 27, 2021 (8 pages).
"Armv8.5-A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.
Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).
Beaulieu, Ray et al., "Simon and Spec: Block Ciphers for the Internet of Things," National Security Agency, Jul. 2015 (15 pages).
Borghoff, Julia et al., "PRINCE—A Low-Latancy Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).
Carr, Scott A. et al., "DataShield: Configurable Data Confidentiality and Integrity," Purdue University, Asia CCS, '17, Apr. 2-6, 2017, Abu Dhabi, United Arab Emirates (12 pages).
Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.
EPO; Extended European Search Report issued in EP Patent Application No. 20163534.9, dated Sep. 24, 2020 3 pages.
FPO; Extended European Search Report issued in EP Patent Application No. 20163546.3, dated Sep. 28, 2020 3 pages.
EPO; Extended European Search Report issued in EP Patent Application No. 20163670.1, dated Sep. 29, 2020 3 pages.
EPO; Extended European Search Report issued in EP Patent Application No. 20163907.7, dated Oct. 6, 2020; 9 pages.
EPO; Extended European Search Report issued in EP Patent Application No. 20164326.9, dated Oct. 2, 2020; 9 pages.
EPO; Extended European Search Report issued in EP Patent Application No. 20164636.1, dated Oct. 6, 2020; 8 pages.
EPO; Extended European Search Report issued in EP Patent Application No. 20168972.6, dated Jul. 3, 2020; 9 pages.
EPO; Extended European Search Report issued in EP Patent Application No. 20181907.5, dated Nov. 2, 2020; 9 pages.
EPO; Extended European Search Report issued in EP Patent Application No. 20193625.9, dated Feb. 22, 2021; 7 pages.
EPO; Extended European Search Report issued in European Patent Application No. EP 20163095.1, dated Aug. 10, 2020; 9 pages.
EPO; Extended European Search Report issued in Patent Application No. EP 20163518.2, dated Aug. 19, 2020; 10 pages.
EPO; Extended European Search Report issued in Patent Application No. EP 20163661.0, dated Aug. 17, 2020; 9 pages.
Liljestrand, Hans, et al., "PAC it up: Towards Pointer Integrity using ARM Pointer Authentication", accessed at https://arxiv.org/pdf/1811.09189.pdf, last updated May 24, 2019, 21 pages.
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
The Electronics Resurgence Initiative, "SSITH: TA1 (Hardware) Performers", accessed at: https://eri-summit.darpa.mil/docs/ERIPoster_Applications_SSITH_DARPA.pdf, Mar. 20, 2020, 1 page.
Watson, Robert N.M., et al., "An Introduction to CHERI", Technical Report UCAM-CL-TR-941, University of Cambridge Computer Labratory, Cambridge, United Kingdom, Sep. 2019, 43 pages.
Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).
Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).
Pyo, Changwoo, "Encoding Function Pointers and Memory Arrangement Checking against Buffer Overflow Attack," In Proceedings of the 4th International Conference on Information and Communications Security (ICICS 2002) (12 pages).
USPTO Final Office Action in U.S. Appl. No. 16/720,059 dated Jan. 21, 2022 (20 pages).
USPTO Non-Final Office Action in U.S. Appl. No. 17/134,406 dated Jan. 21, 2022 (11 pages).
USPTO Notice of Allowance in U.S. Appl. No. 16/723,977 dated Feb. 3, 2022 (13 pages).
Yang, Jun et al., "Improving Memory Encryption Performance in Secure Processors," IEEE Transactions on Computers, vol. 54, No. 5, May 2005 (11 pages).
EPO; Extended European Search Report issued in EP Patent Application No. 21195529.9, dated Mar. 1, 2022; 6 pages.
EPO; Extended European Search Report issued in EP Patent Application No. 21196104.0, dated Feb. 15, 2022; 10 pages.
USPTO Non-Final Office Action in U.S. Appl. No. 16/709,612 dated Feb. 17, 2022 (17 pages).
"Pointer Authentication on ARMv8.3, Design and Analysis of the New Software Security Instructions," Qualcomm Technologies, Inc., Jan. 2017, retrieved from https://www.qualcomm.com/media/documents/files/whitepaper-pointer-authentication-on-armv8-3.pdf, (12 pages).
"SSITH: TA1 (Hardware) Performers," The Electronics Resurgence Initiative, Dec. 22, 2018, available online at https://eri-summit.darpa.mil/docs/ERIPoster_Applications_SSITH_DARPA.pdf, (1 page).
Bernstein, Daniel J., "Gimli," Sep. 27, 2019, retrieved from https://csrc.nist.gov/CSRC/media/Projects/lightweight-cryptography/documents/round-2/spec-doc-md2/gimli-spec-round2.pdf, (48 pages).
BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.
Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).
Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).
Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).
Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).
Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).

(56) References Cited

OTHER PUBLICATIONS

Lilijestrand, Hans et al. "PACStack: an Authenticated Call Stack," Sep. 3, 2019, retrieved from https://arxiv.org/pdf/1905.10242.pdf, (20 pages).
Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).
Serebryany, Kostya, "ARM Memory Tagging Extension and How it Improves C/C++ Memory Safety," Summer 2019, (5 pages).
Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.
USPTO Non-Final Office Action in U.S. Appl. No. 16/723,927 dated Jun. 8, 2021 (32 pages).
USPTO Non-Final Office Action in U.S. Appl. No. 16/724,105 dated Jul. 13, 2021 (10 page).
USPTO Notice of Allowance in U.S. Appl. No. 16/724,105 dated Mar. 31, 2022 (8 pages).
USPTO Notice of Allowance in U.S. Appl. No. 16/740,359 dated Mar. 22, 2022 (9 pages).

\* cited by examiner

```
C SOURCE CODE XXX struct s1 {
  int x;          ⎫
  int y;          ⎬ ~1602
}                 ⎭ int main() {
  s1 s;
  foo(&s);   ~1606 s1 s_arr[4];
  baz(s_arr); ~1608
} void foo(s1 *a) {
  a->x = a->y;
  bar(&(a->y)); ~1610
} int gb;

void bar(const int *b) {
  gb = *b;
} void baz(s1 *s_arr) {
  gb = s_arr[2].x;
}
```

```
        ASSEMBLY LANGUAGE OUTPUT CODE WITH EBA INSTRUCTIONS
        main:
           sub $8, %rsp
           movabs (constant encoding context with size 8, type ID for
        struct s1, RW permissions), %rax
           mov %rsp, %rdi
1612 ⌒  EncryptBaseAddr $0, %rax, %rdi
           call foo
           sub $32, %rsp
           mov %rsp, %rdi
           movabs (constant encoding context with size 32, type ID for
        array of size 4 with elements of type struct s1, RW
        permissions), %rax
1614 ⌒  EncryptBaseAddr $1, %rax, %rdi // this will insert a
        context table entry
           call baz
           xor %eax, %eax
           ret foo:
           movabs (constant encoding context with size 8, type ID for
        struct s1, RW permissions), %rcx
1618 ⌒  LdEP %rcx, 4(%rdi), %eax
1620 ⌒  StEP %rcx, %eax, (%rdi)
           mov (constant encoding context with size 4, type ID for
        int, RO permissions), %rdx
           add $4, %rdi
1622 ⌒  SpecializePtr $0, %rdx, %rcx, %rdi
           call bar
           ret bar:
           mov (constant encoding context with size 4, type ID for
        int, RW permissions), %rcx
           mov (constant encoding context with size 4, type ID for
        int, RO permissions), %rdx
1624 ⌒  LdEP %rdx, (%rdi), %eax
1626 ⌒  StEP %rcx, %eax, gb
           ret baz:
           mov 16(%rdi), %eax // this will dynamically load the
        appropriate context table entry
           mov (constant encoding context with size 4, type ID for
        int, RW permissions), %rcx
1628 ⌒  StEP %rcx, %eax, gb
```

FIG. 16B

CRYPTOGRAPHIC COMPUTING USING ENCRYPTED BASE ADDRESSES AND USED IN MULTI-TENANT ENVIRONMENTS

CROSS REFERENCE TO RELATED APPLICATIONS

This Application claims the benefit under 35 U.S.C. § 119 of U.S. Provisional Application No. 62/868,884 filed Jun. 29, 2019, and entitled "Cryptographic Computing". The disclosure of the prior application is considered part of and is hereby incorporated by reference in its entirety in the disclosure of this application.

TECHNICAL FIELD

This disclosure relates in general to the field of computer systems, and more particularly, to cryptographic computing using encrypted base addresses and cryptographic computing used in multi-tenant environments.

BACKGROUND

Protecting memory in computer systems from software bugs and security vulnerabilities is a significant concern. A buffer overflow, which can affect memory safety, occurs when a program writes data to a buffer and overruns a boundary of the buffer such that adjacent memory locations are overwritten. Similarly, reading past the end of a buffer into another page may trigger an access violation or fault. Another memory safety violation is referred to as a dangling pointer. A dangling pointer is a reference that is not resolved to a valid destination. This may occur when memory is deallocated without modifying the value of an existing pointer to the deallocated (or freed) memory. If the system reallocates the freed memory and the dangling pointer is used to access the reallocated memory, unpredictable behavior, including system failure, may occur. Current computing techniques have used architecture and metadata to provide data protection. For example, in previous solutions, a processor would use lookup tables to encode policy or data about the data for ownership, memory size, location, type, version, etc. However, this metadata requires additional storage (memory overhead) and negatively impacts performance, particularly for implementations with fine-grain metadata. Thus, different approaches are needed to provide memory safety to computing systems.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIG. 16A is an example of software code using cryptographically encoded pointers with encrypted base addresses according to at least one embodiment;

FIG. 16B is an example of assembly language output from the software code of FIG. 16A according to at least one embodiment;

DETAILED DESCRIPTION

Figure 1:
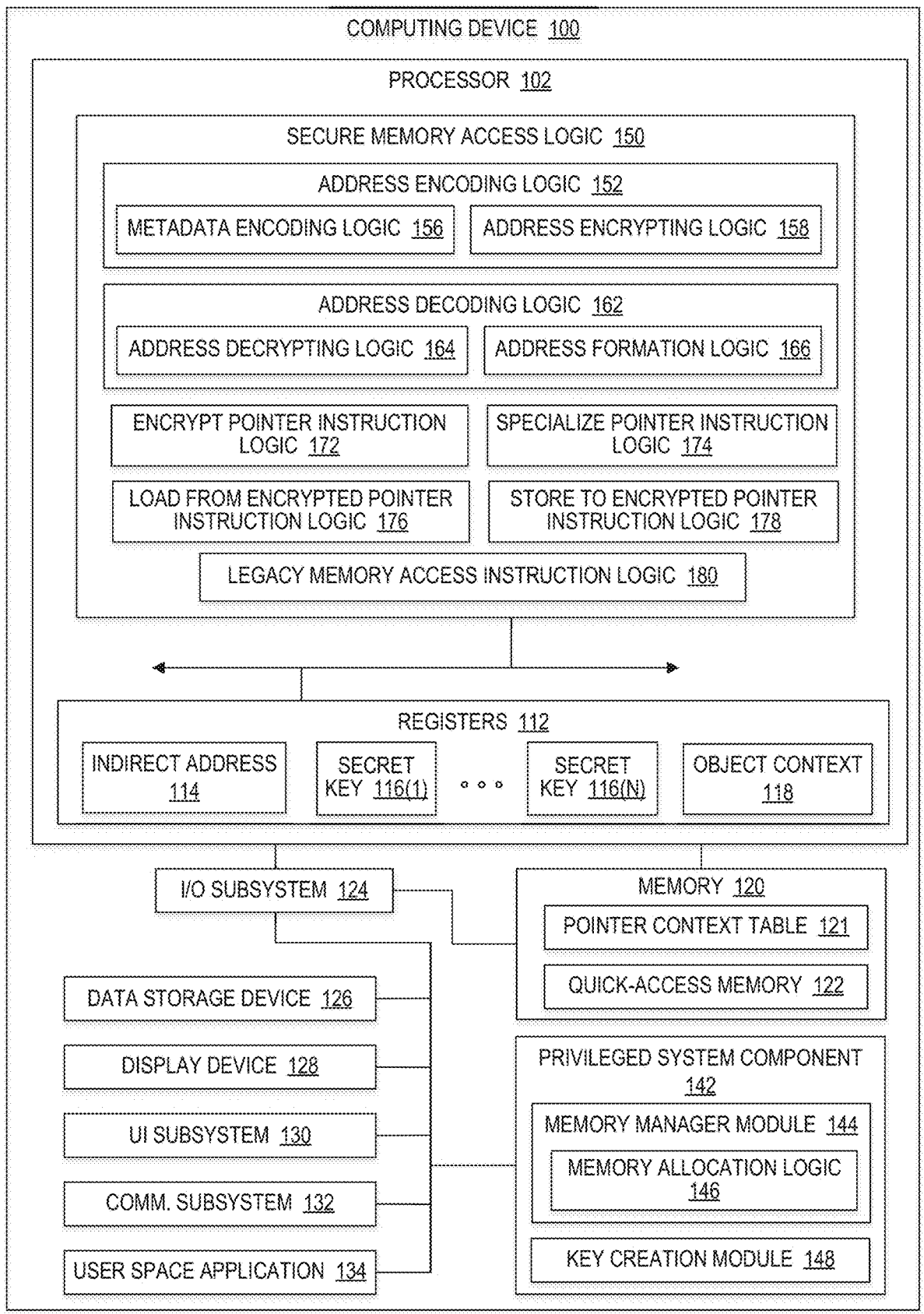
FIG. 1 is a simplified block diagram of an example computing device configured with secure memory access logic according to at least one embodiment of the present disclosure.

The following disclosure provides various possible embodiments, or examples, for implementation of cryptographic computing. Cryptographic computing is an important trend in the computing industry, with the very foundation of computing itself becoming fundamentally cryptographic. Cryptographic computing represents a sea change, a fundamental rethinking of systems security with wide implications for the industry.

Embodiments disclosed in this application are related to base address encryption in which a pointer to a memory location for data is encoded with a tag and/or other metadata and may be used to derive at least a portion of tweak input to data/code cryptographic (e.g., encryption and decryption) algorithms and address cryptographic algorithms. Thus, a cryptographic binding is created between the cryptographic addressing layer and data/code encryption and decryption. This implicitly enforces bounds since a pointer that strays beyond the end of an object (e.g., data) is likely to use an incorrect tag value for that adjacent object. In addition, embodiments also enable explicit checks on the bounds using a memory allocation size, as will be further described herein. In a one or more embodiments, a pointer is encoded with metadata (e.g., a tag of randomly generated bits) and a linear address (also referred to herein as "memory address") to a memory location. In one or more embodiments, the linear address is a base address for an object (or something inside of an object) in memory. A slice or segment of the base address includes a plurality of bits that are encrypted and embedded in the pointer. The base address slice is encrypted (and decrypted) based on a secret address key and a tweak that includes context information (e.g., memory allocation size, type of object, permissions, etc.) and/or the metadata encoded in the pointer. The same context information (and encoded metadata) is supplied when accessing the pointer in order to correctly decrypt the base address slice and generate the linear address. Binding data encryption and the pointer can be achieved by encrypting the data (or code) at the memory location using a pointer-based tweak and secret data key. The pointer-based tweak for encrypting (and decrypting) the data can be derived from the encoded pointer and potentially additional context information. In particular, a pointer-based tweak for data can be created based, at least in part, on the decrypted slice of the base address and possibly the metadata in the encoded pointer. In at least some embodiments, context information stored separately from the pointer may also be included in the tweak.

Variations of a different tweak for encrypting and decrypting a slice of the base address to be embedded in the pointer are possible in one or more embodiments. For example, different and/or additional context information such as various types of metadata, cryptographic context identifier, portions of the plaintext base address, or any suitable combination thereof may be used in the tweak used to encrypt/decrypt the slice of the memory address in the pointer. Similarly, variations of the tweak for encrypting and decrypting the data referenced by the encoded pointer are also possible. In other embodiments, additional parts of the encoded pointer may be used in the pointer-based tweak or the entire encoded pointer may be used as the pointer-based tweak. Furthermore, in at least some embodiments, different and/or additional context information such as metadata, cryptographic context identifier, slices of the plaintext address, or any suitable combination thereof may also be used in the tweak used to encrypt/decrypt the data referenced by the encoded pointer.

It should be noted that, while it is understood that data and code can be referenced by indirect addresses (also referred to herein as "pointers"), for ease of illustration, the description herein may only refer to data (rather than code) being referenced by, and cryptographically bound to, a pointer. However, it should be understood that generally, discussions regarding the memory access and encryption/decryption of such data are intended to also be applicable to code. Furthermore, the use of the term "object" herein is intended to mean a value or information or a group of values or information in memory that is referenced by a pointer. For example, an object can be a heap allocation, a local or global variable, a function, code, etc.

For purposes of illustrating the several embodiments of base address encryption in cryptographic computing, it is important to first understand the operations and activities associated with data protection and memory safety. Accordingly, the following foundational information may be viewed as a basis from which the present disclosure may be properly explained.

Current computing techniques (e.g., page tables for process/kernel separation, virtual machine managers, managed runtimes, etc.) have used architecture and metadata to provide data protection. For example, in previous solutions, a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or for per-object bounds information).

Cryptographic computing can mitigate or resolve many of the aforementioned issues (and more). Cryptographic computing may make redundant the legacy modes of process separation, user space, and kernel with a fundamentally new fine-grain protection model. With cryptographic computing, protections are cryptographic, with processors and accelerators alike utilizing secret keys and ciphers to provide access control and separation at increasingly finer granularities. Further, instead of virtual machine and process separation in current systems, with cryptographic computing, individual functions may become the boundary, allowing objects to be shared via pointers that are encrypted, with the encrypted pointers and keys providing controlled access down to individual data objects.

Cryptographic computing embodiments disclosed herein may leverage the concept of a cryptographic addressing layer where the processor decrypts software allocated memory base addresses (linear/virtual address space, sometimes referred to as "pointers") based on context information (e.g., implicit and explicit metadata, a cryptographic context identifier, metadata encoded in the pointer, etc.). As used herein, a "tweak" may refer to, among other things, an extra input to a block cipher, in addition to the usual plaintext or ciphertext input and the key (e.g., secret key $116(1)$). A tweak comprises one or more bits that represent a value. In one or more embodiments, a tweak may compose all or part of an initialization vector (IV) for a block cipher. When decryption of a base address slice is performed, if the information used to create the tweak (e.g., context information) corresponds to the original allocation of the memory address by a memory allocator (e.g., software allocation method), then the processor can correctly decrypt the base address slice and generate the full plaintext base address. Otherwise, a random address result may cause a fault and get caught by the processor.

A full plaintext base address that has been generated from a cryptographically encoded pointer may be used by the processor as at least part of a tweak to the data encryption cipher used to encrypt/decrypt data they refer to (data referenced by the cryptographically encoded pointer), creating a cryptographic binding between the cryptographic addressing layer and data/code encryption. In other embodiments, the cryptographic addresses (or address slices) may be used as at least part of a tweak for a data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

By cryptographically encoding metadata into addresses and their referenced data, cryptographic computing may reduce or remove the need for extra separate memory/storage to provide policy and context information/metadata. This can save up to billions of dollars in the computing industry (e.g., in dynamic random access memory (DRAM) expenses) due to the reduction of metadata alone. Customers can reap these savings in memory costs while still getting the security, safety and error-free functionality they want with cryptographic computing. By allowing safe speculation, the fundamentally cryptographic separation policies of cryptographic computing may allow the processor to speculate freely and provide increased performance.

In cryptographic computing, where data security is fundamentally linked to cryptographic memory addressing, processing and fine grain cryptographic access controls to data are important. Cryptographic computing transforms all compute vectors from the CPU to GPU, accelerators to FPGAs, etc. With cryptographic computing, protections may be cryptographic, where processors and accelerators alike utilize secret keys and ciphers to provide access control and separation at increasingly fine granularities. Further, instead of virtual machine and process separation, individual functions may become the boundary, address spaces are shared while pointers are encrypted, with keys providing controlled access down to individual data objects. Capabilities may thus become entwined in the cryptographic operations to provide granular access control to data objects while preventing buffer overflows, type confusion and temporal (e.g. use-after-free) vulnerabilities at every level of the system. Cryptographic code may execute natively, safely, and without the need for interpreters or managed runtimes to provide memory and type safety. Memory may move from isolated domains and containers to globally shared memory models where data is accessible based on cryptographic access control mechanisms and gone are difficult-to-scale distributed permissions, paging and associated control structures. Even files may be safely stored directly in memory (e.g., in non-volatile memory modules, such as non-volatile dual-inline memory modules (NVDIMMs)), being individually encrypted, cryptographically sized, and incorruptible from software errors. This may have implications for functional safety, reliability, and multi-tenancy, potentially allowing for more speculation for improving processing performance.

Cryptography continues to become faster and lighter. For instance, the Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer encryption have emerged recently. The PRINCE cipher, for example, can be implemented in 3 clocks requiring as little as 799 $\mu m^2$ of area in the 10 nm process, providing half the latency of AES in a tenth the Silicon area. Cryptographic computing may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information associated with the referenced data, or any suitable combination thereof as tweaks for the data encryption. A variety of encryption modes that are tweakable can be used for this purpose of including metadata (e.g. counter mode (CTR) and XOR—encrypt—XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption of the next input block.

The "Metadata Wall" may refer to the problem of additionally fetching metadata about memory operations such as access control, object type/size, and version. Today's computer architecture requires the processor to lookup metadata, or data about data, to determine if memory accesses are allowed. The additional memory accesses for metadata can impact performance, additional storage for the metadata is required, and the metadata itself needs to be protected in order to provide security. Some current solutions that add metadata in the form of bounds tables that the hardware would use to detect buffer overflows have been shown to have up to 4× performance impact with 400% memory overheads for some workloads. Similarly, shadow stack metadata enables Control-flow Enforcement Technology, and memory tagging uses metadata for versioning and capabilities add metadata for verifying data types. Memory tagging is not suitable for mitigating type confusion and protecting against uninitialized use variables. In addition, although the overhead of memory tagging may be reduced using error-correcting code bits, it can nevertheless require additional devices, which can increase costs. Capability machines may also use fat pointers to embed security metadata in-line with pointers, imposing substantial memory overheads (e.g., 25% in pointer heavy applications) due to doubling the pointer size.

In contrast, embodiments of cryptographic computing described herein may provide context information (e.g., metadata encoded in pointer, external metadata), codified as tweaks to cryptographic addressing and data, cryptographic addressing and code, or a combination thereof, removing potential performance and memory overheads caused by the inclusion of such metadata. In particular, base address encryption in cryptographic computing mitigates major categories of memory safety vulnerabilities, while simultaneously enabling compilers to embed statically-computed context information into program code to reduce time and memory overheads from loading metadata dynamically, as such overheads have been substantial in past approaches relying solely on dynamic metadata. The resulting encrypted base address slice may need no additional protections beyond the secret key, allowing reuse of the same memory as the data. Functional safety standards, which are becoming increasingly important, require the use of memory safety mechanisms to counter vulnerabilities such as data corruption, out-of-bound accesses, control flow violations, and access permission violations, for example. As further discussed or indicated herein, cryptographic computing using encrypted base addresses may solve a myriad of such memory safety vulnerabilities with the same unified mechanism, using computation instead of memory.

Turning to FIG. 1, FIG. 1 is a simplified block diagram of an example computing device 100 configured with secure memory access logic according to at least one embodiment of the present disclosure. In the example shown, the computing device 100 includes a processor 102 having a set of secure memory access logic 150 and a number of registers 112. The secure memory access logic 150 utilizes metadata about an indirect address 114, which is encoded into unused bits of the indirect address 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the indirect address 114. For example, the metadata encoding and decoding provided by the secure memory access logic 150 can prevent the indirect address 114 from being manipulated to cause a buffer overflow, and/or can prevent program code from accessing memory that it does not have permission to access. Address encoding logic 152 of the secure memory access logic 150 is invoked when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the indirect address 114, which points to the allocated memory, is encoded with the address metadata.

The address metadata can include a tag value or version number. A tag value can include randomized bits generated for the memory allocation. The randomized bits may be generated to be unique for the memory allocation. A version number can be a deterministically different value such as a sequential number that determines current ownership of the referenced allocated memory in time. The sequential number can be incremented by a predetermined amount each time an indirect address is created for newly allocated memory. The tag/version can be used as part of a tweak to encrypt and decrypt the base address slice encoded in the indirect address. The tag/version can also be used as part of a tweak to encrypt and decrypt the data or code that the base address references.

The address metadata can also include valid range metadata. The valid range metadata allows executing programs to manipulate the value of the indirect address 114 within a valid range, but could potentially corrupt the indirect address 114 if the memory is accessed using the indirect address 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the indirect address 114 (e.g., whether the indirect address 114 can be used to write, execute, or read the referenced memory).

In at least some other embodiments that will be further described herein, other metadata (or context information) can be encoded in the unused bits of indirect address 114 such as a memory allocation size (e.g., bytes of allocated memory referenced by the indirect address), a type of the data or code (e.g., class of data or code defined by programming language), and/or permissions (e.g., read, write, and execute permissions of the indirect address), a location of the data or code (e.g., address combined with the size of the data or code), the memory location where the pointer itself is to be stored, an ownership of the data or code, a privilege level (e.g., user or supervisor), a cryptographic context identifier (or crypto context ID) (e.g., randomized or deterministically unique value for each indirect address), etc. In other embodiments, such context information may not be encoded in the indirect address but instead, may be accessed statically when it is embedded in the code stream or accessed dynamically via a table look-up in memory. In some embodiments, the address metadata may include a tag of randomized bits associated with the indirect address to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the pointer may include a version number determining current ownership of the referenced allocated data in time instead of or in addition to a randomized tag value. Even if an adversary is able to guess the current tag value or version number for a region of memory, e.g. because the algorithm for generating the version numbers is predictable, the adversary may still be unable to correctly generate the corresponding encrypted portion of the pointer due to the adversary not having access to the key that will later be used to decrypt that portion of the pointer.

Address decoding logic 162 verifies the encoded metadata on memory read and write operations that utilize processor instructions such as MOV, where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). These are considered memory operands, which may specify a location in memory which the processor instruction will access to perform its operation. A data memory operand may specify a location in memory of data to be manipulated, whereas a control transfer memory operand may specify a location in memory at which the destination address for the control transfer is stored. Address decoding logic 162 may also be invoked to verify the encoded metadata for a new instruction to load data or code referenced by an indirect address and another new instruction to store data or code referenced by an indirect address. These instructions can provide the indirect address (or pointer) as a parameter along with context information that may be used as part of a tweak for decrypting the base address slice embedded in the indirect address.

The example secure memory access logic 150 is embodied as part of processor instructions (e.g., as part of the processor instruction set architecture), or microcode (e.g., instructions that are stored in read-only memory and executed directly by the processor 102). In other embodiments, portions of the secure memory access logic 150 may be embodied as hardware, firmware, software, or a combination thereof (e.g., as programming code executed by a privileged system component 142 of the computing device 100). For example, the secure memory access logic 150 may be embodied in software as an instruction set emulator (e.g., a binary instrumentation tool such as a PIN Tool) that emulates the instruction logic utilizing the encoded addresses as disclosed herein.

The secure memory access logic 150 is executable by the computing device 100 to provide security for indirect addresses "inline," e.g., during execution of a program (such as a user space software application) by the computing device 100. As used herein, the terms "indirect address" and "pointer" may each refer to, among other things, an address (e.g. virtual address or linear address), such as a base address of a memory location at which other data or instructions are stored. In an example, a register that stores an encoded memory address of a memory location where data or code is stored may act as a pointer. As such, the indirect address 114 may be embodied as, for example, a data pointer (which refers to a location of data), a code pointer (which refers to a location of executable code), an instruction pointer, or a stack pointer. Thus, indirect addresses may be referred to by other terminology, such as "pointer," "address pointer," or "pointer address." As used herein, "metadata" may refer to, among other things, information about or relating to an indirect address 114, such as a valid data range, a valid code range, pointer access permissions, a size of plaintext address slice (e.g., encoded as a power in bits), a memory allocation size, a type of the data or code, a location of the data or code, an ownership of the data or code, a version of the indirect address, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "memory store instruction" may refer to, among other things, a "MOV" or "STORE" instruction or any other instruction that causes data to be read, copied, or otherwise accessed at one storage location, e.g., register, and moved into another storage location, e.g., memory, or any instruction that accesses or manipulates memory. In one or more embodiments herein, new instructions to load data or code using a pointer encoded with an encrypted base address slice (e.g., "LdEP" instruction) and to store data or code using a pointer encoded with an encrypted base address slice (e.g., "StEP" instruction) will be further described herein.

However, the indirect address encoding/decoding technology disclosed herein is not limited to MOV or load/store instructions. For example, control transfer instructions such as call and jump instructions can be adapted to handle encoded indirect addresses in a similar manner as described herein with respect to MOV instructions, wherein code is to execute within a valid address range. Likewise, the instruction pointer (e.g., register) may be range bound given the encoded address specified by the control transfer instruction (e.g. JMP/CALL) results in an encoded address being used for the instruction pointer, thus restricting valid program execution to within a valid address range (effectively, the program counter can increment correctly until it reaches the end of the encoded range). Furthermore, in some architectures, any number of processor instructions may have a memory operand in the form of an indirect address (e.g., arithmetic operations such as ADD, SUB, MUL, AND, OR, XOR, etc. may have a source/destination memory reference in the form of an indirect address and/or they may have a source/destination register operand). In other architectures, however, the format of memory operands may vary. For example, registers may be combined in some way (e.g., by addition) to produce an effective address. Additionally, other parameters may optionally be included, such as a scaling factor that multiplies one of the register values (e.g., the index) and/or a constant displacement value embedded in the instruction that is directly added. Further, it should be noted that while the illustrative embodiments refer to "instructions," such instructions may be embodied as, e.g., processor instructions, operating system routines, or other forms of computer program code.

The example secure memory access logic 150 includes address encoding logic 152 (which includes metadata encoding logic 156 and address encrypting logic 158) and address decoding logic 162 (which includes address decrypting logic 164 and address formation logic 166). Secure memory access logic 150 also includes encrypt pointer instruction logic 172 ("EncryptBaseAddr" instruction), specialize pointer instruction logic 174 ("SpecializePtr" instruction), load from encrypted pointer instruction logic 176 ("LdEP" instruction), store to encrypted pointer instruction logic 178 ("StEP" instruction), and legacy memory access instruction logic 180 (e.g., MOV instruction). The address encoding logic 152 and the address decoding logic 162 may be embodied in processor instructions (e.g., 172, 174, 176, 178, 180), or as a separate instruction or series of instructions, or as higher-level code executed by a privileged system component such as an operating system kernel or virtual machine monitor, or as an instruction set emulator. As described in more detail below, the address encoding logic 152 and the address decoding logic 162 each operate on an indirect address 114 using metadata (e.g., one or more of valid range, permission metadata, memory allocation size, type, location, ownership, version, tag value, privilege level (e.g., user or supervisor), crypto context ID, etc.) and a secret key (e.g., secret key 116(1)), in order to secure the indirect address 114 at the memory allocation/access level. Also as described in more detail below, data encrypting logic (shown in FIG. 2) and data decrypting logic (shown in FIG. 2) may operate on data or code (referenced by indirect address 114) using at least a portion of the indirect address and a secret key (e.g., secret key 116(2)), in order to secure the data or code at the memory location referenced by the indirect address 114 by binding the data/code encryption to the indirect address.

The example indirect address 114 is embodied as a register 112 (e.g., a general purpose register of the processor 102). The example secret keys 116(1)-116(N) may be generated by a key creation module 148 of a privileged system component 142, and stored in one of the registers 112 (e.g., a special purpose register or machine specific register (MSR)), or another memory location that is readable by the processor 102. In some embodiments, the secret keys 116(1)-116(N) may be stored in a location that is readable only by the processor. In other embodiments, the secret keys 116(1)-116(N) used to secure indirect addresses, data, and code can be stored in another memory location, such as in firmware, in a secure portion of the data storage device 126 or another data storage device, or another form of memory suitable for performing the functions described herein. In some embodiments, the secret keys 116(1)-116(N) may be transmitted across a secure communications channel and restored by an executive (such as an operating system or a virtual machine monitor, e.g., the privileged system component 142 described below). In virtualized environments in which virtual machines are migrated from one machine to another, and/or in cases in which a virtual machine, process or program running on the computing device 100 begins a sleeping/hibernating mode after an indirect address and the referenced data and/or code are secured using secret keys, and then later resumes, the secret keys will need to be recovered and restored. In these cases, the secret keys can be stored or possibly transmitted across a (secure) communications channel prior to a sleeping/hibernating mode, and then retrieved/restored by an executive (such as an operating system or a virtual machine monitor, e.g., the privileged system component 142).

It should be noted that embodiments described herein allow for any number of secret keys to be used for a particular program. In one example, the same secret key may be used for all indirect addresses used in a program. In another example, a different secret key may be used for each indirect address associated with a different memory allocation or for each predefined group of memory addresses associated with different memory allocations. In yet further embodiments, the same secret key used for an address encryption/decryption may also be used for encrypting the data bound to that address. In other embodiments, one secret key may be used for address encryption/decryption, while a different secret key may be used for data encryption/decryption bound to that address. For ease of explanation, embodiments further described herein refer to "secret address key" or "address key" to refer to the use of a secret key in encryption and decryption operations of memory addresses and "secret data key" or "data key" to refer to the use of a secret key in operations to encrypt and decrypt data. Similarly, references to "secret code key" or "code key" as used herein are intended to refer to the use of a secret key in operations to encrypt and decrypt code.

On (or during) a memory allocation operation (e.g., a "malloc"), memory allocation logic 146 allocates a range of memory for a buffer and returns the indirect address 114 and the metadata (e.g., one or more of range, permission metadata, memory allocation size, type, location, ownership, version, tag, privilege level, crypto context ID, etc.). For example, the memory allocation logic 146 may encode a tag with randomized bits or a version number in the indirect address 114 (e.g., in the unused/non-canonical bits), or supply the metadata as one or more separate parameters to the instruction, where the parameter(s) specify the range, code permission information, memory allocation size, type, location, ownership, version, tag, privilege level (e.g., user or supervisor), crypto context ID, or some suitable combination thereof. Illustratively, the memory allocation logic 146 is embodied in a memory manager module 144 of the privileged system component 142. The memory allocation logic 146 initiates the address encoding logic 152. The address encoding logic 152 includes metadata encoding logic 156, which encodes the indirect address 114 with the metadata such as a tag, or with other metadata in other encoding variations (e.g., range, permission metadata, memory allocation size, type, location, ownership, version, tag value, privilege level, crypto context ID, some suitable combination thereof, etc.). The address encoding logic 152 stores the metadata in an unused portion of the indirect address 114 (e.g., non-canonical bits of a 64-bit address). For some metadata or combinations of metadata, the indirect address 114 may be encoded in a larger address space (e.g., 128-bit address, 256-bit address) to accommodate the size of the metadata or combination of metadata.

In an embodiment, address encoding logic 152 selects a portion (or slice) of the base address to be encrypted and encoded in the indirect address 114. In other embodiments, the slice of the base address to be encrypted may be known a priori (e.g., lower 32 bits, etc.). The address encrypting logic 158 encrypts the selected slice of the base address using the secret address key 116(1) and an address tweak, as described further below. On a memory access operation (e.g., a read, write, or execute operation), the address decoding logic 162 decodes the previously-encoded indirect address 114. To do this, the address decrypting logic 164 decrypts the encrypted slice of the base address encoded in the indirect address 114 using the secret key 116(1) and the address tweak, as described further below. The upper address bits (UAB) of the base address, which are not included as part of the slice to be encrypted, may be externally stored in a table (e.g., pointer context table 121) or register (e.g., object context 118). A number of plaintext offset bits (e.g., 25) are encoded in the lower bits of the indirect address 114. In at least one embodiment, they may be initialized to zeros.

The indirect address 114 is returned to its original (e.g., canonical) form, based on appropriate operations (e.g. address decoding logic 162) in order to restore the original value of the indirect address 114 (e.g., the true, original linear memory address). To do this in at least one possible embodiment, the address decoding logic 162 may remove the address metadata (e.g., tag) encoded in the unused bits of the indirect address 114 (e.g., return the unused bits to their original form). The encrypted slice can be decrypted and concatenated with the upper address bits. The result can be adjusted based on the offset. If the indirect address 114 decodes successfully, the memory access operation completes successfully. However, if the encoded indirect address 114 has been manipulated (e.g., by software, inadvertently or by an attacker) so that its value falls outside the valid range indicated by the range metadata (e.g., overflows the buffer), the indirect address 114 will be corrupted as a result of the decrypting process performed by the address decrypting logic 164. A corrupted indirect address will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. In this way, the secure memory access logic 150 enables the computing device 100 to provide indirect address security against buffer overflow attacks and similar exploits. Embodiments of the indirect address security technologies disclosed herein can also be used for software debugging purposes or as an access control mechanism to prevent software from accessing areas of memory for which the software does not have permission. Additionally, in comparison to other buffer overflow mitigation techniques, embodiments of the disclosed indirect address security technologies can operate without any binary modifications, or without the need to recompile legacy code. In some scenarios, the indirect address instructions disclosed herein can operate without any additional memory reads/writes, or without any additional instructions. Moreover, embodiments of the disclosed technologies are responsive to adversaries that can read memory and overwrite pointer values, as well as adversaries that can create/select arbitrary pointer values. Further, embodiments of the disclosed technologies can scale from very small memory ranges to very large memory ranges, or can cascade memory ranges within other memory ranges by using different encoded pointers. Still further, embodiments of the disclosed technologies are effective with dynamic memory allocation (e.g., due to the ability to programmatically create range encoded pointers inline). Additionally, embodiments of the disclosed technologies can be extended to provide code block (code location) access controls to data. Further, embodiments of the disclosed technologies are compatible with 64-bit versions of the x86 instruction set, as well as ARM, MIPS, PowerPC and other processor architectures, including wider (e.g., greater than 64-bit) address bit architectures and smaller (e.g. 32-bit) architectures by reserving address ranges for the metadata containing addresses.

Some embodiments of the disclosed technologies utilize aspects of address decoding logic to support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor. "Legacy code" also refers to a version of computer code designed without using or being adapted to use dedicated instructions for encoding and encrypting indirect addresses as described herein.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 150.

The computing device 100 also includes memory 120, an input/output subsystem 124, a data storage device 126, a display device 128, a user interface (UI) subsystem 130, a communication subsystem 132, at least one user space application 134, and the privileged system component 142 (which, illustratively, includes the memory manager module 144 and the key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a multi-core processor, other multiple-CPU processor or processing/controlling circuit, or multiple diverse processing units or circuits (e.g., CPU and GPU, etc.). The processor 102 has a number of registers 112, which include general purpose registers and special purpose registers. The indirect address 114 and the secret keys 116(1)-116(N) are stored in registers 112. Object context 118 may also be stored in a register. Object context 118 may include a slice of the most significant bits or "upper address bits" (e.g., upper 22 bits in a 57-bit indirect address), which are not encoded in an indirect address (e.g., 114) for the object. As will be further described herein, in this scenario, an indirect address can reference data stored in a statically-addressable memory region (e.g., quick-access memory 122). For some scenarios in which data is stored in a statically-addressable memory region, a linear address for the data can be generated from the indirect address without dynamically obtaining the upper address bits or other context information from, for example, a dynamically-accessible table. Instead, the upper address bits can be obtained from a register, and other context information can be statically provided in the program code. Thus, data stored in a statically-addressable memory region can be more quickly accessed than data stored in other memory in which dynamic look-ups for context information is required. There may be some instances, however, where the other context information is dynamically retrieved even though the data is stored in a statically-addressable region. This may occur when it is desirable to store certain objects in a statically-addressable region but the compiler is unable to statically supply the context information for those objects.

The memory 120 of the computing device 100 may be embodied as any type of volatile or non-volatile memory or data storage capable of performing the functions described herein. In operation, the memory 120 may store various data and software used during operation of the computing device 100, as well as operating systems, applications, programs, libraries, and drivers. In one or more embodiments, memory 120 includes a pointer context table 121, which may contain multiple table entries. The location of the pointer context table 121 may be indicated as a physically-addressable table base defined by a register, such as a model-specific register (MSR)), for example. Each table entry can include context information associated with a cryptographically encoded pointer to an object in memory. In one embodiment, the context information may include size metadata (e.g., a value indicating the memory allocation size for the object), type metadata (e.g., type or class of object), and permissions metadata (e.g., permissions of a pointer to the object). One or more table entries may also contain the upper address bits (UABs) associated with the cryptographically encoded pointer. One or more other table entries may encode zeros for the upper address bits associated with the cryptographically encoded pointer, for example, when the upper address bits are stored in a register (e.g., 118). In at least one embodiment, the pointer context table 121 could be indexed by the encrypted slices of cryptographically encoded pointers to objects. Each table entry can be indexed by an encrypted slice of a respective cryptographically encoded pointer. However, in other embodiments, any suitable technique may be used to index or otherwise map the table entries to their respective pointers, including but not necessarily limited to indexes, other pointers, hash tables, or any other technique that represents a relation, connection, link, or association between the table entries and their respective pointers. Moreover, other indexes may also be used. For example, any portion of a cryptographically encoded pointer that is sufficiently unique could be used to index the pointer context table. For example, pointer context table 121 could be indexed by at least a portion of the cryptographically encoded pointers such as the encrypted slice of the base address, the encrypted slice of the base address plus a tag portion, the entire cryptographically encoded pointer, etc. It should be noted, however, that the entire cryptographically encoded pointer could be suitable as an index as long as the pointer is not modified by the software. For example, if the software updates an offset in the pointer to point to a field within the object, the pointer will change. In this case, indexing the table by the entire pointer could prevent the table entry from being found. The table can be managed from userspace using a new instruction set architecture (ISA) as further described herein. Collisions in the table are possible, however, so the operating system is responsible for handling such occurrences as will be further described herein.

Certain regions of memory 120 may be defined as quick-access memory 122. Quick-access memory 122 represents a region of memory where a register (e.g., 112) can specify the upper address bits of the region. For example, a memory region of 4GB may be designated as quick-access memory where 4GB of data (or code) can be stored and memory access can be performed by an instruction that supplies the appropriate context information (e.g., memory allocation size, type, permissions) and pulls the upper address bits from a register (e.g., object context 118) rather than a table in memory (e.g., pointer context table 121). Although a quick-access memory region may be 4GB as illustrated, any other suitable memory size may be designated as quick-access memory according to particular needs and implementations. For example, a quick-access memory region may be 32GB if objects are aligned to an 8-byte boundary.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as the user space application 134 and the privileged system component 142. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes a number of computer program components, such as the memory manager module 144 and the key creation module 148. Each of the components of the privileged system component 142 may be embodied as software, firmware, hardware, or a combination of software and hardware. For example, the components of the privileged system component 142 may be embodied as modules of an operating system kernel, a virtual machine monitor, or a hypervisor. The memory manager module 144 allocates portions of memory 120 to the various processes running on the computing device 100 (e.g., as ranges of virtual memory addresses). The memory manager module 144 is embodied as, for example, a loader, a memory manager service, or a heap management service. The key creation module 148 creates the secret keys 116(1)-116(N) (e.g., secret address keys, secret data keys, secret code keys) and writes them to a register or registers to which the processor 102 has read access (e.g., a special purpose register). To create a secret key, the key creation module 148 may execute, for example, a random number generator or another algorithm capable of generating a secret key that can perform the functions described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor (not shown), or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2:
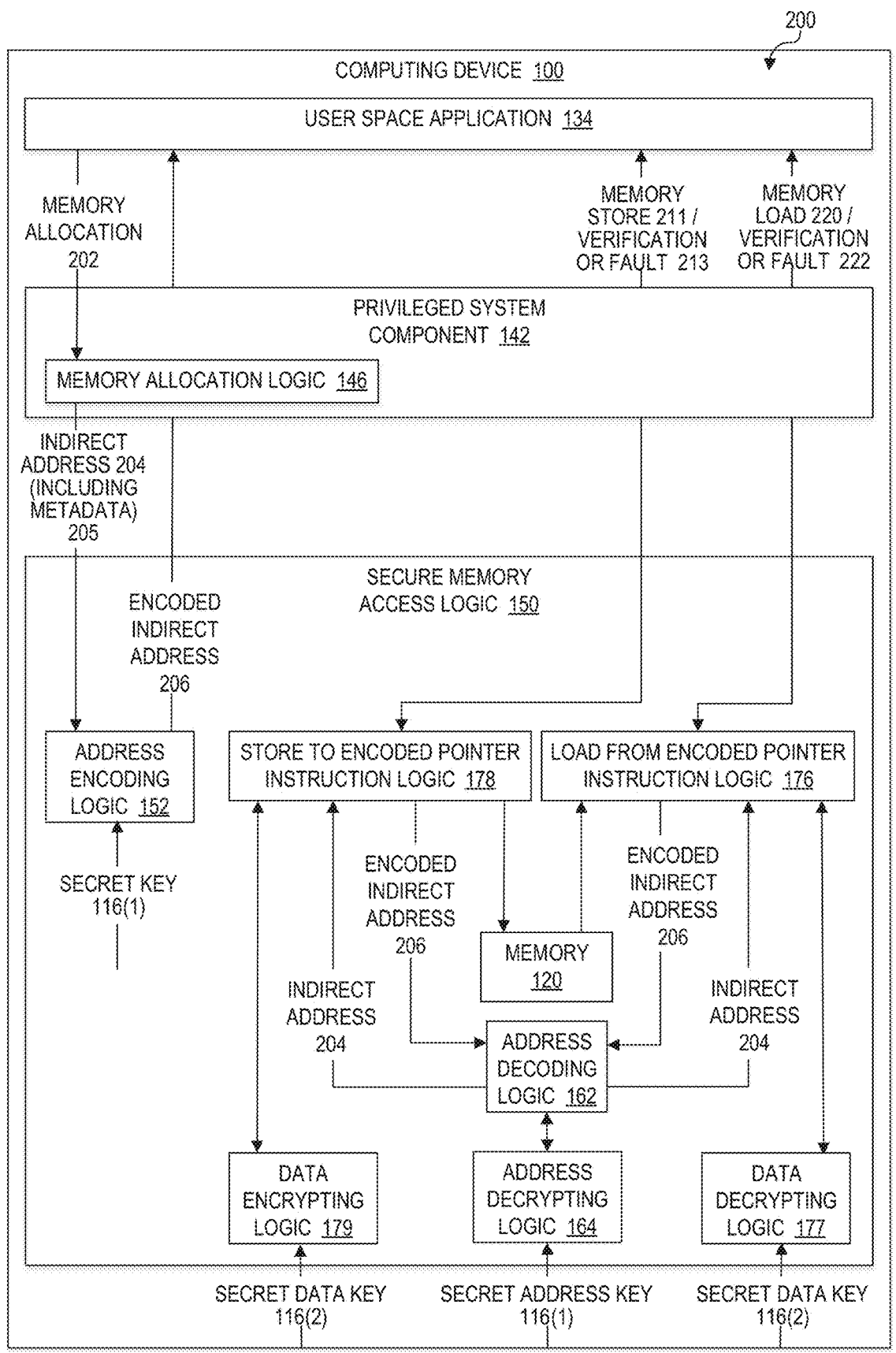
FIG. 2 is a simplified environment diagram illustrating an application of the secure memory access logic of FIG. 1 according to at least one embodiment of the present disclosure.

FIG. 2 is a simplified environment diagram illustrating an application of the secure memory access logic of FIG. 1 according to at least one embodiment of the present disclosure. In some embodiments, the computing device 100 may establish an environment 200 during operation (e.g., native and/or virtual runtime or "execution" environments). The various modules depicted in the example environment 200 may be embodied as hardware, firmware, software, or a combination thereof. In the environment 200, the user space application 134 (or the privileged system component 142, e.g., in loading a user space application 134) may, from time to time, during the operation of the computing device 100, issue a memory allocation 202. The memory allocation 202 may be translated (e.g., compiled or interpreted), as needed, by the memory allocation logic 146 of the privileged system component 142 before being passed on to the processor 102.

In the processor 102, the address encoding logic 152 is executed in response to the memory allocation 202 (e.g., in place of a conventional "malloc" instruction/function call). In one or more embodiments, the memory manager module 144 (or memory allocator) may include a heap allocator or stack allocator that executes an encrypt pointer instruction (EncryptBaseAddr), which performs address encoding logic 152, along with additional checks related to the size of the object relative to the bounds of the region within which the object is allocated, and table management for storing context information in some scenarios. In addition, a specialize pointer instruction (SpecializePtr) may also perform address encoding logic 152, along with additional checks to ensure that the object is contained within the memory allocated by another pointer and that the permissions granted to the specialized pointer are not greater than the permissions granted to the other pointer.

Whereas a conventional malloc instruction simply allocates memory and returns an (unsecured) pointer, the address encoding logic 152 encodes an indirect address 204, including metadata 205 such as a tag of randomized bits or, in other encodings other metadata (e.g., the range permission information, memory allocation size, type, location, ownership, version, privilege level, crypto context ID or key, or any combination thereof, etc.) may be included, and returns an encoded indirect address 206. The metadata may be embedded in the indirect address or pointer (e.g., a standard 64-bit register or enlarged register such as 128 bits or 256 bits to fit more metadata) in a plaintext format, embedded within another operand that is provided to the pointer encryption/decryption instructions and data access instructions, stored in a table in memory or in a control register, or provided via any combination thereof. For example, the tag value may be embedded in the pointer and the crypto context ID may be stored in a control register.

Similarly, the user space application 134 or the privileged system component 142 may issue a memory store 211 from time to time, which may be handled by the processor 102 as a processor instruction that reads from a register 112 (or other storage unit) and writes to memory 120 or cache using indirect address 114 (e.g. a STORE, MOV instruction). Using the STORE instruction as an example, the memory store instruction logic 170 stores data only after successfully executing address decoding logic 162 to decode the encoded indirect address 206 and also successfully executing data encrypting logic 179 based on a data tweak and secret data key 116(2) to encrypt the data to be stored at a memory location pointed to by the indirect address 204. Successful execution of address decoding logic 162 is based on successful execution of address decrypting logic 164, which uses an address tweak and secret address key 116(1) to decrypt the encrypted address slice of the encoded indirect address 206.

Similarly, the user space application 134 or the privileged system component 142 may issue a memory load 220 from time to time, which may be handled by the processor 102 as a processor instruction that reads from memory 120 and writes to a register 112 using an indirect address 114 (e.g. LdEP or MOV instruction). Using the LOAD from encrypted pointer (LdEP) instruction as an example, the load from encrypted pointer instruction logic 176 performs the memory access only after successfully executing the address decoding logic 162 to decode the encoded indirect address 206. Successful execution of address decoding logic 162 is based on successful execution of address decrypting logic 164, which uses an address tweak and secret address key 116(1) to decrypt the encrypted address slice of the encoded indirect address 206. Once the indirect address 204 is returned and memory 120 is accessed to load data from the memory location pointed to by the indirect address 204, the loaded data may be decrypted by executing data decrypting logic 177 based on a data tweak and secret data key 116(2). Successful execution of the data decrypting logic 177 depends on whether the portions of the indirect address used to create a data tweak to decrypt the data, and the additional metadata (if any) used to create the data tweak, correspond to the original allocation of the memory location pointed to by the indirect address.

While the address decoding logic 162 is shown as a separate module from store to encrypted pointer instruction logic 178 and load from encrypted pointer instruction logic 176 in FIG. 2, it should be understood that the address decoding logic 162 can be incorporated into the instruction logic 178 and/or 176 or can be embodied as a separate set of instructions. Further, it should be understood that the address decoding logic 162 can be incorporated into or referenced by other types of instructions, alternatively or in addition to the LdEP, StEP, and MOV instructions (e.g., arithmetic instructions with memory operands, call, JMP, etc.). For example, control transfer instructions such as call and JMP can load the encoded pointer address for the code to execute into the processor's program counter register (e.g. instruction pointer) (e.g., the RIP, where RIP is the instruction pointer register in 64-bit code). The instruction pointer register can then be queried by the processor and as a result, the current program counter address will be the encoded form (offset to the current program counter location).

If the address decoding logic 162 successfully decodes the encoded indirect address 206, which includes the address decrypting logic 164 successfully decrypting the encrypted address slice in the encoded indirect address, the original indirect address 204 is returned to the privileged system component 142 and the memory access is completed, or program execution begins at the new program counter location (in the case of control flow changes). If the encoded indirect address 206 does not successfully decode, a fault is raised. Based on the successful completion or failure of memory store 211, an appropriate verification or fault signal 213 is returned to the user space application 134. Similarly, based on the successful completion or failure of memory load 220, an appropriate verification or fault signal 222 is returned to the user space application 134.

Cryptographically Encoded Pointers in an Encrypted Base Address (EBA) Format

Figure 3:
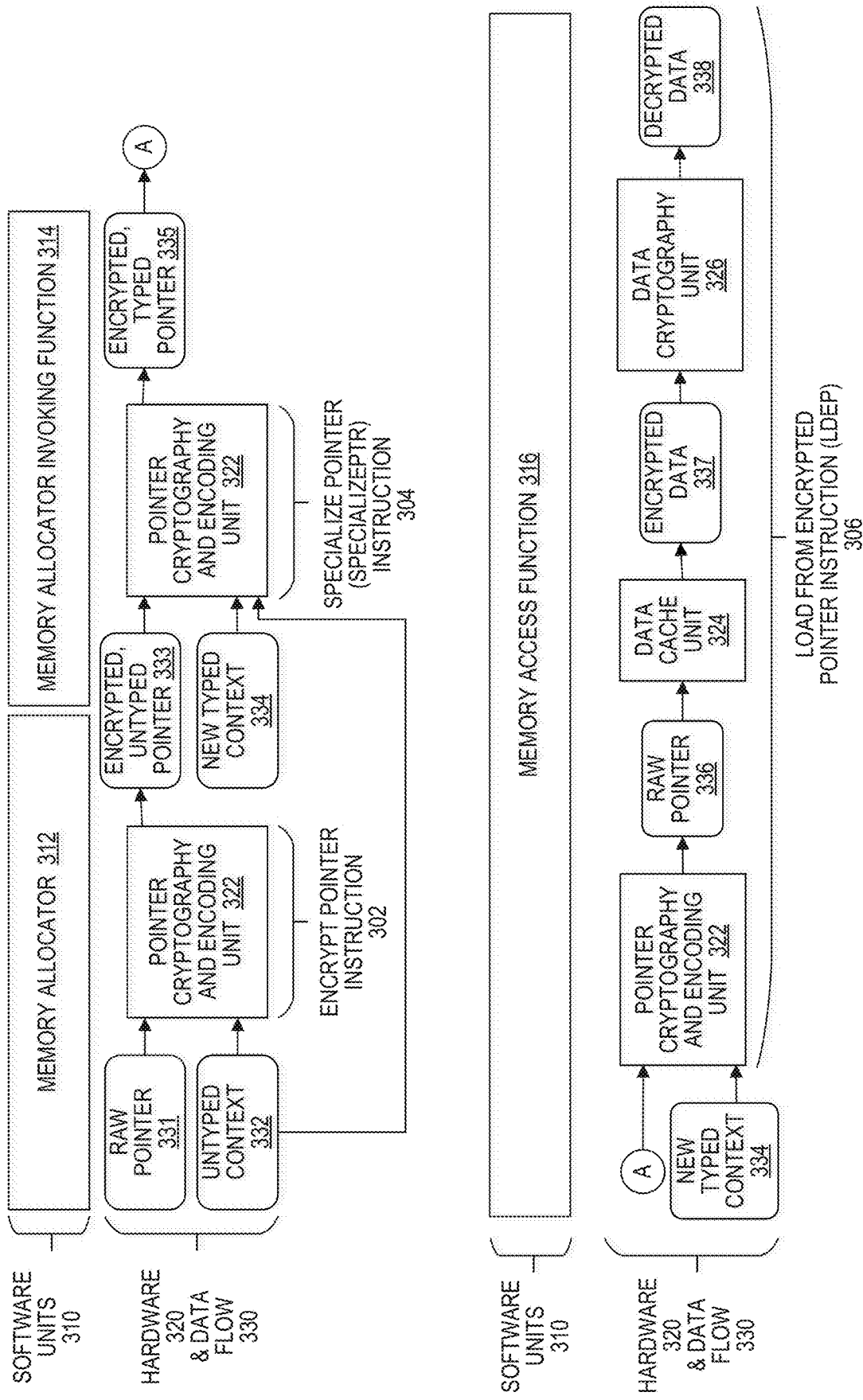
FIG. 3 is a simplified block diagram of possible example details of hardware, software units, and data flow in a computing device according to at least one embodiment.

FIG. 3 is a simplified flow diagram 300 illustrating additional details of software units, hardware, and data flow associated with memory allocation and access using a cryptographically encoded pointer in an encrypted base address (EBA) format. A pointer having an EBA format is encoded with an encrypted slice of a base address and at least one item of metadata associated with the data stored at the base address. In one or more embodiments, a computing device such as computing device 100 includes software units 310, hardware 320, and data flow 330. Software units 310 include a memory allocator 312, a memory allocator invoking function 314, and a memory access function 316. Hardware 320 includes a pointer cryptography and encoding unit 322, a data cache unit 324, and a data cryptography unit 326. Data flow 330 includes a raw pointer 331, untyped context 332, an encrypted, untyped pointer 333, typed context 334, an encrypted, typed pointer 335, encrypted data 337, and decrypted data 338.

An encrypt pointer (EncryptBaseAddr) instruction 302 may be invoked by memory allocator 312. For example, memory allocator invoking function 314 may invoke memory allocator 312 by requesting memory for an object (e.g., malloc instruction), and the memory allocator 312 may include a heap allocator or stack allocator that invokes the EncryptBaseAddr instruction 302. The EncryptBaseAddr instruction 302 causes pointer cryptography and encoding unit 322 to encrypt a slice of raw pointer 331 using untyped context 332. Raw pointer 331 is passed as a register operand of EncryptBaseAddr instruction 302 and represents a plaintext base address for the allocated memory in which the object is to be stored. The slice of the base address to be encrypted includes predetermined bits in the address (e.g., bits 3 to 34). The upper bits in the base address may be stored externally (e.g., in a table in memory or in a register). The untyped context 332 is also passed as a register operand and can include, for example, context information such as memory allocation size and permissions metadata for the object. Untyped context 332 does not include type metadata for the object. The untyped context 332 can be used as a tweak input to an encryption algorithm (e.g., block cipher) to encrypt the slice of the raw pointer 331 (e.g., plaintext base address). Pointer cryptography and encoding unit 322 may also generate a tag of randomized bits, which can be used as part of the tweak for the base address slice. In at least one embodiment, pointer cryptography and encoding unit 322 generates encrypted, untyped pointer 333 by concatenating the tag, the encrypted base address slice, and an offset in the pointer 333. The offset may be initialized to zeroes.

The memory allocator invoking function 314 can invoke a specialize pointer instruction 304 (SpecializePtr) based on a previously-encoded pointer such as encrypted, untyped pointer 333. In at least one embodiment, the encrypted, untyped pointer 333, the untyped context 332, and the typed context 334 can be passed as register operands of the SpecializePtr instruction 304. The SpecializePtr instruction 304 causes pointer cryptography and encoding unit 322 to decrypt the encrypted base address slice of the encrypted, untyped pointer 333 using the original context (e.g., untyped context 332). The upper address bits of the base address may be retrieved and concatenated with the decrypted base address slice. If the decrypted base address slice represents bits 3 to 34 of the original base address (i.e., because the address is 8-byte aligned), then three bits initialized to "0" are concatenated at the end of the decrypted base address slice to obtain the original base address. The offset of the encrypted, untyped pointer 333 can be added to the original base address to obtain a specialized base address to a sub-region within the allocated memory (or to the same region of the allocated memory) for which a specialize pointer is to be generated. For example, if the offset has changed, then the specialized address will point to a location within the allocated memory. If the offset has not changed, then the specialized address will point to the same location as the original base address. This may be desirable, for example, when restricted access to the same object is desired, because permissions can be reduced for the specialized address. Once the specialized address is computed, the new context (e.g., typed context 334) can be used as a tweak input to an encryption algorithm (e.g., block cipher) to encrypt a slice of the special address. In at least one embodiment, typed context 334 includes a memory allocation size, permissions, and a type of the object. The memory allocation size in the typed context 334 may be the same or smaller than the memory allocation size in the untyped context 332. The permissions metadata in the typed context 334 may be the same or less than the permissions metadata in the untyped context 332. Pointer cryptography and encoding unit 322 may also generate a tag of randomized bits, which can be used as part of the tweak for the specialized address slice. The tags for pointers that are used to access the same regions of memory should match to ensure correct data decryption. In other embodiments, the tag encoded in the encrypted, untyped pointer 333 may be used instead. In at least one embodiment, pointer cryptography and encoding unit 322 generates encrypted, typed pointer 335 by concatenating the tag (either the newly generated tag or the original tag encoded in pointer 333), the encrypted specialized address slice, and an offset in the pointer 335. The offset may be initialized to zeroes.

After a pointer is cryptographically encoded with a base address slice or specialized address slice, metadata (e.g., tag), and an offset, the cryptographically encoded pointer may be used to access an object stored in the memory location referenced by the pointer. Thus, both the encrypted, untyped pointer 333 and the encrypted, typed pointer 335 could be used to access memory at their respective locations based on their respective permissions. For illustration purposes, FIG. 3 further shows how a specialized pointer such as encrypted, typed pointer 335 can be used to access memory. For example, the memory access function 316 can invoke a load from encrypted pointer instruction 306 (LdEP) based on a previously-encoded pointer such as encrypted, typed pointer 335. In at least one embodiment, the encrypted, typed pointer 335 and the typed context 334 can be passed as register operands of the LdEP instruction 306. The LdEP instruction 306 causes pointer cryptography and encoding unit 322 to decrypt the encrypted specialized address slice of the encrypted, typed pointer 335 using the typed context 334 as a tweak and generate a raw pointer 336. The upper address bits of the specialized address (which are the same as the upper address bits of the base address) may be retrieved and concatenated with the decrypted specialized address slice. If the decrypted specialized address slice represents bits 3 to 34 of the original specialized address (i.e., because the specialized address is 8-byte aligned), then three bits initialized to "0" are concatenated at the end of the decrypted specialized address slice to obtain the original specialized address. The offset of the encrypted, typed pointer 335 can be added to the original specialized address to obtain the raw pointer 336, which is the location in memory to be accessed. If there is no offset, then raw pointer 336 represents the original specialized address.

Once the raw pointer 336 is generated, LdEP instruction 306 performs access control checks such as boundaries and permissions. If the access control checks succeed, then the object (or data) from the desired memory location is loaded into a destination operand and decrypted. Raw pointer 336 is used to load data from memory, such as from data cache unit 324 into a register. In at least one embodiment, the data being accessed is encrypted using a tweak that binds the encrypted, typed pointer 335 to the data. For example, the tweak used to encrypt the data may include raw pointer 336 and the tag encoded in the encrypted, typed pointer 335. In one or more embodiments, additional context may also be used in the tweak including, for example, a crypto context identifier (or crypto context ID) (e.g., 64-bit random or deterministically unique value assigned to the pointer) and/or other variable length metadata (e.g., range, location, ownership, version, privilege level, etc.). LdEP instruction 306 causes data cryptography unit 326 to decrypt encrypted data 337 using the same tweak to generate decrypted data 338. The address metadata may include a tag of randomized bits associated with the indirect address to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the indirect address may include a version number (or other deterministic value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

Figure 4:
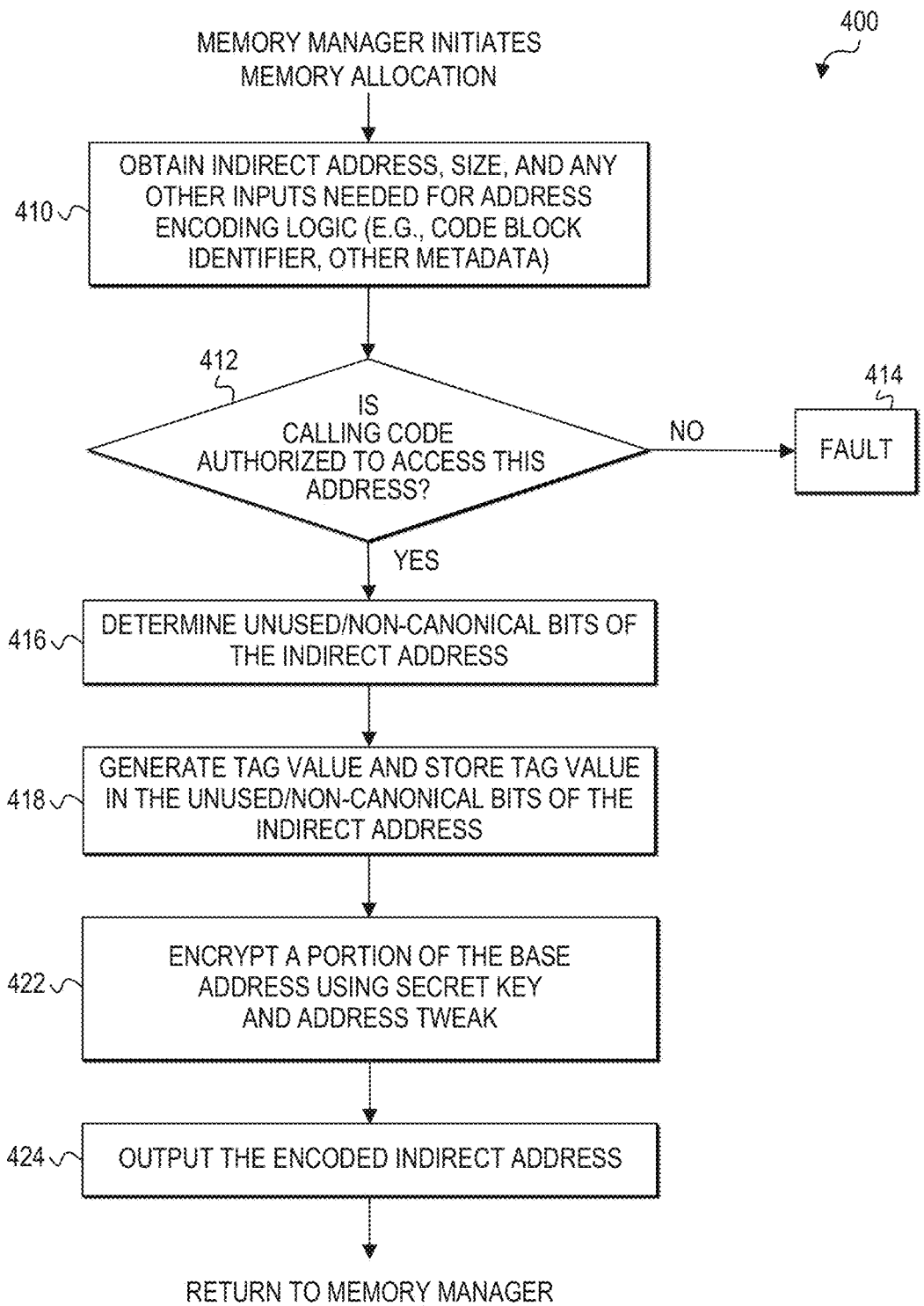
FIG. 4 is a simplified flow diagram of at least one embodiment of a process for providing security for an indirect address as disclosed herein, which may be executed by the computing device of FIG. 1.

Referring now to FIG. 4, an example process 400 for securing an indirect address is shown. Portions of the process 400 may be executed by hardware, firmware, and/or software of the computing device 100 (e.g., by the processor 102 executing the address encoding logic 152). The process 400 begins in response to a memory allocation (e.g., by a memory manager module). In block 410, the computing device 100 obtains the indirect address, size of memory to be allocated, and other inputs needed to encode the indirect address (e.g., a code block identifier, instruction pointer, permissions metadata, possibly type metadata, and/or other possible metadata for tweaks, as described herein). In block 412, the computing device 100 determines whether the calling code (e.g., the code initiating the memory allocation) is authorized to access the indirect address received in block 410 (e.g., indirect address 204). To do this, the computing device 100 may perform an access control check by verifying the instruction pointer or caller privilege level information for the calling code, which may be obtained from, for example, a heap manager of the memory manager module 144. If the computing device 100 determines that the calling code is not authorized to access the indirect address, a fault is raised (414). If the computing device 100 determines that the calling code is authorized to access the indirect address, the computing device 100 proceeds to block 416. In block 416, the computing device 100 determines the unused (e.g., non-canonical) address bits of the indirect address to perform metadata encoding (e.g., tag value). To do this, the computing device 100 may simply use the higher (e.g., most significant) unused/non-canonical bits of the indirect address. It should be noted that the encoded addresses do not need to be architecturally non-canonical. Rather, the unused/non-canonical addresses can simply be a range of memory set aside by, for example, the privileged system component 142, to enable the address encoding as disclosed herein.

In block 418, the computing device 100 creates the metadata (e.g., tag/version value) and stores the metadata in the unused/non-canonical bits of the indirect address selected in block 416. In block 422, the computing device 100 encrypts a portion of the base address, where the portion of the base address to be encrypted is a pre-determined number of bits in the address. In one example, a 57-bit address may be stored in a 64-bit register. The portion (or slice) of the base address to be encrypted may include 32 bits. If the base address is aligned to an 8-byte boundary, then the lowest three significant bits may be set to zero and the portion (or slice) to be encrypted can include bits 3-34. The remaining bits 35-56 may be stored separately. To save space in the pointer, the least significant three bits can be removed and added back when the encrypted slice of the base address is decrypted. Although this is one possible implementation that provides a suitable size for various block cipher encryption options, any other suitable number of bits may be pre-determined for encrypting and encoding in the indirect address based on particular needs and implementation details. Indeed, other block cipher configurations with different input sizes may be utilized and the size of the encrypted slice in the indirect address may be adjusted accordingly. In some embodiments, the pre-determined portion of bits of the used bits/canonical address are encrypted with a secret address key (e.g., the secret address key 116(1)), using the tag/version metadata and other context information such as memory allocation size and permissions metadata as an address tweak. In the illustrated embodiments, metadata encoded in the indirect address (e.g., tag/version metadata) would not be encrypted because the processor uses the encoded metadata as a tweak in the case of a tweakable block cipher (and thereby affects the encrypted bits). Generally, context information that may be used as tweaks includes, but is not necessarily limited to: data stored in the unused bits of the indirect address, the upper limit on the buffer size, an exponent of a two's power boundary selected as the upper limit on the buffer size, a code block identifier, instruction pointer data, permission information encoded in the metadata, version number (useful when reassigning/revoking pointers that were previously assigned to a program, version may be maintained by the processor in a register), and/or other metadata described herein (e.g., plaintext address slice, size, memory allocation size, type, location, ownership, tag, privilege level, crypto context ID, or any suitable combination thereof).

As used herein, a "tweak" may refer to, among other things, a second input to a block cipher, in addition to the usual plaintext or ciphertext input and the key (e.g., the secret key 116(1)-116(N)). In at least some embodiments, a tweak may compose all or part of an initialization vector (IV) for a block cipher. Encrypting a slice of the indirect address enables computing device 100 to detect when the indirect address has been illegally changed, because the encryption algorithm will cause the illegally-changed bits to produce a random sequence of bits that are non-deterministic to an adversary, which likely results in a fault when the illegally-changed indirect address is used.

The portion of the indirect address to be encrypted, which may be in a lower portion of the indirect address (e.g., the least significant 32 bits, bits 3-35 for an 8-byte boundary aligned address, etc.), is encrypted using a cipher mode encryption algorithm, such as a tweakable block cipher, using the metadata (e.g., tag/version value) encoded in the indirect address a tweak. Some examples of tweakable block ciphers include: XOR-encrypt-XOR (XEX), Liskov, Rivest, and Wagner (LRW), and XEX-based tweaked-codebook mode with ciphertext stealing (XTS). Other bit diffusion methods in which any single bit change in the cipher text results in changes across the entire decrypted plaintext can be used. If desired, alternative embodiments can trade off security for performance by using non-cryptographic methods that still achieve reasonable bit diffusion and confusion analogous to a block cipher.

The cipher selected for the encryption can be implemented in hardware, using an algorithm that has a bit-selectable or otherwise variable block size (e.g., any block cipher or similar diffusion algorithm with appropriate block sizes that may constructed to utilize a tweak), or an algorithm that allows a fixed block size with a tweak using the remaining unencrypted bits (e.g., the extra bits outside the fixed block size). A cipher that has a bit-selectable block size may accept as an input (in some cases, along with the plaintext to be encrypted) a bit-length parameter that specifies how many bits of the plaintext are to be encrypted. In some cases, the bit-length parameter specifies the same number of bits that are in the plaintext, and in other cases, the bit-length parameter specifies a number of bits in the plaintext less than the length of the entire plaintext. The cipher encrypts the plaintext bits using an encryption key (which may be of the same or different length from the bit-length parameter). In cases where the encryption key is longer than the bit-length parameter, a subset of the bits of the key equal to the bit-length parameter may be used in the cipher. The cipher encrypts as many bits from the plaintext as specified by the bit-length parameter using a sequence of logical operations that include at least two logical AND operations and two logical XOR operations. Each of the operations is performed both on the bits of the plaintext and on the bits of the key; that is, each of the operations is performed on at least one plaintext bit and at least one key bit. In this manner, both confusion and diffusion between the plaintext and the ciphertext may be achieved. This bit-length parameterizable cipher according to the present disclosure may be referred to as a K-cipher.

A K-cipher may also be configured to receive a tweak input so that encryption (and decryption) is based on the encryption key and the tweak input. For example, the tweak input may be added to a certain number of round keys in a key schedule generated by the K-cipher. The tweak input may have the same length as the round keys and may be configured in any suitable manner, including tweak inputs that are described herein with reference to various embodiments.

In some embodiments, the cipher has sufficient bit diffusion so that any bit change made to the encrypted address bits will equally affect (cascade through) all bit positions when decrypted. This provides the basis for a corrupted address given any change or bounds violation. Using this method, if the adversary attempts to tamper with the metadata (e.g., tag/version value) the resulting decoded address will be corrupted. In the 64-bit address space, address corruption will result in a fault with high probability, thus allowing the address corruption (and pointer access or bounds violation) to be caught by the privileged system component 142 (e.g., an operating system/executive/VMM/alternative mode/debug trace/management processor/subsystem, etc.).

The cipher tweak can be extended to include a code block identifier to provide access controls over which code blocks (e.g., blocks of the calling code) are permitted to use an indirect address/pointer to access memory. Additionally, instruction pointer (which may be referred to as the "program counter") information or ranges can be encoded as part of the pointer encryption tweak (also referred to herein as "address tweak"). The instruction pointer information can be used to limit the scope of what code can access what data. For example, all code can be arranged within fixed blocks of memory within the 64-bit address space. Code with similar access permissions can be grouped together in the same block or range. The address tweak can include the identifier for the block of memory from which an instruction is executing. In this way, code and data can be associated, and access controlled, such that an adversary coming from a different code block will not be able to access data of the protected block using the encrypted pointers, because the encrypted pointers will not decode properly if the wrong code block identifier is used as an address tweak. Further, when a block of code calls, e.g., malloc, to allocate memory to itself, malloc can return the encrypted address using the calling code's memory block to ensure private access to the allocated memory (so long as the allocated memory isn't freed and then reallocated to another code block). Alternatively, other methods of identifying the calling code can be used in the address tweak, such as protection keys. Still further, the metadata for read/write/execute access that is used by the processor 102 to control access to memory can be used as part of the address tweak for the encrypted address bits. Additionally, the instruction pointer may itself be represented as an encoded pointer (e.g., encrypted base address (EBA) format). In this case, the metadata and encrypted base address bits can be used as part of the "tweak" identifying the code block accessing a data pointer or requesting a memory allocation/assignment. At 424, the encoded indirect address may be output and control returned to memory manager 144.

Figure 5:
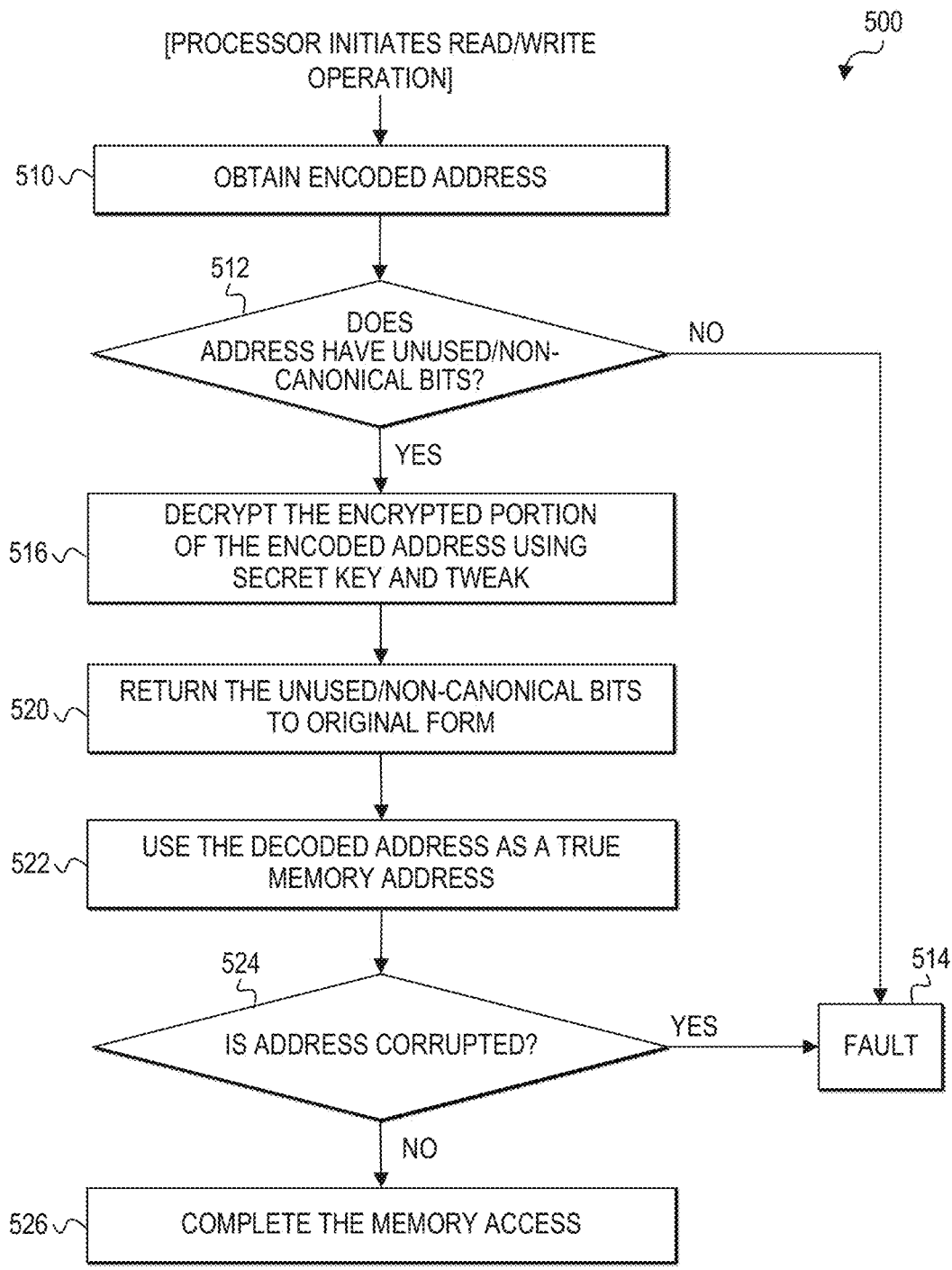
FIG. 5 is a simplified flow diagram of at least one embodiment of a process for verifying a previously secured indirect address as disclosed herein, which may be executed by the computing device of FIG. 1.

Referring now to FIG. 5, an example process 500 for decoding an indirect address is shown. Portions of the process 500 may be executed by hardware, firmware, and/or software of the computing device 100 (e.g., by the processor 102 executing the secure mov logic the address decoding logic 162, load from encrypted pointer instruction logic 176, and/or store to encrypted pointer instruction logic 178). The process 500 begins in response to a memory access operation such as a read, write, or execute operation, e.g., a legacy MOV instruction, a new LdEP instruction, a new StEP instruction. Of course, different processor architectures may refer to the "MOV," "LdEP," and "StEP" functionalities by different names for the instructions or different options/parameters. As such, the disclosed embodiments apply to all types of "MOV," "LdEP," and "StEP" functionalities across different architectures, irrespective of the terminology used to refer to such functionality. Further, the MOV, LdEP, and StEP instructions are a few examples, and any instruction that can request memory access to read/write data can apply the address encoding and decoding methods disclosed herein.

In block 510, the computing device 100 obtains the encoded indirect address (e.g., the encoded address 206, which may be obtained from a register 112). In block 512, the computing device 100 determines whether the encoded address obtained in block 510 has unused or non-canonical bits. If the computing device 100 determines that the encoded address does not have unused/non-canonical bit (e.g., the address doesn't fall within the non-canonical, or otherwise reserved, range of addresses, whether the address range is 32-bit, 64-bit, 128-bit or whatever range an alternate architecture may require), a fault is raised (514). If the computing device 100 determines that the encoded address has unused/non-canonical bits (e.g., the address falls within the non-canonical or reserved address range), the computing device 100 proceeds to block 516. In block 516, the computing device 100 decrypts the encrypted portion of the encoded address, using the decryption algorithm counterpart of the encryption algorithm used in block 422 of FIG. 4, and using the same secret key and tweak as used by the encryption algorithm in block 422 of FIG. 4. An example process for decoding and decrypting the indirect address having an encrypted base address (EBA) format is shown and described herein with reference to FIG. 13.

If the decrypted address contains unused/non-canonical bits, then in block 520, the computing device 100 returns the decrypted indirect address to its original (e.g., canonical) form by, for example, removing the unused/non-canonical bits. In addition, for an indirect address in EBA format, plaintext upper address bits may be retrieved statically from an operand, or dynamically from memory, and concatenated with the decrypted slice of the base address. Furthermore, if the address is aligned to a certain byte boundary, then the appropriate number of bits corresponding to the byte boundary may be concatenated to the decrypted slice of the base address to form the least significant bits. For example, three bits may be concatenated if the base address is aligned to an 8-byte boundary. Finally, an offset in the indirect address may be added to the decrypted and decoded base address.

In block 522, the computing device 100 uses the decoded address output by block 520 as a "true" (e.g., virtual or linear) memory address (e.g., as a pointer). In block 524, the computing device 100 determines whether the decoded address used as a memory address/pointer at block 522 is a corrupted address. If the decoded address is corrupted, a fault is raised (514). If the decoded address is not corrupted, the computing device 100 completes the memory access operation successfully, using the decoded address as a memory address/pointer, in block 526.

Even if corruption is not detected, the resulting address would not be deterministic (and therefore usable) to an adversary. In addition to the buffer overflow mitigation techniques described above, there are other applications of the pointer address encoding technologies disclosed herein. For example, processor instructions can be restricted by privilege level or caller location authorization (e.g., an instruction pointer block or range of a heap manager). Additional instructions can be added in cases in which the program code itself can control its own pointers and ranges. These instructions may use a larger memory allocation size metadata as input, and may produce a smaller/equal size pointer (more restrictive) falling within the larger buffer's size if the code executing this instruction belongs to the code block that owns the original (superset) buffer pointer (which can be determined by the instruction pointer). For example, the memory manager module 144 can allocate the call stack and provide a large memory allocation size pointer to the call stack (e.g., for the stack pointer). Code segments that are authorized to act on the call stack may then use this processor instruction to encode sub range pointers to buffers implicitly created on the stack. Compilers can automatically augment code to do this as stack operations are performed (local variables created, etc.), thus, protecting even individual data structures or individual variables on the stack. That is, the disclosed techniques enable encoding buffer sizes down to individual variable sizes (e.g., a 32-bit integer can be encoded as a pointer to a buffer of 4 bytes).

Similarly, code blocks that own a pointer can use similar instructions to transfer control/ownership to another/different code block by generating a newly encoded pointer for the target/receiving code block based on the original, e.g., by selecting a smaller buffer size for assignment to another code block. Such an instruction would take as input parameters the resulting buffer size, the original data pointer and an encoded pointer for the targeted code range (that the pointer is being assigned). Such an instruction can decode the input encoded pointer using the instruction pointer of the calling code block as a tweak, reduce the range if the input range is smaller than the input encoded pointer, and use the input encoded pointer to the targeted code block/range as part of the tweak when producing the output encoded pointer (now accessible to the newly assigned code block for the extent of the specified range). Other input parameters could be, for example, additional metadata, such as read/write/execute permissions (possibly as a subset of the original) for the targeted code.

To provide access control, the instruction pointer, or an encoded instruction pointer comprising of a range identified with a similar exponent, adjustment and encrypted indirect address bits, can be used as part of the tweak. The instruction pointer can similarly be encoded as an executable range/buffer of memory where the program is stored. When used as a tweak for the data pointer (e.g., an indirect address 114), the instruction pointer can control access to data by different pieces of program code. Further, the encoded instruction pointer value can be queried by programs for RIP relative addressing. (e.g. the instruction pointer register can be read by a program and then used to call/jump to relative offsets within the program's valid range, or read/write data within the program's valid range by using the encoded instruction pointer value).

Additionally, data pointers may be created and converted by new processor instructions (or operating system routines), allowing ownership of a data pointer (e.g., an indirect address 114) to be extended to other code/program ranges. That is, the owner program/code of a data pointer (whose instruction pointer range was used as part of the tweak for the data pointer) can call, e.g., an operating system routine (or processor instruction) that will produce a new data pointer that can be used by another program/code range. In this case, the new instructions/operating system routine will decode the original data pointer that was encoded as described herein and re-encode the range using the new program/code range metadata as the tweak, thereby producing a data pointer that will decode properly when accessed from an instruction pointer operating in the new address range. The new instruction/routine may also take as a parameter a smaller range encoding, thereby allowing the program owning the original data pointer to subset the data buffer size to a smaller region of memory accessible by the new program/code range.

Further, a 64 bit-stack pointer can be encoded as described herein, and as such, should be updated accordingly by the processor 102 on stack pushes and pops, calls and returns conforming to the allocated range of the stack. After decoding a MOV instruction to the stack pointer, the processor 102 may choose to cache the decrypted version of the stack pointer for direct memory access efficiency, however, the processor 102 may continue to track the range condition to assure stack overflows do not occur.

With instruction pointer relative addressing, the program counter register can be read and used to calculate offsets for position independent code (PIC) and data. The instruction pointer can also be encoded such that legacy instruction pointer relative position independent code will still function correctly. In this case, the encoded instruction pointer register may have a range conforming to the extent of the relocated program code and data (including text sections) in memory. In addition to memory accesses, PIC programs may utilize indirect jumps (JMP) and calls based on RIP relative addressing. As such, the JMP and CALL instructions can be modified to handle encoded pointer addresses, converting them into the actual linear memory address similar to the MOV instruction. Instruction pointer relative jumps and calls outside of the pointer's bounds may result in a corrupted target address for the jump/call instruction, which is very likely caught with a fault. The loader can also fix relocatable symbol tables to properly encode the extent of the function pointers for their respective code sections and memory locations. This instruction pointer-range pointer can also be used as a flexible code block/identifier tweak to access control data pointers with their associated code. Additionally, encoded range pointers on the call stack can be encrypted to provide control flow integrity between calls and returns while retaining the range encoding when decrypted on returns. Not all values of the 6-bit exponent metadata are actually used (e.g., with 64-bit addressing). For example, in 64-bit addressing, values that go beyond 48 will collide with the non-canonical bits and therefore will never be utilized. Thus, exponent values above 48/57 can be redefined to indicate that other interpretations of the adjustment region can be defined. It should be noted that the number 57 is based on five-level paging. This interpretation of the high order exponent values allows alternative uses of the unused/non-canonical address bits to coexist with the disclosed address encoding mechanisms. Other embodiments can use these undefined values to selectively determine if the adjustment data is or isn't present. For example, an exponent value beyond 48 can indicate no adjustment is present/needed for the buffer, and only the 2's power is valid, setting the 2's power back to the beginning without adjustments. This approach can enable better utilization of the address space by selectively determining what metadata is required for the encoded addresses, and selectively extending the available address bits into the space previously reserved for the adjustment value.

Figure 6:
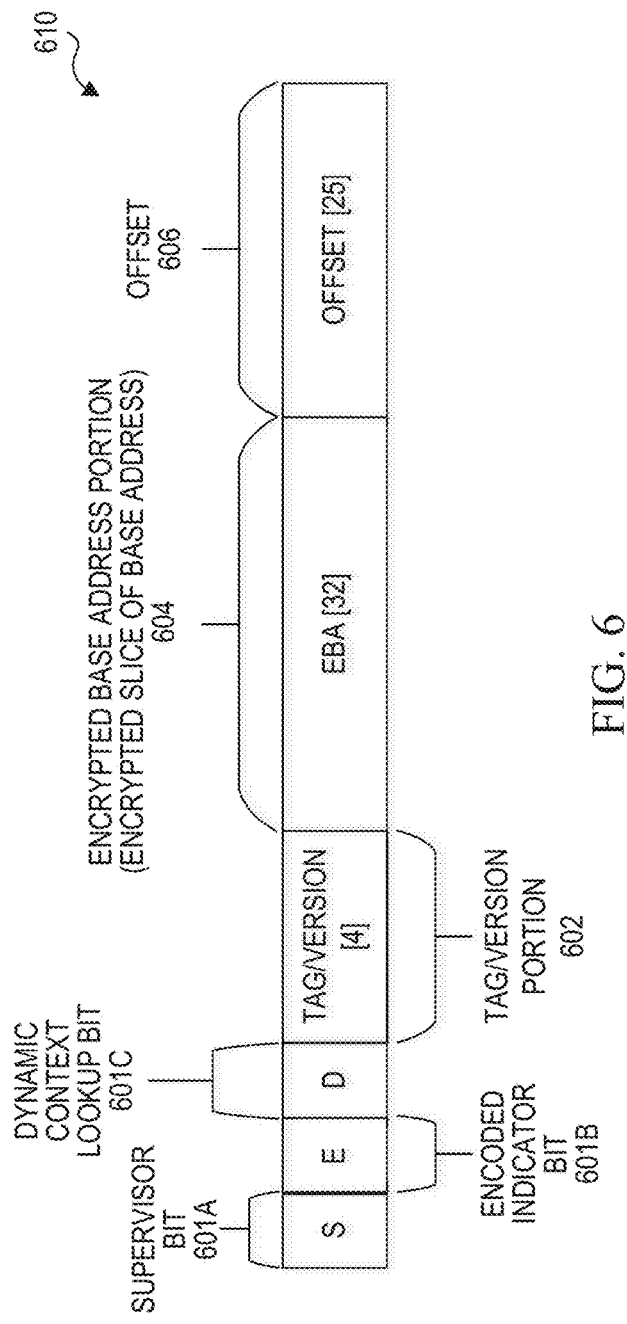
FIG. 6 is a diagram of an example pointer that is cryptographically encoded according to at least one embodiment of the present disclosure.

Turning to FIG. 6, FIG. 6 is a diagram of a cryptographically encoded pointer according to at least one embodiment in the present disclosure. In particular, FIG. 6 shows a cryptographically encoded 64-bit pointer 610 (address) in an encrypted base address (EBA) format (also referred to herein as "EBA pointer"). The EBA pointer 610 may be the output of the process 400 of FIG. 4, in some instances. In the example shown, the EBA pointer includes a supervisor bit (S-bit) 601A, an encoded indicator bit (E-bit) 601B, a dynamic context lookup bit (D-bit) 601C, a 4-bit tag/version portion 602, a 32-bit encrypted base address (EBA) portion 604, and a 25-bit offset portion 606. With typical canonical encoding, the bits that are adjacent to the most significant bit, and that are not part of the encoded address, have the same value as the most significant bit in order to be considered canonical (e.g., conventional or non-cryptographically encoded pointers). In a 64-bit register used for 57-bit paging, the most significant seven bits are not used as part of the 57 address bits. In an embodiment of EBA pointer 610, the seven most significant bits can include three upper bits 601A-601C and four bits in a tag/version portion 602.

Two upper bits (e.g., 601A, 601B) of a pointer can be encoded to indicate that the pointer is a cryptographically encoded pointer rather than a conventional pointer, so that both types of pointers can potentially be used in a single address space. For example, the supervisor bit 601A is used to indicate whether the encoded linear address is in the supervisor address space (e.g., "1") or within the user mode address space (e.g., "0"). The encoded indicator bit 601B can indicate whether the pointer is a cryptographically encoded pointer or a legacy pointer (i.e., not cryptographically encoded). For example, the encoded indicator bit 601B can be set to the opposite value of the supervisor bit 601A to indicate that the pointer is cryptographically encoded or can be set to the same value of the supervisor bit 601A to indicate that the pointer is not cryptographically encoded. In other embodiments, the upper bits 601A and 601B may not be used. Instead, the legacy encoding could be achieved without dedicated bits by encoding special values in the tag/version portion 602 (e.g., all 1s, all 0s) to indicate that the pointer is not cryptographically encoded. Any other values in the tag/version portion can indicate that the pointer is encoded as a cryptographically encoded pointer with a tag/version portion. Thus, both types of pointers (e.g., conventional and cryptographically encoded with a tag/version portion) can potentially be used in the same address space. In yet other embodiments, legacy encoding may be eliminated entirely if, for example, the concepts are not implemented to be compatible with legacy programs.

The dynamic context lookup bit 601C can be used to indicate how context information is to be obtained for use in an address tweak to decrypt the encoded linear base address slice in the pointer and/or in a data tweak to decrypt the encrypted data. For example, the dynamic context lookup bit 601C can indicate whether the context information is to be dynamically obtained from a pointer context table in which each table entry contains context information associated with a certain pointer, or statically obtained from an instruction operand embedded in the code stream, which is supplied when accessing memory using a cryptographically encoded pointer. In addition, when context information is dynamically obtained, upper address bits that are not encoded in EBA pointer 610 may also be obtained from the pointer context table entry associated with the pointer. When context information is statically obtained, the upper address bits may be obtained from a separate register.

Tag/version portion 602 can be used in the address tweak and the data tweak, and can be a number or value that is unique to the memory allocation or memory region referenced by a particular valid pointer. In one example, tag/version portion is a randomized string of bits (e.g., 4 bits or any other suitable size). In another example, tag/version portion 602 is a deterministic value such as a sequential number that is incremented by a predefined amount each time a pointer is generated for a particular memory allocation. Versioning may be implemented at any suitable granularity (e.g., by program, by particular linear address, etc.). The tag/version portion adds diversity to the encryption of an address tweak and/or a data tweak. However, the address encryption and data encryption may be sufficiently secure using the context information in the tweaks or using the context information and upper address bits in the tweaks, without the tag/version portion. Moreover, although a tag value with randomly generated bits may be more difficult for an attacker to learn, a version number may be sufficient in a pointer with an encrypted slice of the linear address it references, such as EBA pointer 610. This is because encryption protection is provided by the encrypted slice of the linear address and a version number may use less resources to generate.

In EBA pointer 610, a linear base address of the data is encoded. A 64-bit pointer may not have enough space to encode the entire base address of the data. Therefore, a slice of the base address is encrypted and stored in the pointer. In this example, the 3 through 34 of the base address are encrypted and compose the encrypted base address portion 604 of EBA pointer 610. The upper address bits (UAB) that are not embedded in pointer 610 are stored separately from the pointer. When decoding the pointer, the upper address bits can be pulled from a table entry associated with the data (or code) (e.g., in a pointer context table), from a separate register, from an operand in the data access instruction, or from a register that covers multiple objects (or code segments). The remaining 25 bits in the pointer comprise an offset within the data. The offset specifies the number of bytes beyond the base address to which the EBA pointer 610 is pointing. Typically, the offset portion 606 is set to zeros. It should be apparent, however, that instructions could be defined to initialize the offset portion to any desired number based on particular needs and implementations. The offset may be manipulated by software, e.g., for pointer arithmetic or other operations. The encrypted base address portion 604 (e.g., 32 bits in the example shown) of EBA pointer 610 may be encrypted with a small tweakable block cipher (e.g., a SIMON, SPECK, or tweakable K-cipher at a 32-bit block size, or other variable bit size tweakable block cipher).

Also, although EBA pointer 610 is illustrated and described based on using 32 bits for the EBA portion 604, the pointer format is not intended to be so limited. The address slice to be encrypted may be selected based on readily available 32-bit block encryption ciphers. However, an encryption cipher using any other block size (e.g., 27, 16, variable, etc.), may be used instead. If the number of encrypted base address slice bits is adjusted (upward or downward), the remaining address bits (e.g., upper address bits) may be adjusted accordingly. For example, if the encrypted base address portion is adjusted to be 16 bits, then the upper address bits could be adjusted to 38 bits, and the available 16 bits in the pointer could be encoded with additional offset bits and/or additional metadata (e.g., permissions, size, etc.)

When a processor is running in a cryptographic mode and accessing memory using an encoded pointer (address) (e.g., a pointer formatted in the same or similar manner to pointer 610 of FIG. 6) to get the actual linear/virtual address memory location, the processor takes the encoded address format and decrypts the EBA portion (e.g., 604 of FIG. 6)

using the metadata encoded in the pointer, such as tag/version portion 602, and a secret key. In some instances, the metadata encoded in the pointer and/or other metadata or context information may be included as part of the tweak for decrypting the EBA portion 604 (also referred to herein as "address tweak"). If the address decrypts incorrectly, the processor may cause a general protection fault (#GP) or page fault due to the attempted memory access with corrupted linear/virtual address.

As used herein, "context information" is intended to include any metadata or other information related to a memory allocation, its associated memory address, its associated pointer, the software for which the memory was allocated, and/or the contents of the allocated memory. For example, context information may include, but is not limited to, one or more of a size indicating the bytes of memory that are allocated, a tag containing randomized bits associated with the memory address, permission information indicating access permissions for the data stored in the allocated memory, a version number of a pointer that may be used for reassigning/revoking pointers that were previously assigned to a program, a type or class of the data stored in the allocated memory, a privilege level indicating a user or supervisor mode of the software for which the memory was allocated, and a crypto (cryptographic) context identifier including a randomized or deterministically unique value for a memory address. Context information can also include upper address bits of the encoded base address, which may be used as at least part of an address tweak in one or more embodiment. One or more pointer encoding embodiments may use any single item of context information as part of a tweak (address tweak or data tweak), or may use any suitable combination of context information items.

Context information may be stored in any type of storage, which may be based on particular needs and implementations. As previously described herein, context information associated with a pointer may be stored in a table entry in a pointer context table (e.g., 121). In other examples, one or more items of context information may be embedded in a standard-sized (e.g., 64-bit) pointer, such as EBA pointer 610. In this scenario, the context information may be stored in the unused/non-canonical bits in place of, or in addition to, the tag/version portion 602. Other example types of storage for context information include, but are not necessarily limited to embedding the context information in a pointer that has been enlarged to fit more or bigger tweaks (e.g., a 128-bit pointer, a 256-bit pointer, etc.), embedding the context information within another operand that is provided to the pointer encryption instructions and to the data access instructions, and/or storing the context information in a control register. A control register may be automatically selected by an instruction to be used as a crypto input (e.g., if there is just one register storing that type of tweak). Otherwise a control register may be selected using some other instruction operand such as a field in the pointer itself or in a context operand supplied with data access instructions (e.g., special load and store instructions) configured for the particular operand encoding embodiment. For example, an index field of an access instruction could be used to select a register containing a key or tweak for the data (or code). Generally, for tweaks that are only updated when switching contexts, the item(s) used for the tweak may be especially suited for storage in a register. Other tweaks that are more closely associated with a particular pointer may be more suitable for being embedded in the pointer or passed in an instruction operand. As previously noted, however, any item of context information may be embedded or stored in any type of storage.

It should be noted that size and version metadata can be particularly advantageous in security attack detection. A use-after-free attack can occur when certain memory is allocated to a second pointer after it has been freed. If the original pointer is used again and points to some place within the re-allocated memory and changes data, this can be used to read or corrupt the memory. Versioning metadata can allow such attacks to be prevented and/or detected when the wrong version (old pointer) is being used by making the data encryption/integrity dependent on the pointer version (e.g. using the pointer encoded with a previously freed version will not properly decrypt the data allocated and written using a pointer encoded with the new version). Other embodiments may select a different data encryption/decryption key based on the version value, for example, by using the version as an index into a key table.

Figure 7:
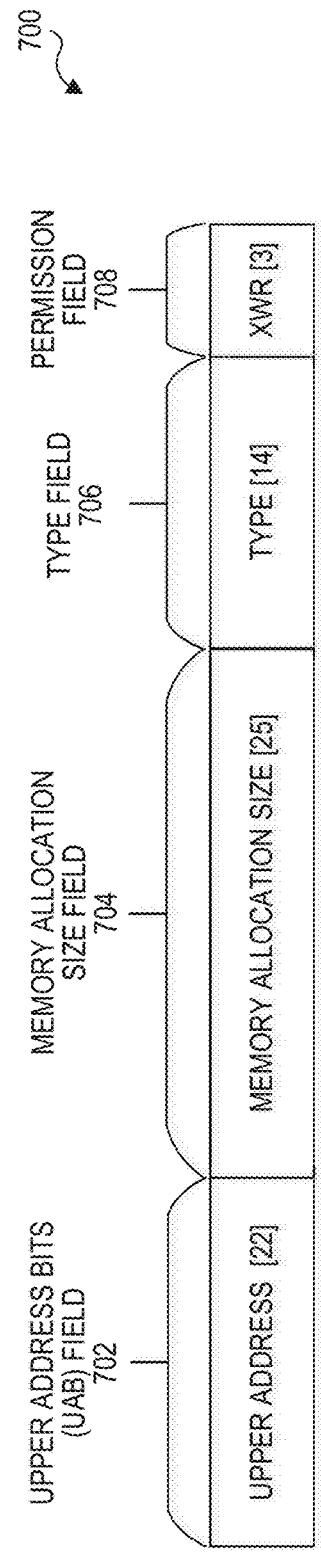
FIG. 7 is a diagram of possible context information that may be used to generate the pointer of FIG. 6 according to at least one embodiment of the present disclosure.

FIG. 7 is a diagram of example context information 700 that can be used to when encoding and decoding a pointer with an encrypted base address, such as EBA pointer 610. In this example, context information 700 includes upper address bits (UAB) field 702, memory allocation size field 704, type field 706, and permission field 708. In at least one embodiment, depending on the particular memory allocation (e.g., not statically addressable), context information 700 can be one table entry that is stored separately from the pointer and that can be dynamically accessed from memory to retrieve context information needed to encrypt or decrypt a slice of a linear address and possibly data referenced by the linear address. In some scenarios, upper address bits may be stored in a control register for static access, and the other context information may be stored in a memory operand for static access or in memory for dynamic access.

In one or more embodiments, at least a portion of the cryptographically encoded pointer may be used as an index into a pointer context table containing dynamically loaded context information. For example, encrypted base address portion 604 of pointer 610 may be used to index a pointer context table to obtain a table entry containing context information for pointer 610. This technique conserves pointer bits in pointer 610 by eliminating the need for dedicated pointer bits to index the pointer context table. It should be noted that the format of context information, such as context information 700, may vary depending on whether the context information is stored in a table entry that is to be dynamically looked-up or embedded in program code that is to be statically retrieved, both of which will be further described herein.

The memory allocation size field 704 may contain 29 bits and can be encoded with the exact size of the data at the memory location referenced by pointer 610. Thus, memory size can be specified at byte granularity or a coarser granularity to save space. The memory allocation size field 704 may be limited to 25 bits to match the width of the offset portion 606 in pointer 610. When a data access is being performed, the offset portion 606 in the pointer 610 is checked by the processor to ensure that it does not exceed the value in memory allocation size field 704.

The type field 706 may contain fourteen bits and is used for programming languages that specify different classes. In certain programming languages, an error can result by using a pointer to an object of a particular class to obtain data (or an object) of a different class and then attempting to treat the data based on the different class. Accordingly, type of data (e.g., object type) can be determined and stored as part of context information 700 for a pointer when memory is allocated for the data and a pointer is generated. When the pointer is accessed in the program, the type information specified as part of context information 700 can be matched against an expected type ID specified in the program to mitigate type confusion vulnerabilities.

The permission field 708 may contain three permissions bits (XWR). This is a layer of permissions on top of the paging permissions such as read, write, and execute. Permissions can be determined based on an intersection operation performed on the paging permissions and the context permissions. For example, if the permission bits indicate that a pointer is only readable, then even if the page table says the memory that is mapped is writeable, then write access is going to be denied by the processor because the most restrictive permissions are chosen. In another example, if the permissions bits indicate that memory is readable and writeable, but the page table says it is only readable, the write access could be denied.

UAB field 702 includes the upper address bits that are to be concatenated with the decrypted base address slice from pointer 610. In this example, the encrypted base address portion 604 may contain only 32 bits (encrypted) of the linear address (e.g., bits 3 to 34), the UAB field 702 in context information 700 may contain 22 bits, and the lowest three bits (bits 0-2) can be set to "0" to align the base address to an 8-byte boundary. The lowest three bits may not be encoded in the pointer. Once the encrypted base address portion 604 is decrypted, the bits in the UAB field 702 can be obtained from context information 700 stored in memory (e.g., in the table entry) or from a register and concatenated with the decrypted base address slice. The lower three bits set to "0" may also be concatenated at the end of the address.

Context information may be embedded in code (e.g., in an instruction operand) if the context information is to be retrieved statically, or may be stored in a table in memory if the context information is to be retrieved dynamically. It should be noted that if larger registers (e.g., 128-bit register, 256-bit register, etc.) are used for the cryptographically encoded pointers, then the entire base address may be encoded in the pointer. For 64-bit registers, however, the encrypted base address portion (e.g., 604) may be too narrow to specify a complete base address. Consequently, upper base address bits can be pulled from another storage location during a memory access request (e.g., load, store). In some scenarios, upper address bits may be statically obtained from a register, while some or all of the context information is dynamically retrieved from memory. This may occur if the linear address is statically addressable, but the compiler of the software determines that context information for the pointer is not ascertainable by the compiler for each invocation of the pointer in the software. In this scenario, the UAB field 702 in context information 700 in the table entry may be fixed to zero since the upper address bits to be concatenated with the decrypted base address slice can be supplied implicitly by a control register.

Certain defined memory regions may be addressable using static context information. As used herein 'static context information' is intended to mean context information that is accessible via an instruction operand or separate register (e.g., control register). Such a memory region may be designated as quick-access memory (e.g., quick-access memory 122) where data (or code) can be stored and memory access to that data (or code) can be performed quickly, without the need to perform a more time-consuming table look-up for the context information. In an example illustration, a register specifying a base address of a memory region that is addressable using static context information could be named STATIC_REGION_BASE. The base address of the memory region may be set by software running in a supervisory mode such as, for example, a trusted runtime, operating system, virtual machine manager, etc. From that register, the exclusive limit of the statically-addressable region could be defined as:

STATIC_REGION_END=STATIC_REGION_BASE+
STATIC_REGION_SIZE=2^(bitwidth of the encrypted base address slice+base
alignment shift value), where "bitwidth" is the length of a value in bits In one example illustrated herein, the base alignment shift value may be three bits to align to an 8-byte boundary. The value of STATIC_REGION_BASE should be aligned to the value of STATIC_REGION_SIZE to permit a final base address to be computed simply by concatenating the slice of bits from STATIC_REGION_BASE that are more significant than the bits defined by the encrypted base address slice plus its base alignment shift value. In some embodiments, a hint may be provided to the memory allocator for certain memory allocation requests to indicate that the requested memory will be frequently accessed. In this case, the memory allocator can cause the pointer to be encoded with an address within the static region.

The encrypted base address format using context information, as shown in FIGS. 6-7, offer several advantages. First, the EBA format enables cryptographic computing without expanding the pointer, as pointer expansion can impose undesirable memory overhead. Second, embodiments using the EBA format avoid passing additional metadata when invoking functions with encrypted pointers, as requiring additional metadata to be passed can introduce software enabling challenges. Third, the EBA format described herein uses an 8-byte base alignment, but byte-granular limits are also possible. Larger alignment requirements can result in wasted space. Fourth, distinct permissions for accessing memory are possible per instruction, which provides memory safety. Finally, in multi-tenant environments, which will be further discussed herein, the EBA format results in very limited context switching overhead.

Figure 8:
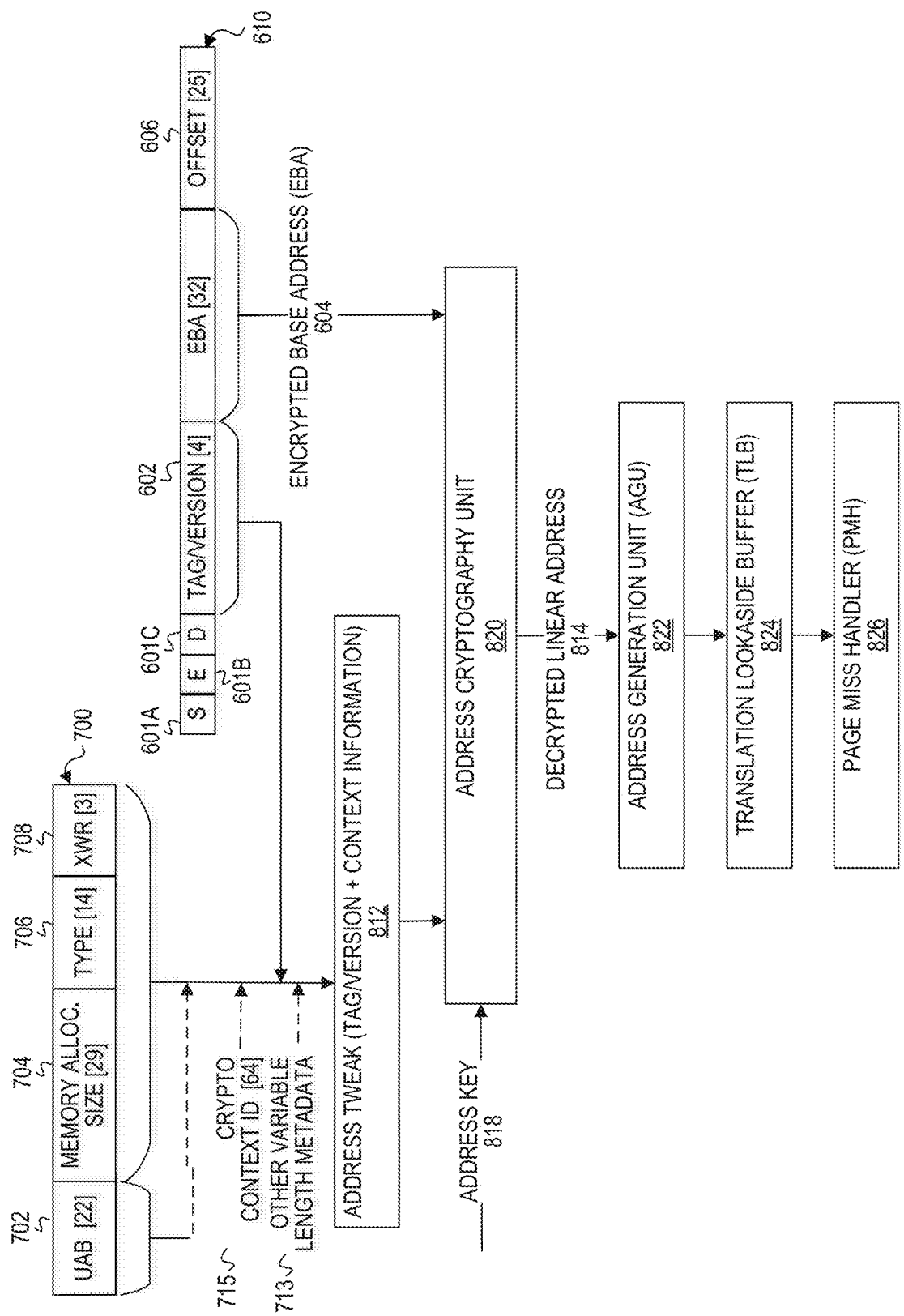
FIG. 8 is a diagram of an environment for decrypting a cryptographically encoded pointer to produce a linear address according to at least one embodiment.

Turning to FIG. 8, FIG. 8 is a diagram illustrating hardware components for decoding a cryptographically encoded pointer in EBA format according to at least one embodiment. In this example, the decoding of EBA pointer 610 based on associated context information 710 is illustrated. An address cryptography unit 820 is used to decode pointer 610 to obtain a decrypted linear address 814. Additional hardware units such as an address generation unit (AGU) 822, a translation lookaside buffer (TLB) 824, and a page miss handler (PMH) 826, for example, transform the decrypted linear address 814 into a physical address for accessing data in the allocated memory referenced by pointer 610.

Address cryptography unit 820 includes a cryptographic algorithm for decrypting the encrypted base address portion 604 of pointer 610. The EBA portion 604 is an encrypted slice of the memory address that points to (or references) the allocated memory. In at least one embodiment, address cryptography unit 820 includes a block cipher that performs decryption of the encrypted address slice based on an address key 818 and a second input (also referred to herein as "tweak" or "address tweak") 812. Generally, a block cipher is an encryption algorithm that uses a symmetric key to encrypt a block of data in a way that provides confidentiality with properties such as bit diffusion and confusion that are important for preventing an adversary from predictably manipulating the decrypted address slice. At least some block cipher embodiments include an initialization vector (IV), which is a fixed-size input that is random, pseudorandom, or nonrepeating, depending on the particular block cipher requirements. For embodiments using a block cipher that requires an initialization vector, address tweak 812 may compose all or part of the initialization vector. In some embodiments, the address tweak may comprise one or more items of context information from the pointer (e.g., tag/version portion 602), from a storage structure such as a table in memory, from another register, and/or from an instruction operand.

Embodiments disclosed herein allow for variations of EBA pointer encodings and, therefore, various tweaks. A tweak (address tweak or data tweak) may include a random value, a deterministically different value for different memory allocations, a semantic meaning that cannot be randomized or generated as an arbitrary value, or any suitable combination thereof. Randomness and/or deterministically different values may be used as a tweak (or as part of a tweak) to diversify the cryptography. Such tweaks are referred to herein as "crypto context identifier" or "crypto context ID" and may take the form of a random tweak (or initialization vector), a deterministic tweak (or initialization vector) generated and controlled by trusted software, or a random cryptographic key. Certain tweaks, however, may have a semantic meaning that cannot be randomized or generated as an arbitrary value. For example, a memory allocation size field in context information is used by the CPU to select a size of memory for which a pointer is generated. Accordingly, the memory allocation size has a well-defined interpretation for each memory allocation size value.

In the embodiment shown in FIG. 8, a portion of address tweak 812 is obtained from pointer 610 and other portions are obtained from other storage locations (e.g., registers, other memory, instruction operands). Address tweak 812 includes the tag/version portion 602 from EBA pointer 610 and context information such as memory allocation size metadata in field 704, type metadata in field 706, and permissions metadata in field 708. In some scenarios, the upper address bits 702, crypto context ID 715, and/or other variable length metadata 713 may also be used as part of the address tweak 812. Context information 710 may be obtained from a table in memory (pointer context table 121) if the context information cannot be statically provided in the program code. However, if the context information can be statically provided in the program code, then the memory allocation size metadata 704, type metadata 706, and permissions metadata 708 may be provided in an operand of an instruction, and the upper address bits 702 may be provided in a register. The other possible tweaks include the crypto context ID 715, which can be a randomly generated value stored in a register, and other variable length metadata, which may be stored in memory such as the pointer context table 121. It should be noted however, that any of the tweaks may be stored in any suitable storage options based on particular implementations, including instruction operands, registers, and/or tables or other storage structures in memory. Address key 818 may be generated or obtained in any suitable manner as previously described herein, for example, with respect to privileged system component 142 and key creation module 148 of FIG. 1.

Any suitable block cipher cryptographic algorithm may be implemented as address cryptography unit 820. For example, a small tweakable block cipher (e.g., a SIMON, SPECK, or tweakable K-cipher at a 32-bit block size, or other variable bit size tweakable block cipher may be used). The Advanced Encryption Standard (AES) offers various block ciphers that may be implemented in any number of ways to achieve encryption/decryption of a block of data such as ciphertext 804. For example, an AES xor-encrypt-xor (XEX) based tweaked-codebook mode with ciphertext stealing (AES-XTS) may be suitable. In other embodiments, an AES counter (CTR) mode of operation could be implemented.

Once decryption of the EBA portion 604 is successful, address cryptography unit 820 can generate decrypted linear address 814 based on the decrypted slice of the linear base address. The decrypted linear base address is computed by concatenating the decrypted slice of the linear base address with the upper address bits 702, and potentially a certain number of alignment bits (e.g., 3 bits for an 8-byte boundary alignment). A linear address to the particular byte referenced by pointer 610 is computed by adding the offset 608. The order of the bits to be concatenated include, most significant bits-to-less significant bits: upper address bits 702, decrypted linear base address bits, alignment bits. In addition, a decoded linear address may be formed by replicating the most significant bit in each of the unused/non-canonical bits. In this example, the unused/non-canonical bits include the next six bits adjacent to the most significant bit.

Figure 9:
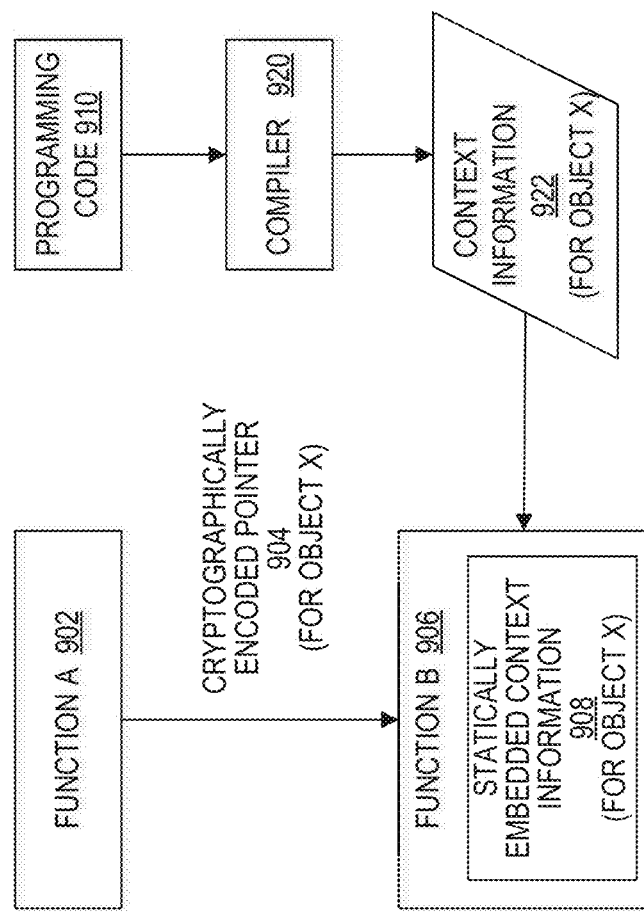
FIG. 9 is a simplified block diagram illustrating a compiler embedding context information into compiled code according to at least one embodiment.

FIG. 9 is a simplified block diagram that illustrates a compiler flow 900 for embedding context information into compiled code according to at least one embodiment. As shown in flow 900, EBA format permits a compiler 920 to statically compute context information and embed it at precisely the point it is needed in the program to enhance efficiency. In compiler flow 900, software programming code 910 may be provided to compiler 920. The programming language to produce the programming code may any suitable programming language based on particular needs and implementations, including for example, C++, Rust, Swift, etc. In many scenarios, compiler 920 is able to extract information about which objects a particular portion of a program is expecting to access. This extracted information can include context information 922 such as size of the allocated memory for the object, permissions for a pointer to the object, and a type of the object. In this example, compiler 920 extracts context information 922 for object X, and statically embeds the context information 922 into the precise location in the executable code where it is needed to access object X. In the example of FIG. 9, context information 922 is statically embedded in function B 906 as statically embedded context information 908, which can be used to access object X from function B 906.

Programming code 910 may include function A 902 and function B 906, with function A 902 calling (or otherwise passing control to) function B 906. In this example, function A 902 requests memory to be allocated for object X for which a cryptographically encoded pointer 904 is generated. The pointer 904 is passed to function B 906, where the context information for object X has been statically embedded by compiler 920. Thus, function B 906 can use pointer 904 for memory access of object X without needing to perform a dynamic context information look-up.

If a non-default based extension is needed, however, then a dynamic context information look-up may still be needed. A non-default based extension refers to the upper address bits for the base address. Even if the compiler is able to deduce static context information, the pointer may still indicate that a dynamic context information look-up is required to load a non-default base extension. This is required if the object has been allocated outside of the range of memory that is accessible using the default upper base address bits stored in the corresponding register (e.g., outside the quick-access memory 122). The D-bit 601C in pointer 610 is encoded to indicate that the associated object has been allocated in a region that always necessitates a dynamic context look-up.

Figure 10:
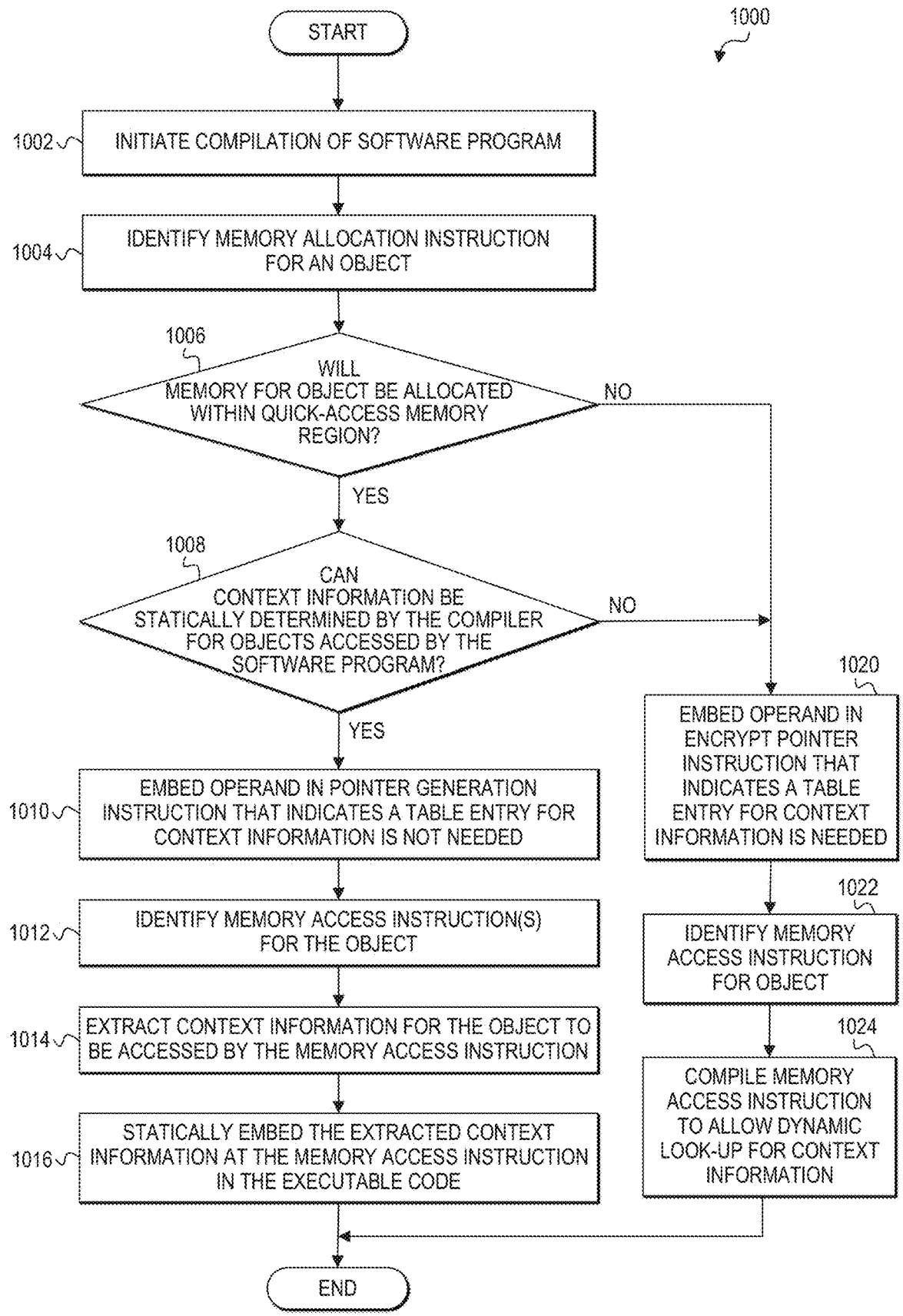
FIG. 10 is a simplified flow diagram of at least one embodiment of a process for compiling code to use a cryptographically encoded pointer with an encrypted base address according to at least one embodiment.

Referring now to FIG. 10, an example process 1000 for compiling a software program using cryptographically encoded pointers in EBA format is shown. Portions of the process 1000 may be executed by hardware, firmware, and/or software of a computing device on which a compiler program runs. In some scenarios, computing device 100 may run a compiler program (e.g., 920) to compile software programs using cryptographically encoded pointers in EBA format. In other scenarios, such software programs may be compiled by a compiler that is run on separate computing devices, and the compiled code (e.g., executable code) may be distributed for execution on computing devices such as computing device 100.

At 1002, compilation of a software program is initiated. At 1004, the compiler identifies a memory allocation instruction for an object. At 1006, a determination is made as to whether the memory for the object will be allocated within a quick-access memory region (e.g., 122) where the memory is accessible using a default base extension (i.e., upper base address bits) stored in a corresponding register.

If it is determined that the memory for the object is to be allocated within a quick-access memory region, then at 1008, a determination is made as to whether context information can be statically determined by the compiler for the object at subsequent memory access instructions in the program code. If it is determined that the compiler can statically determine the context information for the access it needs to perform, then at 1010, an operand is embedded in a pointer generation instruction (e.g., EncryptBaseAddr) that indicates a table entry for the context information is not needed.

At 1012, the compiler identifies a memory access instruction for the object. At 1014, the compiler extracts context information (e.g., size, type, permissions) for the object to be accessed by the memory access instruction. At 1016, the compiler statically embeds the extracted context information at the memory access instruction in the executable code.

With reference again to 1006, if it is determined that the memory for the object is to be allocated outside of a quick-access memory region, or if it is determined that the memory for the object is to be allocated within a quick-access memory region but that context information for subsequent memory access instructions for the object cannot be deduced by the compiler at 1008, then at 1020, an operand is embedded in a pointer generation instruction (e.g., EncryptBaseAddr) that indicates a table entry for the context information is needed. At 1022, the compiler identifies a memory access instruction for the object. At 1024, the memory access instruction is compiled to allow dynamic look-up for context information associated with the object. It should be noted that if context information can be deduced for some of the memory accesses, but not all of them, then a table entry is still needed for the context information. Accordingly, the compiler may perform operations 1012-1016 or 1020-1024, as appropriate, for each memory access instruction for the object, and that operations 1004-1024 may be performed for each memory allocation request instruction in the software program code.

In one or more embodiments, several instructions may be used by a compiler to operationalize the generation and use of cryptographically encoded pointers in EBA format in software program code. In one or more embodiments, these new instructions may include an encrypt pointer (EncryptBaseAddr) instruction, an encode context information (EncodeCtx) instruction, a specialize pointer (SpecializePtr) instruction, a load from encrypted pointer (LdEP) instruction, and a store to encrypted pointer (StEP) instruction, which will each now be described. It should be noted that, for ease of description, reference is made to data being stored and accessed in allocated memory. Such data can include objects, arrays, and any other data storage structure. Furthermore, the instructions described herein are also applicable to code that may be stored and accessed in the allocated memory.

The EncryptBaseAddr instruction is an example of a pointer generation instruction (e.g., 1010) for generating a cryptographically encoded pointer in EBA format when memory is allocated. The purpose of the pointer generation instruction (e.g., EncryptBaseAddr) is to convert a raw pointer into the EBA encoded format and to insert a corresponding table entry for dynamic context information look-up, if needed. One example format of the EncryptBaseAddr instruction is the following:

EncryptBaseAddr rd, rs2, imm8
    rd: Register operand (e.g., 64 bits) containing a raw pointer to be cryptographically encoded
    rs1: Register operand (e.g., 64 bits) containing context information
    imm8: Immediate operand (e.g., 8 bits) set to a value to indicate whether a table entry containing context information is to be inserted in the pointer context table.

If the object is stored in a statically addressable memory region (e.g., for quick-access) and the compiler knows that the pointer will only be used in places where the context is known statically, then the immediate operand imm8 may be set to a predefined value (e.g., "0") to indicate that a table entry is not necessary. In this scenario, the register operand Rs1 contains context information associated with the object such as size, permissions, and possibly type. In another scenario, the immediate operand imm8 may be set to a different predefined value (e.g., "1") to indicate that a table entry with the context information is to be inserted in the pointer context table.

The EncodeCtx instruction enables a function to encode a context value from multiple items of context information. The instruction generates an encoded context value from provided operand inputs containing context information. In one embodiment of the EncodeCtx instruction, the context value is encoded by generating a single 64-bit value using the context information contained in each of the operand inputs. The encoded context value can be used as input to the EncryptBaseAddr instruction (e.g., rs1 of EncryptBaseAddr instruction). One example format of the EncodeCtx instruction is the following:

EncodeCtx: rd, rs1, rs2
    rd: Register operand (e.g., 64 bits) input containing a first item of context information to be encoded (e.g., size metadata)
    rs1: Register operand (e.g., 64 bits) input containing a second item of context information to be encoded (e.g., type metadata)
    rs1: Register operand (e.g., 64 bits) input containing a third item of context information to be encoded (e.g., permissions metadata)

The SpecializePtr instruction can be used to restrict or "specialize" a pointer. The SpecializePtr instruction can be used in three special instances. First, SpecializePtr can be used for type casts to decrypt a cryptographically encoded pointer in EBA format using expected source context information (i.e., with the original type metadata) and re-encrypt the linear address using destination context information (i.e., new type metadata). Second, SpecializePtr can be used for bounds narrowing (e.g., generating a cryptographically encoded pointer in EBA format to a filed in a struct). In this example, the SpecializePtr instruction can be used to decrypt a cryptographically encoded pointer in EBA format using context information for a parent memory allocation (e.g., an entire struct), check that intended narrowed bounds are entirely within parent bounds, and generate a new cryptographically encoded pointer in EBA format representing narrowed bounds. Finally, SpecializePtr can be used to reduce permissions (e.g., casting a non-const* to const*). Operationally, the SpecializePtr instruction decrypts a cryptographically encoded pointer in EBA format using original context including original permissions metadata, and generates a new cryptographically encoded pointer in EBA format with new permissions and/or new size metadata. One example format of SpecializePtr instruction is the following:

SpecializePtr: rd, rs1, rs2, imm8
rd: Register operand (e.g., 64 bits) containing original cryptographically encoded pointer in EBA format
rs1: Register operand (e.g., 64 bits) input containing original encoded context value
rs2: Register operand (e.g., 64 bits) input containing new encoded context value
imm8: Immediate operand (e.g., 8 bits) set to a value to indicate whether a table entry containing context information is to be inserted in the pointer context table for the new cryptographically encoded pointer Generally, the SpecializePtr instruction decrypts the original (or parent) cryptographically encoded pointer according to original context information, checks that new context information grants no new permissions compared to the original context information, and re-encrypts and encodes the pointer using new context information to obtain a new cryptographically encoded pointer in EBA format. In at least one embodiment, the original pointer is a pointer that is returned without having a type associated with it (e.g., malloc pointer). The original context information is the context information that was used to generate the original pointer. The base for the new pointer is the base plus the offset from the old pointer (New base address=original pointer base address+original pointer offset). In some embodiments, SpecializePtr may be invoked in such a way that it specifies the new encoded context value, and the old encoded context value is loaded dynamically.

If the original pointer has its dynamic bit set, then the SpecializePtr instruction may handle the pointer in a similar manner as the Ld/StEP instructions. If a SpecializePtr instruction is used on a cryptographically encoded pointer in EBA format with its dynamic bit set, then this indicates a possible scenario in which the compiler only deduced some of the context information needed for the instruction. In this scenario, the instruction logic checks whether the statically embedded type matches the dynamically obtained type, and whether the statically embedded permissions are a subset of the dynamically obtained permissions. If the checks succeed, then the instruction logic may use the statically embedded permissions and type and the dynamically obtained size and base (e.g., upper address bits) in the instruction operation.

In one example, the immediate operand imm8 in the SpecializePtr instruction may be set to "1" (imm8==1), to indicate that a table entry with the new context information associated with the new pointer is to be inserted in the pointer context table. If the object is stored in memory allocated in a quick-access memory region and the compiler knows that the pointer will only be used in places where the context is known statically, then the immediate operand imm8 may be set to "0" (imm8==0), to indicate that a table entry is not necessary.

The LdEP instruction decrypts and decodes a cryptographically encoded pointer in EBA format to obtain a final linear address of a memory location and to access (e.g., read) data from that memory location. One example format of LdEP instruction is the following:

LdEP: rd, m1, rs2
rd: Destination operand (e.g., 64 bits)
m1: Memory operand (e.g., 64 bits) to supply the cryptographically encoded pointer
rs2: Register operand (e.g., 64 bits) input containing encoded context value The LdEP instruction uses the context value from rs2 and performs access control checks to ensure that the attempted access is entirely within the bounds of the allocated memory and to ensure that the permissions indicated by the context value allows read operations to be performed when using the cryptographically encoded pointer. The bounds of the allocated memory are defined by [base, base+size), which is computed to determine whether the linear address computed by the LdEP instruction is within those bounds. If the access checks do not fail, then the bits of the final linear address (decoded and decrypted from the cryptographically encoded pointer) are loaded in the destination operand rd. A memory access request can then be issued through a memory interface (e.g., data cache unit 360). If the memory access request succeeds, the bits (e.g., 64 bits) at the final linear address are placed into the destination operand rd specified in the LdEP instruction.

The StEP instruction decrypts and decodes a cryptographically encoded pointer in EBA format to obtain a final linear address of a memory location and to store (e.g., write) data at that memory location. One example format of StEP instruction is the following:

StEP: m1, rs1, rs2
m1: Memory operand (e.g., 64 bits) to supply the cryptographically encoded pointer
rs1: Register operand (e.g., 64 bits) containing data to be stored
rs2: Register operand (e.g., 64 bits) input containing encoded context value The StEP instruction uses the context value from rs2 and performs access control checks to ensure that the attempted access is entirely within the bounds of the allocated memory and to ensure that the permissions indicated by the context value allows write operations to be performed when using the cryptographically encoded pointer. The bounds of the allocated memory are defined by [base, base+size), which is computed to determine whether the linear address computed by the StEP instruction is within those bounds. If the access checks do not fail, then the bits of the final linear address (decoded and decrypted from the cryptographically encoded pointer) can be used to issue a memory write request through a memory interface (e.g., data cache unit 360). If the memory write request succeeds, the bits (e.g., 64 bits) in the register operand rs1 specified in the StEP instruction are stored at the final linear address.

If a LdEP instruction or a StEP instruction is used on a cryptographically encoded pointer in EBA format with its dynamic bit set, then it is possible that the context information and upper address bits are stored in memory and can be dynamically retrieved. The dynamic bit may also indicate another possible scenario in which the compiler only deduced some of the context information needed for the instruction and, therefore, some context information may be statically accessible (e.g., stored in operands and/or registers) and some context information may be dynamically accessible (e.g., stored in memory). In this scenario, the instruction logic checks whether the statically embedded type matches the dynamically obtained type, and whether the statically embedded permissions are not greater than the dynamically obtained permissions. If the checks succeed, then the instruction logic may use the statically embedded permissions and type and the dynamically obtained size and upper address bits in the instruction operation.

One possible access violation could potentially occur if the compiler makes an incorrect inference during the compilation of the program code. For example, if a memory access through an LdEP or StEP instruction causes an integrity violation, this may indicate that the compiler incorrectly inferred that a function expected a pointer to an individual object rather than an array. In this scenario, the array pointer should have its context information stored and available to be looked-up dynamically, so the load or store could be retried after performing the dynamic context load.

Various approaches are possible with new LdEP and StEP instructions and legacy instructions. Although legacy (existing) instructions include memory operands, the instructions load context information dynamically from a table in memory, as their available memory operands are designated for data, pointers, immediate values, etc., but not for context information. Legacy instructions offer numerous functionalities such as adding, subtracting, multiplying, etc. In addition, legacy instructions may include moving data (or code) between register operands and memory operands. In one or more embodiments, legacy operations to read and write from memory may be replaced with the LdEP and StEP instructions to enable the use of statically embedded context information. In these embodiments, other legacy instructions with memory operands may continue to be used (e.g., add, multiply, subtract, etc.), and context information can be dynamically obtained via a pointer context table.

In another embodiment, some or all legacy instructions that perform operations (e.g., add, multiply, subtract, etc.) using memory operands are not included in assembly language output code generated by a compiler. Instead, LdEP and StEP instructions are used in combination with other legacy instructions that perform the same operations (e.g., add, multiply, subtract, etc.) by operating only on register data without accessing memory. For example, when an addition operation of two values in memory is included in the software program code, the compiler may cause the assembly language output code to include a first LdEP instruction to load the first value from memory into a first register, and a second LdEP instruction to load the second value from memory into a second register. The compiler can cause another legacy instruction to be added to the assembly language output code to perform an add operation on the values in the two different registers loaded by the LdEP instructions. A StEP instruction may then be used to write the resulting value back to memory.

Figure 11:
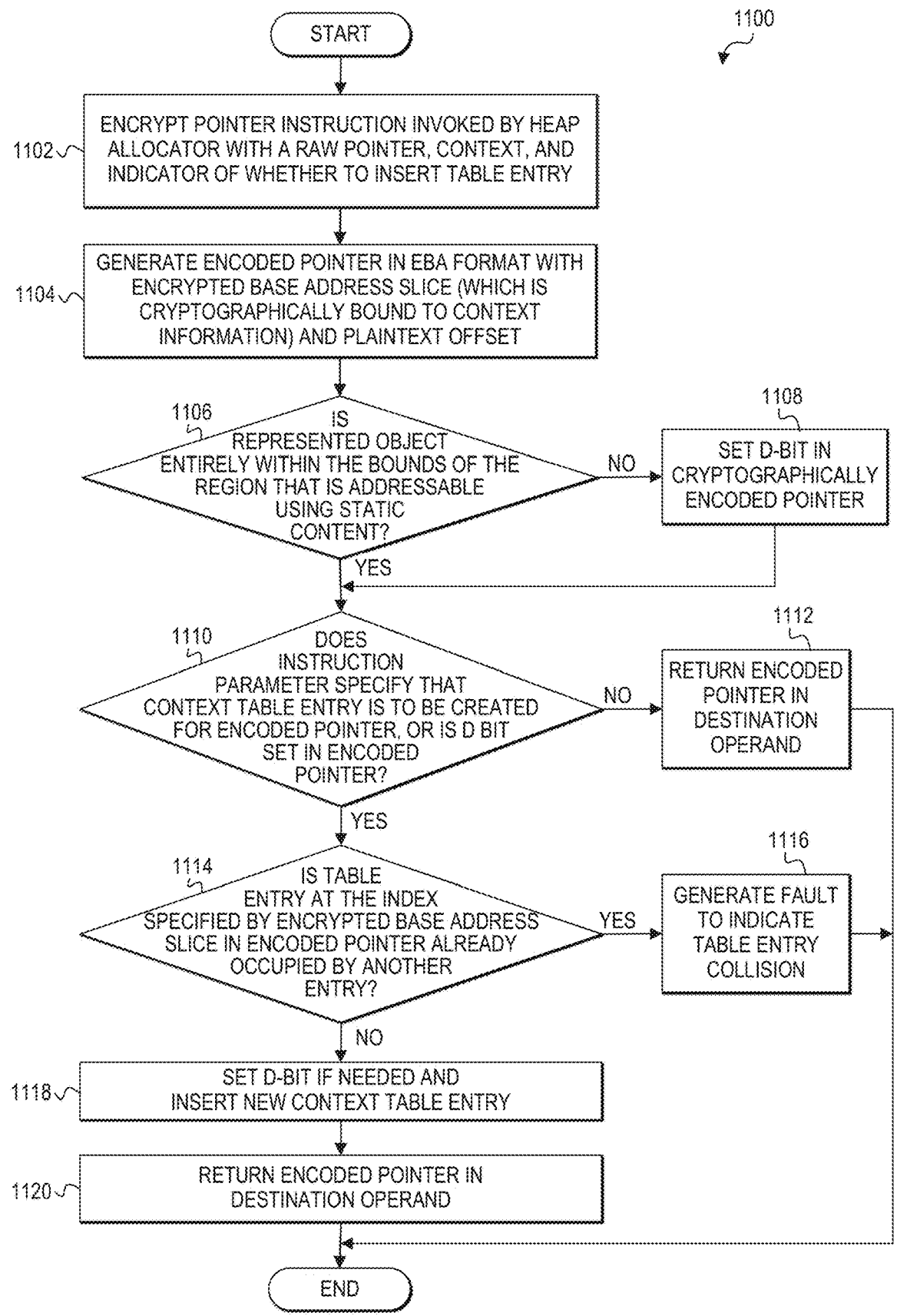
FIG. 11 is a simplified flow diagram of at least one embodiment of a process for generating a cryptographically encoded pointer with an encrypted base address, which may be executed by the computing device of FIG. 1.

Referring now to FIG. 11, an example process 1100 for generating a cryptographically encoded pointer in EBA format using the EncryptBaseAddr instruction is shown. Portions of the process 1100 may be executed by hardware, firmware, and/or software of the computing device 100 (e.g., by the processor 102 executing the address encoding logic 152). The process 1100 begins at 1102 in response to a memory allocation (e.g., by a memory manager module). At 1102, an EncryptBaseAddr instruction is invoked by a heap allocator or stack allocator with a raw pointer (ptr), context information (including memory allocation size), and an indicator for whether a table entry is to be inserted in a pointer context table. At 1104, a cryptographically encoded pointer in EBA format is generated. An encrypted base address slice in the pointer is cryptographically bound to context information, such as size metadata and permissions metadata.

At 1106, a determination is made as to whether the object represented by the cryptographically encoded pointer is entirely within the bounds of a memory region that is addressable using static context information. A statically addressable region can be delimited by a STATIC_REGION_BASE register containing the base address of the allocated memory region and the limit or end of the allocated memory region. The limit or end of the allocated memory region can be defined as STATIC_REGION_END= STATIC_REGION_BASE+STATIC_REGION_SIZE, where STATIC_REGION_SIZE=2^(bitwidth of the encrypted base address slice+base alignment shift value). In one example, the following determinations can indicate whether the object represented by the cryptographically encoded pointer is entirely within the bounds of a statically addressable memory region:

Is STATIC_REGION_BASE <=ptr and ptr+size <STATIC_REGION_END?

In this determination, "ptr" is the raw pointer generated for the memory allocation and "size" is the number of bytes allocated in the memory.

If it is determined that the object represented by the cryptographically encoded pointer is not entirely within the bounds of a statically addressable memory region, then at 1108, the D-bit (e.g., 601C) may be set in the cryptographically encoded pointer. The D-bit indicates that context information is to be dynamically obtained, for example, via a pointer context table.

Once the D-bit is set, or if it is determined that the object represented by the cryptographically encoded pointer is entirely within the bounds of a statically addressable memory region, then at 1110, a determination is made as to whether an instruction parameter (e.g., imm8 in EncryptBaseAddr instruction) specifies that the context table entry is to be created. If context information does not have to be added to the pointer context table, then at 1112, the cryptographically encoded pointer is returned in the destination operand (e.g., rd in EncryptBaseAddr instruction).

If it is determined that the context information has to be added to the pointer context table, then at 1114, a determination is made as to whether a table entry at the index specified by the encrypted base address slice in the cryptographically encoded pointer is already occupied by other context information. If other context information occupies the pointer context table at the index specified by the encrypted base address slice, then at 1116, a fault is generated to indicate the table entry collision. A privileged software flow for handling table entry collisions will be further described herein with reference to FIG. 10.

If it is determined that the location in the pointer context table at the index specified by the encrypted base address slice in the cryptographically encoded pointer is not occupied by another entry, then at 1118, a new context table entry is inserted at that index. The context table entry can include, for example, memory allocation size metadata, type metadata, and permissions metadata. At 1120, the cryptographically encoded pointer is returned in the destination operand (e.g., rd in EncryptBaseAddr instruction).

Figure 12:
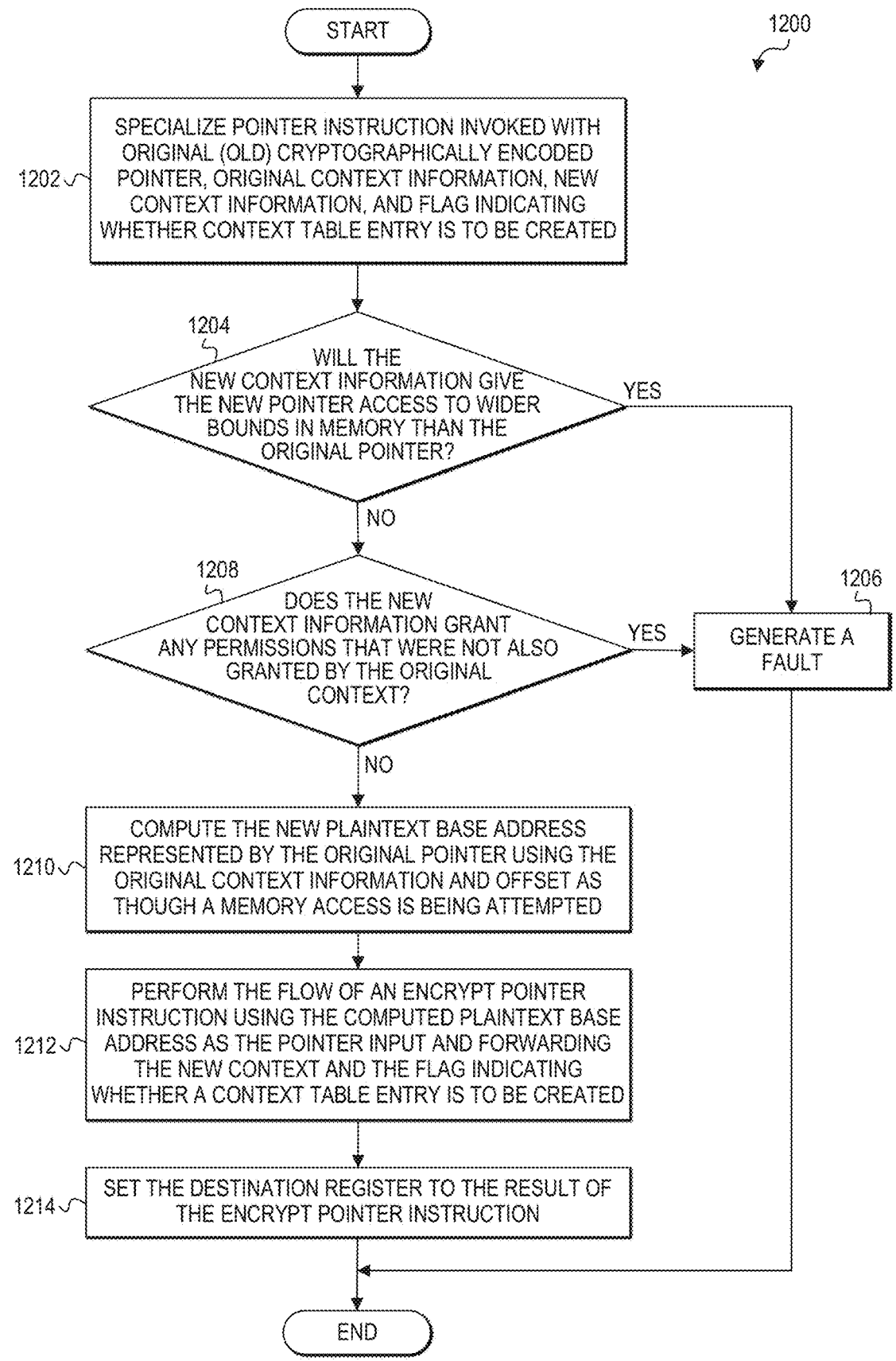
FIG. 12 is a simplified flow diagram of an example process of generating a specialized pointer according to at least one embodiment.

FIG. 12, an example process 1200 to perform a pointer specialization (SpecializePtr) instruction on a cryptographically encoded pointer in EBA format. In particular, the operations can be performed to change a type that is associated with the pointer, narrow the bounds of the memory region associated with the pointer (e.g., reduce the size associated with the pointer and potentially increase the base address as part of the size reduction), and/or reduce the permissions by which an object can be accessed by the pointer. Portions of the process 1200 may be executed by hardware, firmware, and/or software of the computing device 100 (e.g., by address encoding logic 152 of processor 102). The process 1200 begins at 1202, when a specialize pointer instruction (SpecializePtr) is invoked with operands that include an original (old) cryptographically encoded pointer in EBA format, original (old) context information associated with the original cryptographically encoded pointer, new context information associated with the new cryptographically encoded pointer to be generated, and a flag indicating whether a context table entry is to be created for the new pointer.

At 1204, a determination is made as to whether the new context information will give the new pointer access to wider bounds in memory than the old pointer could access. In at least one embodiment, this determination can be made by calculating the new base address, the new limit (bounds), the original limit, and comparing the new limit and the original limit, where o_ptr is the original pointer and n_ptr would be the new pointer:

new_base_address=original_base_address [in o_ptr]+current offset [in o_ptr]
new_limit=new_base_address+new_size [in new context information]
original_limit=original_base_address [in o_ptr]+original_size [in o_ptr]

If new_limit≥original_limit, then the new context information (i.e., new size metadata) would give the new pointer access to wider bounds in memory than the original pointer could access. Consequently, a fault is generated at 1206. Otherwise, if new_limit <original_limit, then the new size metadata would give the new pointer access to memory within the bounds of the original pointer. Therefore, no fault is generated and another check can be performed.

At 1208, a determination is made as to whether the new context information (i.e., permissions metadata) grants any permissions that were not also granted by the original context information. If the new context information grants any permissions that were not also granted by the original context information (i.e., the new context information expands the permissions) then a fault is generated at 1206. If the new context information does not grant any permissions that were not also granted by the old context (i.e., the new context information either reduces or does not change the permissions in the original context information) then a new cryptographically encoded pointer can be created based on the new context information.

At 1210, the plaintext linear address represented by the original pointer using the original context information can be computed as though a memory access is being attempted. Computing the plaintext linear address can include decrypting the base address slice in the original pointer using a cryptographic algorithm (e.g., block cipher), a secret key, and an address tweak. The address tweak can include a tag/version portion of the original pointer and the original context information (e.g., size metadata and permissions metadata associated with the original pointer). Other context information may also be used in the tweak in at least some embodiments including a crypto context ID and/or other variable length metadata. To obtain the original (decrypted) base address, once the base address slice has been decrypted, it can be concatenated with upper address bits pulled from a register or a table entry in memory, and a number of alignment bits may be concatenated at the end of the decrypted base address slice. In one example, three alignment bits are used if the address is 8-byte aligned. To compute the new plaintext linear address, an offset in the original pointer can be added to the original (decrypted) base address. The computed plaintext linear address can be used as the new base address for the new (specialized) pointer.

At 1212, the flow of the EncryptBaseAddr instruction can be performed using the computed new plaintext base address as the pointer input, and forwarding the new context information and the flag indicating whether a context table entry needs to be created. Once a specialize pointer (i.e., a new cryptographically encoded pointer in EBA format) is generated, a destination register can be set to the result of the EncryptBaseAddr flow (i.e., the new cryptographically encoded pointer in EBA format based on the new context information), as shown and described with reference to FIG. 11.

Figure 13:
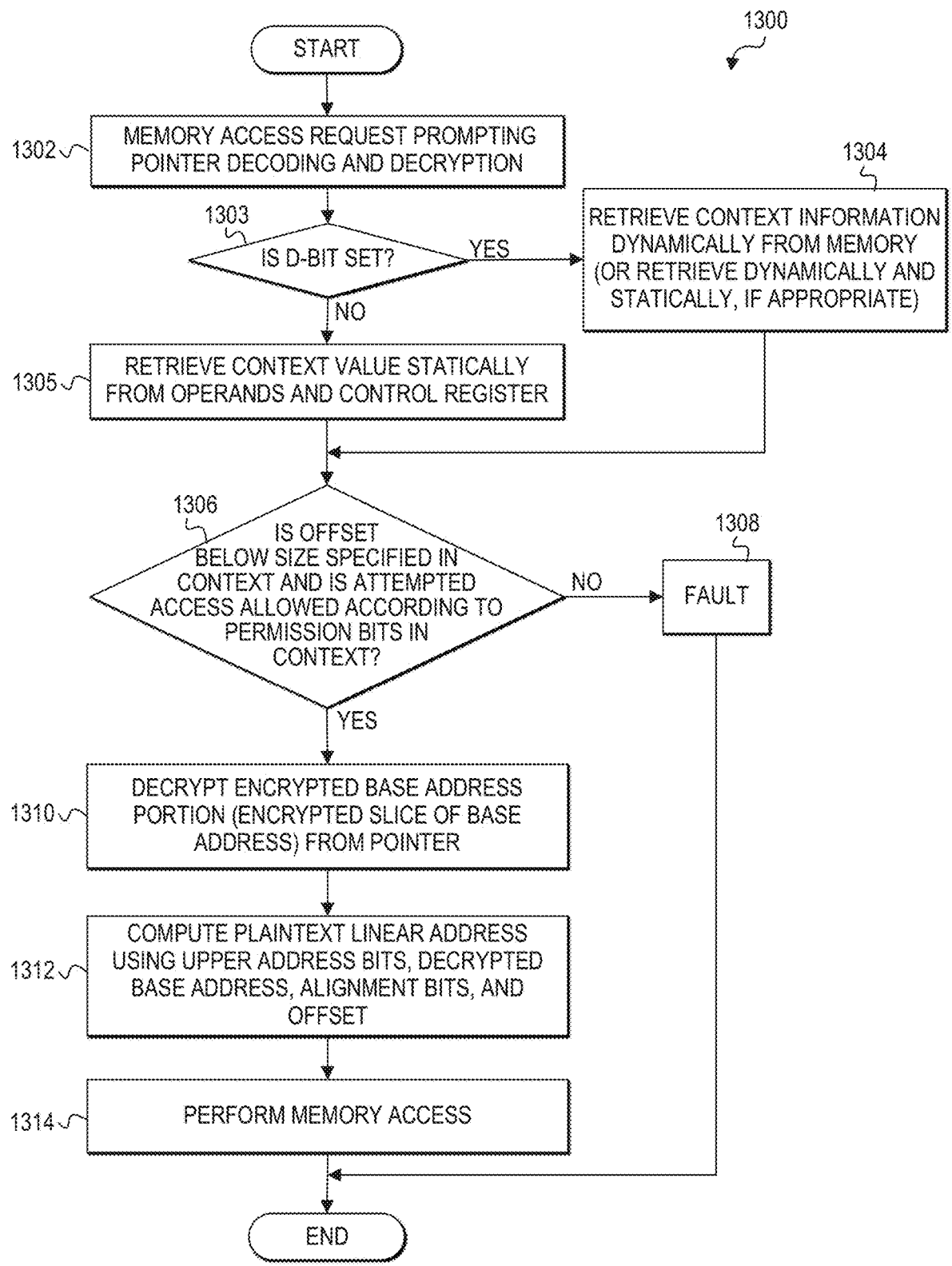
FIG. 13 is a flow diagram of an example process associated with generating a linear address from a cryptographically encoded pointer with an encrypted base address according to at least one embodiment.

In FIG. 13, an example process 1300 for decoding and decrypting a cryptographically encoded pointer in EBA format is shown. Process 1300 can be used in a load from encrypted pointer (LdEP) instruction and in a store to encrypted pointer (StEP) instruction. Portions of the process 1300 may be executed by hardware, firmware, and/or software of the computing device 100 (e.g., by the address decoding logic 162 in processor 102). The process 1300 begins at 1302 based on a memory access request prompting the pointer decoding and decryption. For example, a load from encrypted pointer (LdEP) instruction or a store to encrypted pointer (StEP) instruction may be initiated at 1302.

At 1304, a determination is made as to whether the pointer indicates that context information is to be retrieved statically (from an instruction operand) or dynamically (from memory). In one example, this determination can be made by evaluating a D-bit of the pointer (e.g., 601C). If the D-bit is not set, then at 1305, a context value is statically retrieved from an operand of the instruction. If the D-bit is set, however, then at 1304, context information can be dynamically retrieved from memory (e.g., pointer context table 121). More specifically, a context value can be dynamically obtained from a pointer context table. In some scenarios, some information may be retrieved from an operand of the instruction and some information may be retrieved from a control register (e.g., upper address bits may be stored in a control register and the size, type, and permissions metadata may be stored in an operand). The context value is generated to represent the context information (e.g., size metadata, type metadata, permissions metadata) associated with the pointer. When the pointer was cryptographically encoded, the context value may have been generated using the EncodeCtx instruction or existing legacy instructions, and then stored in a table entry of the pointer context table.

At 1306, access control checks are performed to determine whether the linear address encoded in the pointer is within the base and bounds of the allocated memory region and that permissions associated with the pointer allow the particular access that is being requested. In at least one embodiment, the base and bounds check can be performed by determining if all of the offset values for each pointer value referring to a byte of memory to be accessed in the current operation are less than the size metadata specified in the context information. If the offsets are less than or equal to the size metadata specified in the context information, then the base and bounds check succeeds. If any of the checked offsets is greater than the size metadata specified in the context information, then the base and bounds check fails. In some embodiments, checking a small number of offsets, e.g., just the maximum offset for the current operation, is sufficient. The permissions check can be performed by determining whether the permissions metadata specified in the context information permits the particular type of access that is being requested. If the permissions metadata permits the type of access that is being requested, then the permissions check also succeeds. If the permissions metadata does not permit the type of access being requested (e.g., write request is requested and permissions metadata only allows read access), then the permissions check fails. In this embodiment, process 1300 allows the computing device 100 to verify the cryptographically encoded pointer and enforce base and bounds check before converting the pointer into a real memory address.

If either one of the access control checks fails, then a fault is generated at 1308. If both of the access control checks succeed, then cryptographically encoded pointer is decoded at 1310 and 1312. At 1310, the base address slice in the pointer is decrypted using a cryptographic algorithm (e.g., block cipher), a secret key, and an address tweak. The address tweak can include a tag portion of the pointer and the context information (e.g., size metadata, type metadata, and permissions metadata associated with the pointer). Other context information may also be used in the tweak in at least some embodiments including the upper address bits of the pointer, a crypto context ID and/or other variable length metadata. Once the encrypted base address slice has been decrypted, at 1312, the effective plaintext linear address is computed using the upper address bits, decrypted base address slice, alignment bits, and offset. The decrypted base address slice can be concatenated with upper address bits pulled from a register or a table entry in a pointer context table. In addition, a number of alignment bits may be concatenated at the end of the decrypted base address slice to produce a decrypted base address. A final plaintext linear address can be computed by adding the offset in the original pointer to the decrypted base address. One example equation representing the computation of the plaintext linear address is the following:

(({Upper Base Address Bits, Decrypted Base Address slice}) <<3)+Offset

In this example computation, three alignment bits are used to force an 8-byte alignment. In other examples, however, a different number of alignment bits may be used or alignment bits may be eliminated. In addition, any form of computation may be used to appropriately combine the upper address bits, the decrypted base address slice, and the alignment bits. For example, the alignment bits may be added by shifting the concatenated upper address bits and decrypted base address slice to the left by three bits. Once the plaintext linear address is computed, the memory access can be performed at 1314.

Figure 14:
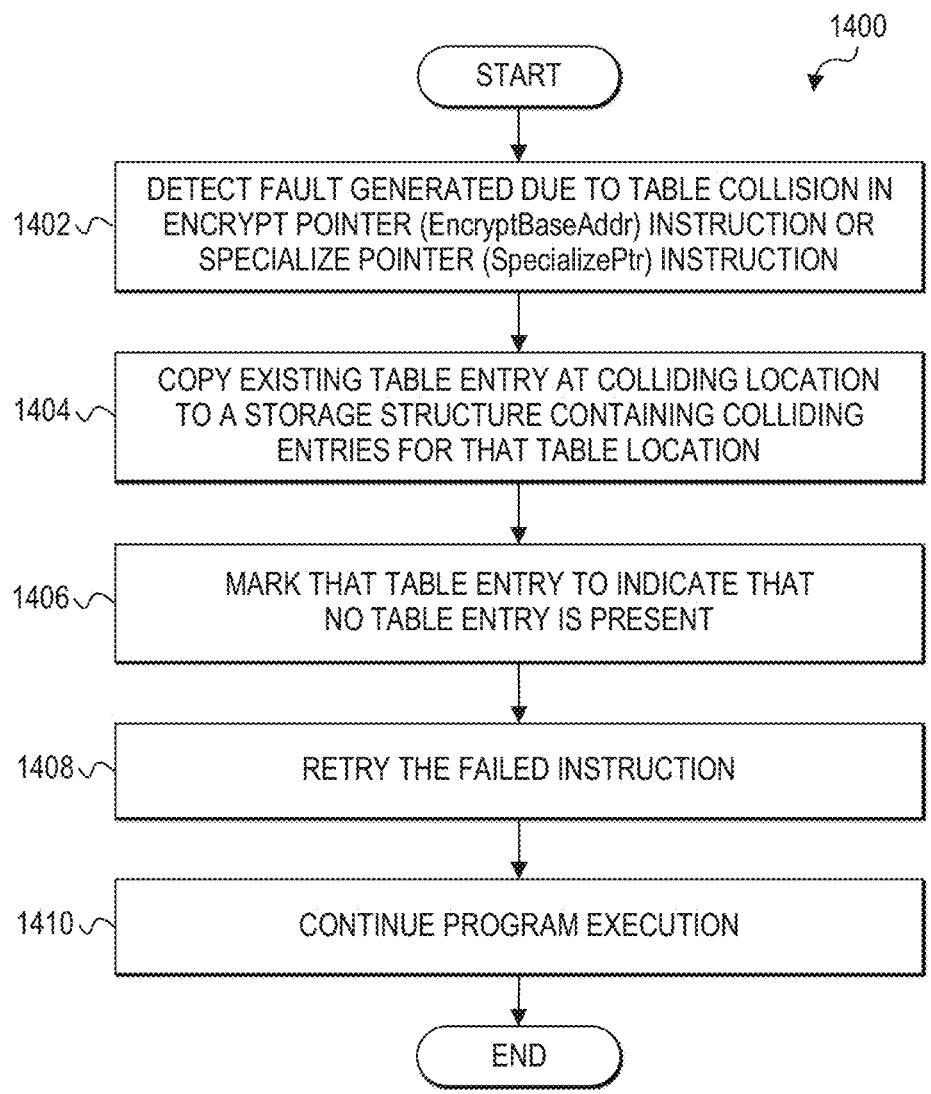
FIG. 14 is a flow diagram of an example process of detecting table collisions when generating a cryptographically encoded pointer with an encrypted base address according to at least one embodiment.

FIG. 14, an example process 1400 for an operating system to trap collision faults when an attempt is made to insert a new table entry into a pointer context table in a space that is already occupied by an entry. This can occur when the cryptographically encoded pointer associated with the existing entry has the same encrypted slice as the cryptographically encoded pointer associated with the new entry and the encrypted slices are used to index the pointer context table. This is a possibility even if the pointers reference different objects and have different sizes, types, and/or permissions. This could also occur if another portion of the cryptographically encoded pointers is used to index the pointer context table (e.g., the entire pointer, the encrypted slice plus the tag portion, etc.). Portions of the process 1400 may be executed by hardware, firmware, and/or software of the computing device 100 (e.g., by privileged system component 142). The process 1400 begins at 1402 in response to a fault being generated due to a table collision during execution of an EncryptBaseAddr instruction or SpecializePtr instruction. For example, during the flow of an EncryptBaseAddr instruction, a fault may be generated at 816 due to a table entry collision.

At 1404, the existing table entry at the colliding location in the table is copied to a storage structure containing colliding entries for that table location. At 1406, the location in the context table that corresponds to the index (e.g., encrypted base address slice of the current cryptographically encoded pointer) is marked to indicate that no table entry is present. In at least one example, marking the location can be achieved by clearing the permission bits (e.g., XWR bits in permission field 708) in the table entry at that location.

If the fault was generated by the execution of EncryptBaseAddr instruction (e.g., at 816), then at 1408, the EncryptBaseAddr instruction can be retried. If the fault was generated by execution of SpecializePtr instruction (e.g., at 1214), then at 1408, the SpecializePtr instruction can be retried. However, it is possible that if the fault was generated by execution of SpecializePtr instruction, then at 1408, just the flow of an EncryptBaseAddr instruction can be performed. A fault should not occur in either scenario since the space in the table is now available. At 1410, the program execution can continue.

Figure 15:
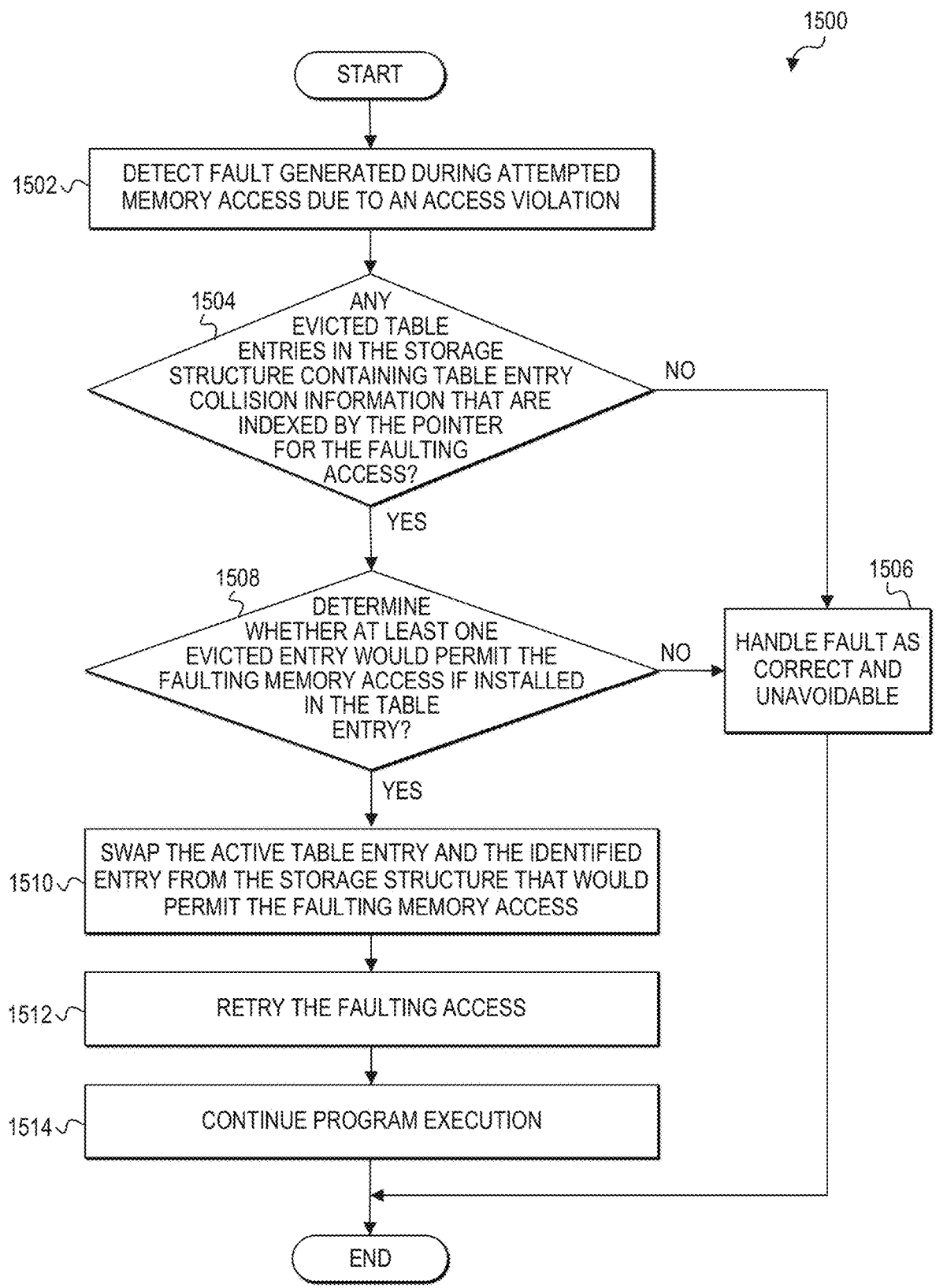
FIG. 15 is a flow diagram of an example process of detecting a fault during a memory access based on a cryptographically encoded pointer with an encrypted base address according to at least one embodiment.

FIG. 15, an example process 1500 for an operating system to trap memory access violations and to check for colliding table entries in a pointer context table. Generally, if collisions in the pointer context table occurred previously (e.g., during an EncryptBaseAddr instruction), necessitating the eviction of one or more previous entries that are still valid, the operating system can try each valid, evicted entry to determine whether any permit the current access request. If so, the operating system can swap the matching evicted entry and the entry currently loaded in the pointer context table and resume the program, which should then proceed successfully. Portions of the process 1500 may be executed by hardware, firmware, and/or software of the computing device 100 (e.g., by privileged system component 142). The process 1500 begins at 1502 in response to a fault being generated during an attempted memory access due to an access violation. The memory access instruction may be, for example, an LdEP instruction or a StEP instruction. For example, during the pointer decoding and decryption flow illustrated in FIG. 13, a fault may be generated at 1308 due to a memory access violation being detected.

At 1504, a determination is made as to whether any table entries in the storage structure containing table entry collision information (also referred to as "evicted entries" in an "eviction table") that are indexed by the pointer (e.g., the encrypted base address slice of the pointer) for the faulting memory access. If no evicted entries are indexed in the eviction table by the pointer for the faulting access, then at 1506, the fault is handled as correct and unavoidable. Thus, an appropriate fault detection response can be made based on the particular operating system and implementation.

If an evicted entry existing in the eviction table is indexed by the pointer for the faulting memory access, then at 1508, a determination is made as to whether at least one evicted entry would permit the faulting memory access if installed in the table entry of the pointer context table that is indexed by the pointer for the faulting access. If no evicted entries that are indexed by the pointer for the faulting memory access would permit the faulting memory access, then at 1506, the fault is handled as correct and unavoidable.

If at least one evicted entry that is indexed by the pointer for the faulting memory access would permit the faulting memory access if that evicted entry was installed in the pointer context table, then at 1510, the active table entry in the pointer context table and the identified evicted entry from the storage structure that would permit the faulting memory access are swapped. At 1512, the faulting memory access is retried, and should be successful. At 1514, the program execution can continue.

In some embodiments, underlying cache accesses may be aligned to the block size so that integrity checking can operate. Instructions can extract or modify a portion of a block after reading or before writing the entire block. Logical bounds checks prevent access to unauthorized portions of each block. In an example scenario of sub-block access, consider a struct with two fields: struct a {int x; int y;}. An instance of the struct is allocated aligned to an 8-byte block. A pointer is generated that covers just the y integer. A four-byte LdEP to the pointer loads the entire struct, but then just returns the value of the y integer, which is extracted from the struct.

Turning to FIGS. 16A-16B, FIG. 16A is an example of C++ programming language software code 1600A and its corresponding compiled assembly language output 1600B in FIG. 16B using cryptographically encoded pointers in an EBA format and associated instructions for EBA pointers. In software code 1600A, a structure definition 1602 is followed by a main function 1604 that performs various allocations. For example, a pointer is generated at 1606, a pointer to an array is generated at 1608, and a specialized pointer is generated to field y at 1610. For simplicity in this example, the assumption is that any function with a pointer parameter is taking an encrypted pointer. Thus, if the function is invoked, the pointer is being generated. In other scenarios, however, a pointer may be generated and used without passing it to another function.

FIG. 16B shows the assembly language output (or program code) 1600B generated from the software code 1600A. Program code 1600B is generated with two EncryptBaseAddr instructions 1612 and 1614 and one SpecializePtr instruction 1622. EncryptBaseAddr instruction 1612 does not insert a table entry with context information, so subsequent memory accesses with that pointer can obtain context information statically. EncryptBaseAddr instruction 1614 does insert a table entry with context information, so subsequent memory accesses with that pointer dynamically load context information from memory (e.g., pointer context table 121). Program code 1600B also includes LdEP instructions 1618 and 1624 for loading data from memory using EBA pointers, and StEP instructions 1620, 1626, and 1628 for storing data to memory using EBA pointers.

Some enabling of the runtime software is also performed for implementations of EBA pointers and instructions. First, global pointers that are statically initialized are to be encrypted at load-time. This requires the executable and linkable format (ELF) metadata to indicate the locations of such pointers and where they point so that the loader can initialize them. This may be analogous to using relocation data. In addition, the dynamic linker is configured to use the cryptographically encoded pointer format when populating the global offsets table (GOT) and the procedure linkage table (PLT).

Figure 17:
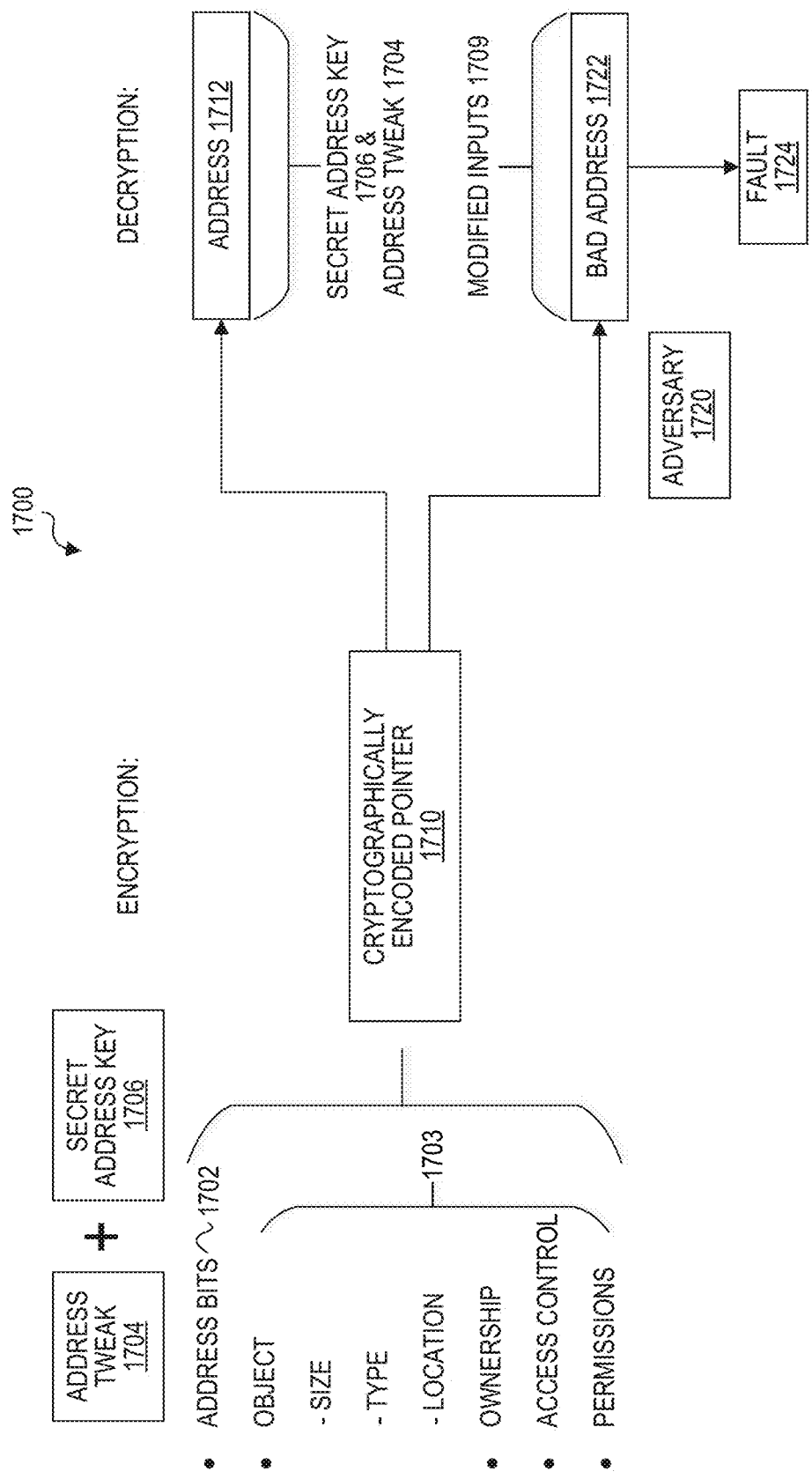
FIG. 17 is a diagram of an example adversary attempting to use a cryptographically encoded pointer to access memory according to at least one embodiment.

FIG. 17 is a diagram 1700 of an example adversary 1720 (e.g., malicious software, malicious user, bot, defective software, etc.) attempting to use a cryptographically encoded pointer 1710 to access memory according to at least one embodiment. Cryptographically encoded pointer 1710 may be configured in an EBA format as described with reference to EBA pointer 610. The example shown in FIG. 17 illustrates a cryptographic algorithm using context information 1703 (e.g., context information such as size of object, type of object, location of object, ownership information, access control, permissions) and some address bits 1702 (e.g., upper address bits) as an address tweak 1704 to encrypt a memory address slice to obtain an encrypted base address slice in pointer 1710. A secret address key 1706 may also be used by the cryptographic algorithm. The cryptographically encoded pointer 1710 with an encrypted slice (e.g., ciphertext) of the address is then accessible to software and, if manipulated correctly (e.g., only the offset is manipulated and the offset stays within the base and bounds of the allocated memory) and the same implicit information is provided when the pointer is returned to the CPU, the correct original address will be decoded. An adversary without the correct implicit information (such as the accessing function being in the wrong memory location), or the tag or encrypted portions of the pointer were changed, then the processor will decode the address incorrectly, resulting in a bad/faulting memory access. For instance, in the example shown, metadata tweaks (e.g., address bits, object (size, type, and/or location), ownership, access controls, permissions, etc.) and a secret address key are used to encrypt a virtual address. If an adversary modifies an input to the decryption process (e.g., changes the encoded pointer value or provides the wrong size information) as indicated by modified inputs 1709, the pointer may be decrypted to a random (or bad) address 1722 that may result in a fault 1724 as shown. On the other hand, if the correct address tweak 1704 and secret address key 1706 are used as shown in the top branch of the diagram, a correct linear address 1712 may be obtained from the decryption process, which may be different than the linear base address if the offset has changed.

Figure 18:
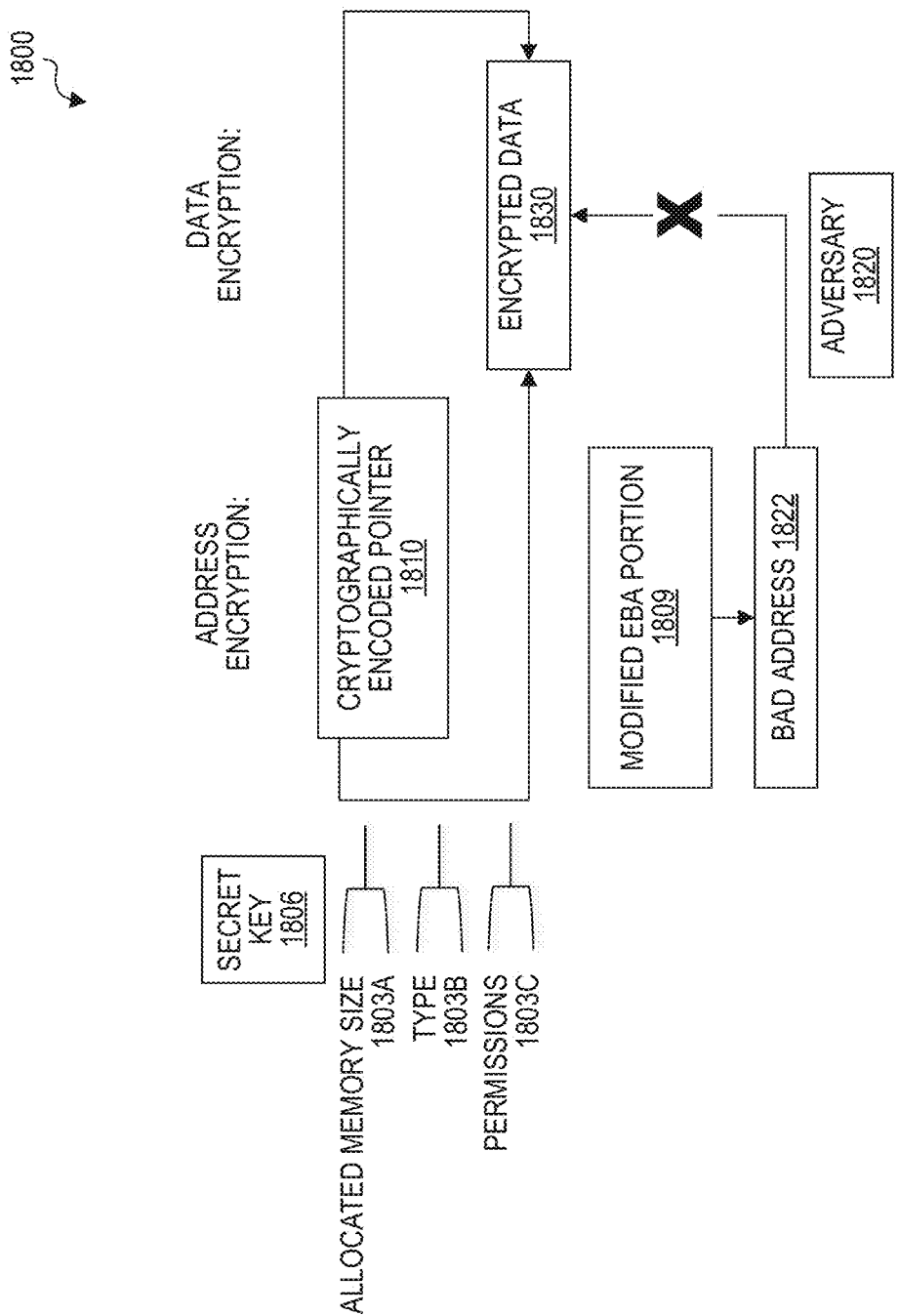
FIG. 18 is a diagram of another example adversary attempting to use a cryptographically encoded pointer to access memory according to at least one embodiment.

FIG. 18 is a diagram 1800 of another example adversary 1820 (e.g., malicious software, malicious user, bot, defective software, etc.) attempting to use a cryptographically encoded pointer 1810 to access memory according to at least one embodiment. In particular, in the example shown, the pointer 1810 is encrypted based on a secret address key 1806 and an address tweak that includes three items of context information. In this example, the context information includes memory allocation size metadata 1803A, type metadata 1803B, and permissions metadata 1803C. As previously described herein, however, any suitable item of context information, portion of memory address, or suitable combination thereof may be used as a tweak to encrypt the base address slice embedded in the pointer (e.g., EBA portion 604). An encrypted base address slice that is embedded in a pointer may be encrypted multiple times with multiple levels of contextual metadata included. In other embodiments, a base address slice that is embedded in a pointer may be encrypted once with an address tweak containing one or more items of context information, a portion of the memory address (e.g., upper address bits), or any suitable combination thereof.

Data encryption may then be dependent on the pointer encoding. For instance, when encrypting data on a memory store (write) or decrypting data on a memory read (load) operation, the decoded linear address encoded in the pointer 1810 (e.g., plaintext base address plus offset) can be generated and used as a data tweak to encrypt/decrypt the data referenced by the pointer 1810. The metadata from pointer 1810 (e.g., a tag/version portion 602) may also be used with the decoded linear address to form the data tweak. In addition, any suitable context information may be used with the decoded linear address as a tweak for the encryption/decryption of the data. In another embodiment, when encrypting (or decrypting) data, the encrypted base address portion (e.g., 604) of the encoded address in pointer 1810 can be used as a data tweak to encrypt/decrypt the data referenced by the encoded pointer 1810. Here, the processor can use a tweakable block cipher and a secret data encryption key to encrypt the data using the encrypted base address portion as part of the data tweak. The plaintext portion of the pointer (e.g., upper address bits) may also be used as part of the data tweak depending on the tweak size of the cipher. For example, a store of a 64-bit register may use the PRINCE cipher with a 64-bit block size, and the encrypted base address portion (604) and offset to that 64-bit block may be used as the data tweak, or the decoded linear address (e.g., plaintext base address plus offset) generated from the pointer plus the offset may be used as the data tweak. Similarly, 32-bit block size ciphers (e.g. SPECK, SIMON, tweakable K-cipher) could be used when running in 32-bit mode or to encrypt and store 32-bit sized registers, using the encrypted base address portion (604) and the offset to that 32-bit memory block as a data tweak, or some portion of the linear base address generated from the pointer plus the offset may be used as the data tweak. Similarly, larger size block ciphers such as AES may be used to store a 128-bit AVX register to memory using the encrypted base address portion (604) and offset to the 128-bit memory block as a data tweak, or the linear base address generated from the pointer plus the offset may be used as the data tweak. In addition, when the tweak input has available bits, some context information may also be included in the tweak. Alternatively, a smaller block size cipher (e.g. 64-bits) can be used to encrypt and store a larger register 128-bits in parts, encrypting the upper half with a data tweak for the upper half and separately encrypting the bottom half with a different data tweak. It should be noted that in at least some implementations, depending on the block cipher block size and the pointer size, the entire pointer or any selected contents thereof can be used as a data tweak or part of a data tweak for the block cipher. For example, pointer 610 of FIG. 6, or the linear base address generated from pointer 610, or some portion thereof, may be used as a data tweak for encrypting data with an AES counter mode cipher having a 128-bit block size.

As in FIG. 17, in the diagram of FIG. 18, decrypting encrypted data 1830 with an invalid encoded address (e.g., modified encrypted base address portion 1809) will either result in a fault due to the pointer value decoding to a bad address 1822, or, even if the decrypted address is valid (non-faulting), the data at that location may be encrypted with a different tweak (e.g., resulting in an invalid keystream). Thus, even if an adversary attempts an unauthorized access and guesses an address tweak that causes the decrypted and decoded pointer to refer to the targeted memory, that memory is encrypted in such a way that it is bound to authorized pointers. Consequently, the adversary's access is likely to only return garbled data or induce a detectable integrity violation if integrity is enforced.

In this manner, data cryptography may be dependent on the cryptographic address encoding. A memory manager may use this to its benefit by allocating different sized objects from the heap to ensure that the ciphertext in the pointer is always different for each malloc/new instruction. For example, when freeing an allocation for 8 bytes, the next reallocation of that same location in memory may be given to an allocation of 4 bytes to produce a different ciphertext (e.g., 604) for the newly allocated buffer. If the freed 8 byte allocation pointer was later incorrectly reused to access the memory location, the contents of the current 4-byte allocation will be encrypted with a different keystream/tweak such that the freed 8-byte allocation pointer will not properly decrypt the new data.

In some embodiments, data integrity can be validated by the processor implicitly based on entropy or pattern tests, as data decrypted with the wrong tweak/keystream may appear random vs. properly decoded data which will exhibit patterns. Implicit integrity is an optimization where the processor looks up integrity values (e.g. Message Authentication Code/MAC) stored in memory corresponding to the (encrypted) data every time. When the processor loads a register from memory, it may either verify the implicit integrity of the corresponding portion of the memory used to load the register/port, or, if the entropy is uncertain, the processor may look up an integrity value for that portion of the memory (e.g., based on its memory address where the register is being loaded from) to verify the contents of memory belong to that keystream/tweak. If the integrity value in memory does not match the memory (data) contents being loaded into a register given the current encoded address (tweak, keystream), an integrity violation (exception/fault) may be generated by the processor.

A write for ownership operation can be used to change the contents of memory from using one keystream to using another keystream, and this may be a privileged operation (e.g., performed by the memory manager, or determined by the permissions used with EncryptBaseAddr) to allocate memory without causing integrity violations. The write for ownership may change the data and corresponding integrity values (e.g., ICVs/MACs) to match the written data contents with the new keystream/tweak. Meanwhile, normal writes will first read the old data/integrity values from memory using the encoded address being used to store (write) the register contents to memory to first verify that the correct keystream/tweaks are being used (this is a read for ownership check). In this way, attempts to overwrite memory belonging to someone else (different key/tweak) is detected and prevented.

Figure 19:
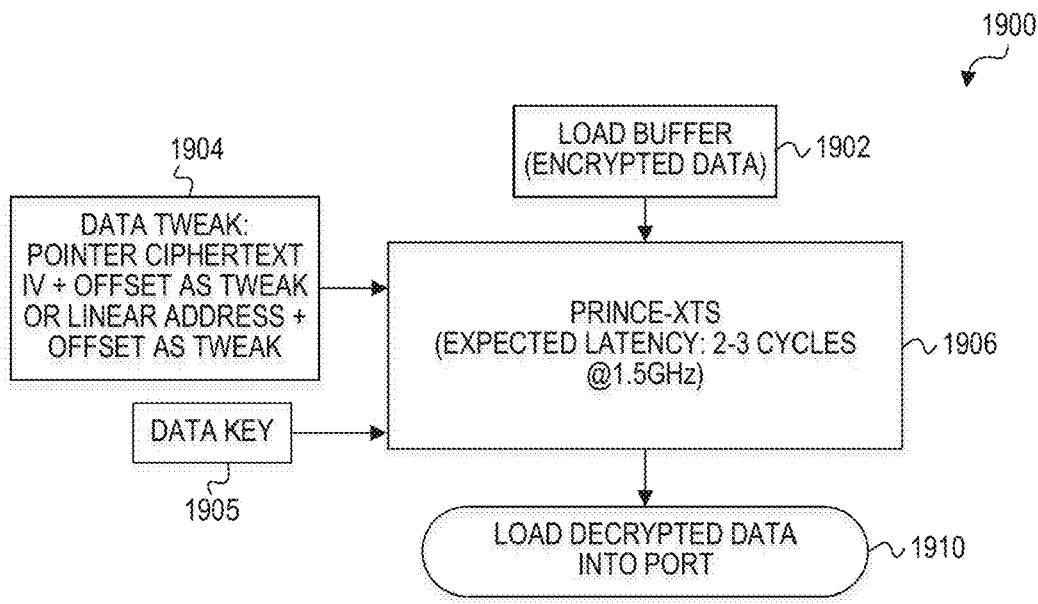
FIG. 19 is a block diagram of an XEX-based Tweaked CodeBook Mode with ciphertext stealing (XTS) block cipher that may be used for encryption and decryption in accordance with at least one embodiment.
Figure 20:
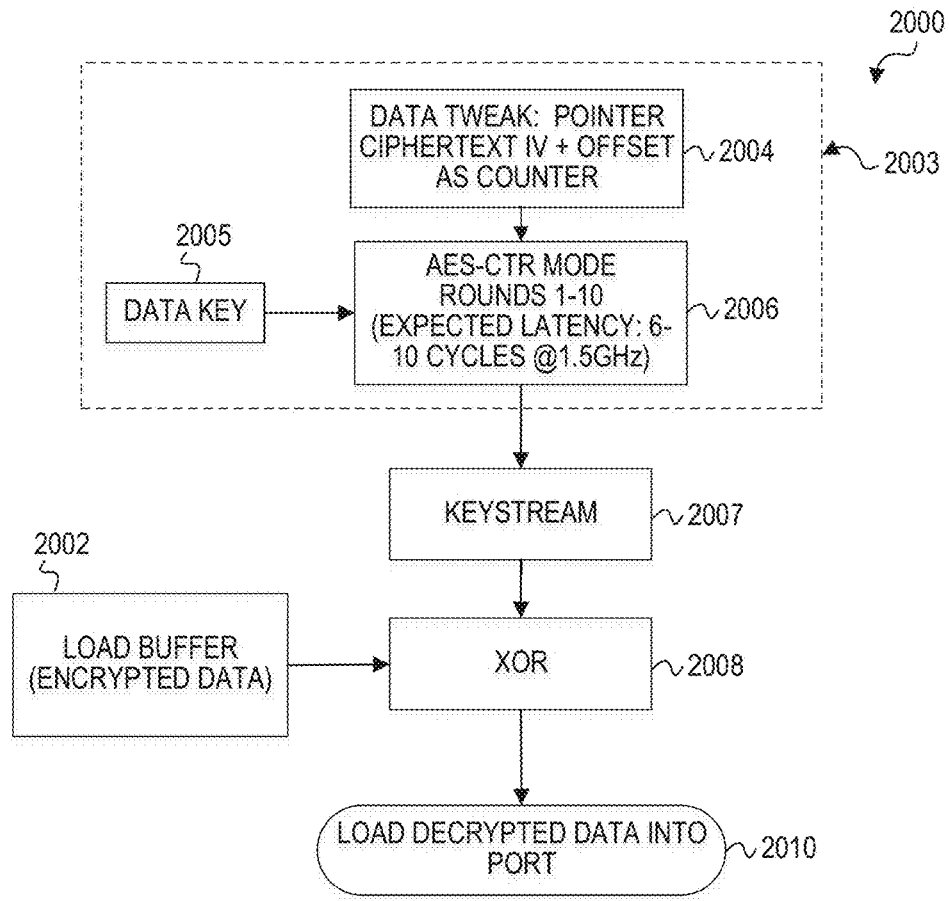
FIG. 20 is a block diagram of an Advanced Encryption Standard (AES) counter mode block cipher that may be used for encryption and decryption in accordance with at least one embodiment.

FIGS. 19 and 20 are block diagrams illustrating example block ciphers for decrypting data according to embodiments described herein. The block ciphers illustrated in FIGS. 19 and 12 are not intended to be limiting as numerous different tweakable block ciphers in various sizes may be used for encrypting and decrypting data (and memory address slices) according to particular needs and implementations of the embodiments disclosed herein.

FIG. 19 shows an Advanced Encryption Standard (AES) XEX-based tweaked codebook mode with ciphertext stealing (XTS-AES) decryption flow 1900 for decrypting encrypted data that is referenced by a cryptographically encoded pointer, such as EBA pointer 610. AES is a block cipher that operates on blocks (e.g., fixed-length groups of bits) of data. The XTS-AES algorithm is a mode of operation of the AES algorithm. XTS-AES is a tweakable block cipher that performs an XTS-AES encryption procedure and an XTS-AES decryption procedure using the same secret data key and the same data tweak. For example, a Prince-XTS block cipher 1906 can perform encryption of data based on a data tweak 1904 and a secret data key 1905 and can also perform the counterpart decryption of the encrypted data using the same data tweak 1904 and the same data key 1905.

With reference to decryption flow 1900, after data is encrypted by Prince-XTS block cipher 1906, when the encrypted data is subsequently accessed by software (e.g., load or store instructions, etc.), the encrypted data is loaded in a buffer at 1902 and fed into Prince-XTS block cipher 1906. Data tweak 1904 and data key 1905 are also input to the block cipher 1906. In one embodiment, data tweak 1904 can include encrypted base address portion (e.g., 604) and an offset from a pointer referencing the memory location of the encrypted data. In another embodiment, data tweak 1904 can include at least a portion of the linear base address generated from an EBA pointer (e.g., 610) plus an offset. The block cipher 1906 decrypts the encrypted data using the data tweak 1904 and the data key 1905. The decrypted data can be loaded into a port at 1910 for use by the software.

FIG. 20 shows an Advanced Encryption Standard (AES) counter mode (AES-CTR) decryption flow 2000 for decrypting encrypted data that is referenced by a cryptographically encoded pointer, such as pointer 610. An AES-CTR algorithm is a mode of operation of the AES algorithm. AES-CTR is a block cipher that can be used in an AES-CTR mode encryption procedure and an AES-CTR mode decryption procedure using the same secret data key and the same data tweak. For example, in an AES-CTR mode encryption procedure, an AES-CTR block cipher encrypts a data tweak based on a secret data key to create a keystream that then encrypts a block of data using an XOR operation. In a counterpart AES-CTR decryption procedure, the AES block cipher encrypts the same data tweak based on the same secret data key to create the keystream that then decrypts the corresponding block of encrypted data using an XOR operation.

In an example, prior to decryption flow 2000 being invoked, data is encrypted in an AES-CTR mode encryption procedure. In the AES-CTR mode encryption procedure, an AES-CTR mode block cipher 2006 encrypts a data tweak/initialization vector (IV) 2004 based on a secret data key 2005 to create a keystream 2007. The keystream 2007 is used in an XOR operation 2008 to encrypt a block of data. This may be performed for multiple blocks of data with AES-CTR block cipher 2006 encrypting a new data tweak for each block of data to be encrypted. The new data tweak may be computed by incrementing a counter in the data tweak. The counter (or tweak/IV) 2004 can include encrypted base address portion (e.g., 604) and an offset from a pointer referencing the memory location of the encrypted data. In at least one embodiment, data tweak 2004 can include a linear address generated from an EBA pointer (e.g., 610). The linear address may be computed by decoding the EBA pointer to generate the decrypted base address and adding an offset in the EBA pointer to the decrypted base address. After the AES-CTR mode encryption procedure is completed and encrypted data is generated, decryption flow 2000 may be invoked when the encrypted data is accessed by software (e.g., load or store instructions, etc.). In the decryption flow 2000, the encrypted data generated by the AES-CTR mode encryption procedure is loaded into a buffer at 2002. The AES-CTR mode block cipher 2006 encrypts the same data tweak 2004 based on the same secret data key 2005 to create the keystream 2007. The keystream 2007 is used in the XOR operation 2008 to decrypt the corresponding block of encrypted data that was previously generated by the AES-CTR mode encryption procedure. This may be performed for each block of encrypted data using a new data tweak (e.g., computed by incrementing the counter in the data tweak) for each block. The decrypted data can be loaded into a port at 2010 for use by the software.

It should also be noted that in some embodiments, operations indicated at 2003 may be performed in parallel to operations to obtain encrypted data to be decrypted. The operations for obtaining the encrypted data include decoding a cryptographically encoded pointer to form a linear base address and using the linear base address to locate the encrypted data. The encrypted data may then be stored in the buffer at 2002. Also, it should be further noted that the block ciphers shown and described with reference to FIGS. 19-20 could also be adapted to perform cryptographic operations on linear base addresses (e.g., a slice of a linear base address) that are formed into cryptographically encoded pointers in EBA format.

Generally, when encrypting/decrypting data, it is advantageous to avoid using the same tweak/IV for every block of data within a given allocation. Thus, a value in the tweak/IV varies depending on the position of the particular block being processed. In certain block ciphers, such as AES-CTR mode (e.g., 2006), an initialization vector (IV) embodies this concept as it is transformed (e.g., incremented) when generating subsequent blocks of a keystream. However, embodiments herein allow software to access any block of an allocation from any memory access instruction. Thus, the relative offset of the access has to be incorporated in the tweak/IV. Incorporating an offset of the linear address encoded in the pointer is one possible way to achieve this in various embodiments using offsets (e.g., 606), which are described herein.

Figure 21A:
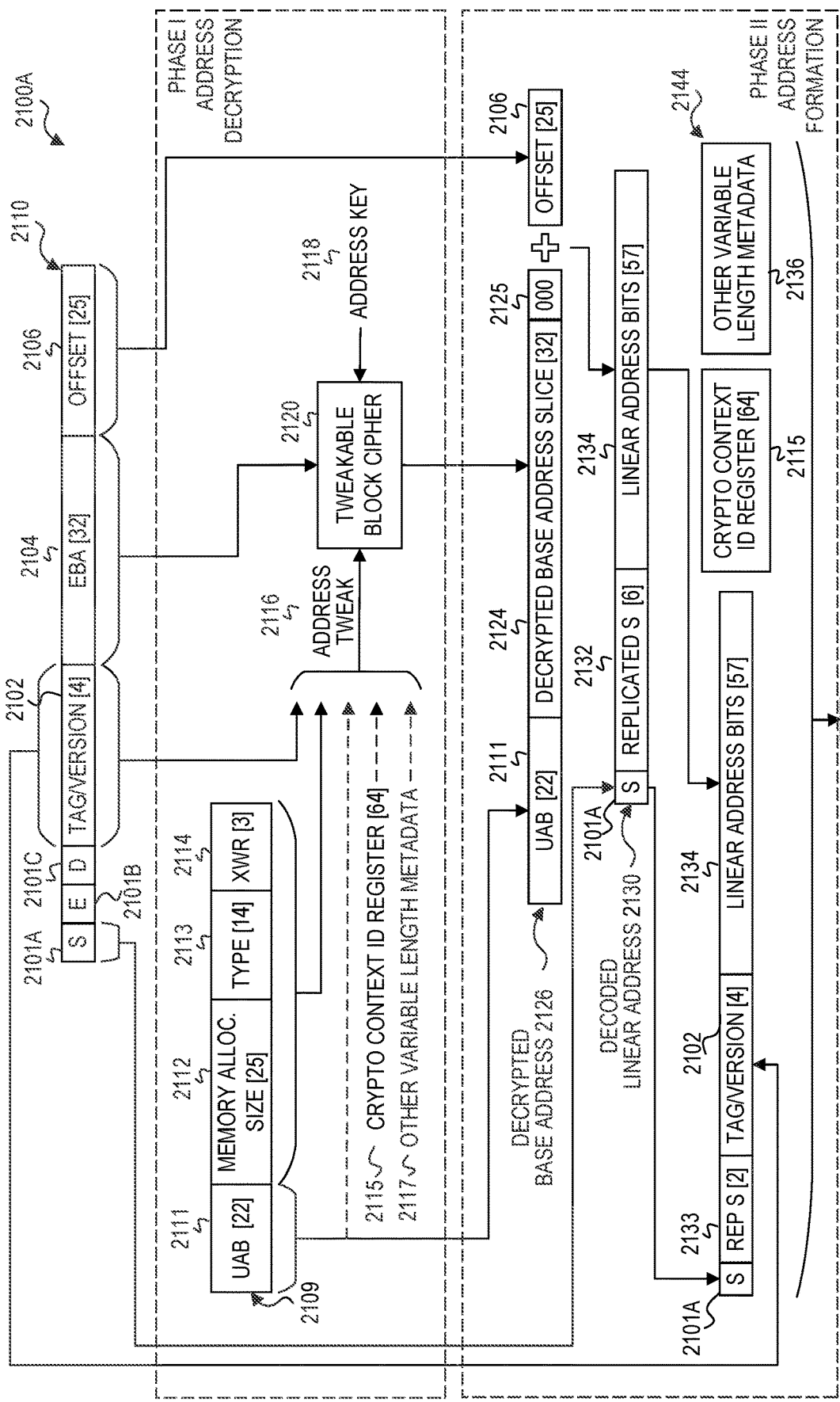
FIGS. 21A-21B are flow diagrams illustrating an example process of binding a cryptographically encoded pointer with an encrypted base address to the encryption of the data referenced by that pointer according to at least one embodiment.
Figure 21B:
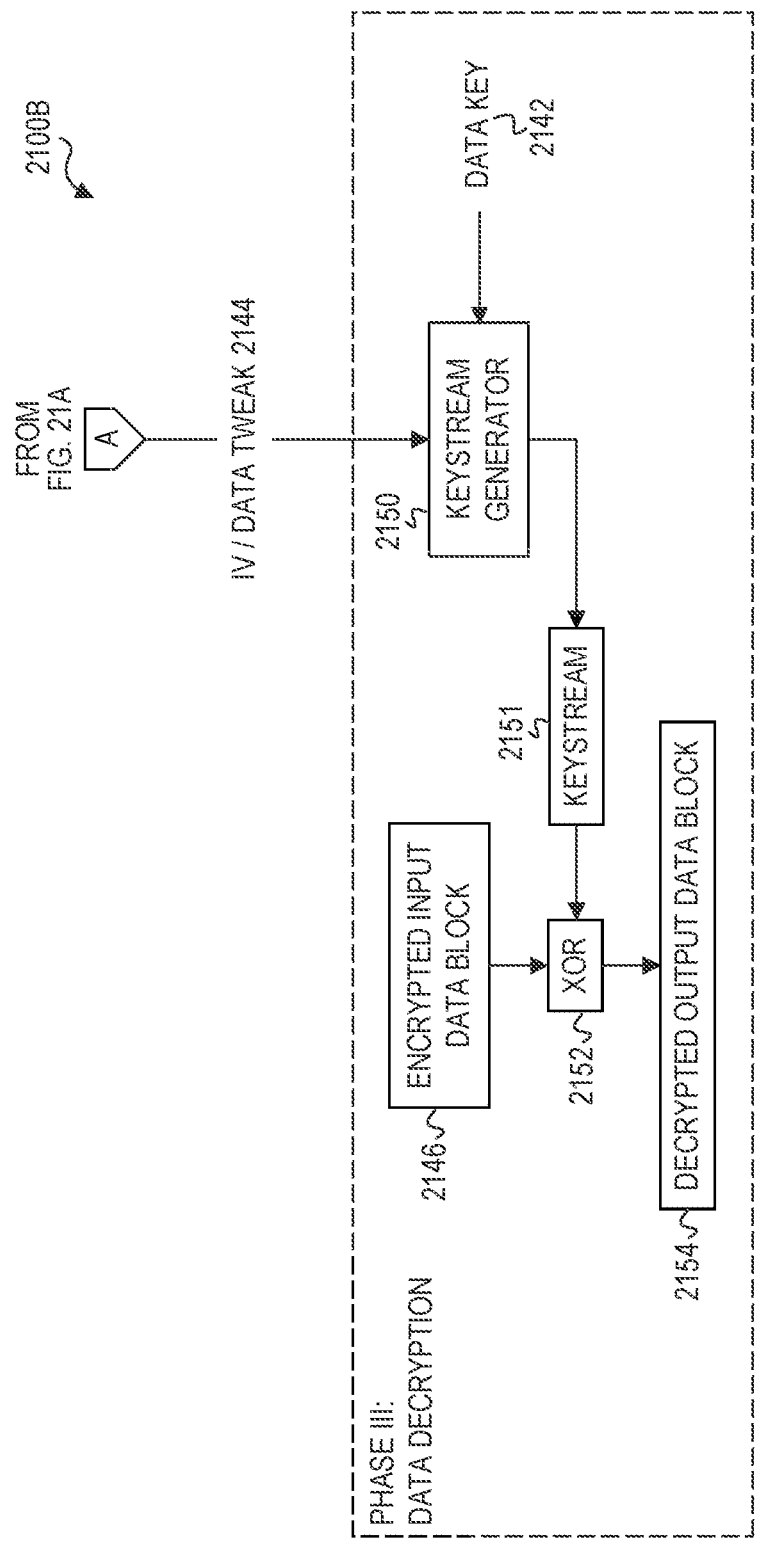

FIGS. 21A-21B illustrate a detailed flow diagram of an example process 2100A-2100B of obtaining data referenced by an embodiment of a cryptographically encoded pointer 2110 in EBA format, where encryption of the data is bound to the contents of the pointer. At least some portions of process 2100A-2100B may be executed by hardware, firmware, and/or software of the computing device 100. In the example shown, EBA pointer 2110 is embodied as a 64-bit encoded linear address including a reserved portion that includes a supervisor bit (S-bit) 2101A, an encoded indicator bit (E-bit) 2101B, and a dynamic context lookup bit (D-bit) 2101C. Pointer 2110 also includes a tag/version portion 2102, an encrypted base address portion 2104, and an offset portion 2106. Generally, pointer 2110 has a similar configuration to pointer 1610.

The operations of process 2100A-2100B are identified in three phases: address decryption (Phase I), address formation (Phase II), and data decryption (Phase III). In Phase I, the linear base address embedded in pointer 2110 is decrypted. Specifically, the EBA portion 2104 of the pointer is decrypted by a decryption algorithm such as a tweakable block cipher 2120 using an address key 2118 and an address tweak 2116. The address tweak 2116 can include bits of tag/version portion 2102, in addition to one or more items of external context information 2109. For example, bits of memory allocation size metadata 2112, type metadata 2113, and permissions metadata 2114 of external context information 2109 can be included in address tweak 2116. In further embodiments, the plaintext upper address bits 2111 may also be used as part of address tweak 2116. In yet further embodiments, a crypto context identifier register 2115 may be used as part of address tweak 2116. The crypto context identifier register 2115 may contain a unique value (e.g., randomly or deterministically generated) associated with a particular functional group (e.g., processes, subset of processes, virtual machines (VM), subset of VMs, etc.). In at least some embodiments, an additional one or more items of variable length metadata 2117 may also be used as part of address tweak 2116 for the tweakable block cipher 2120. For example, the variable length metadata may include other context information or metadata (e.g., privilege level, location, ownership, etc.) as previously described herein. The block cipher 2120 may be any suitable decryption algorithm (e.g., XTS-AES block cipher, LRW, AES-CTR mode, etc.) as noted herein.

When the EBA portion 2104 of the encoded linear address has been decrypted into a decrypted base address slice 2124 by tweakable block cipher 2120, then a decoded linear base address 2126 can be formed in Phase II. First, upper address bits 2111 can be obtained from context information in a register (or from other storage as previously described herein) and concatenated to the decrypted base address slice 2124. In at least some embodiments, base alignment bits 2125 are concatenated with the decrypted base address slice 2124 to form the least significant bits. This could also be accomplished by a left-shifting operation that performs an appropriate number of bit shifts. In this example, base alignment bits 2125 include three bits. The base alignment bits 2125 are set to zero in order to align the address to an 8-byte boundary. A decoded linear address 2130 is formed by adding the offset in offset portion 2106 of the pointer 2110 to the decrypted base address 2126 to obtain linear address bits 2134. Also, the supervisor bit 2101A is replicated in the unused/non-canonical bits (e.g., adjacent six bits 2132), and all unused/non-canonical bits are concatenated with the linear address bits 2134. In some embodiments, it is the most significant bit of the linear address bits 2134 that is replicated to fill the other unused/non-canonical bits in the decoded linear address 2130.

Prior to using the decoded linear address to perform the memory access, the bounds specified by the combination of the decrypted base address 2126 and the memory allocation size 2112 are checked. The decrypted base address 2126 specifies the lower bound and the upper bound is computed by adding the memory allocation size 2112 to the decrypted base address 2126. Narrower bounds can be used in pointers referencing a portion of an overall allocation. If the checks pass, then the memory access can proceed. Otherwise, a fault can be raised.

The decoded linear address 2130 is used to find the memory location of the encrypted data to be decrypted in Phase III. In addition, the decoded linear address 2130 and the encoded pointer 2110 can be used to create a data tweak 2144 for decrypting the encrypted data. As shown in Phase II of FIG. 21A, data tweak 2144 can include the tag/version portion 2102 of the encoded pointer 2110 and the linear address bits 2134 of the decoded linear address 2130. In addition, the S-bit 2101A may be included and replicated as needed, for example, to fill any remaining unused/non-canonical bits 2133. In addition, other context information may be included in data tweak 2144. For example, the crypto context ID register 2115 may be included in the tweak and/or any other variable length metadata 2136 may also be included in the tweak. Variable length metadata 2136 may include other context information or metadata (e.g., privilege level, location, ownership, type, permissions, memory allocation size, etc.) as previously described herein. It may be particularly advantageous for data tweak 2144 to include the memory allocation size and linear address bits 2134 combined with one or more of the following: (1) type; (2) tag/version; (3) type and tag/version; (4) crypto context ID; or (5) crypto context ID and permission level. Using the plaintext linear address bits 2134 in the IV/data tweak 2144 rather than encrypted pointer bits, e.g. EBA 2104, enables multiple pointers with different bounds, permissions, or other metadata to simultaneously reference the same allocation and to all correctly encrypt and decrypt data such that it can be accessed using any pointer in that group. Metadata that is not permitted to vary within groups of pointers that may be used simultaneously to access the same memory may be included in IV/data tweak 2144, since including metadata that is permitted to vary within that group may cause data to be incorrectly decrypted when accessed using some pointer in that group if it was previously encrypted using another pointer in that group with differing metadata that is included in IV/data tweak 2144.

In some embodiments, it may be advantageous to add a copy of the decrypted base address 2126 (or the decrypted base address slice 2124) as part of the data tweak 2144. To illustrate the advantages of this approach, consider sequential overlapping memory allocations where an object A is allocated and freed, and subsequently, an object B is allocated at an overlapping location. Even though the two allocations overlapped at separate times, but with different base addresses having the same tag/version, using a dangling pointer to the overlapping memory location will not enable correct decryption of even the overlapping parts of the object B since they have different base addresses.

The encrypted data obtained by the decoded linear address 2130, is decrypted in Phase III shown in FIG. 21B. The data decryption may commence once the data key 2142 becomes available and the IV/data tweak 2144 has been computed, which may require waiting for EBA 2104 to be decrypted. The encrypted data is decrypted by a decryption algorithm such as keystream generator 2150. In at least one embodiment, keystream generator 2150 can be implemented as an AES-CTR mode block cipher, at a particular size granularity (any suitable size). In this embodiment, the data tweak 2144 (or initialization vector) for the keystream generator 2150 is derived from the decoded linear address 2130 (e.g., linear address bits 2134, supervisor bit 2101A, remaining non-canonical bits 2133) and from the encoded pointer (e.g., tag bits of tag/version portion 2102). Data tweak 2144 may additionally include external context information (e.g., crypto context ID register 2115 and/or other variable length metadata 2136). Keystream generator 2150 encrypts the data tweak 2144 based on data key 2142 to generate a keystream 2151. The value of data tweak 2144 may be adjusted to be congruent to 0 (modulo the block size of the keystream generator 2150) prior to being used as an input to the keystream generator. The value of the data tweak 2144 may have some suitable number of least significant bits set to 0 to satisfy this requirement and a prefix of the keystream 2151 may be discarded to account for that adjustment. The number of bytes of the keystream 2151 to discard may be computed by subtracting the adjusted value of the data tweak 2144 from the unadjusted value of the data tweak 2144. If the memory to be encrypted crosses one or more block-aligned boundaries, the keystream generator 2150 may be re-invoked for the subsequent blocks with the data tweak 2144 being increased by an amount equal to the block size each time that it is re-invoked. A suffix of the generated keystream 2151 may be unneeded and thus discarded. An XOR operation 2152 is then performed on the keystream 2151 and an encrypted input data block (or cache line) 2146 selected from the memory location referenced by the decoded linear address. The granularity of the encrypted input data block 2146 matches the keystream 2151 output from the keystream generator 2150, and the XOR operation 2152 produces a decrypted output data block 2154.

Figure 22:
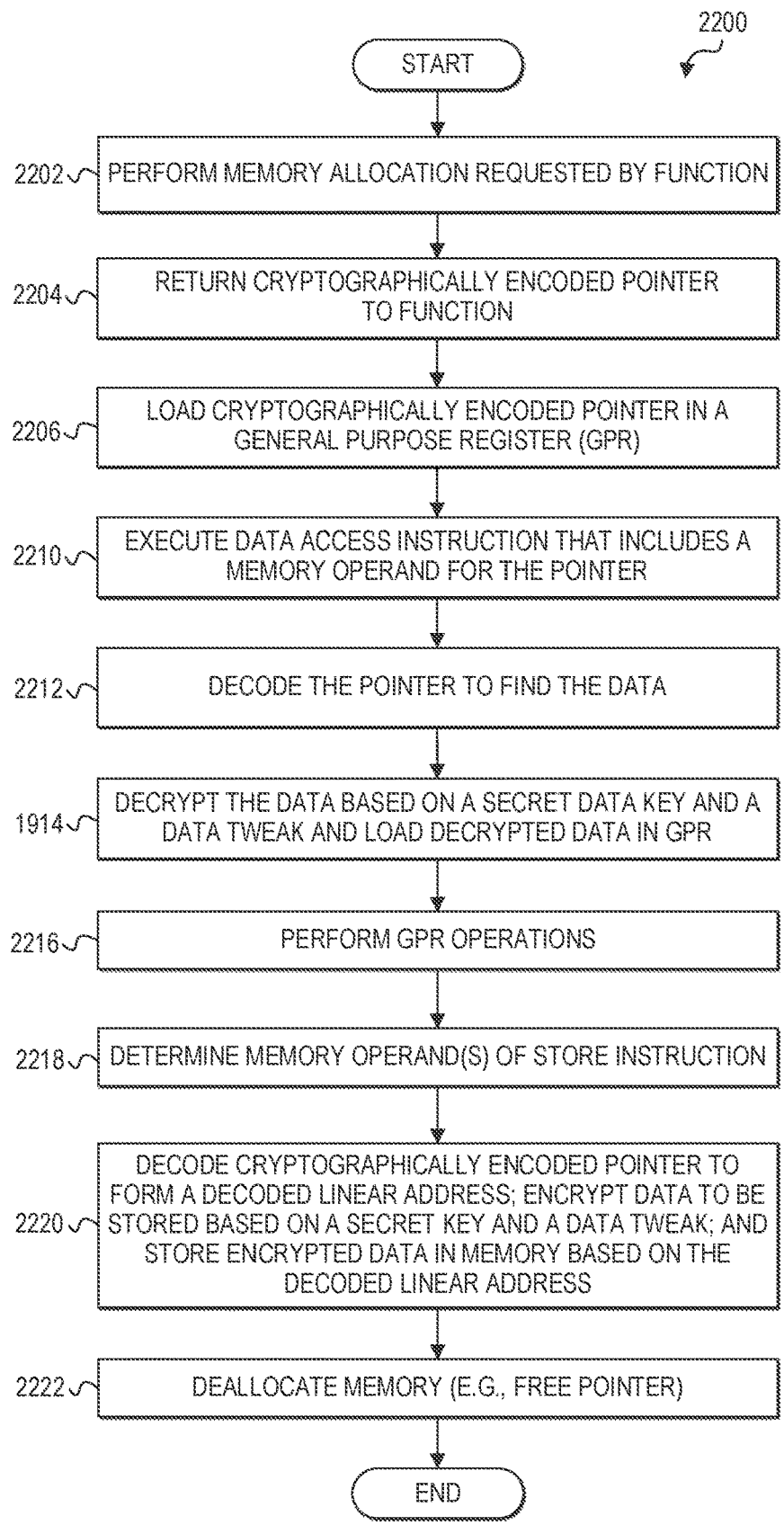
FIG. 22 is a flow diagram of an example process associated with a cryptographically encoded pointer bound to data encryption according to at least one embodiment.

FIG. 22 is a flow diagram of an example high-level process 2200 for creating and using a cryptographically encoded pointer with an encrypted base. At least some portions of process 2200 may be executed by hardware, firmware, and/or software of computing device 100. In the example shown in FIG. 22, at 2202, a processor performs a memory allocation requested by a function of a software program. For example, a malloc (memory allocation) instruction may be used in C programming language software to dynamically request memory for data (e.g., variable, buffer, array, etc.). The malloc instruction allocates memory on the heap and also allocates a pointer on the stack. In one or more embodiments, the memory allocation instruction, such as malloc, is configured to generate a cryptographically encoded pointer to the allocated memory. The cryptographically encoded pointer may have any suitable configuration that includes an encrypted base address (or a portion thereof), such as pointers 610 and 2110, or any other appropriate variation thereof. In particular, the cryptographically encoded pointer includes an encrypted slice of the linear base address to the allocated memory. In one possible variation, a larger register used for the pointer could store the entire encrypted base address. The cryptographically encoded pointer also includes additional metadata (e.g., tag, version, etc.), and potentially reserved bits. In at least some embodiments, the pointer includes an offset or mutable plaintext portion for the linear base address.

At 2204, the cryptographically encoded pointer is returned to the function. At 2206, the cryptographically encoded pointer may be loaded into a general purpose register (GPR). The software program can manipulate the pointer within the bounds of the data structure defined for the encoded pointer. For example, if the pointer is encoded in the same or similar configuration as pointers 610 or 2110, then the offset portion (e.g., 606, 2106) may be manipulated within the bounds defined by the memory allocation size metadata (e.g., 704), which may be stored in a memory operand such as a context information register (e.g., as part of context information 700), or in a table in memory such as pointer context table 121.

At 2210, a data access instruction, such as a load instruction, is executed by the software program and includes a memory operand for the pointer. The memory operand can be a register containing the pointer. The instruction may also include a memory operand in the form of another register or an immediate operand for the context information, and a memory operand in the form of a register to contain the destination or decoded linear address for the memory access.

At 2212, the pointer is decoded to obtain a linear address to be used to access the encrypted data. Decoding the pointer can be achieved by performing a decryption algorithm (e.g., block cipher such as XTS-AES, LRW, AES-CTR mode, etc.) to decrypt the encrypted address slice (e.g., EBA portion 604, 2104) based on a secret address key and an address tweak. The address tweak includes at least one metadata value associated with the pointer. For example, the metadata value can include one or more metadata items embedded in the pointer (e.g., tag/version portion 602, 2102, other context information, etc.), one or more external context information items (e.g., metadata stored in a context information register, stored in a table to be accessed dynamically, or passed as an immediate operand in an instruction), and/or a crypto context identifier register. To form the decoded linear address, first, the decrypted base address is generated by concatenating the decrypted address slice with another slice of the linear base address, which are the upper address bits (e.g., 702, 2111). An offset in the pointer is added to the decrypted base address to compute the actual linear address and additional upper bits may be padded or set to a particular value depending on the pointer encoding and address register size (e.g. replication of most significant bit 2101A, etc.).

Incorporating a pointer's tag portion of randomized bits into data encryption/decryption is a way of versioning memory and can prevent certain malware attacks. For example, since the tag bits are incorporated into the data encryption, a use-after-free attack (i.e., accessing a dangling pointer after the underlying object has already been freed and potentially even reallocated to a different object) and out-of-bounds accesses can be mitigated. Both scenarios have a high probability of causing an integrity check violation if integrity checking is enabled. If integrity checking is not enabled, a use-after-free attack or out of bound access should result in data corruption, which may still be sufficient to protect data confidentiality.

A tag/version portion having a unique value used in data encryption/decryption can also mitigate uninitialized use vulnerabilities. An uninitialized use occurs when data is read from a buffer that was allocated but not filled with initial values. An uninitialized use can be detected by delaying a write-for-ownership of an object until the object is initialized. Write-for-ownership refers to issuing a write to memory without first reading from that region of memory, as is customary for memory writes. Software can be adapted to use write-for-ownership when initializing an object to avoid an integrity check violation that would otherwise occur if a region of memory is read using a tag/version value embedded in the pointer that differs from whatever tag/version value was previously used to write the current value in memory.

Software can further be adapted to detect an attempted access of a dangling pointer (e.g., use-after-free) or uninitialized object. If integrity checking is enabled, then the memory allocator (e.g., malloc instruction, free instruction) can be adapted to inject zeroed ciphertext into the newly allocated (e.g., malloc instruction) memory regions or freed (e.g., free instruction) memory regions. This can cause an integrity fault to be generated when a dangling pointer or uninitialized object is accessed.

At 1914, after accessing the encrypted data by using the decoded linear address, decrypted data can be obtained by performing a decryption algorithm (e.g., block cipher such as XTS-AES, LRW, AES-CTR mode, etc.) to decrypt the data based on a secret data key and a data tweak. The data tweak value is derived, at least in part, from the cryptographically encoded pointer. For example, the actual linear address (which includes the pointer offset) may be used in the data tweak. The data tweak may also include other portions of the cryptographically encoded pointer, such as a tag/version portion 612 or 2112 or even the entire contents of the cryptographically encoded pointer. In some cases, it may be desirable to add the encrypted slice of the EBA portion 604 or 2104. In further embodiments, the data tweak may include one or more items of context information (e.g., metadata stored in a context information register, stored in a table to be accessed dynamically, or passed as an immediate operand in an instruction), and/or a crypto context identifier register. Also at 1914, the decrypted data may be loaded in a general purpose register (GPR).

If the program decodes the pointer correctly, then the data can be decrypted correctly. However, if the pointer is incorrectly decoded to an incorrect linear address, then a page fault may occur. Even if a page fault does not occur, the incorrect linear address is likely to access random memory and would attempt to decrypt data from the random memory using an invalid data tweak. Thus, two levels of protection are provided in one or more embodiments.

At 2216, operations may be performed on the data in the GPR. Generally, the decrypted data may be manipulated according to the software program. At 2218, a memory operand or operands of a store instruction are determined. For example, the encoded pointer may be provided as an operand of the store instruction.

At 2220, the cryptographically encoded pointer is decoded to form a decoded linear address as previously described herein. The data to be stored is encrypted by performing an encryption algorithm (e.g., block cipher such as XTS-AES, LRW, AES-CTR mode, etc.) to encrypt the data in the GPR based on the secret data key and the data tweak, as previously described. The data tweak is derived, at least in part, from the cryptographically encoded pointer (e.g., tag/version portion 602 or 2102). The data encryption is performed on the current data in the GPR to reverse the previous decryption process. If the current data in the GPR has been modified, then the newly encrypted data will be different than the encrypted data that was previously retrieved from memory at 2212. Once the data is encrypted, it may be stored in memory based on the decoded linear address.

At 2222, the memory may be deallocated and therefore, the cryptographically encoded pointer is freed.

Other Encoded Pointer Formats

Like cryptographically encoded pointers in an EBA format, other embodiments of encoded pointers (both cryptographically encoded and non-cryptographically encoded) may be used to reference data and/or code and to bind the referenced data and/or code to the pointer. Two possible alternative embodiments of encoded pointers will now be described.

Figure 23:
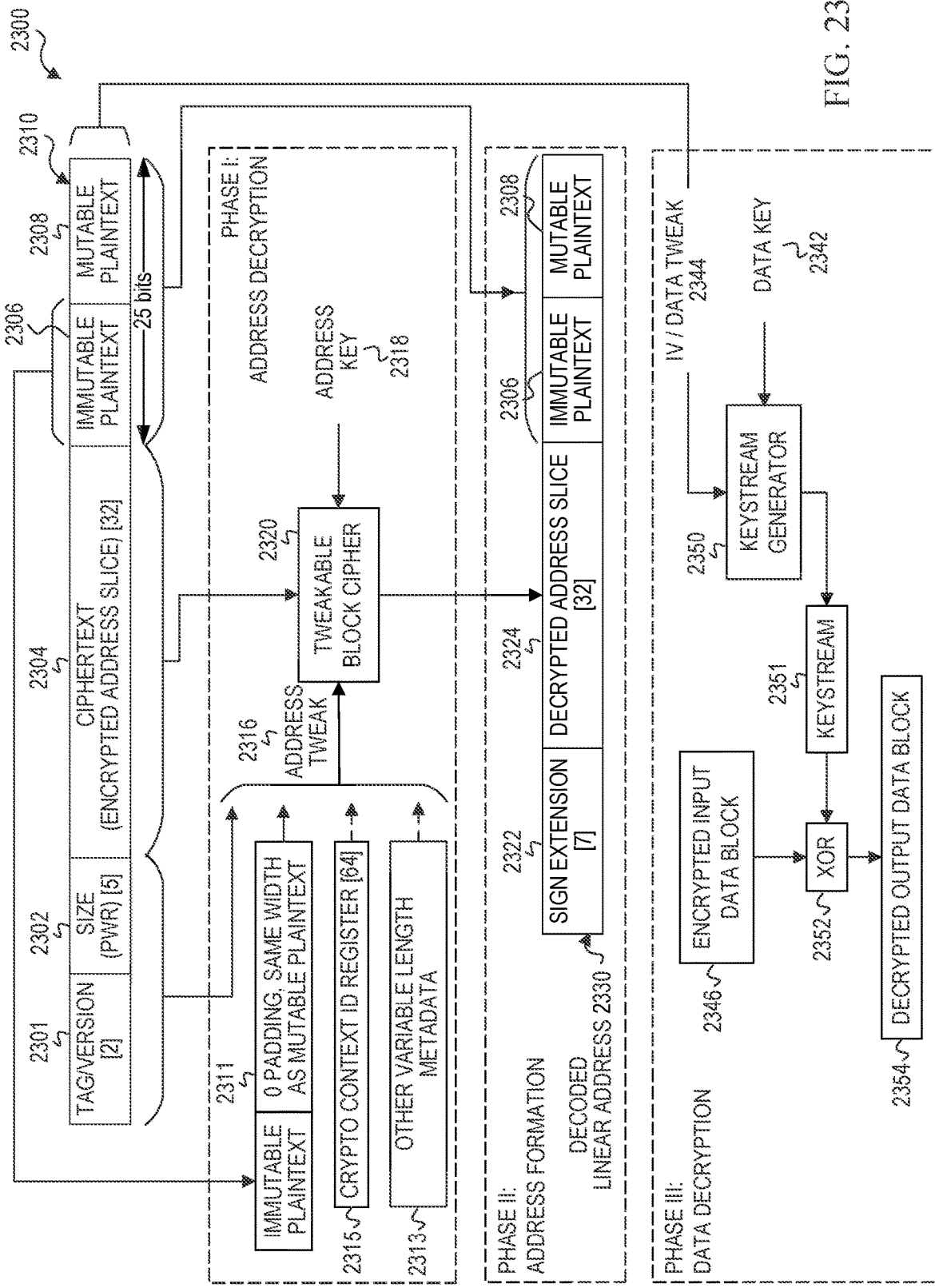
FIG. 23 is flow diagram illustrating an example process of binding another embodiment of a cryptographically encoded pointer to the encryption of data referenced by that pointer according to at least one embodiment.

FIG. 23 is a detailed flow diagram illustrating an example process 2300 of obtaining data referenced by another embodiment of a pointer 2310, which is cryptographically encoded with a linear address for data, where encryption of the data is bound to the contents of the pointer according to at least one embodiment. At least some portions of process 2300 may be executed by hardware, firmware, and/or software of the computing device 100. In the example shown, pointer 2310 is embodied as a cryptographically encoded 64-bit pointer in its base format, using exponent (power) metadata but not an offset. In the example shown, the encoded pointer includes context information such as a tag/version portion (e.g., 2 bits in the example shown) and a size (power) metadata portion 2302 (e.g., 5 bits in the example shown). The encoded pointer also includes a variable-bit immutable plaintext portion 2306 and a variable-bit mutable plaintext portion 2308. In the example shown, each of the immutable plaintext portion 2306 and the mutable plaintext portion 2308 may contain 0-25 bits, with the total number of bits contained in the combined portions 2306 and 2308 equaling 25 bits.

In at least one embodiment, the size (power) portion 2302 indicates a size of the mutable plaintext portion 2308, which are a number of low order address bits that may be manipulated freely by software for pointer arithmetic. In some embodiments, the size/power portion 2302 may include power (exponent) metadata bits that indicate a size based on a power of 2. The size/power metadata portion 2302 can also be used to determine the number of bits that compose the immutable plaintext portion 2306. In certain embodiments, the total number of bits that make up the immutable plaintext portion 2306 and the mutable plaintext portion 2308 may be constant, with the sizes of the respective portions being dictated by the size/power metadata portion 2302. For example, if the size/power metadata value is 0, there are no mutable plaintext bits and all 25 remaining address bits compose the immutable plaintext portion 2306. To further illustrate encoding of the size/power metadata in the example shown, if the size/power metadata value is 1, then there is one bit of mutable plaintext and 24 bits of immutable plaintext, if the power metadata value is 2, then there are 2 bits of mutable plaintext and 23 bits of immutable plaintext. Up to 25 bits of mutable plaintext may be indicated by the size/power metadata 2302, resulting in no immutable plaintext bits (2306). The mutable plaintext portion 2308 may be manipulated by software, e.g. for pointer arithmetic or other operations.

The immutable plaintext portion 2306 can be used as a tweak to generate ciphertext portion 2304 from an address slice (i.e., a subset of linear address bits of the linear address), where the ciphertext portion 2304 is adjacent to and more significant than the immutable plaintext portion 2306. The ciphertext portion 2304 (e.g., 32 bits in the example shown) of the pointer 2310 may be encrypted with a small tweakable block cipher (e.g., a SIMON, SPECK, or tweakable K-cipher at a 32-bit block size, or other variable bit size tweakable block cipher). The remaining address bits compose immutable plaintext portion 2306 and are used as part of the tweak for the tweakable block cipher used to encrypt the ciphertext portion 2304. While these bits are also a plaintext (non-encrypted) portion of the address, they cannot be modified by software (e.g. pointer arithmetic) like the bits of mutable plaintext portion 2308 without causing the ciphertext portion 2304 to decrypt incorrectly. The base pointer format of pointer 2310 allows for cryptographically describing object sizes and their location in memory. In some cases, the exponent/power/size metadata portion 2302 could be provided as a separate parameter in addition to the pointer; however, in some cases (e.g., as shown) the bits of the size/power metadata portion 2302 may be integrated with the pointer 2310 to provide legacy compatibility in certain cases.

The tag/version portion 2301 of pointer 2310 may be a random or deterministically different value. In other embodiments, the tag/version portion 2301 may be omitted and additional bits may be added to the plaintext portion 2306 and 2308 (e.g., 27 total bits) or to any other portion of pointer 2310. In yet other embodiments, the two upper bits may be reserved bits that allow cryptographically encoded pointers to be used concurrently with legacy pointers. For example, the most significant bit can be used to indicate whether the address is located within the supervisor address space (e.g., "1") or within the user mode address space (e.g., "0"). The next most significant bit can be set to the opposite value of the supervisor bit to indicate that the pointer is cryptographically encoded or can be set to the same value of the supervisor bit to indicate that the pointer is not cryptographically encoded. In other embodiments, the legacy encoding may be achieved without dedicated reserved bits. Instead, legacy encoding can be achieved by encoding particular values in the size/power metadata portion 2302 (e.g., all 1s, all 0s). If the pointer 2310 includes the tag/version portion 2301, then these bits may also be encoded with the particular values (e.g., all 1s, all 0s) to allow legacy and conventional encoding to be used concurrently. In yet other embodiments, legacy encoding may be eliminated entirely if, for example, the concepts are not implemented to be compatible with legacy programs.

It should be noted that the size/power metadata portion 2302 may not be encrypted as it is used to determine the number of bits in the mutable and immutable plaintext portions of the pointer and, therefore, the number of bits used in the address tweak (e.g., immutable plaintext portion 2306). The tag/version portion 2301, however, is not used to determine the size of the address tweak. Therefore, the tag/version portion 2301 may alternatively be included as part of the encrypted portion of the address (i.e., ciphertext 2304) as long as the tag/version portion 2301 is not used in the address tweak. In this alternative embodiment, the block cipher would have a correspondingly larger block size to fit the tag/version portion, or the address bits included in the ciphertext would be reduced and a corresponding number of address bits would be included in the plaintext portion (i.e., 2306 and 2308). Additionally, it should be noted that, although the process 2300 is illustrated with the encoding shown in pointer 2310, which includes a tag/version (or reserved bits) portion 2301, process 2300 could be performed with other pointer encodings having a size/power metadata portion that do not include a tag/version (or reserved bits) portion. In this scenario, the tag/version (or reserved bits) portion may simply be eliminated from the address tweak.

The operations of process 2300 are identified in three phases: address decryption (Phase I), address formation (Phase II), and data decryption (Phase III). In Phase I, the linear address embedded in pointer 2310 is decrypted. Specifically, ciphertext portion 2304 of the encoded linear address is decrypted by a decryption algorithm such as a tweakable block cipher 2320 using an address key 2318 and an address tweak 2316. The address tweak 2316 can include context information encoded in the pointer such as tag/version portion 2301 and size/power metadata portion 2302. The address tweak 2316 can also include immutable plaintext portion 2306, in addition to zeros padding 2311. The size/power metadata portion 2302 is used to determine the number of bits in immutable plaintext portion 2306 and the number of bits in mutable plaintext portion 2308, which equals the number of bits for padding 2311 in the address tweak 2316. In at least some embodiments, an additional one or more items of variable length metadata 2313 may also be used as part of address tweak 2316 for the tweakable block cipher 2320. For example, the variable length metadata 2313 may include other context information or metadata (e.g., permissions, privilege level, type, location, ownership, etc.) as previously described herein. In yet further embodiments, a crypto context identifier register 2315 may be used as part of address tweak 2316. The crypto context identifier register 2315 may contain a unique value (e.g., randomly or deterministically generated) associated with a particular functional group (e.g., processes, subset of processes, virtual machines (VM), subset of VMs, etc.). The block cipher 2320 may be any suitable decryption algorithm (e.g., tweakable version of a 32 bit block size cipher such as SIMON, SPECK, K-cipher, or other variable block size cipher, or for larger addresses, PRINCE, XTS-AES block cipher, LRW, AES-CTR mode, etc. may be used) as noted herein.

When the ciphertext 2304 portion of the encoded linear address has been decrypted into a decrypted address slice 2324 by tweakable block cipher 2320, then a decoded linear address 2330 can be formed in Phase II. If the tag/version portion 2301 was included as part of the encrypted portion of the address (i.e., ciphertext 2304), then the tag/version portion in the decrypted base address slice 2324 should be overwritten with sign extension bits 2322 when forming the decoded linear address 2330. In at least one embodiment, the uppermost bits (e.g., tag/version portion 2301 and size/power portion 2302) can be set to the same bit value (e.g., 0 or 1). In addition, the bits of the immutable plaintext portion 2306 and mutable plaintext portion 2308 make up the lower bits of the decoded linear address 2330. In some embodiments, the processor may check whether a slice of the upper bits in decrypted address slice 2324 has an expected value as an indication of whether the decrypted address slice 2324 was decrypted incorrectly. For example, in some paging modes, some number of upper address bits are required to all have the same value (i.e. all 0's or all 1's). If the corresponding bits in the decrypted address slice 2324 have differing values, then that indicates that decrypted address slice 2324 was decrypted incorrectly. Some embodiments may generate a fault in that case. Some other embodiments may rely on existing canonicality checks to generate a fault in that case when the decoded linear address 2330 is used. Even if the upper bits do all have the same value, that may not conclusively indicate that decrypted address slice 2324 was decrypted correctly. Some embodiments may perform the aforementioned checks for expected bit values for both the minimum and maximum addresses to be accessed in the current operation so that a fault will likely be generated if any portion of the access is out-of-bounds. Other embodiments may only require that a particular portion of the access, e.g. the first byte, be within the bounds of the pointer, and thus only perform the aforementioned checks for expected bit values on the pointer for that portion of the access. Other embodiments may check both the minimum and maximum addresses for write operations but only check a single pointer value for reads, relying on data cryptography to likely prevent partially out-of-bounds reads from returning correct plaintext.

The decoded linear address 2330 is used to find the memory location of the encrypted data to be decrypted in Phase III. The encrypted data is decrypted by a decryption algorithm such as keystream generator 2350. In at least one embodiment, keystream generator 2350 can be implemented as an AES-CTR mode block cipher, at a particular size granularity (any suitable size). In this embodiment, the contents of the cryptographically encoded pointer are used as the initialization vector (IV) or data tweak 2344, with the plaintext offset (e.g., 2308) being used as the counter value (CTR). Generation of keystream 2351 may commence without waiting for encrypted address slice 2304 to complete. Keystream generator 2350 encrypts data tweak 2344 based on a data key 2342 to generate a keystream 2351. The value of data tweak 2344 may be adjusted to be congruent to 0 (modulo the block size of the keystream generator 2350) prior to being used as an input to the keystream generator. The value of the data tweak 2344 may have some suitable number of least significant bits set to 0 to satisfy this requirement and a prefix of the keystream 2351 may be discarded to account for that adjustment. The number of bytes of the keystream 2351 to discard may be computed by subtracting the adjusted value of the data tweak 2344 from the unadjusted value of the data tweak 2344. This adjustment may modify the values of immutable plaintext 2306 in pointers to objects smaller than the block size. However, the data encryption may be indirectly bound to the values of the modified immutable bits, since those bits may be incorporated in the tweak used to generate ciphertext 2304. If the memory to be encrypted crosses one or more block-aligned boundaries, the keystream generator 2350 may be re-invoked for the subsequent blocks with the data tweak 2344 being increased by an amount equal to the block size each time that it is re-invoked. A suffix of the generated keystream 2351 may be unneeded and thus discarded. An XOR operation 2352 is then performed on keystream 2351 and an encrypted input data block (or cache line) 2346 selected from the memory location referenced by the decoded linear address 2330. The granularity of the encrypted input data block 2346 matches the keystream 2351 output from of the keystream generator 2350, and the XOR operation 2352 produces a decrypted output data block 2354. Likewise, when storing data back to cache/memory the same operations may be performed, where the plaintext data from a processor register may be XORed with the keystream output 2351 for the encoded address (which is the data tweak 2344) and the resulting encrypted data written back to memory.

Figure 24:
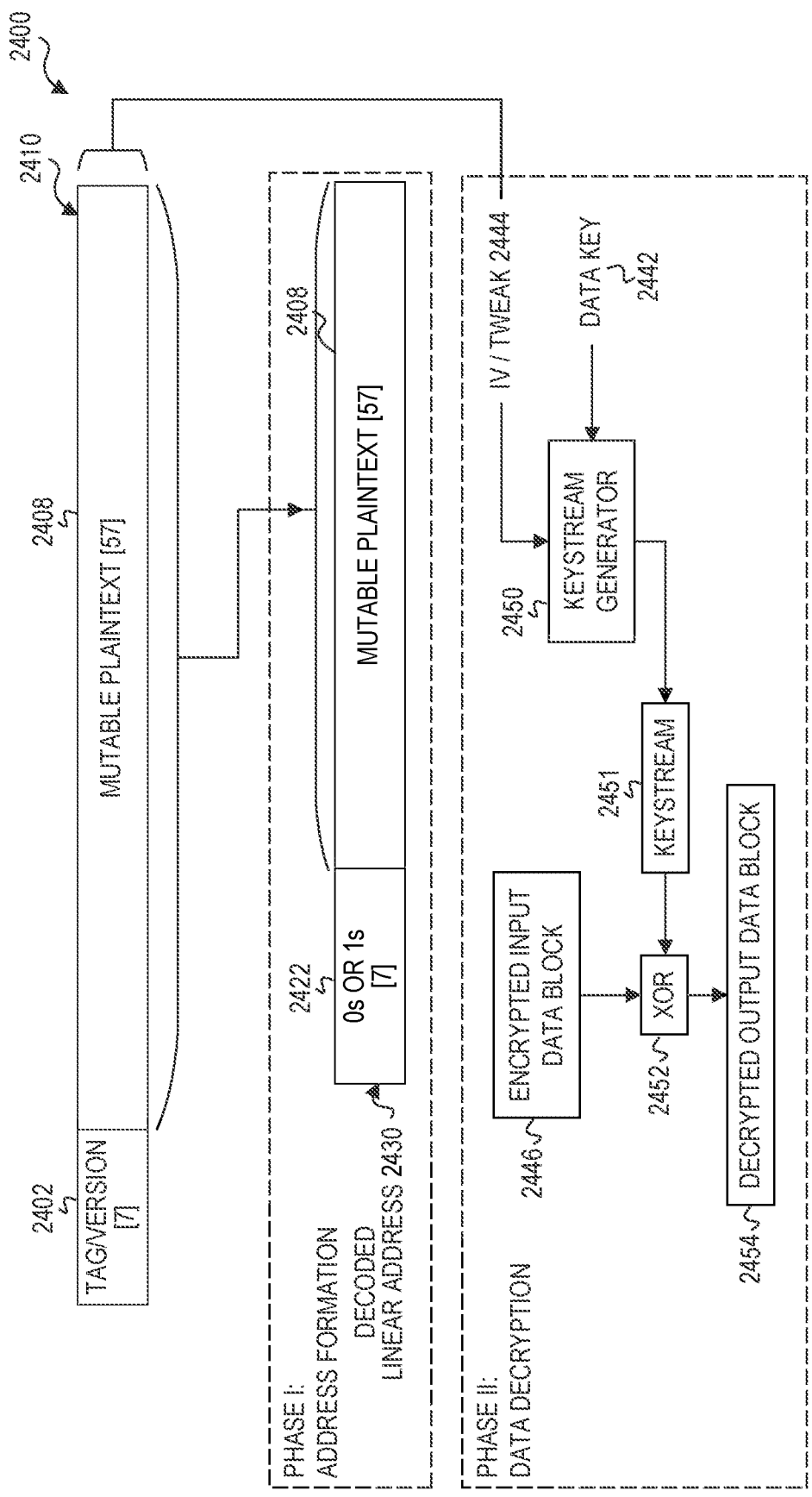
FIG. 24 is flow diagram illustrating an example process of binding yet another embodiment of an encoded pointer to the encryption of data referenced by that pointer according to at least one embodiment.

FIG. 24 is a detailed flow diagram illustrating an example process 2400 of obtaining data referenced by another embodiment of a pointer 2410, which is encoded with a linear address for data, where encryption of the data is bound to the contents of the pointer. At least some portions of process 2400 may be executed by hardware, firmware, and/or software of the computing device 100. In the example shown, pointer 2410 is embodied as a 64-bit encoded linear address including a 7-bit tag/version portion 2402 and a 57-bit mutable plaintext address portion 2408. Tag/version portion 2402 can comprise temporal safety bits, which are randomly generated each time a pointer is encoded for a requested memory allocation. Alternatively, tag/version portion 2402 can comprise a version number or any deterministically unique value for a requested memory allocation. For example, a tag/version portion 2402 may be a sequentially incremented number that is generated each time a pointer is encoded for a requested memory allocation. Although either approach may be used, in this embodiment in which none of the address bits are encrypted, a tag with randomly generated bits may provide greater protection against an attack as randomly generated bits are more difficult to determine than deterministically different values such as sequentially incremented numbers. For other embodiments disclosed herein, in which a portion of the address is encrypted, a version may be more desirable as the encryption provides protection against an attack, and the version number uses less resources to generate.

It should be noted that the tag/version portion 2402 and address portion 2408 may be configured with different numbers of bits (e.g., 5-bit tag/version portion and 59-bit address portion 2408, etc.). In other embodiments, additional bits may be encoded to allow encoded pointer 2410 to be used concurrently with legacy pointers. For example, encoded pointer could be allocated with a 2-bit reserved portion, 5-bit tag/version portion, and 57-bit plaintext address portion. In this embodiment, the 2-bit reserved portion can be designated as a supervisor bit and an encoded bit indicator. The supervisor bit can indicate whether the address is located within the supervisor address space (e.g., "1") or within the user mode address space (e.g., "0"). The encoded bit indicator can be set to the opposite value of the supervisor bit to indicate that the pointer is encoded (e.g., with tag/version bits) or can be set to the same value of the supervisor bit to indicate that the pointer is not encoded. In other embodiments, the legacy encoding may be achieved without dedicated bits. Instead, legacy encoding can be achieved by encoding particular values in the tag/version portion 2402 (e.g., all 1s, all 0s). In yet other embodiments, legacy encoding may be eliminated entirely if, for example, the concepts are not implemented to be compatible with legacy programs.

The operations of process 2400 are identified in two phases: address formation (Phase I), and data decryption (Phase II). Process 2400 does not include an address decryption phase because the encoded linear address is not encrypted. Instead, the linear address is encoded in mutable plaintext address portion 2408.

In Phase I, a decoded linear address 2430 can be formed from the encoded pointer 2410. In at least one embodiment, the uppermost bits 2422 (tag/version portion 2402) that are not part of the linear address can be set to the same bit value (e.g., 0 or 1). The bits of the mutable plaintext address portion 2408 make up the lower bits of the decoded linear address 2430.

The decoded linear address 2430 is used to find the memory location of the encrypted data to be decrypted in Phase II. The encrypted data is decrypted by a decryption algorithm such as keystream generator 2450. In at least one embodiment, keystream generator 2450 can be implemented as an AES-CTR mode block cipher, at a particular size granularity (any suitable size). In this embodiment, the contents of the encoded pointer are used as the initialization vector (IV) or data tweak 2444. In particular, the randomly generated bits of tag/version portion 2402 concatenated with the bits of plaintext address portion 2408 form the data tweak (or IV) for decrypting the encrypted data. Keystream generator 2450 encrypts data tweak 2444 based on a data key 2442 to generate a keystream 2451. An XOR operation 2452 is then performed on keystream 2451 and an encrypted input data block (or cache line) 2446 selected from the memory location referenced by the decoded linear address 2430. The granularity of the encrypted input data block 2446 matches the keystream 2451 output from of the keystream generator 2450, and the XOR operation 2452 produces a decrypted output data block 2454. Additionally, in some embodiments, other context information could also be used in the data tweak 2444 including, for example, memory allocation size, type, permissions, privilege level, location, ownership, crypto context ID register, or any combination thereof.

Incorporating a pointer's tag/version portion into data encryption/decryption can be used as a way of versioning memory and can prevent certain malware attacks, even if the linear address is embedded in the pointer entirely as plaintext (i.e., with no encrypted slices). For example, since the tag/version bits are incorporated into the data encryption, a use-after-free attack (i.e., accessing a dangling pointer after the underlying object has already been freed and potentially even reallocated to a different object) and out-of-bounds accesses can be mitigated. Both scenarios have a high probability of causing an integrity check violation if integrity checking is enabled. If integrity checking is not enabled, a use-after-free attack or out of bound access should result in data corruption, which may still be sufficient to protect data confidentiality.

A tag/version portion used in data encryption/decryption can also mitigate uninitialized use vulnerabilities. An uninitialized use occurs when data is read from a buffer that was allocated but not filled with initial values. An uninitialized use can be detected by delaying a write-for-ownership of an object until the object is initialized. Write-for-ownership refers to issuing a write to memory without first reading from that region of memory, as is customary for memory writes. Software can be adapted to use write-for-ownership when initializing an object to avoid an integrity check violation that would otherwise occur if a region of memory is read using a tag/version value embedded in the pointer that differs from whatever tag/version value was previously used to write the current value in memory.

Software can further be adapted to detect an attempted access of a dangling pointer (e.g., use-after-free) or uninitialized object. If integrity checking is enabled, then the memory allocator (e.g., malloc instruction, free instruction) can be adapted to inject zeroed ciphertext into the newly allocated (e.g., malloc instruction) memory regions or freed (e.g., free instruction) memory regions. This can cause an integrity fault to be generated when a dangling pointer or uninitialized object is accessed.

Restricting Code Accesses

As noted previously herein, encoded pointers, such as cryptographically encoded pointers in EBA format as described herein for accessing data, can also be adapted to control code fetches. This includes cryptographically encoded pointers with tag/version portions (e.g., 610, 2110) as well as non-cryptographically encoded pointers with tag/version portions. Moreover, other encoded pointer formats may also be used to control code fetches if a tag/version portion is added, for example, by increasing address register size, by reducing the number of address bits embedded in the pointer, and/or reducing the number of other metadata bits embedded in the encoded pointer).

Typically, code fetches are performed automatically by a processor based on the contents of an instruction pointer register, such as RIP, which is a 64-bit instruction pointer register. In an embodiment for controlling code fetches, tag/version bits are included in an instruction pointer register, such as RIP (e.g., 64-bit register), to bind encryption of the code region to that RIP. Any of the various pointers disclosed herein, including for example pointers with a tag/version portion (e.g., 610, 2110, 2310, 2410) and pointers without a tag/version portion (e.g., EBA pointer 610 and 2110 without a tag/version portion, pointer 2310 without a tag/version portion), may be stored in an RIP to fetch code regions and bind data encryption of a code region to the pointer that references that code region. For pointer formats that include other metadata (e.g., size bits indicating a number of mutable and immutable plaintext bits in the pointer), then that metadata may also be included in the RIP. In one or more embodiments, context information (e.g., upper address bits, memory allocation size metadata, permission metadata and type metadata for EBA pointers), for use during a code fetch can be stored in a dedicated register alongside the RIP register. Indirect branch instructions can specify updated context information, for example, in an immediate operand. When a jump in code occurs between functions (e.g., when one function calls another function), then the particular branch instruction may specify a new context value to put into the dedicated register so that the fetch in the new function will succeed. Thus, some possible extended branch instructions will be further described herein with reference to multi-tenancy architectures. When performing a function call, the contents of the RIP-associated context register may also be pushed onto the stack alongside RIP so that it can be restored to the RIP-associated context register during the corresponding return.

For pointer formats that do not include context information in the encryption and decryption operations, the contents of the RIP register can be used to encrypt/decrypt code regions. For EBA-format pointers and other pointers that use context information, the RIP register, the dedicated register, and the immediate operand (in some scenarios) can be used to encrypt/decrypt code regions. This encryption/decryption of code regions helps limit the code that can be executed by a program by preventing branch target injection. Branch target injection can be used in ROP and JOP attacks where an adversary jumps between snippets of code to perform a sequence of operations that is not intended to be executed by the code. Code pointers that are formatted according to an embodiment disclosed herein force a potential adversary to guess or obtain tag bit values. Tag bits can be randomized into an unpredictable value for each code region each time a program is loaded to harden the code encryption protections. Using an encrypted base address pointer (e.g., 610, 2110) with tagged data encryption layered beneath the EBA embodiment can further harden the code encryption protections by forcing a potential adversary to guess or obtain both a valid encrypted base address slice for the targeted code region as well as a valid tag for the region.

An EBA format pointer with memory allocation size context information can indicate the bounds within which a particular part of a program (e.g., a function) can execute. The dedicated register holding context information is used implicitly by the processor when performing code accesses. When a branch or call instruction is executed, a new extended branch/call instruction is used to specify updated context information (e.g., in an immediate operand of the instruction) for the dedicated register so that the access in the new function can succeed.

Forward code pointer protections to enforce that all indirect branches use legitimate targets can be probabilistically checked through load-time generation and fix-ups of pointers in an EBA format and in other pointer formats containing a tag portion, or runtime generation of the same. This can be applied to functions and other indirect branch targets (e.g., switch statements in C programming language).

Encoded pointers can also be used to secure imported functions. An imported function is a library file that is dynamically pulled into a program's address space as needed. Thus, the function may be pulled into different locations in different programs. In addition, the key used to encrypt/decrypt the pointers also changes. Thus, the pointer value may need to change as it gets loaded into different programs. Typically, most binary structures have a section that includes information regarding the addresses of imported functions. This section is referred to herein as a global function table. One example of a global function table is a procedure linkage table (PLT) for an executable and linking format (ELF) file. Any references to imported functions themselves within the binary are represented as an offset (e.g., in a global offset table (GOT)) from the start of the global function table. For an embodiment using a pointer format with a tag portion, but no context information, at load-time the actual addresses in the global function table can be replaced by the pointer by generation and inclusion of newly generated tag bits. For an embodiment using a pointer format with a tag portion and also context information (e.g., EBA-format pointers 610, 2110), at load-time the actual addresses in the global function table can be replaced by the EBA pointer by generation and inclusion of newly generated tag bits, with the EBA pointer being bound to context information indicating the size of the destination code region (e.g., function, basic blocks free of control flow transfer, or compilation unit).

For ordinary pointers (e.g., not referencing imported functions), metadata associated with executable code (e.g., ELF file) is stored in the executable file. The metadata indicates the location of the code pointers in the executable file and the objects they reference. The code pointers in the executable file are to be updated once executable file is loaded. As the executable file is being loaded, a software component (e.g., loader) can go through the list of code pointers and encode them according to their particular encoding format (e.g., encrypted slice such as EBA, non-encrypted address bits, etc.).

Corresponding code regions (e.g., functions, basic blocks free of control flow transfers, or compilation units) can then be encrypted accordingly. Functions can contain one or more basic blocks, which may have a single entry point and exit point. Generally, basic blocks that are connected with direct branching (e.g., number of bytes to jump is embedded in code rather than a register) can have the same context information. Indirect branches that transfer between basic blocks (e.g., switch statements in C programming language), however, are likely to use different context information. Compilation units are files that may have included files. Thus, regions of code can be defined at different granularities based on particular implementations and needs.

Finer-grained policies can potentially mitigate more vulnerabilities. However, such policies could increase code size if using a block cipher based code encryption scheme that requires code encrypted with distinct tags to be aligned to block boundaries. Alternatively, fine-grain protections that do not increase code size can be achieved by using a stream-cipher based encryption scheme (e.g., AES-CTR mode).

Similar pointer tagging operations can be performed to update code pointers embedded in global variables, indirect branch targets pointing to functions or other code that are not invoked via a global function table, or code pointers in non-position-independent programs.

As described above, controlling what data a program can access can be achieved by controlling which encoded pointers each program can access. Access can be provided, for example, by passing pointers as parameters or providing pointers as global variables. Cryptographically encoded pointers such as EBA pointers, however, can also be used to restrict which segments of code can access particular data. In at least one embodiment, this can be achieved by binding a hash of the code segment into the context information used to encrypt the pointer.

First, a hash of each code segment can be computed when entering it with an indirect call or return (since an EBA pointer 610 or 2110, or a pointer encoded with size/power metadata 2310, specifies the bounds of the code segment) and used to initialize a CURRFUNCID (Current Function ID) register with a hash identifying the current function. The sequence of CURRFUNCID values for the current stack of function invocations can also be accumulated into a CURRCFID (Current Control Flow ID) register representing the current control flow. A reversible accumulation algorithm (e.g. XOR) can be used so that the corresponding return (e.g., RET) can automatically revert to the previous hash value in CURRCFID without needing to store it. For example, this may be accomplished for indirect calls by computing CURRCFID=CURRCFID XOR CURRFUNCID after CURRFUNCID has been updated to represent the callee, and for corresponding returns by computing CURRCFID=CURRCFID XOR CURRFUNCID while CURRFUNCID still represents the callee that is returning. CURRCFID may be initialized to a constant value at the beginning of a defined unit of software, e.g. initialized to zero when a thread starts within a program. Returns from function activations that were invoked using direct calls may not need to revert the hash value in CURRCFID. To detect whether a return corresponds to a previous indirect call, an indicator may be encoded into the return address, e.g. as a bit setting. Alternatively, to conserve pointer bits, an indication could be pushed onto the stack alongside the return address, e.g. as part of the context value associated with RIP, automatically by the call instruction or manually by software and checked automatically by the return instruction or manually by software. In the latter return case, software could select between multiple variants of return instructions depending on whether CURRCFID needs to be updated. The CURRFUNCID register value can also be copied into a PREVFUNCID (Previous Function ID) register upon an indirect call. Correspondingly, the CURRCFID register value can also be copied into a PREVCFID (Previous Control Flow ID) register upon an indirect call. Computing the hash of a code segment may be slow, so alternative embodiments may substitute the encrypted slice of the pointer passed to an indirect call or return or an entire pointer to the base of the code segment containing the destination function for the hash of the code segment. The base address of a code segment can be computed from both the destination address in an indirect call as well as a return address, so it can support updating the CURRFUNCID and CURRCFID registers after both calls and returns.

In addition, instructions are to be used after an END-BRANCH instruction (or other similar designated instruction) to check that a certain control flow has been used to reach that point. One instruction can perform a direct branch if the check succeeds (e.g., jump control-flow integrity instruction (JCFI)), and another instruction can generate a fault if the check fails (e.g., control-flow integrity check (CFIC)). A sequence of JCFIs branching to a point just after the CFIC could be followed by a single CFIC to support encoding an arbitrarily-large set of authorized control flows. The operand for each of the instructions can specify a hash value representing an authorized control flow that is compared against the value in the PREVFUNCID register or the PREVCFID register. An operand may be used to select which of those registers is used in the comparison, or different instruction variants or prefixes may be defined to select between those registers.

A control-flow integrity (CFI) authentication hash could also be included in a data tweak for some code or data encryption to restrict which functions along which control flow paths can access the code or data. For example, some combination of the address tweak and code tweak or data tweak could be bound to the identity of the current code segment (e.g. using the CURRFUNCID value) or the relevant sequence of function calls (e.g. using the CURRCFID value). An indicator that a code segment or data object is bound to a CFI authentication hash stored in a particular register may be encoded into the pointer referring to that code segment or data object, into the associated context, or into an instruction that leads to a memory access. The EncryptBaseAddr instruction may be extended to specify the authorized hash and its meaning (e.g. corresponding to CURRFUNCID or CURRCFID) as one or more additional operands. The SpecializePtr instruction may propagate the restriction from the old pointer to the new pointer if it is embedded in the pointer. To initialize memory that is only accessible from a particular function (e.g. as identified in CURRFUNCID) or at a particular point in a control flow (e.g. as identified in CURRCFID), a WRCFMEM (Write Control Flow Memory) instruction may be defined that accepts an operand specifying an override value for the relevant register, e.g. CURRFUNCID or CURRCFID, a pointer to the destination memory location, and a code or data value to be written. WRCFMEM may then encrypt the data as though the relevant register has been overridden using the specified value prior to writing it to memory.

In other embodiments, the context information for cryptographically encoded pointers in EBA format could be expanded to specify which functions or control flows are authorized to access a particular pointer by incorporating the control flow representation or a hash of a specific code segment (e.g. corresponding to the CURRFUNCID value) or sequence of function calls (e.g. corresponding to the CURRCFID value) in the context information in addition to or instead of using that hash as a data tweak, a code tweak, or an address tweak. The EncryptBaseAddr instruction may be extended to specify the authorized hash and its meaning (e.g. corresponding to CURRFUNCID or CURRCFID) as one or more additional operands. The SpecializePtr instruction may propagate the restriction from the old pointer to the new pointer if it is embedded in the pointer. WRCFMEM may be defined to accept the pointer and context encoding in this embodiment, which may obviate the need for a separate operand to specify the hash value.

Multi-Tenant Architecture

Cryptographically encoded pointers with an EBA format as described herein, or any other cryptographically encoded pointer, can also be used to support multi-tenant software architectures in a single address space. A tenant may be defined as a collection of code executed by a processor 102 (e.g., a function, a group of functions, a process, a virtual machine, or other collection of program code). In multi-tenant environments using cryptographically encoded pointers (e.g., 610, 810, 2310) or non-cryptographically encoded pointers (e.g., 2410), cryptography enforces isolation between the tenants rather than page tables or extended page tables.

Figure 25:
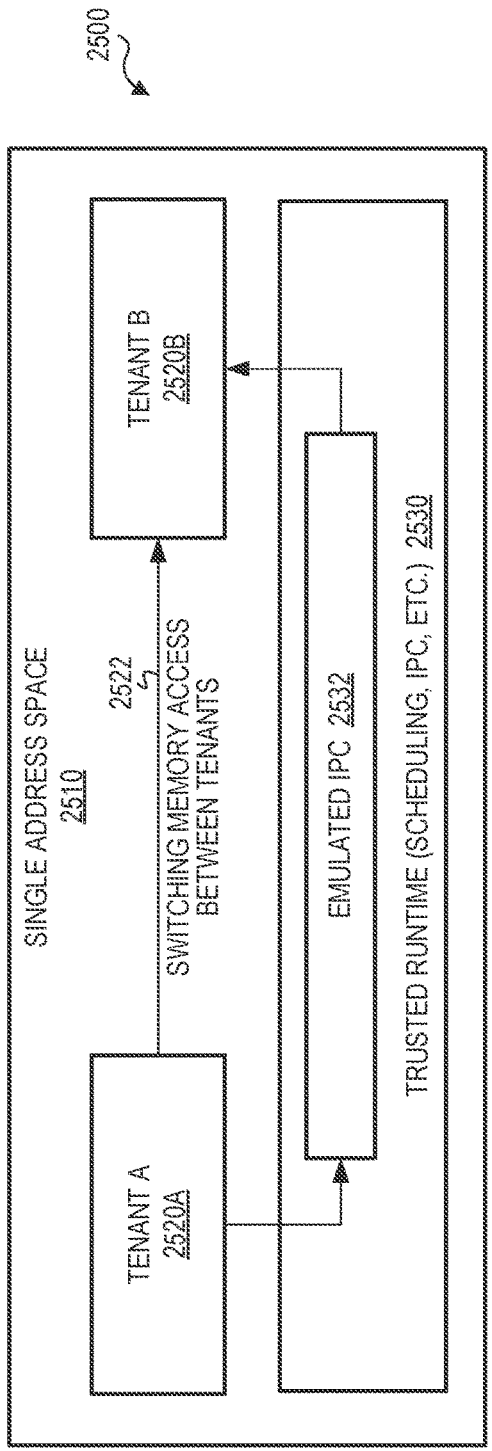
FIG. 25 is a simplified block diagram of a multi-tenant environment illustrating an example single address space supporting multi-tenancy in which isolation is enforced using cryptographically encoded pointers with encrypted base addresses according to at least one embodiment.

FIG. 25 is a simplified block diagram that illustrates an example multi-tenant environment 2500 including a single address space 2510 supporting a tenant A 2520A and a tenant B 2520B. Isolation is enforced between the tenants using cryptographically encoded pointers. The address space 2510 comprises a trusted runtime 2530 that facilitates an emulated inter-process communication 2532 between the tenants 2520A and 2520B. Only two tenants are illustrated in FIG. 25 for simplicity and ease of description. It should be noted, however, that the concepts described herein could be applied to a scaled implementation with many tenants.

Several instruction rules may be implemented to instantiate cryptographic isolation in a multi-tenant software architecture (e.g., 2500) using the concepts previously shown and described herein related to cryptographically encoded pointers (e.g., 610, 2110, 2310) and non-cryptographically encoded pointers (e.g., 2410). First, tenants are not permitted to generate pointers with raw pointers as input, as this could enable the tenant to access unauthorized memory. Typically, in a multi-tenant environment, tenants are not trusted by other tenants or by a trusted runtime. If each tenant could access any part of the address space, a malicious tenant could access data or code of another tenant, corrupt data or code of another tenant. Therefore, the ability to generate an encrypted pointer to any part of the single address space is restricted. For example, in one or more embodiments, tenants are restricted from executing the EncryptBaseAddr instruction. This restriction is enforced by cryptographically encoded pointers and non-cryptographically encoded pointers as will be further described herein. A second instruction rule includes allowing tenants to execute the SpecializePtr instruction, since this produces pointers that provide at most the permissions that are already supplied by existing pointers the tenant is allowed to access.

The preceding instruction rules restrict each tenant to just the memory areas covered by the pointers that are provided as input to that tenant by its supervisor (e.g. the operating system or a trusted runtime). In at least one embodiment, the instruction rules can be enforced by scanning the program code (e.g., assembly language output) for the absence of the prohibited instructions prior to running the program code, by defining a new mode in which those instructions fault, by marking certain code pages as being prohibited from using those instructions, or by any suitable combination thereof. Instruction restrictions could also be encoded in the context information associated with an instruction pointer register (RIP) and cryptographically bound to the RIP (e.g., as a bit in the context information newly designated to indicate that EncryptBaseAddr is disallowed). In another embodiment, instruction restrictions could be enforced at the source code level, where source code to be executed by a tenant is compiled by a trusted compiler (e.g., in the cloud) that prevents EncryptBaseAddr instructions from being generated in the executable code.

In one or more embodiments, trusted runtime 2520 comprises software that is trusted by the tenants but does not necessarily have to be privileged software. Along with the trusted software, trusted runtime 2530 may also include firmware and/or hardware in any suitable combination. The when executed, is responsible for loading tenant code into memory, for scheduling tenants, and for configuring the processor memory access control features to grant each tenant access to precisely the memory that it is authorized to access. It may also provide services such as allocating or deallocating regions of private or shared memory for tenants, sending messages between tenants, terminating tenants, and providing cryptographic keys of a first tenant to one or more other tenants that are authorized to access the first tenant.

In the multi-tenant environment, the trusted runtime 2530 restricts each tenant to its own authorized memory region. Trusted runtime 2530 can generate a pointer or pointers that reference one or more "private" memory regions that a particular tenant is authorized to access, but that other tenants are not authorized to access. A pointer to an authorized memory region can be generated by the trusted runtime 2530 with a raw pointer (e.g., using EncryptBaseAddr instruction). Additionally, the trusted runtime encrypts the tenant code as it is being loaded and generates pointers to the tenant code. The pointers generated by the trusted runtime 2530 can be provided to the tenant code when the tenant code is initiated or during execution for example, when a message is received from another tenant. In one example illustration, when trusted runtime 2530 initiates tenant A 2520A, trusted runtime 2530 generates an EBA pointer that covers a particular memory region that tenant A 2520A is authorized to access, and then provides the EBA pointer to tenant A 2520A to be used during its execution. It should be noted that the authorized memory region may contain sub-regions within the memory region that may contain their own pointers. In addition, trusted runtime 2530 can also generate a pointer or pointers that reference one or more "shared" memory regions that all tenants within the single address space are allowed to access or that a subset of tenants in the single address space are allowed to access.

In one or more embodiments, tenants are provided with at least one pointer to an authorized memory region and can generate specialized pointers to sub-regions within the authorized memory region. In one example, tenants can be allowed to execute the SpecializePtr instruction previously described herein, using a pointer provided by the trusted runtime 2530 as input for the instruction. The SpecializePtr instruction can take the input pointer, which covers the authorized memory region for the tenant, and produce a specialized pointer that covers a smaller region (or sub-region) within the larger, authorized region. Thus, the tenant can pass the pointer to its entire memory region and request a pointer to a particular object within that memory region. The SpecializePtr instruction can verify that the object to which the tenant has requested access is referenced by the input pointer (i.e., located within the memory region to which the input pointer is pointing).

As previously described herein, secret cryptographic keys are used to encrypt base address slices of EBA pointers (e.g., 610, 2110) and address slices in pointers using other cryptographically encoded formats (e.g., 2310), and to encrypt data or code that is referenced by the pointers. In the multi-tenant environment, keys may be switched between tenants so that each tenant uses a different key than the other tenants for generating encrypted base address slices (and address slices in pointers using other cryptographically encoded formats) for its pointers, and for encrypting data or code that is referenced by the pointers. Switching keys can strengthen isolation without requiring translation lookaside buffer (TLB) evictions, or other actions that impose additional overhead as in conventional page table switching. Embodiments also allow switching memory access between tenants 2522, where one tenant transfers control so that another tenant may access the code and data of the second tenant. The first tenant (e.g., Tenant A 2520A) may cause the keys of the tenant being accessed (e.g., Tenant B 2520B) to be activated for use in order to successfully access data and code of the tenant being accessed.

Figure 26:
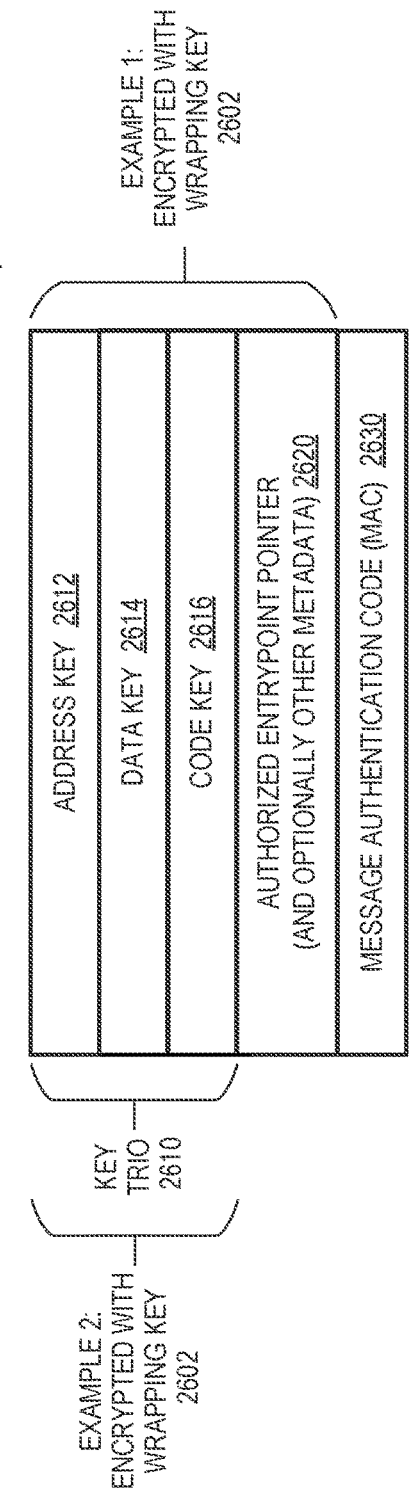
FIG. 26 is an example of possible keys and information that may be associated with a tenant in a multi-tenant environment in one or more embodiments.

FIG. 26 is a block diagram illustrating a possible security handle 2600 that may be associated with a tenant in a multi-tenant environment. In one or more embodiments, security handle 2600 can be unique to each tenant and can be stored in memory. Security handle 2600 may comprise a key trio 2610 including an address key 2612, a data key 2614, and a code key 2616. An address key can be used in a cryptographic algorithm to encrypt/decrypt a slice of a base address to be embedded in a pointer referencing that base address. A data key can be used in a cryptographic algorithm to encrypt/decrypt data to which a cryptographically encoded pointer is pointing. A code key can be used in a cryptographic algorithm to encrypt/decrypt code to which a cryptographically encoded pointer is pointing. In at least one embodiment, one or more the cryptographic algorithms may include one or more types of block ciphers, as previously described herein. Although separate keys are illustrated in the single security handle 2600 for pointer addresses, data, and code, and can provide a higher level of security, it should be understood that a single key could be used, or two keys could be used in any suitable combination, based on particular needs and implementations (e.g., one key for addresses and a different key for code and data, one key for data and a different key for addresses and code, one key for code and a different key for addresses and data). Furthermore, it should also be noted that, depending on the particular implementation, only certain keys may be included. For example, address and data keys may be included without a code key, address and code keys may be included without a data key, or data and code keys may be included without an address key.

Security handle 2600 may also include an authorized entrypoint pointer 2620 associated with the key trio 2610. Optionally, other metadata may be included with the authorized entrypoint pointer if the authorized entrypoint pointer is not encrypted. An authorized entrypoint pointer may comprise a pointer to an address in a memory region authorized to use the key trio 2610 for decrypting cryptographically encoded pointers and for decrypting the data or code referenced by the pointers. Loading the keys of a destination tenant's security handle can cause a branch to an authorized entrypoint of the destination tenant based on the entrypoint pointer 2620 embedded in the destination tenant's security handle 2600. This ensures that other tenants are only able to invoke a destination tenant at its authorized code locations. This can help prevent a malicious tenant from invoking functionality in a victim tenant that may compromise the victim's security (e.g. a function that reads a private key or other data and returns it to the caller). In addition, since security handles are in-memory structures, the EBA instructions previously described herein could be used to control which other handles each tenant can invoke by setting authorized memory regions to only include certain handles.

In at least one embodiment, a security handle (e.g., 2600) can be used by a first tenant (which can be untrusted software) to supply the processor with an entrypoint pointer of a second tenant, and the keys or a handle to the keys of the second tenant, to effect a switch to the second tenant without invoking trusted software such as the trusted runtime. In an example, if tenant A wants to invoke tenant B, tenant A can be given access to a security handle for tenant B. For example, a trusted runtime can store tenant B's security handle in a memory region of tenant A if tenant A is authorized to access tenant B. Tenant A can execute a new instruction that accepts the security handle as a memory operand and, based on the contents of the security handle, updates an instruction pointer and key registers for the different key types (e.g., address, data, and/or code). For example, execution of the new instruction can include loading an address key (e.g., 2612) specified in the security handle into a register to be used for decrypting an encrypted slice in an EBA pointer (e.g., 610, 2110) or other cryptographically encoded pointer (e.g., 2310), and updating an instruction pointer to the authorized entrypoint pointer (e.g., 2620) specified in tenant B's security handle (e.g., 2600). This prevents tenant A from branching to any arbitrary code in tenant B, which tenant B might want to protect from outside (other tenants) access, for example, if it contains sensitive data and/or code. In addition, if the security handle includes a data key and/or a code key, those keys can also be loaded into the appropriate registers so that they are activated for use to enable successful access to the data and code of tenant B.

Authentication and encryption may be used to maintain the security and integrity of the keys and the authorized entrypoint pointer. The integrity of security handle 2600 can be assessed by generating a message authentication code 2630 based on the key trio 2610 and authorized entrypoint pointer 2620. A MAC algorithm and a key may be used to generate the MAC. A tenant that is attempting to use the security handle 2600 can verify its integrity (i.e., that its contents have not been modified) by generating a second MAC using the same MAC algorithm and key based on the key trio 2610 and the authorized entrypoint pointer 2620. The second MAC is compared to the MAC 2630 in security handle 2600. If they match, then the integrity of the security handle 2600 is verified and the tenant can use the security handle 2600 to access the associated tenant. However, if the MACs do not match, then a fault can be generated and the tenant attempting to use the security handle is prevented from doing so. A MAC mismatch may indicate that one or more of the keys, the authorized entrypoint pointer, or the MAC have been modified.

The keys and optionally the authorized entrypoint pointer 2620 may be secured by encryption and authentication with a wrapping key. In a first example, a wrapping key 2602 may be used to encrypt the key trio 2610 and the authorized entrypoint pointer 2620 (either separately or in combination). In a second example, the wrapping key 2602 may be used to encrypt the key trio 2610 (either separately or in combination), but the authorized entrypoint pointer may not be encrypted. The wrapping key 2602 can subsequently be used to decrypt the keys and authorized entrypoint pointer (if encrypted) when a tenant loads the security handle. These encryption and decryption steps may occur separately from the MAC generation steps, or they may be combined. For example, some Authenticated Encryption with Associated Data (AEAD) (or simply authenticated encryption if there is no unencrypted authenticated data) modes combine these steps and others perform them separately. In one embodiment, the wrapping key 2602 can be stored in the processor core to provide additional security. In other embodiments, the wrapping key could be stored separately in memory.

In some embodiments, more than one key for each key type (e.g., address key, data key, code key) could be defined per tenant to support selective sharing of memory regions between multiple tenants. For example, a single code key, multiple address keys, and multiple data keys could be defined for a single tenant. When multiple keys are defined for a group of tenants, instead of being strictly isolated and sending all messages through the trusted runtime, a shared memory region could be used to enable direct communication between the group tenants.

A particular tenant may be authorized to access any number of memory regions, and each separate memory region may be identified by a pointer or its context information. The pointer or its context information could indicate whether that memory region is private to the current tenant, globally shared between all tenants, or shared by a subset of tenants. Accordingly, a particular tenant may be associated with one or more pointers or context information instances, such as a private pointer or context information for a memory region that is only authorized for that tenant, a broadcast pointer or context information for a memory region that is authorized for all tenants, a unicast pointer or context information for a memory region that may be read from but not written to by the tenant (e.g., another tenant may populate the memory region and the tenant may consume data from that region), and/or a multicast pointer or context information for a memory region that may be read from and written to by multiple tenants. In one or more embodiments, the context information may include a cryptographic context ID that indicates the authorization for the memory region (e.g., private, unicast, multicast, broadcast). In some embodiments, a particular tenant may be associated with multiple pointers or context information instances for any of these types of pointers and context information instances.

For each of the shared memory regions, a particular key is selected to encrypt the address or data. Accordingly, separate encryption keys can be used for the different types of shared memory regions. In a memory region shared by a subset of tenants, each tenant in the subset could use a different data key for its private memory region, but all of the tenants could use the same data key for the shared memory region. For example, consider a shared memory region for tenant A and tenant B. Tenant A could have access to a first data key for encrypting/decrypting data in a first private memory region assigned to tenant A. Tenant B could have access to a second data key for encrypting/decrypting data in second private memory region assigned to tenant B. However, both tenant A and tenant B could have access to a shared data key for encrypting/decrypting data in the shared memory region. Separate registers could be defined to hold different keys for each of the crypto contexts. It may be beneficial to store keys for the multicast groups in a table in memory indexed by the multicast group ID if a large number of multicast groups is supported to reduce silicon area requirements.

When using cryptographically encoded pointers in a multi-tenant environment, one or more keys are to be updated when switching tenants. Tenants may also be referred to herein as "compartments." In at least one embodiment, updating keys when switching tenants can be accomplished using instructions that may be executable from either or both of user mode and supervisor mode, depending on which software is trusted to access and update the keys. For example, a trusted runtime that manages tenants, such as trusted runtime 2530 of FIG. 25, could use key update instructions that can be executed in user mode (e.g., ring level 3 code). The trusted runtime could execute a key update instruction to update the relevant key register(s) when transferring control between tenants. As previously described herein with respect to certain other pointer instructions (e.g., EncryptBaseAddr), certain key update instructions can be restricted to just the trusted runtime.

Instructions for reading and writing key register values, which could be executed by a trusted runtime or directly by tenants, may be used when the keys are used to encrypt and decrypt code, data and/or addresses. Such instructions may not be usable, however, for switching the code key if the code is encrypted using separate keys for separate tenants and the code is not arranged such that the destination tenant's code begins immediately after the WRKEY instruction that switches the code key. In one example, such read (RDKEY) and write (WRKEY) instructions could be defined as follows:

RDKEY: rs1/xmm, rs2
rs1/xmm: Register operand input to which key value will be written. The size of the operand may vary (e.g., r64 for a 64-bit general-purpose register or xmm for a 128-bit register) depending on the size of the key.
rs2: Register operand (e.g., 64 bits) specifying the index of the key register to be read (e.g., when there are multiple keys such as shared objects between different pairs of tenants)

WRKEY: rs1/xmm, rs2
imm64 or rs1/xmm: Immediate operand or register operand input containing the key value to be written. The register operand could be used if the key value is too large to fit in the immediate operand. The size of the operand may vary (e.g., r64 for a 64-bit general-purpose register or xmm for a 128-bit register) depending on the size of the key.
rs2: Register operand (e.g., 64 bits) specifying the index of the key register to be updated (e.g., when there are multiple keys such as shared objects between different pairs of tenants)

Instructions that simply update the keys from user mode are usable if the keys are not used to encrypt and decrypt code. If one of the keys is used to decrypt code, however, then a single instruction to both branch and update the key is used so that execution continues at a location that can be correctly decrypted using the new key. For example, if the branch and update is not performed in a single instruction, then if code is encrypted with a key and a write key instruction is executed, the key would be updated but it may be in a code region that is encrypted using the previous key (i.e., before the write key instruction was executed). Unless the code is re-encrypted with the new key immediately following the write key instruction, the newly updated key to decrypt code may fail. Accordingly, a key instruction that performs a branch as well as a key update prevents this scenario.

An example instruction for branching and also updating a key register value may be defined as JKEY. The JKEY instruction can specify a destination address where a tenant is jumping and a new value for a key register to update a code key for the code to be executed at the destination. The other key values (e.g., address and data keys) can be updated by the destination tenant once control is transferred to the destination tenant. The JKEY instruction can be used for transferring control directly between tenants, from a tenant to a trusted runtime, or from a trusted runtime to a tenant. An example format for a JKEY instruction to branch and update a key register value could be defined as follows:

JKEY: rs1, rs2/xmm, rs3
- rs1: Register operand (e.g., 64 bits) input containing the destination address for branching to the destination (e.g., tenant, trusted runtime)
- rs2/xmm: Register operand input containing new value for key register that is used to decrypt code. Alternatively, the new value for the code key may be embedded as an immediate operand. The size of the operand may vary (e.g. r64 for a 64-bit general-purpose register or xmm for a 128-bit register) depending on the size of the key.
- rs3: Register operand containing context information if the destination address is a cryptographically encoded pointer, if external context information was used to generate the cryptographically encoded pointer, and if the external context information is statically available.

Another example instruction for branching and also updating a key register value may be defined as JHND. The JHND instruction can specify a memory operand that points to a security handle in memory. The security handle can contain new key values (e.g., address, data, and code keys) to update appropriate key registers and an authorized entrypoint pointer that points to where the tenant is jumping. The JHND instruction can be used for transferring control directly between tenants, from a tenant to a trusted runtime, or from a trusted runtime to a tenant. An example format for a JHND instruction to branch and update key register values for address, data, and code keys could be defined as follows:

JHND: m1, rs2/xmm
- m1: Memory operand (e.g., 64 bits) pointing to the security handle for the destination (e.g., tenant, trusted runtime)

If an authorized entrypoint pointer in the security handle is a cryptographically encoded pointer and if context information was used to generate the cryptographically encoded pointer, then the security handle may be configured to include the context information.

Figure 27:
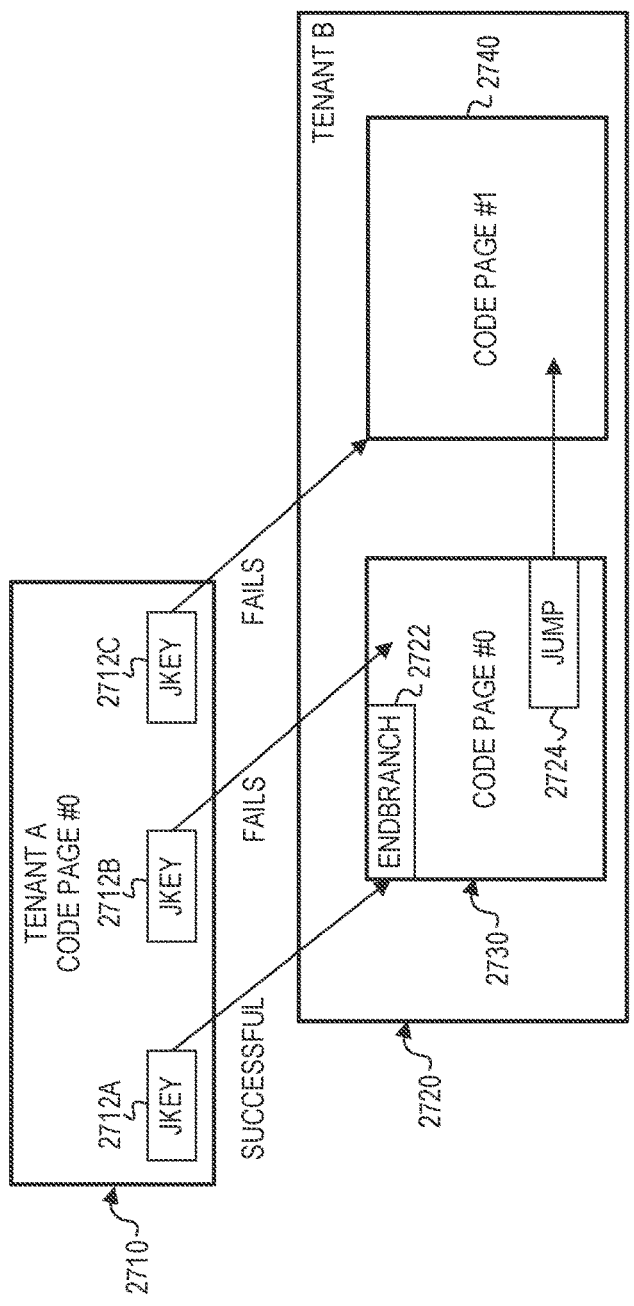
FIG. 27 is a block diagram illustrating example operations of an instruction for jumping from one tenant to another tenant according to at least one embodiment.

FIG. 27 is a simplified block diagram illustrating example operations of an instruction, such as JKEY, for jumping from one tenant to another tenant when cryptographically encoded pointers are used. FIG. 27 includes a tenant A code page #0 2710 and a tenant B 2720 with a code page #0 2730 and a code page #1 2740. In this example, a regular jump instruction 2724 is used to jump from code page #0 2730 in tenant B 2720 to code page #1 2740, which is also in tenant B 2720. Jumping from one code page to another code page within the same region does not require the JKEY instruction since the code keys of the code pages are within the same tenant are the same. FIG. 27 also shows tenant-to-tenant attempted branching from tenant A code page #0 2710, which includes three JKEY instructions 2712A, 2712B, and 2712C. Each of the JKEY instructions attempts to access one of the code pages 2730 and 2740 of tenant B.

It may be desirable from at least a security standpoint to limit the entrypoints a tenant can use when invoking another tenant or the trusted runtime. In at least one embodiment, entrypoints can be limited by using a designated required instruction at each entrypoint. For example, the Intel® Control-flow Enforcement Technology (CET) ENDBRANCH instruction can be used. In this example, the JKEY instruction could be designed to require that its destination decrypt to an ENDBRANCH instruction. However, ENDBRANCH may also be used within each tenant to restrict control-flow, which could permit any valid function entrypoint to also be used as tenant entrypoint. Because this is generally undesirable, the entrypoints can be further restricted. Specifically, the JKEY instruction could be designed to check that its destination address is aligned to a page boundary (e.g. 4 KB) and generate a fault otherwise. This can prevent JKEY from landing on ENDBRANCH instructions that are not at the beginning of a page. In addition, the compiler is modified to avoid placing function entrypoints or other code constructs starting with ENDBRANCH instructions at the beginnings of pages that are not valid entrypoints. This can be rectified by shifting the ENDBRANCH instruction back by one byte and inserting a NOP instruction at the beginning of the page.

In FIG. 27, the JKEY instruction 2712A is successful because its destination decrypts to the required instruction, ENDBRANCH instruction 2722, of code page #0 2730 in tenant A 2720. JKEY instruction 2712B fails because its destination is not the beginning of a page (i.e., not page-aligned). Although JKEY instruction 2712C jumps to the beginning of code page #1 2740, the JKEY instruction 2712C also fails because its destination does not decrypt to an ENDBRANCH instruction.

Multiple techniques can be used in tandem to protect keys from disclosure. First, keys may be embedded in a code page marked execute-only to prevent software from reading the key directly. An adversary, however, may still be able to jump to unintended instruction offsets within the key itself and attempt to determine all or a portion of the key value by observing the effects of the processor interpreting the key value as instructions. This can be mitigated by enabling CET to prevent branches to unintended offsets. It is possible that the byte sequence for an ENDBRANCH instruction may happen to appear in a key value, so the key values should be scanned prior to use to verify that they do not contain embedded ENDBRANCH sequences. By removing the ENDBRANCH sequences embedded within a key, this can prevent an adversary from jumping to that unintended offset within the key, allowing the processor to execute the "code" that might happen to be represented in the key value, and attempting to learn the contents of the key from observing the processor responses.

An alternative embodiment to requiring that JKEY instructions land on ENDBRANCH instructions is to define a new instruction, e.g., LANDKEY, to be used specifically for this purpose rather than reusing ENDBRANCH.

Another alternative embodiment is to define call gates that use a descriptor table in memory. A call gate is a specification of a code entrypoint and resources (e.g. keys or crypto context IDs) usable by that tenant code that is authorized by supervisory software to be invoked by one or more other tenants. The supervisory software may be a traditional operating system, a trusted runtime that is itself supervised by an operating system, etc. Call gates both update an instruction pointer (e.g., in an RIP) to an authorized entrypoint and also update one or more key register values. For example, the authorized call gates could be stored in the descriptor table containing a number of descriptors that contain information about other tenants that the current tenant can invoke. The descriptor table can be managed by a supervisor mode and a pointer can be generated to the descriptor table. A usermode instruction, (e.g., CALLCOMPARTMENT) could be defined for a tenant to use to invoke other tenants. The CALLCOMPARTMENT instruction is designed to accept an index into the descriptor table, look up the descriptor in the table. This descriptor gives the CALLCOMPARTMENT instruction the entrypoint for the new tenant and the key values. The CALLCOMPARTMENT instruction may then jump to the entrypoint and update the key values.

The CALLCOMPARTMENT instruction offers several advantages. It would obviate the need for checking the alignment of the entrypoint and for checking whether an ENDBRANCH/LANDKEY instruction is present at the entrypoint, since the entrypoint value is already trusted. It would also eliminate the need for WRKEY instructions after the entrypoint of a tenant to update additional key registers, since they could all be updated as part of passing through the call gate.

In yet another embodiment, instead of switching keys when switching between tenants, objects can be bound to different cryptographic contexts using an enhanced format for a contextual tweak value. A cryptographic context is a particular memory region which may be authorized for a single tenant of a processor (e.g., 102), a set of two or more tenants, or all of the tenants. Thus, a cryptographic context may be private memory region accessible to a single tenant or a shared memory region accessible to two or more tenants. A particular tenant may be authorized to access any number of memory regions, and each separate memory region may be identified by a cryptographic context identifier (or crypto context ID). Tweaks that are used for encrypting/decrypting data, code, or an address slice in a pointer can be extended to include this crypto context ID. Accordingly, instead of switching keys when switching control between tenants, a crypto context ID value can be switched for each cryptographic context. Thus, the overhead of switching keys, particularly when a key schedule with sub-keys is generated, may be eliminated or reduced.

A particular tenant may be associated with one or more crypto context IDs, such as a private crypto context ID for a memory region that is only authorized for that tenant, a broadcast crypto context ID for a memory region that is authorized for all tenants, a unicast crypto context ID for a memory region that may be read from but not written to by the tenant (e.g., another tenant may populate the memory space and the tenant may consume data from that space), and/or a multicast crypto context ID for a memory region that may be read from and written to by multiple tenants, but not all tenants. In some embodiments, a particular tenant may be associated with multiple crypto context IDs for any of these types of crypto context IDs.

In a particular embodiment, a crypto context ID may be generated by, for example, a trusted runtime, which may generate crypto context IDs for multiple (or all) of the tenants of a multi-tenant environment. In some embodiments, the crypto context IDs are random numbers (e.g., random 64-bit values).

A cryptographic context ID may identify, for a memory location being accessed, the scope of access of that memory location for the current tenant. Generally, the crypto context ID may be unique to each cryptographic context as long as the same key is in use, because the crypto context IDs are unique within each key used in the multi-tenant environment. For example, if two tenants share a particular memory region, they may each be associated with the same crypto context ID for that region if a single key is used for that region. While data sharing could also be accomplished by having tenants share cryptographic keys, use of the crypto context IDs may be a more efficient way to share data (e.g., the overhead with switching keys may be burdensome, especially when subkeys have to be generated).

It is desirable to prevent untrusted software from forging crypto context IDs to prevent malicious software from performing unauthorized data accesses. For example, crypto context IDs could be stored in context information that is embedded in program code (e.g., as an operand) that has been scanned by the trusted runtime to ensure that it uses only authorized crypto context IDs, or in a table that is protected from malicious accesses. However, this requires additional scanning and memory access restrictions that may be undesirable due to the complexity that they introduce into the system.

Figure 28:
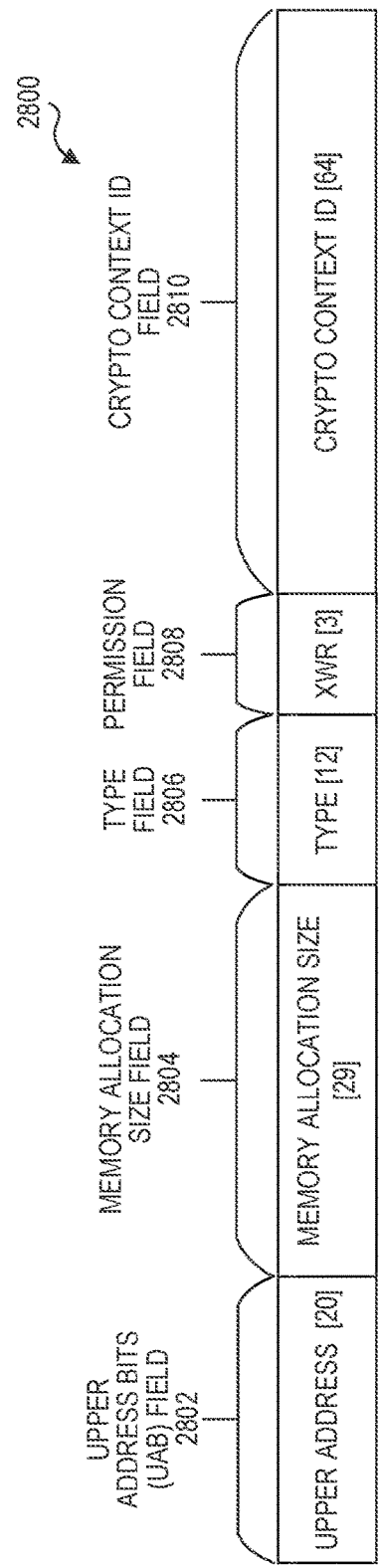
FIG. 28 is a diagram of possible context information that may be used to generate a cryptographically encoded pointer for a multi-tenant environment according to at least one embodiment.

FIG. 28 illustrates an alternative embodiment for using secret crypto context ID values to probabilistically prevent adversaries from forging the correct ID value for a given object. In particular, for a multi-tenant environment that uses EBA format for its cryptographically encoded pointers, enhanced context information 2800 could be used to specify a secret crypto context ID. The enhanced context information 2800 can include an upper address bits field 2802 with twenty bits, a memory allocation size field 2804 with twenty-nine bits, a type field 2806 with twelve bits, a permission field 2808 with three bits, and a crypto context ID field 2810 with sixty-four bits. In this example, the enhanced context information 2800 is increased from a 64-bit field to a 128-bit field.

Software that generates cryptographically encoded pointers (e.g., EncryptBaseAddr, SpecializePtr) could directly insert a secret crypto context ID into a contextual tweak. In at least one embodiment, the crypto context IDs may be sized to prevent adversaries from successfully guessing them. Thus, if the crypto context IDs are large, it may be preferable to store relevant IDs in registers and/or tables that are updated when switching cryptographic contexts. Then, instead of the software directly specifying complete crypto context IDs as an operand, the software can specify a smaller crypto context index that is then used to lookup the crypto context ID. That would then shrink the containing scope within which crypto context indexes must be unique relative to the requirements for full crypto context IDs. For example, if crypto context ID registers are updated when switching processes, even if a single key is used for multiple processes, then crypto context indexes only need to be unique between processes. As with any of the context information, the crypto context index could alternatively be encoded directly into an encoded pointer rather than in a separate context value. Some embodiments may support a multiplicity of crypto context IDs or keys for one or more of each of the private, unicast, multicast, or broadcast crypto context ID categories to represent separate versions of data within those categories. Each crypto context index value would map to a particular crypto context ID or key. The versioned crypto context index could be encoded directly into an encoded pointer. Thus, each instruction could access any version of data. In this embodiment, the compiler may not statically specify version information in context values.

Another embodiment includes incorporating the crypto context ID value from a single crypto context ID register for every memory access, which would not require a crypto context index to be specified. However, sharing memory may result in frequent updates to the crypto context ID register even within a single session of a tenant execution. This can occur due to the tenant switching between accessing its own private objects and objects shared with other tenants, since the crypto context ID register would need to contain the corresponding crypto context ID for the current object being accessed. To avoid requiring so many crypto context ID register updates, some larger number of registers could be supported. For example, in addition to a crypto context ID register for private objects, an additional crypto context ID register could be defined for objects globally shared between all functions, analogous to a network broadcast. Further crypto context ID registers or even a table could be defined to hold crypto context IDs for objects to be shared with one or more other functions, analogous to network unicast or multicast packets, respectively.

Figure 29:
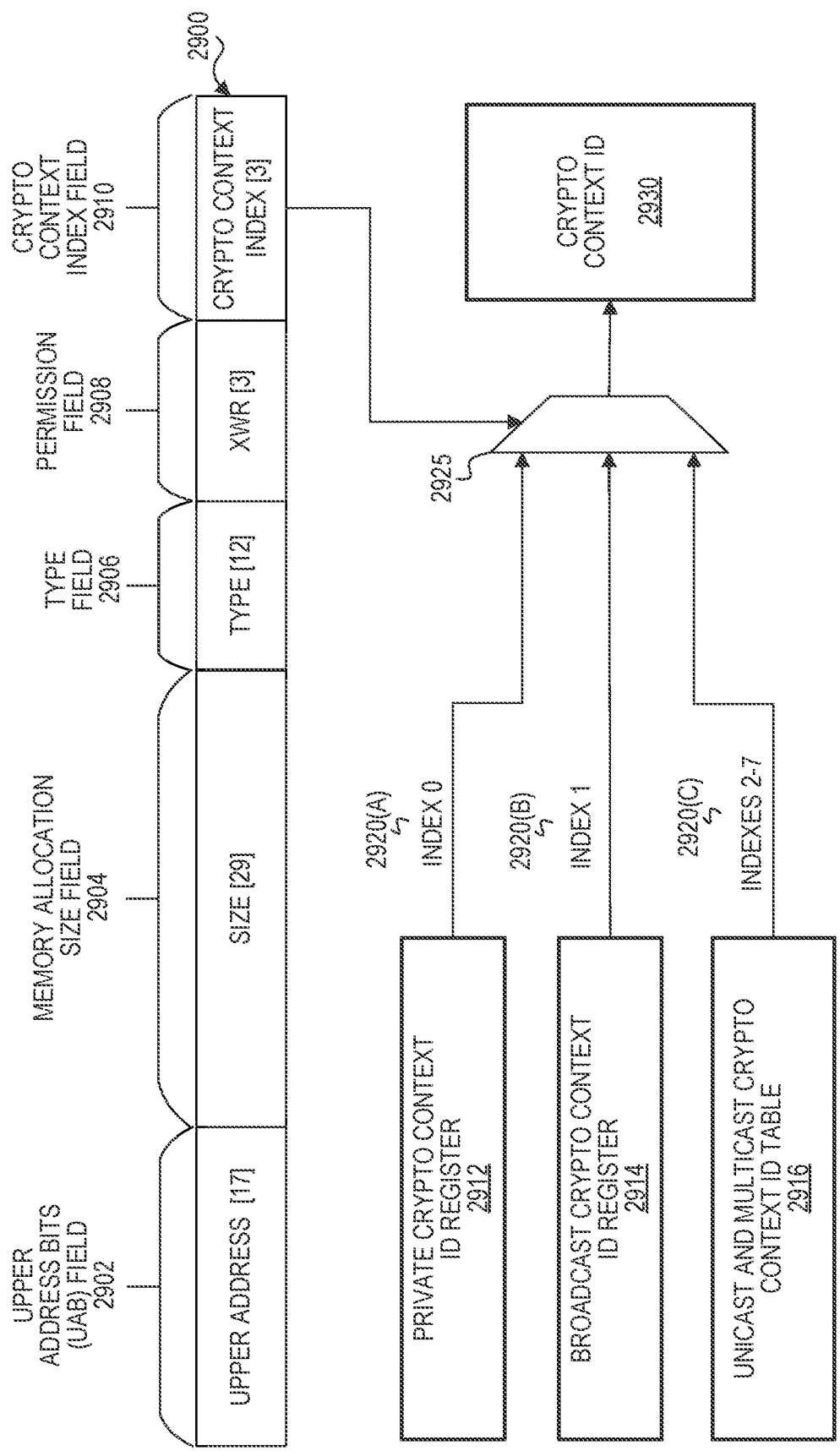
FIG. 29 is a simplified block diagram illustrating the use of a crypto context index in a multi-tenant environment according to at least one embodiment.

FIG. 29 illustrates alternative enhanced context information 2900 with a crypto context index and selection of a cryptographic context ID 2930 using the crypto context index from multiple registers and/or a table in memory. The alternative enhanced context information 2900 differs from the expanded context information 2800 in that a crypto context index field 2910 contains a crypto context index with a smaller number of bits (e.g., 3-bits) than the crypto context ID in crypto context ID field 2810 (e.g., 64 bits) of expanded context information 2800. In order to maintain a 64-bit value for the alternative enhanced context information 2900, the number of bits of upper address bits field 2902 may be downwardly adjusted (e.g., 17 bits). In this example, the number of bits in the other fields (e.g., memory allocation size field 2904, type field 2906, and permissions field 2908) are not changed. Consequently, for a pointer in an EBA format, adjustments are needed in one or more portions of the pointer. For example, the number of bits by which the upper address bits field 2902 is adjusted may be used to increase the number of alignment bits (e.g., 2125) in the EBA pointer. Alternatively, any other suitable adjustment may be used.

In this embodiment, a plurality of registers and/or a table in memory store cryptographic context IDs. The registers may be 64-bit registers in at least one implementation. For example, private crypto context ID register 2912 may store a private cryptographic context ID for a cryptographic context that can be accessed by a single tenant, broadcast crypto context ID register 2914 may store a broadcast crypto context ID for a shared memory region that can be accessed by all tenants, and unicast and multicast cryptographic context ID table 2916 may store various unicast and multicast crypto context IDs (or other custom cryptographic context ID) for shared memory regions that can be shared between subsets of all of the tenants in the multi-tenant environment (e.g., two tenants, three tenants, etc.). A crypto context ID can be selectable based on a crypto context index in field 2910.

The crypto context index in field 2910 may be supplied to the processor 102 in any suitable manner (e.g., using any of the manners described herein for provision of context information 700). In some embodiments, the crypto context index in field 2910 may be supplied in an input register or may be loaded from an in-memory table. In this example, the crypto context index is supplied to multiplexer 2925 to be compared to index 0 2920(A) of private crypto context ID register 2912, index 1 2920(B) of broadcast crypto context ID register, and indexes 2-7 2920(C) of unicast and multicast crypto context ID table 2916. The corresponding index of indexes 0-7 is selected and its associated crypto context ID 2930 is provided for use as all or a portion of a tweak for the relevant cryptographic instruction (e.g., EncryptBaseAddr, SpecializePtr, JKEY, JHND, CALLCOMPARTMENT, WRKEY, etc.).

As described above, a cryptographic context ID (e.g., 715, 2115, in field 2810) may be generated by a trusted runtime or other trusted entity. The same entity may store the cryptographic context ID with its appropriate handle. For example, a security handle (e.g., 2600) may include a crypto context ID for the cryptographic context (e.g., memory region) to which the security handle is assigned (e.g., private memory region of tenant A, shared memory region, private memory region of tenant B, broadcast memory region, etc.). When execution at the processor 102 switches to a particular tenant, that tenant may call instructions to load the registers 2912 and 2914 with the crypto context IDs for that tenant. When execution at the processor 102 switches to a different tenant, the new tenant may call instructions to overwrite the values of the registers 2912 and 2914 with crypto context IDs for that new tenant.

Numerous other embodiments or variations to the multi-tenant embodiments disclosed herein. For example, crypto context indexes could be mapped to separate keys, rather than crypto context IDs. In another example, other state from configuration registers can be incorporated into the contextual tweak, e.g., the identifier for the current privilege level to prevent other privilege levels from accessing the associated data. Furthermore, instructions analogous to previously disclosed instructions herein (e.g., RDKEY, WRKEY, JKEY, JHND, LANDKEY, CALLCOMPARTMENT) could be defined for crypto context ID registers. Thus, instead of operating on key values, the instructions would operate in crypto context ID values.

Figure 30:
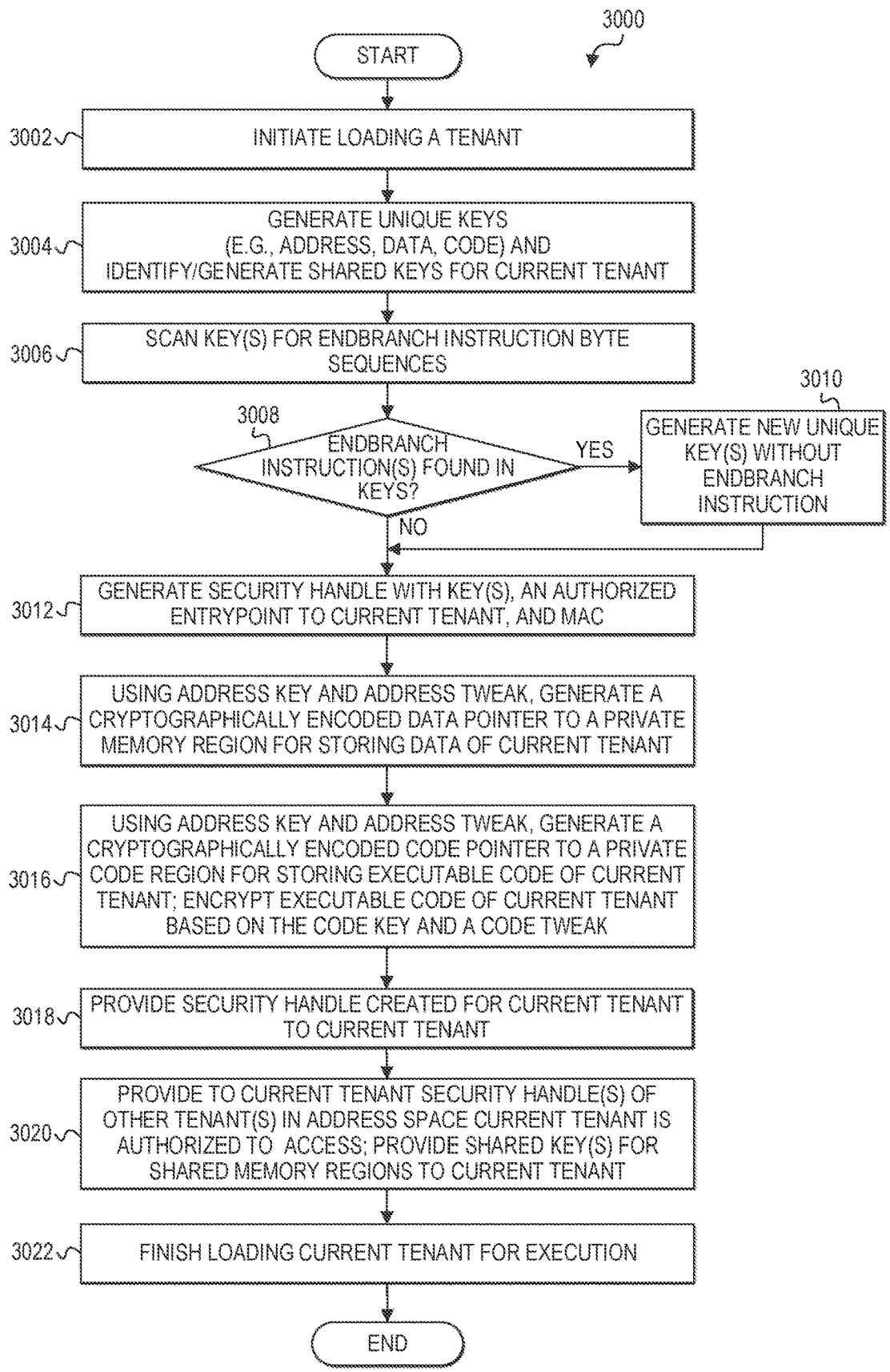
FIG. 30 is a flow diagram illustrating an example process associated with loading a tenant in a multi-tenant environment using encoded pointers according to at least one embodiment.

Referring now to FIGS. 30-34, example processes are shown for operations in a multi-tenant environment, where memory addresses, data, and/or code are secured using cryptographically encoded pointers. FIG. 30 illustrates an example process 3000 associated with loading a current tenant in a multi-tenant environment (e.g., 2500). Portions of the process 3000 may be executed by hardware, firmware, and/or software of a computing device (e.g., by executing a trusted runtime). In some scenarios, a processor (e.g., 102) with one or more cores of a computing device (e.g., 100) may run a trusted runtime (e.g., 2530), which manages multiple tenants (e.g., tenant A 2520A, tenant B 2520B).

At 3002, the trusted runtime may initiate loading a tenant for execution in a single address space. At 3004, the trusted runtime may generate (or request the generation of) unique keys for the tenant. The unique keys can include any combination of an address key, a data key, and a code key for encrypting/decrypting addresses, data, and code, respectively. In addition, the trusted runtime can identify or generate shared keys, if any, that the current tenant is authorized to use to access shared memory. Furthermore, the trusted runtime may also identify any security handles of other tenants that the current tenant is authorized to access (e.g., branch to).

At 3006, the generated keys can be scanned for embedded byte sequences (e.g., ENDBRANCH instruction byte sequence) that can be accessed by outside code such as a malicious tenant. If the keys are stored in execute-only code, then malicious code could branch to the byte sequence and monitor processor actions as the processor attempts to execute byte sequences embedded in the key. If any of the byte sequences in the instruction happen to represent an instruction, then the malicious code can use the processor actions to determine the contents (or part of the contents) of the key. Accordingly, at 3008, If any byte sequences such as ENDBRANCH are found in the keys, then at 3010, the trusted runtime generates new unique keys without the ENDBRANCH instruction (or other instruction that can be accessed by outside code.

At 3012, the trusted runtime can generate a security handle with the generated keys, an authorized entrypoint to the tenant, and a message authentication code, as previously described herein.

At 3014, the trusted runtime can generate a cryptographically encoded data pointer to a private memory region for storing data of the current tenant (also referred to herein as a "private data pointer"). The private data pointer can be generated using a cryptographic algorithm (e.g., block cipher) based on the address key generated at 3004 and an address tweak. The private data pointer may be generated according to any suitable cryptographic encoding format such as, for example, an EBA format. Alternatively, the private data pointer could be generated according to any other format that includes encryption of at least a portion of the address of the private memory region.

In one or more embodiments, the private data pointer can also be used to encrypt the data in the private memory region. The data can be encrypted using a cryptographic algorithm (e.g., block cipher) based on the data key generated at 3004 and a data tweak. In other embodiments further described herein, however, different portions of the private data region are separately encrypted to enforce memory safety within the private data region, which can provide more granular security.

At 3016, the trusted runtime can generate a cryptographically encoded code pointer to a private code region for storing executable code of the current tenant (also referred to herein as a "private code pointer"). The private code pointer can be generated using a cryptographic algorithm (e.g., block cipher) based on the address key generated at 3004 and an address tweak. The private code pointer can be generated according to any suitable cryptographic encoding format such as, for example, an EBA format. Alternatively, the private code pointer could be generated according to any other format that includes encryption of at least a portion of the address of the private code region.

The private code pointer can also be used to encrypt the executable code in the private code region. The executable code can be encrypted using a cryptographic algorithm (e.g., block cipher) based on the code key generated at 3004 and a code tweak.

At 3018, the security handle created for the current tenant is provided to the current tenant by the trusted runtime. In one example, the trusted runtime could copy the current tenant's security handle into one of the current tenant's private memory regions.

At 3020, for each other tenant in the address space that the current tenant is authorized to access, the security handle(s) for the other tenant(s) are provided to the current tenant by the trusted runtime. In one example, the trusted runtime could copy the security handle(s) of the other tenant(s) into one of the current tenant's private memory regions. Also, for any shared memory regions that the current tenant is authorized to access, the shared key(s) identified (or generated) at 3004 are provided to the current tenant. In one example, the trusted runtime could copy the shared keys to the current tenant's private memory regions.

At 3022, the trusted runtime finishes loading the current tenant for execution. It should be noted that, for simplicity, process 3000 is described with reference to a single instance of the keys, the private memory region, and the private code region. However, a tenant may have multiple private memory regions and/or private code regions, and multiple keys for performing encryption/decryption of the linear addresses, data, and/or code.

Figure 31:
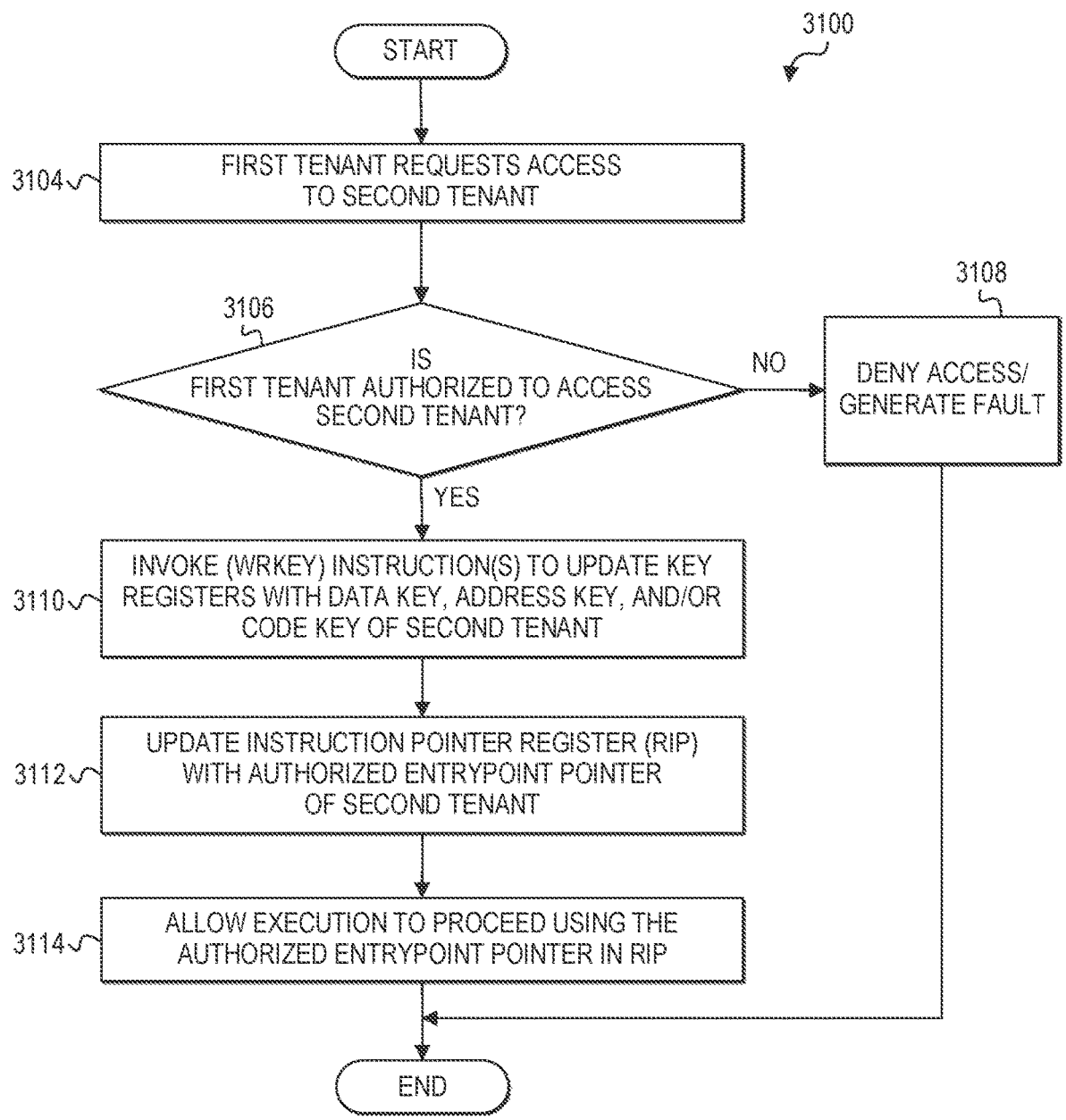
FIG. 31 is flow diagram illustrating another example process associated with transferring control from one tenant to another tenant in a multi-tenant environment using encoded pointers according to at least one embodiment.

FIG. 31 illustrates an example process 3100 associated with branching from a first tenant to a second tenant in a multi-tenant environment (e.g., 2500). Portions of the process 3100 may be executed by hardware, firmware, and/or software of a computing device (e.g., by executing a trusted runtime). In some scenarios, a processor (e.g., 102) with one or more cores of a computing device (e.g., 100) may run a trusted runtime (e.g., 2530), which manages multiple tenants (e.g., tenant A 2520A, tenant B 2520B).

At 3104, a first tenant requests access to a second tenant. Any suitable mechanism for requesting access to another tenant may be used. In one example, the first tenant may invoke a software application programming interface (API) to indicate that it wishes to invoke the second tenant. This API may be exported to the first tenant by the trusted runtime.

At 3106, the trusted runtime can determine whether the first tenant is authorized to access the second tenant. For example, if the first tenant provides a valid security handle of the second tenant to the trusted runtime, then this can indicate that the first tenant is authorized to access the second tenant. In another example, the trusted runtime checks a table that indicates authorizations for accesses among tenants. For example, the table may indicate all tenants that are authorized to access the second tenant. The table may also indicate all tenants that the first tenant is authorized to access.

If a determination is made that the first tenant is not authorized to access the second tenant, then at 3108, access may be denied by the trusted runtime and a response may be sent to the first tenant. A message may also be sent to alert the second tenant (or user of the second tenant) that an unauthorized access was attempted. In some implementations, a fault may be generated and the first tenant may be terminated.

If a determination is made that the first tenant is authorized to access the second tenant, then at 3110, the trusted runtime can invoke an instruction (e.g., WRKEY) to update key registers with a data key, a code key, and/or an address key of the second tenant. The address key, data key, and code key are known to the trusted runtime, as the trusted runtime created the keys when loading the second tenant (e.g., 3004). In addition, the trusted runtime also generated a cryptographically encoded pointer to a private memory region for the second tenant (e.g., 3014). Furthermore, the trusted runtime may have generated an entrypoint pointer for the second tenant when loading the second tenant. In one scenario, when cryptographically encoded pointers (e.g., 610, 2110, 2310) are used, an address key register may be updated with the second tenant's address key. A code key register and a data key register may be updated with the second tenant's code key and data key, respectively. In another scenario, if non-cryptographically encoded pointers (e.g., 2410) or unencrypted linear addresses are used, then an address key may not be needed and only the data key register and/or the code key register may be updated. Also, it should be noted that in some implementations, the data and/or the code may not be cryptographically bound to their pointers or otherwise encrypted. In these implementations, if the data is not cryptographically bound to its pointer, then the data key register may not need to be updated when switching tenants. Similarly, if the code is not cryptographically bound to its pointer, then the code key register may not need to be updated when switching tenants. In one embodiment, the instruction for updating a key register (e.g., WRKEY) is invoked for each key being updated.

At 3112, the trusted runtime can update the instruction pointer register (e.g., RIP) with the authorized entrypoint pointer of the second tenant, which effectively transfers the flow to the authorized entrypoint of the second tenant. At 3114, execution is allowed to proceed based on the linear address encoded in the authorized entrypoint pointer in the RIP. It should be noted that if the code is encrypted, and therefore the code key register is updated with the destination code key, then the next instruction fetched has to be encrypted using the destination code key.

Figure 32A:
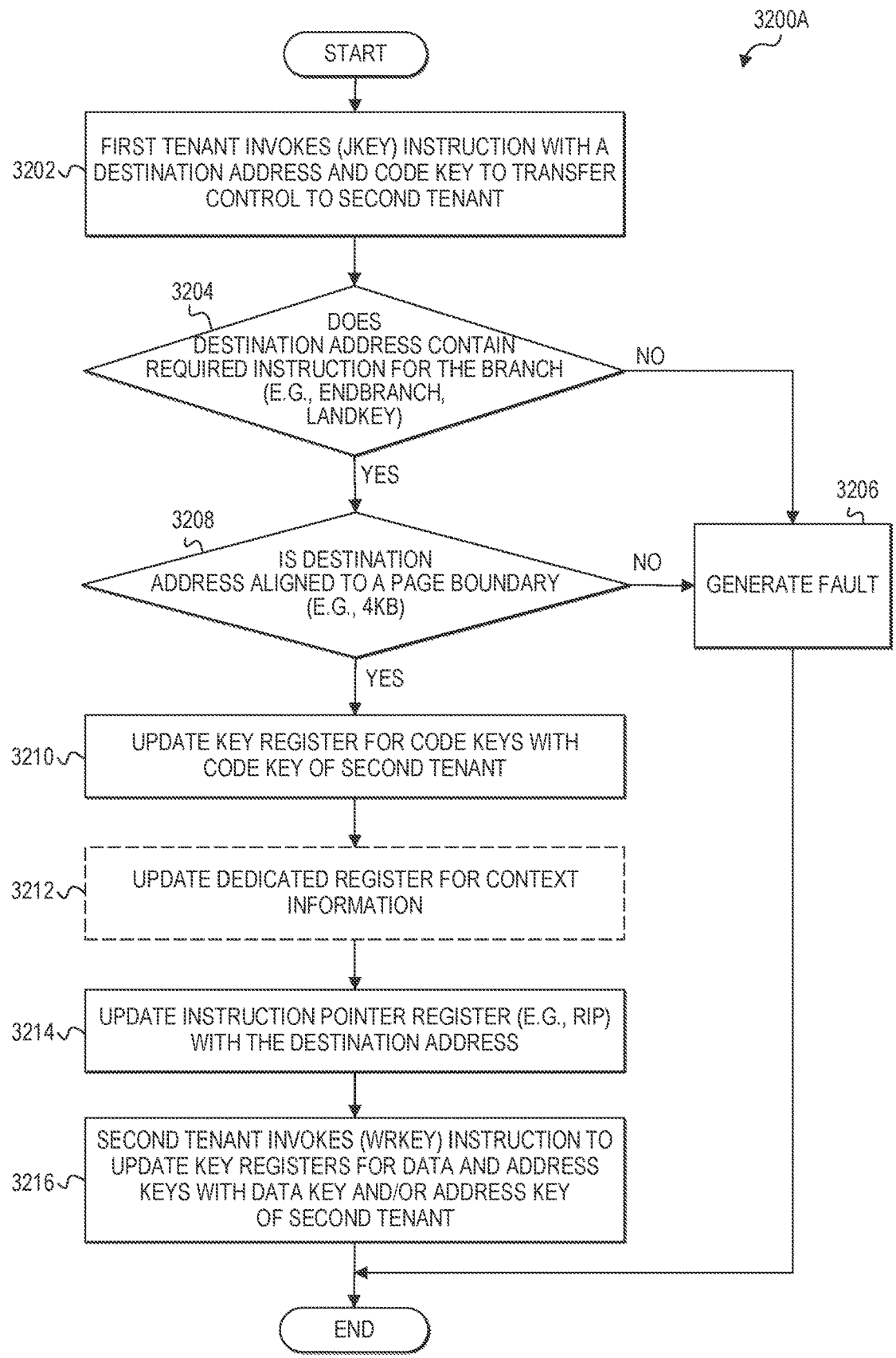
FIG. 32A is flow diagram illustrating another example process associated with transferring control from one tenant to another tenant in a multi-tenant environment using encoded pointers according to at least one embodiment.

FIG. 32A illustrates a process 3200A that may be associated with an example instruction (e.g., JKEY) to transfer control directly from one tenant to another tenant, from a tenant to a trusted runtime, or from a trusted runtime to a tenant, in a multi-tenant environment (e.g., 2500). Process 3200A is performed without the use of a security handle. Instead, in one embodiment, the code key for the destination tenant may be embedded in the code as an immediate operand of the instruction (e.g., JKEY). The code itself may be marked "execute-only" to protect the embedded keys. Another benefit of using separate code and data keys is that a data load is unable to correctly decrypt code and a data store is unable to correctly encrypt code, thus rendering code effectively execute-only even if code is not marked execute-only in page tables. Updating page table markings may introduce additional overhead. Alternative embodiments with keys too large to fit in a single immediate operand may embed different parts of a key into multiple immediate operands in execute-only code that are loaded into registers such that they can be combined into one or more register operands to JKEY. Portions of the process 3200A may be executed by hardware, firmware, and/or software of a computing device (e.g., by executing the branching tenant, the invoked tenant, and/or the trusted runtime). In some scenarios, a processor (e.g., 102) with one or more cores of a computing device (e.g., 100) may run a trusted runtime (e.g., 2530), which manages multiple tenants (e.g., tenant A 2520A, tenant B 2520B). Although the instruction associated with process 3200A can be used to transfer control among tenants and a trusted runtime, for simplicity, process 3200A is described with reference to transferring control only between a first (originating) tenant and a second (destination) tenant. It should be understood that the concepts are also applicable to transferring control between a tenant and a trusted runtime.

In at least one embodiment, if a first tenant is authorized to access a second tenant, then a code key for the second tenant and a destination address representing an authorized entrypoint of the second tenant may be embedded in the code of the first tenant to enable the first tenant to access the second tenant at its authorized entrypoint. For example, in a branching/jumping instruction such as JKEY, the second tenant's code key may be embedded as an immediate operand. A register operand may contain the second tenant's destination address. The destination address may be an unencrypted linear address of the authorized entrypoint or an encoded pointer to the authorized entrypoint. The encoded pointer may be cryptographically encoded (e.g., 610, 2110, 2310) or non-cryptographically encoded (e.g., 2410). Also, if the destination address is embodied as a cryptographically encoded pointer that is generated using external context information (e.g., 610, 2110, some variations of 2310), then the external context information may be embedded as an immediate operand of the JKEY instruction or may be accessible via a context table in memory. The code pages may be marked as "execute only" to protect the code key.

At 3202, the first tenant invokes an instruction (e.g., JKEY) to transfer control to the second tenant at its authorized entrypoint. The instruction may include operands for a destination address and a code key for the second tenant. The instruction may also include an operand for context information in some embodiments. If the destination address is a cryptographically encoded pointer, then it may be decoded to a linear address as shown in, for example, FIG. 21. In this scenario, the JKEY instruction may accept an address key to enable the decoding, which includes decryption of the encrypted address slice. In further embodiments, the JKEY instruction may also accept a data key so that neither the address key nor the data key needs to be loaded in the destination tenant using WRKEY.

At 3204, a check is performed to determine whether the destination address contains an ENDBRANCH instruction. In at least one embodiment, the JKEY instruction is required to land on an ENDBRANCH instruction (or a variation of the ENDBRANCH instruction such as ENDBR64, etc.) in order to limit the entrypoints that one tenant (e.g., the first tenant) can use when invoking another tenant (e.g., the second tenant). If the destination address does not contain an ENDBRANCH instruction, then at 3206 a fault may be generated.

If the destination address does contain an ENDBRANCH instruction, then at 3208, another check is performed to determine whether the destination address is aligned to a page boundary (e.g., 4 KB). This prevents the JKEY instruction from landing on ENDBRANCH instructions that are not at the beginning of a page. If the ENDBRANCH instruction is not aligned to a page boundary, then a fault may be generated at 3206.

Otherwise, if the ENDBRANCH instruction is aligned with a page boundary, then at 3210, the key register for code keys is updated with the code key of the second tenant. In at least one embodiment, the key register is updated with the code key embedded as an immediate operand of the JKEY instruction. It should be noted that if the second tenant's code is not cryptographically bound to its pointers or otherwise encrypted, then the code key register may not need to be updated.

At 3212, a dedicated register for context information, which is associated with the instruction pointer register (e.g., RIP), may be updated depending on the encoding (or lack of encoding) of the destination address. If the destination address is a pointer that is cryptographically encoded based at least in part on external context information (i.e., context information not encoded in the pointer), then at 3212, the dedicated register may be updated with a context value representing the external context information for the pointer. The context value representing the external context information may be embedded in the instruction as an immediate operand. Alternatively, the context value may be contained in a pointer context table in memory. In one or more embodiments, the pointer context table may be created such that it is accessible by all tenants that share pointers in a multi-tenant environment. In other embodiments, however, separate pointer context tables may be created for different tenants. If the authorized entrypoint pointer is cryptographically encoded with context information encoded in the pointer but not external to the pointer (e.g., some embodiments of 2310), or if the authorized entrypoint pointer is non-cryptographically encoded (e.g., 2410), then the dedicated register may not be updated with context information at 3212. Similarly, if the authorized entrypoint pointer is an unencrypted (plaintext) linear address, then the dedicated register may not be updated with external context information at 3212.

At 3214, the instruction pointer register (e.g., RIP) is updated with the destination address. In at least one embodiment, the instruction pointer register is updated with the destination address in a register operand of the JKEY instruction. If the destination address is a cryptographically encoded pointer, then it may be decoded to a linear address as shown in, for example, FIG. 21 or 23. The control is then effectively transferred from the first tenant to the second tenant.

At 3216, once control has been transferred to the second tenant, the second tenant invokes an instruction (e.g., WRKEY) to update data and/or address key registers with a data key and/or an address key of the second tenant. In one scenario, when cryptographically encoded pointers (e.g., 610, 2110, 2310) are used, both the address key register and the data key register may be updated with the second tenant's address key and data key, respectively. In another scenario if non-cryptographically encoded pointers (e.g., 2410) or unencrypted linear addresses are used, then an address key may not be needed and only the data key register may be updated. Also, it should be noted that in some implementations, the data may not be cryptographically bound to its pointer or otherwise encrypted. In these implementations, a data key register may not need to be updated when switching tenants. In at least one embodiment, the instruction for updating a key register (e.g., WRKEY) is performed for each key that is updated. At the completion of process 3200A, all of the keys (e.g., code, data, and/or address keys) and possibly external context information that are needed to execute the second tenant's accessible code for authorized tenants are updated to enable successful execution of the accessible code.

It should be noted that, in another embodiment, a new instruction may be defined and used instead of ENDBRANCH as a required instruction contained in the memory location of the destination address in the JKEY instruction. For example, this new instruction could be named LANDKEY as previously described herein.

Figure 32B:
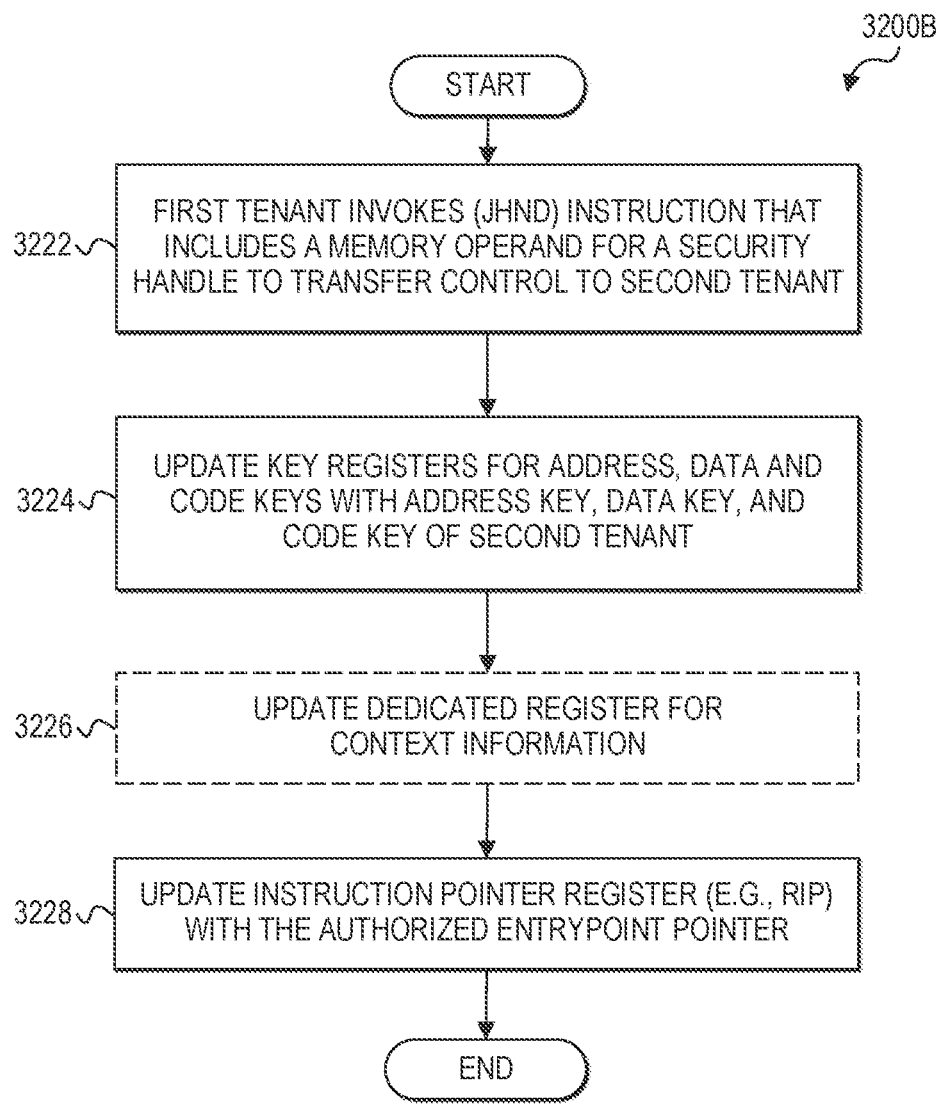
FIG. 32B is flow diagram illustrating another example process associated with transferring control from one tenant to another tenant in a multi-tenant environment using encoded pointers according to at least one embodiment.

FIG. 32B illustrates a process 3200B that may be associated with an example instruction (e.g., JHND) to transfer control directly from one tenant to another tenant, from a tenant to a trusted runtime, or from a trusted runtime to a tenant, in a multi-tenant environment (e.g., 2500). Process 3200B is performed with the use of a security handle of a destination tenant. Keys stored in the security handle are wrapped (i.e., encrypted) for protection and loaded by the instruction to transfer control to the destination tenant. Portions of the process 3200B may be executed by hardware, firmware, and/or software of a computing device (e.g., by executing the branching tenant and/or the trusted runtime). In some scenarios, a processor (e.g., 102) with one or more cores of a computing device (e.g., 100) may run a trusted runtime (e.g., 2530), which manages multiple tenants (e.g., tenant A 2520A, tenant B 2520B). Although the instruction associated with process 3200B can be used to transfer control among tenants and a trusted runtime, for simplicity, process 3200B is described with reference to transferring control only between a first (originating) tenant and a second (destination) tenant. It should be understood that the concepts are also applicable to transferring control between a tenant and a trusted runtime.

In at least one embodiment, if a first tenant is authorized to access a second tenant, then a security handle (e.g., 2600) containing keys and a pointer for the second (destination) tenant may be stored in a private memory region of the first (originating) tenant. The security handle can include keys for decrypting and encrypting code of the second tenant, data of the second tenant, and/or addresses in cryptographically encoded pointers to a memory region of the second tenant. The memory region of the second tenant may be private or shared with tenants that are authorized to access the second tenant. The security handle can also include an authorized entrypoint pointer, which may be embodied as a cryptographically encoded pointer (e.g., 610, 2110, 2310), a non-cryptographic encoded pointer (e.g., 2410), or an unencrypted linear address. In one implementation, the security handle of the second tenant may be provided to the first tenant by a trusted runtime (e.g., 2530) during the loading of the first tenant for execution, or later if the second tenant indicates at a later time that the first tenant is authorized to access the second tenant. In one example implementation, upon determining that the first tenant is authorized to access the second tenant, the trusted runtime may store the second tenant's security handle in a private memory region of the first tenant.

At 3222, the first tenant invokes an instruction (e.g., JHND) to transfer control to the second tenant at its authorized entrypoint. The instruction may include a memory operand for the security handle. The instruction may also include an operand for context information in some embodiments.

At 3224, the key registers for address keys, data keys, and/or code keys are updated with the address key, data key, and/or code key, respectively, of the second tenant. In one scenario, when cryptographically encoded pointers (e.g., 610, 2110, 2310) are used, the address key register is updated with the second tenant's address key. In another scenario, if non-cryptographically encoded pointers (e.g., 2410) or unencrypted linear addresses are used, then an address key may not be needed when switching tenants. If the second tenant's data is cryptographically bound to its pointers or otherwise encrypted, then the data key register may be updated with the second tenant's data key. However, if the second tenant's data is not cryptographically bound to its pointers or otherwise encrypted, then the data key register may not need to be updated. Similarly, if the second tenant's code is cryptographically bound to its pointers or otherwise encrypted, then the code key register is updated with the second tenant's code key. However, if second tenant's code is not cryptographically bound to its pointers or otherwise encrypted, then the code key register may not need to be updated. The keys needed to switch to the second tenant can be retrieved from the security handle stored in memory. The security handle can be accessed using the memory operand in the instruction. The address, data, and code keys may be wrapped in the security handle and, therefore, appropriate unwrapping (or decryption) may be performed before the keys are loaded into the appropriate key registers.

At 3226, a dedicated register for context information, which is associated with the instruction pointer register (e.g., RIP), may be updated depending on the encoding (or lack of encoding) of the authorized entrypoint pointer stored in the security handle. If the authorized entrypoint pointer is cryptographically encoded based at least in part on external context information (i.e., context information not encoded in the pointer), then at 3226, the dedicated register may be updated with a context value representing the external context information for the pointer. The context value representing the external context information may be embedded in the instruction as an immediate operand. Alternatively, the context value may be contained in a pointer context table in memory. In one or more embodiments, the pointer context table may be created such that it is accessible by all tenants that share pointers in a multi-tenant environment. In other embodiments, however, separate pointer context tables may be created for different tenants. If the authorized entrypoint pointer is cryptographically encoded with context information encoded in the pointer but not external to the pointer (e.g., some embodiments of 2310), or if the authorized entrypoint pointer is non-cryptographically encoded (e.g., 2410), then the dedicated register may not be updated with context information at 3226. Similarly, if the authorized entrypoint pointer is an unencrypted (plaintext) linear address, then the dedicated register may not be updated with external context information at 3226.

At 3228, the instruction pointer register (e.g., RIP) is updated with the authorized entrypoint pointer. In at least one embodiment, the instruction pointer register is updated with the authorized entrypoint pointer retrieved from the security handle of the second tenant, which is stored in the private memory region of the first tenant. The authorized entrypoint pointer may not be wrapped. If the authorized entrypoint pointer is wrapped, however, then appropriate unwrapping (e.g., decrypting) may be performed before updating the instruction pointer register. If the destination address is a cryptographically encoded pointer, then it may be decoded to a linear address as shown in, for example, FIG. 21 or 23. The control is then effectively transferred from the first tenant to the second tenant. At the completion of process 3200B, all of the keys (e.g., code, data, and/or address keys) and possibly external context information that are needed to execute the second tenant's accessible code for authorized tenants are updated to enable successful execution of the accessible code.

Many of these embodiments provide benefits relative to past approaches to enforcing isolation between tenants and permitting controlled switching between tenants. For embodiments disclosed herein, it is not necessary to define new modes, privilege levels, or code segments with special privileges occupied by a trusted runtime to execute instructions that generate security handles or update keys. The necessity of such provisions in past approaches increased system complexity and overhead. It is difficult for a tenant to guess key values that will permit unauthorized access to another tenant in many of the embodiments by maliciously executing instructions to generate unauthorized security handles or to perform unauthorized key updates. Thus, the trusted runtime disclosed herein is uniquely able to enforce isolation and impose controls on control transfers between tenants due to its knowledge of the correct keys for each tenant.

Figure 33:
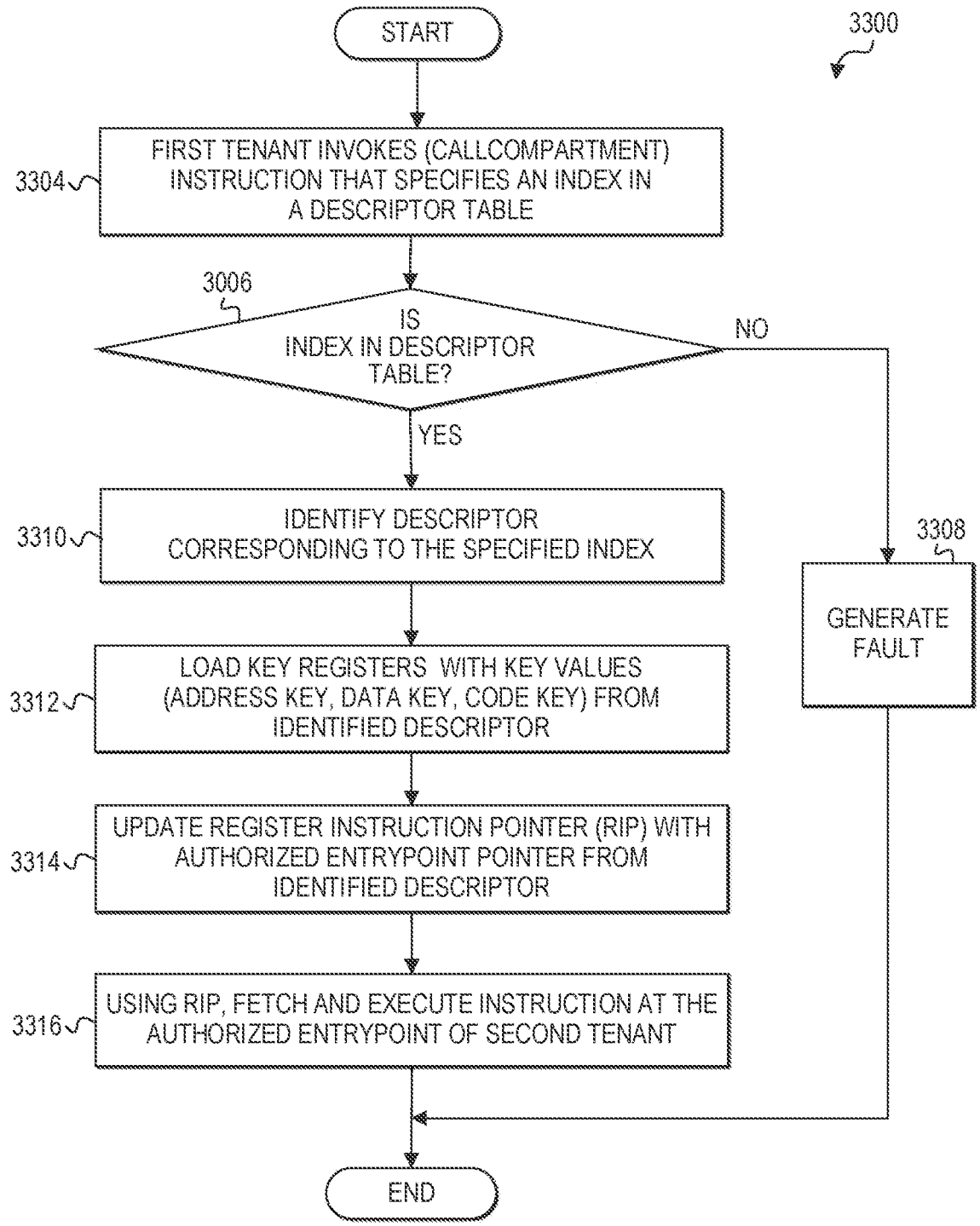
FIG. 33 is a flow diagram illustrating an example process associated with transferring control from one tenant to another tenant in a multi-tenant environment using pointers according to at least one embodiment.

FIG. 33 illustrates a process 3300 that may be associated with an example instruction (e.g., CALLCOMPARTMENT) to transfer control directly from one tenant to another tenant, from a tenant to a trusted runtime, or from a trusted runtime to a tenant, in a multi-tenant environment (e.g., 2500). Portions of the process 3300 may be executed by hardware, firmware, and/or software of a computing device (e.g., by executing the branching tenant, the invoked tenant, and/or the trusted runtime). In some scenarios, a processor (e.g., 102) with one or more cores of a computing device (e.g., 100) may run a trusted runtime (e.g., 2530), which manages multiple tenants (e.g., tenant A 2520A, tenant B 2520B). Although the instruction associated with process 3300 can be used to transfer control among tenants and a trusted runtime, for simplicity, process 3300 is described with reference to transferring control only between a first tenant and a second tenant. It should be understood that the concepts are also applicable to transferring control between a tenant and a trusted runtime.

Process 3300 uses a new call gate to effect the transfer of control from a first tenant to a second tenant and update key registers with data, code, and address keys needed by the second tenant. At 3304, the first tenant invokes an instruction (e.g., CALLCOMPARTMENT) to transfer control to the second tenant at the authorized entrypoint. The instruction specifies an index in a descriptor table. The descriptor table is a table in memory that contains indexed descriptors. A descriptor corresponding to a particular tenant can include an authorized entrypoint pointer to the particular tenant, and key values of the particular tenant (e.g., address key, data key, code key).

At 3006, the table is searched for the index specified in the CALLCOMPARTMENT instruction. If the index is not found, then a fault may be generated at 3308. If the index is found, then at 3310, the descriptor corresponding to the specified index is identified.

At 3312, the key registers are loaded with the key values (e.g., address key, data key, code key) of the second tenant, which are obtained from the identified descriptor. At 3314, the register instruction pointer (RIP) is updated with the authorized entrypoint pointer (e.g., cryptographically encoded pointer) from the identified descriptor.

At 3316, the RIP can be used to fetch and execute the instruction at the authorized entrypoint of the second tenant. The cryptographically encoded pointer stored in the RIP can be decoded based on the updated address key of the second tenant. Context information to be used in a tweak may be stored in a dedicated register for fetch operations. Once a linear address for the authorized entrypoint is obtained, the code at the linear address can be fetched and decrypted based on the updated code key of the second tenant. Context information to be used in a tweak may be stored in the dedicated register for fetch operations. Once the code is decrypted, execution of the second tenant at its authorized entrypoint can proceed.

Figure 34:
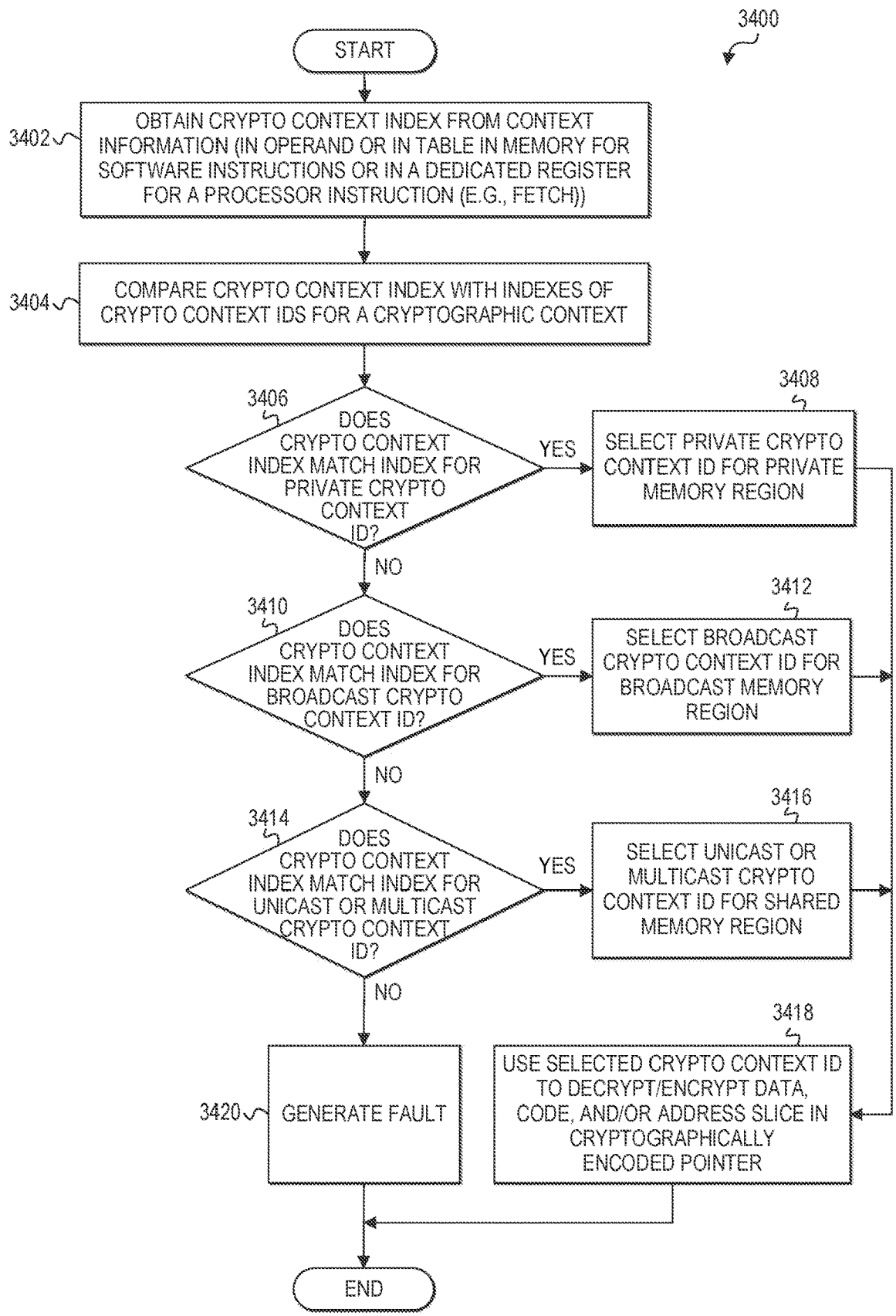
FIG. 34 is a flow diagram illustrating an example process associated with compiling tenant code using cryptographically encoded pointers for accessing memory and code according to at least one embodiment.

FIG. 34 illustrates an example process 3400 associated with selecting a crypto context ID in a multi-tenant environment (e.g., 2500) in which crypto context IDs are switched for different cryptographic contexts. Portions of the process 3400 may be executed by hardware, firmware, and/or software of a computing device (e.g., by executing a trusted runtime or a tenant). In some scenarios, a processor (e.g., 102) with one or more cores of a computing device (e.g., 100) may run a trusted runtime (e.g., 2520), which manages multiple tenants (e.g., tenant A 2520A, tenant B 2520B). Process 3400, or variations thereof, may be performed during the execution of an instruction in which crypto context ID for a particular memory region is used to form all or part of a tweak for decrypting/encrypting data, code or at least a portion of a linear address in a pointer to data or code.

At 3402, a crypto context index is obtained from context information. For some software instructions that access data with a cryptographically encoded pointer, the crypto context index may be obtained statically via an operand containing other context information, which may also be used as at least part of the tweak. For other software instructions that access data with a cryptographically encoded pointer, the crypto context index may be obtained dynamically, for example, from a table in memory (e.g., pointer context table 121). For a processor instruction (e.g., fetch) that accesses code with a cryptographically encoded pointer, the crypto context index may be obtained from a dedicated register associated with the register instruction pointer.

At 3404, the crypto context index is compared to indexes of crypto context IDs for a cryptographic contexts (or memory regions) in the multi-tenant environment.

At 3406, a determination is made as to whether the crypto context index matches (or otherwise corresponds to) an index for a private crypto context ID (e.g., private memory region for a single tenant), which may be stored in a register. If the crypto context index does match the index for the private crypto context ID, then at 3408, the private crypto context ID for the private memory region is selected. At 3418, the selected crypto context ID for the private memory region is used to decrypt/encrypt code, data, or an encrypted slice of an address in a cryptographically encoded pointer, depending on the particular instruction or processor pipeline.

If it is determined at 3406, that the crypto context index does not match (or otherwise correspond to) an index for a private crypto context ID, then at 3410 a determination is made as to whether the crypto context index matches (or otherwise corresponds to) an index for a broadcast crypto context ID (e.g., broadcast memory region for all tenants), which may be stored in a register. If the crypto context index does match the index for the broadcast crypto context ID, then at 3412, the broadcast crypto context ID for the broadcast memory region is selected. At 3418, the selected crypto context ID for the broadcast memory region is used to decrypt/encrypt code, data and/or an encrypted slice of an address in a cryptographically encoded pointer, depending on the particular instruction or processor pipeline.

If it is determined at 3410, that the crypto context index does not match (or otherwise correspond to) an index for a broadcast crypto context ID, then at 3414 a determination is made as to whether the crypto context index matches (or otherwise corresponds to) an index for a unicast or multicast crypto context ID (e.g., shared memory region for subset of tenants), which may be stored in a table in memory, in one example. If the crypto context index does match the index for the unicast or multicast crypto context ID, then at 3416, the unicast or multicast crypto context ID for the shared memory region is selected. At 3418, the selected crypto context ID for the shared memory region is used to decrypt/encrypt code, data and/or an encrypted slice of an address in a cryptographically encoded pointer, depending on the particular instruction or processor pipeline.

If it is determined at 3414, that the crypto context index does not match (or otherwise correspond to) an index for a unicast or multicast crypto context ID, then no indexes match the crypto context index and a fault is generated at 3420. However, if the crypto context index was matched at 3406, 3410, or 3414, then the selected crypto context ID is used at 3418 for the appropriate encryptions/decryptions.

Hidden In-Line Metadata

Hidden in-line metadata (HIM) may be combined with cryptographically encoded pointers in EBA format to eliminate the need for performing dynamic lookups to centralized context tables just to retrieve size and type information. However, if the object is stored outside of the region represented by the default upper address bits stored in the STATIC_REGION_BASE register, then a look-up to a centralized context table may still be needed.

By requiring objects to be aligned to a cacheline boundary and allocating enough storage within the cacheline to hold the size and type information, the size and type context can be loaded for each access without requiring any additional cacheline loads. In this approach, the size and type would be checked directly rather than being incorporated as a tweak for encrypting the base address slice. Only the permission bits would still be incorporated as an address tweak. Thus, pointers with different permissions can reference the same underlying storage since they are not incorporated as a data tweak. The size and type information may no longer be supplied by software as part of a static context even if known statically, since the size and type information would still need to be compared against the hidden inline metadata to ensure that they match and have not been forged by the software.

Permission bits could also be stored as hidden inline metadata rather than being incorporated into the tweak for encrypting the base address slice. However, it is very common for some portions of programs to use read-write pointers to data and other portions of programs to use read-only pointers to that same data, so embedding that as hidden inline metadata associated with the object storage may result in a mismatch between the security policy expressed in the program source code versus the policy enforced by hardware.

The size stored as hidden inline metadata should be relative to the current cacheline to avoid needing to look up the beginning of the object, which may introduce additional overhead. One possible compact encoding is to indicate the amount that the object extends beyond the current cacheline in increments of cachelines. Alternatively, the length could be specified with a finer-grained unit to support more precise bounds checking, e.g. the number of bytes that the object extends past the beginning of the current cacheline.

Encrypted base address slices can be bound to object storage to mitigate dangling and forged pointer vulnerabilities using hidden in-line metadata. In particular, an alternative to binding data encryption to a portion of the pointer such as the tag or encrypted base address slice is to store a copy of the bound portion of the pointer as hidden inline metadata. However, this may not mitigate physical attacks as effectively as encryption.

To provide fine-grained bounds checking with space-efficient HIM storage, a rotating sub-slice of the EBA slice could be stored as hidden inline metadata. For example, to support a 16-byte bounds granularity with 8 bits of hidden inline metadata per 16-byte data chunk, 8 bits of the EBA slice could be selected to be stored as hidden inline metadata based on bits 4 and 5 of the pointer. This can be expressed as a set of formulae for selecting the hidden inline metadata to be stored for a given chunk of data:

EBA=pointer[56:25]
slice_idx=pointer[5:4]
HIM metadata=EBA[(slice_idx+1)*8-1):(slice_idx*8)]

The tag slice in the pointer can be incorporated as context into the address tweak used to encrypt and decrypt the base address slice.

Example Architectures

Figure 35:
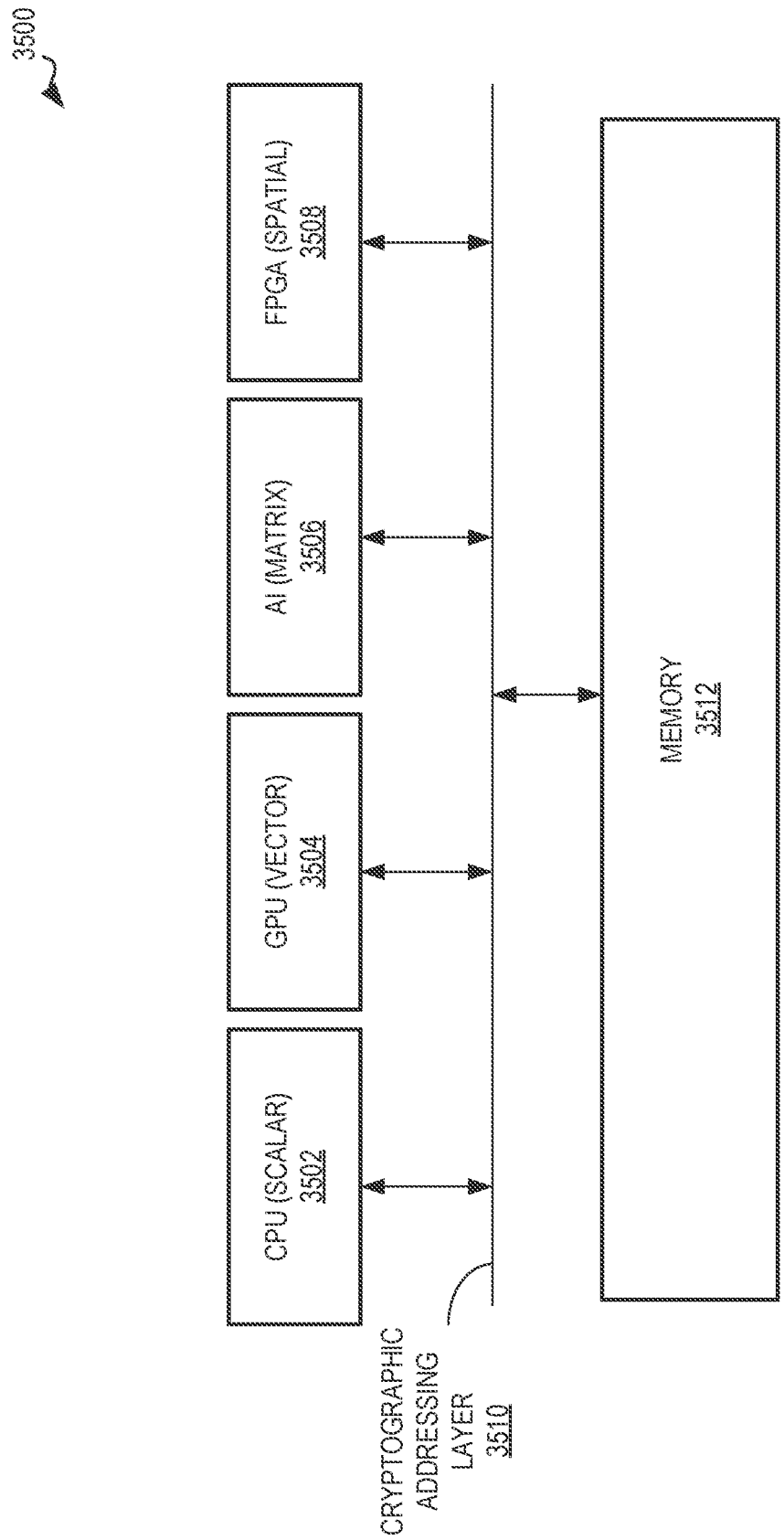
FIG. 35 is a block diagram illustrating an example cryptographic computing environment according to at least one embodiment.

FIG. 35 is a block diagram illustrating an example cryptographic computing environment 3500 according to at least one embodiment. In the example shown, a cryptographic addressing layer 3510 extends across the example compute vectors central processing unit (CPU) 3502, graphical processing unit (GPU) 3504, artificial intelligence (AI) 3506, and field programmable gate array (FPGA) 3508. For example, the CPU 3502 and GPU 3504 may share the same virtual address translation for data stored in memory 3512, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 3512 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 36:
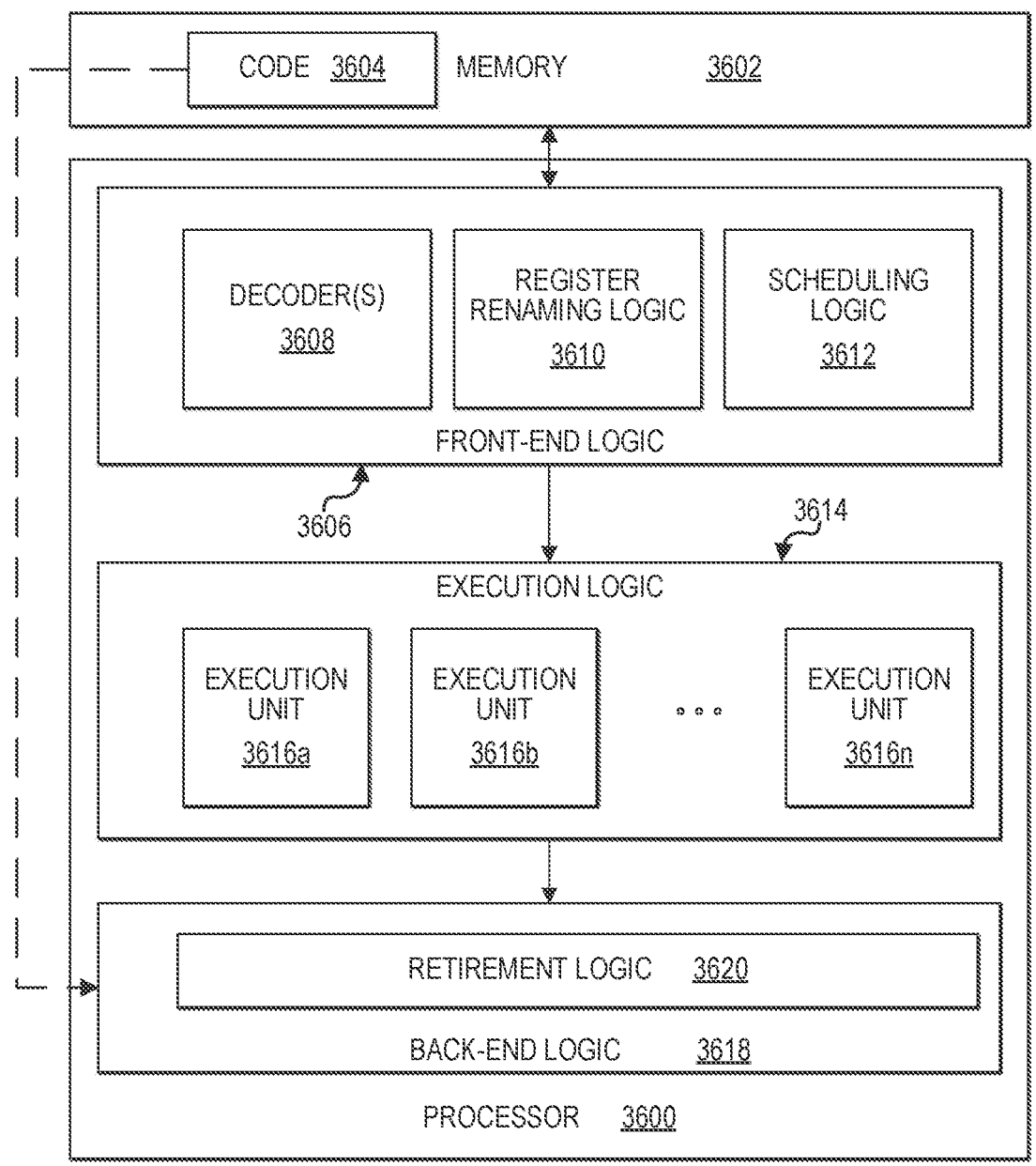
FIG. 36 is a block diagram illustrating an example processor according to at least one embodiment.

FIGS. 34-36 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 34-36.

FIG. 36 is an example illustration of a processor according to an embodiment. Processor 3600 is an example of a type of hardware device that can be used in connection with the implementations shown and described herein (e.g., processor 102). Processor 3600 may be any type of processor, such as a microprocessor, an embedded processor, a digital signal processor (DSP), a network processor, a multi-core processor, a single core processor, or other device to execute code. Although only one processor 3600 is illustrated in FIG. 36, a processing element may alternatively include more than one of processor 3600 illustrated in FIG. 36. Processor 3600 may be a single-threaded core or, for at least one embodiment, the processor 3600 may be multi-threaded in that it may include more than one hardware thread context (or "logical processor") per core.

FIG. 36 also illustrates a memory 3602 coupled to processor 3600 in accordance with an embodiment. Memory 3602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 3600 can execute any type of instructions associated with algorithms, processes, or operations detailed herein. Generally, processor 3600 can transform an element or an article (e.g., data) from one state or thing to another state or thing.

Code 3604, which may be one or more instructions to be executed by processor 3600, may be stored in memory 3602, or may be stored in software, hardware, firmware, or any suitable combination thereof, or in any other internal or external component, device, element, or object where appropriate and based on particular needs. In one example, processor 3600 can follow a program sequence of instructions indicated by code 3604. Each instruction enters a front-end logic 3606 and is processed by one or more decoders 3608. The decoder may generate, as its output, a micro operation such as a fixed width micro operation in a predefined format, or may generate other instructions, microinstructions, or control signals that reflect the original code instruction. Front-end logic 3606 also includes register renaming logic 3610 and scheduling logic 3612, which generally allocate resources and queue the operation corresponding to the instruction for execution.

Processor 3600 can also include execution logic 3614 having a set of execution units 3616a, 3616b, 3616n, etc. Some embodiments may include a number of execution units dedicated to specific functions or sets of functions. Other embodiments may include only one execution unit or one execution unit that can perform a particular function. Execution logic 3614 performs the operations specified by code instructions.

After completion of execution of the operations specified by the code instructions, back-end logic 3618 can retire the instructions of code 3604. In one embodiment, processor 3600 allows out of order execution but requires in order retirement of instructions. Retirement logic 3620 may take a variety of known forms (e.g., re-order buffers or the like). In this manner, processor 3600 is transformed during execution of code 3604, at least in terms of the output generated by the decoder, hardware registers and tables utilized by register renaming logic 3610, and any registers (not shown) modified by execution logic 3614.

Although not shown in FIG. 36, a processing element may include other elements on a chip with processor 3600. For example, a processing element may include memory control logic along with processor 3600. The processing element may include I/O control logic and/or may include I/O control logic integrated with memory control logic. The processing element may also include one or more caches. In some embodiments, non-volatile memory (such as flash memory or fuses) may also be included on the chip with processor 3600.

Figure 37:
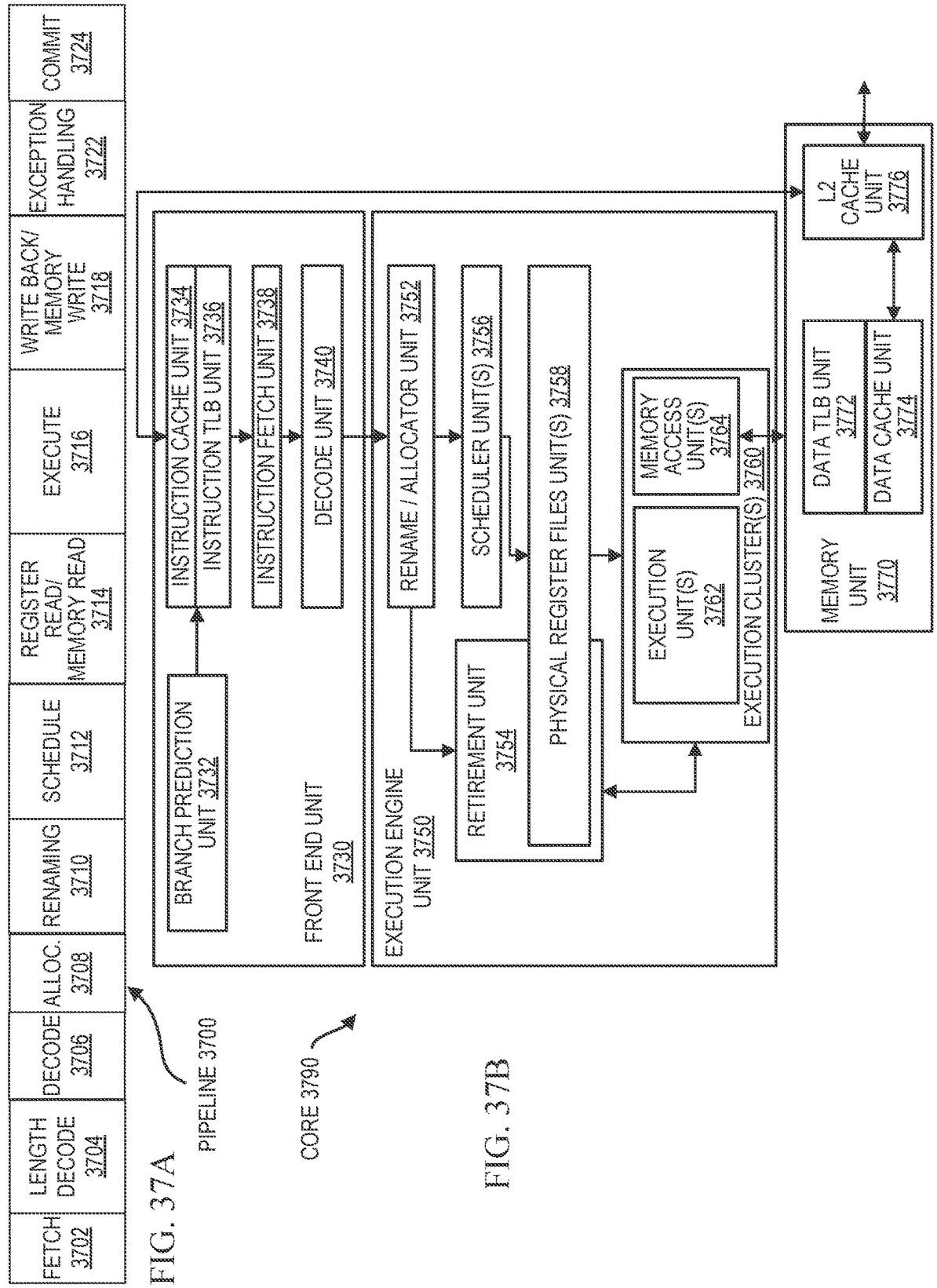
FIG. 37A is a block diagram illustrating both an exemplary in-order pipeline and an exemplary register renaming, out-of-order issue/execution pipeline in accordance with certain embodiments.
FIG. 37B is a block diagram illustrating both an exemplary embodiment of an in-order architecture core and an exemplary register renaming, out-of-order issue/execution architecture core to be included in a processor in accordance with certain embodiments.

FIG. 37A is a block diagram illustrating both an exemplary in-order pipeline and an exemplary register renaming, out-of-order issue/execution pipeline according to one or more embodiments of this disclosure. FIG. 37B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 37A-37B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 37A, a processor pipeline 3700 includes a fetch stage 3702, a length decode stage 3704, a decode stage 3706, an allocation stage 3708, a renaming stage 3710, a schedule (also known as a dispatch or issue) stage 3712, a register read/memory read stage 3714, an execute stage 3716, a write back/memory write stage 3718, an exception handling stage 3722, and a commit stage 3724.

FIG. 37B shows processor core 3790 including a front end unit 3730 coupled to an execution engine unit 3750, and both are coupled to a memory unit 3770. Processor core 3790 and memory unit 3770 are examples of the types of hardware that can be used in connection with the implementations shown and described herein (e.g., processor 102, memory 120). The core 3790 may be a reduced instruction set computing (RISC) core, a complex instruction set computing (CISC) core, a very long instruction word (VLIW) core, or a hybrid or alternative core type. As yet another option, the core 3790 may be a special-purpose core, such as, for example, a network or communication core, compression engine, coprocessor core, general purpose computing graphics processing unit (GPGPU) core, graphics core, or the like. In addition, processor core 3790 and its components represent example architecture that could be used to implement logical processors and their respective components.

The front end unit 3730 includes a branch prediction unit 3732 coupled to an instruction cache unit 3734, which is coupled to an instruction translation lookaside buffer (TLB) unit 3736, which is coupled to an instruction fetch unit 3738, which is coupled to a decode unit 3740. The decode unit 3740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 3740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3790 includes a microcode ROM or other medium that stores microcode for certain macroinstructions (e.g., in decode unit 3740 or otherwise within the front end unit 3730). The decode unit 3740 is coupled to a rename/allocator unit 3752 in the execution engine unit 3750.

The execution engine unit 3750 includes the rename/allocator unit 3752 coupled to a retirement unit 3754 and a set of one or more scheduler unit(s) 3756. The scheduler unit(s) 3756 represents any number of different schedulers, including reservations stations, central instruction window, etc. The scheduler unit(s) 3756 is coupled to the physical register file(s) unit(s) 3758. Each of the physical register file(s) units 3758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3758 comprises a vector registers unit, a write mask registers unit, and a scalar registers unit. These register units may provide architectural vector registers, vector mask registers, and general purpose registers (GPRs). In at least some embodiments described herein, register units 3758 are examples of the types of hardware that can be used in connection with the implementations shown and described herein (e.g., registers 112). The physical register file(s) unit(s) 3758 is overlapped by the retirement unit 3754 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 3754 and the physical register file(s) unit(s) 3758 are coupled to the execution cluster(s) 3760. The execution cluster(s) 3760 includes a set of one or more execution units 3762 and a set of one or more memory access units 3764. The execution units 3762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 3762 may also include an address generation unit (e.g., 822) to calculate addresses used by the core to access main memory (e.g., memory unit 3770) and a page miss handler (PMH) (e.g., 826).

The scheduler unit(s) 3756, physical register file(s) unit(s) 3758, and execution cluster(s) 3760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3764). It should also be understood that where separate pipelines are used, one or more of these pipelines may be out-of-order issue/execution and the rest in-order.

The set of memory access units 3764 is coupled to the memory unit 3770, which includes a data TLB unit 3772 coupled to a data cache unit 3774 coupled to a level 2 (L2) cache unit 3776. In one exemplary embodiment, the memory access units 3764 may include a load unit, a store address unit, and a store data unit, each of which is coupled to the data TLB unit 3772 in the memory unit 3770. The instruction cache unit 3734 is further coupled to a level 2 (L2) cache unit 3776 in the memory unit 3770. The L2 cache unit 3776 is coupled to one or more other levels of cache and eventually to a main memory. In addition, a page miss handler (e.g., page miss handler 826) may also be included in core 3790 to look up an address mapping in a page table if no match is found in the data TLB unit 3772.

By way of example, the exemplary register renaming, out-of-order issue/execution core architecture may implement the pipeline 3700 as follows: 1) the instruction fetch 3738 performs the fetch and length decoding stages 3702 and 3704; 2) the decode unit 3740 performs the decode stage 3706; 3) the rename/allocator unit 3752 performs the allocation stage 3708 and renaming stage 3710; 4) the scheduler unit(s) 3756 performs the schedule stage 3712; 5) the physical register file(s) unit(s) 3758 and the memory unit 3770 perform the register read/memory read stage 3714; the execution cluster 3760 perform the execute stage 3716; 6) the memory unit 3770 and the physical register file(s) unit(s) 3758 perform the write back/memory write stage 3718; 7)

various units may be involved in the exception handling stage 3722; and 8) the retirement unit 3754 and the physical register file(s) unit(s) 3758 perform the commit stage 3724.

The core 3790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 3734/3774 and a shared L2 cache unit 3776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 38:
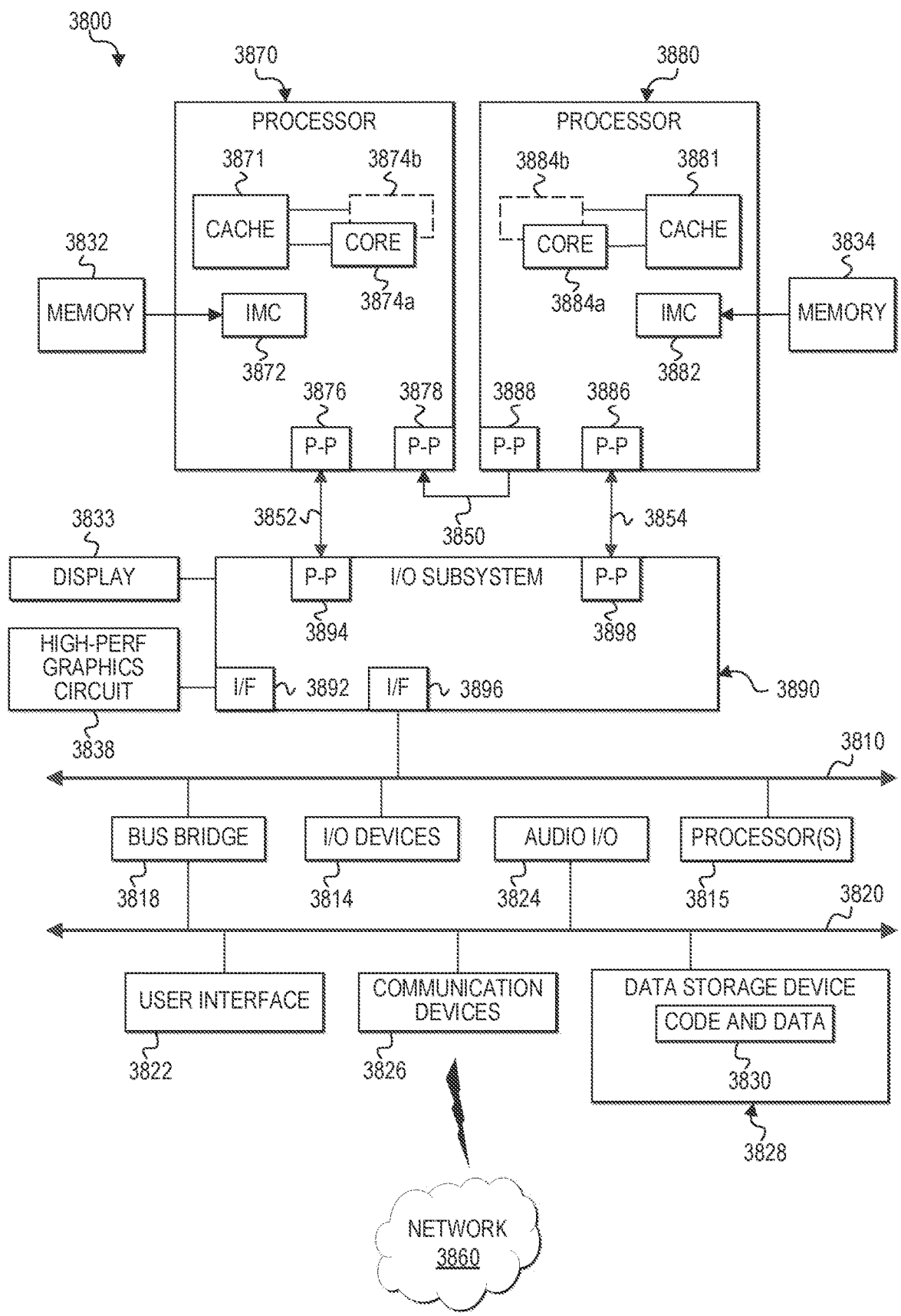
FIG. 38 is a block diagram of an example computer architecture according to at least one embodiment.

FIG. 38 illustrates a computing system 3800 that is arranged in a point-to-point (PtP) configuration according to an embodiment. In particular, FIG. 38 shows a system where processors, memory, and input/output devices are interconnected by a number of point-to-point interfaces. Generally, one or more of the computing systems or computing devices described (e.g., computing device 100) herein may be configured in the same or similar manner as computing system 3800.

Processors 3870 and 3880 may be implemented as single core processors 3874*a* and 3884*a* or multi-core processors 3874*a*-3874*b* and 3884*a*-3884*b*. Processors 3870 and 3880 may each include a cache 3871 and 3881 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 3800. Moreover, processors 3870 and 3880 are examples of the types of hardware that can be used in connection with the implementations shown and described herein (e.g., processor 102).

Processors 3870 and 3880 may also each include integrated memory controller logic (MC) 3872 and 3882 to communicate with memory elements 3832 and 3834, which may be portions of main memory locally attached to the respective processors. In alternative embodiments, memory controller logic 3872 and 3882 may be discrete logic separate from processors 3870 and 3880. Memory elements 3832 and/or 3834 may store various data to be used by processors 3870 and 3880 in achieving operations and functionality outlined herein.

Processors 3870 and 3880 may be any type of processor, such as those discussed in connection with other figures. Processors 3870 and 3880 may exchange data via a point-to-point (PtP) interface 3850 using point-to-point interface circuits 3878 and 3888, respectively. Processors 3870 and 3880 may each exchange data with an input/output (I/O) subsystem 3890 via individual point-to-point interfaces 3852 and 3854 using point-to-point interface circuits 3876, 3886, 3894, and 3898. I/O subsystem 3890 may also exchange data with a high-performance graphics circuit 3838 via a high-performance graphics interface 3839, using an interface circuit 3892, which could be a PtP interface circuit. In one embodiment, the high-performance graphics circuit 3838 is a special-purpose processor, such as, for example, a high-throughput MIC processor, a network or communication processor, compression engine, graphics processor, GPGPU, embedded processor, or the like. I/O subsystem 3890 may also communicate with a display 3833 for displaying data that is viewable by a human user. In alternative embodiments, any or all of the PtP links illustrated in FIG. 38 could be implemented as a multi-drop bus rather than a PtP link.

I/O subsystem 3890 may be in communication with a bus 3810 via an interface circuit 3896. Bus 3810 may have one or more devices that communicate over it, such as a bus bridge 3818, I/O devices 3814, and one or more other processors 3815. Via a bus 3820, bus bridge 3818 may be in communication with other devices such as a user interface 3822 (such as a keyboard, mouse, touchscreen, or other input devices), communication devices 3826 (such as modems, network interface devices, or other types of communication devices that may communicate through a computer network 3860), audio I/O devices 3824, and/or a data storage device 3828. Data storage device 3828 may store code and data 3830, which may be executed by processors 3870 and/or 3880. In alternative embodiments, any portions of the bus architectures could be implemented with one or more PtP links.

Program code, such as code 3830, may be applied to input instructions to perform the functions described herein and generate output information. The output information may be applied to one or more output devices, in known fashion. For purposes of this application, a processing system may be part of computing system 3800 and includes any system that has a processor, such as, for example; a digital signal processor (DSP), a microcontroller, an application specific integrated circuit (ASIC), or a microprocessor.

The program code (e.g., 3830) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 38 is a schematic illustration of an embodiment of a computing system that may be utilized to implement various embodiments discussed herein. It will be appreciated that various components of the system depicted in FIG. 38 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 39:
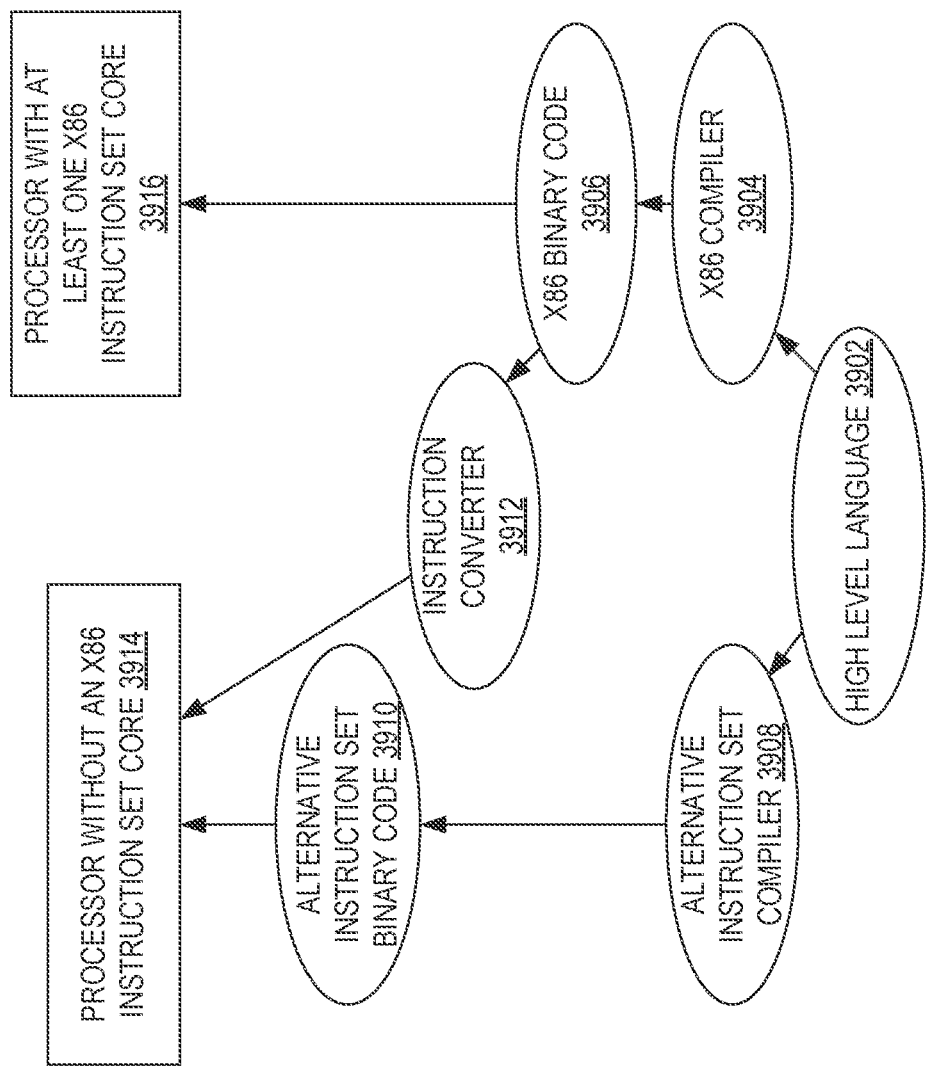
FIG. 39 is a block diagram contrasting the use of a software instruction converter to convert binary instructions in a source instruction set to binary instructions in a target instruction set according to embodiments of the present disclosure.

FIG. 39 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 39 shows a program in a high level language 3902 may be compiled using an x86 compiler 3904 to generate x86 binary code 3906 that may be natively executed by a processor with at least one x86 instruction set core 3916. The processor with at least one x86 instruction set core 3916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3904 represents a compiler that is operable to generate x86 binary code 3906 (e.g., object code) that can, with or without additional linkage processing, be executed on the processor with at least one x86 instruction set core 3916. Similarly, FIG. 39 shows the program in the high level language 3902 may be compiled using an alternative instruction set compiler 3908 to generate alternative instruction set binary code 3910 that may be natively executed by a processor without at least one x86 instruction set core 3914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3912 is used to convert the x86 binary code 3906 into code that may be natively executed by the processor without an x86 instruction set core 3914. This converted code is not likely to be the same as the alternative instruction set binary code 3910 because an instruction converter capable of this is difficult to make; however, the converted code will accomplish the general operation and be made up of instructions from the alternative instruction set. Thus, the instruction converter 3912 represents software, firmware, hardware, or a combination thereof that, through emulation, simulation or any other process, allows a processor or other electronic device that does not have an x86 instruction set processor or core to execute the x86 binary code 3906.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Other Notes and Examples

The following examples pertain to embodiments in accordance with this specification. The system, apparatus, method, and machine readable storage medium embodiments can include one or a combination of the following examples:

Example A1 provides an apparatus, a system, a processor, a machine readable medium, a method, and/or hardware-, firmware-, and/or software-based logic, where the Example of A1 includes executing a first encryption instruction to generate a first cryptographically encoded pointer to a memory location in memory for storing an object, including: computing an encrypted slice of a base address of the memory location based, at least in part, on first context information associated with the object and a first key; storing the encrypted slice of the base address in first bits of the first cryptographically encoded pointer; and based on determining the object is to be stored in a memory region that is statically addressable, indicating in the first cryptographically encoded pointer that the first context information to be used for decoding the first cryptographically encoded pointer is to be obtained from a first instruction operand.

In Example A2, the subject matter of Examples A1 can optionally include where the first context information includes size metadata specifying a size of the object and first permissions metadata specifying one or more access permissions for the first cryptographically encoded pointer to access the memory location.

In Example A3, the subject matter of any one of Examples A1-A2 can optionally include where upper address bits adjacent to a plaintext slice of the base address are stored in a register, where the computing includes encrypting the plaintext slice of the base address based on the first key and a tweak including at least the first context information.

In Example A4, the subject matter of any one of Examples A1-A3 can optionally include where the executing the first encryption instruction further includes calculating that the object is to be stored entirely within the memory region delimited by a first address of the memory region and a second address of the memory region.

In Example A5, the subject matter of any one of Examples A1-A4 can optionally include where the second address of the memory region is equal to the first address of the memory region plus a memory region size, and where the memory region size is based, at least in part, on a bitwidth of the encrypted slice of the base address of the memory location.

In Example A6, the subject matter of any one of Examples A1-A5 can optionally include where the executing the first encryption instruction further includes: responsive to determining that a second instruction operand in the first encryption instruction indicates the first context information is to be stored in the memory, storing the first context information in a table entry of a table in the memory, where the table entry is mapped to the first cryptographically encoded pointer.

In Example A7, the subject matter of any one of Examples A1-A6 can optionally include where first metadata is stored in second bits of the first cryptographically encoded pointer and an offset is stored in third bits of the first cryptographically encoded pointer.

In Example A8, the subject matter of any one of Examples A1-A7 can optionally include where the encrypted slice of the base address is computed based, in part, on first metadata stored in second bits of the first cryptographically encoded pointer, where the first metadata represents a randomly generated value or a deterministically different value.

In Example A9, the subject matter of any one of Examples A1-A8 can optionally include executing a second encryption instruction to generate a second cryptographically encoded pointer to a second memory location in the memory for a second object, including: computing a second encrypted slice of a second base address of the second memory location based, at least in part, on second context information associated with the second object; storing the encrypted slice of the second base address of the second memory location in the second cryptographically encoded pointer; and based on determining the second object is to be stored in a second memory region that is not statically addressable, indicating in the second cryptographically encoded pointer that the second context information to be used for decoding the second cryptographically encoded pointer is to be dynamically obtained from memory.

In Example A10, the subject matter of any one of Examples A1-A9 can optionally include where a table in the memory contains a plurality of table entries, where a new table entry containing the second context information is to be indexed by at least a portion of the second cryptographically encoded pointer.

In Example A11, the subject matter of any one of Examples A1-A10 can optionally include where the executing the second encryption instruction further includes attempting to store a new table entry containing the second context information in the table using the encrypted slice of the second base address as an index.

In Example A12, the subject matter of any one of Examples A1-A11 can optionally include where the executing the second encryption instruction further includes, in response to determining that an existing table entry in the table is indexed by the encrypted slice of the second base address and contains other context information: copying the other context information from the existing table entry in the table to a storage structure containing colliding table entries; and storing the second context information in the existing table entry in the table.

In Example A13, the subject matter of any one of Examples A1-A12 can optionally include executing a third instruction, the third instruction including: a first operand containing the first cryptographically encoded pointer; a second operand containing the first context information; and a third operand containing new context information, where the executing the third instruction includes generating a third cryptographically encoded pointer to the memory location, including: computing the base address from the first cryptographically encoded pointer obtained from the first operand, where the base address is computed based, at least in part, on the first context information obtained from the second operand and the first key; and computing a new encrypted slice of the base address of the memory location based, at least in part, on the new context information obtained from the third operand.

In Example A14, the subject matter of any one of Examples A1-A13 can optionally include where the generating the third cryptographically encoded pointer includes: determining that the new context information indicates new memory bounds that are less than or equal to first memory bounds associated with the first cryptographically encoded pointer; and determining that the new context information includes new permissions metadata that grants the same or fewer access permissions to the memory location than first permissions metadata in the first context information grants to the memory location.

In Example A15, the subject matter of any one of Examples A1-A14 can optionally include where the new context information includes size metadata specifying a size of the object, new permissions metadata specifying one or more access permissions for the third cryptographically encoded pointer to access the memory location, and type metadata specifying a class of the object.

Example B1 provides an apparatus, a system, a processor, a machine readable medium, a method, and/or hardware-, firmware-, and/or software-based logic, where the Example of B1 includes executing a first encryption instruction to generate a first cryptographically encoded pointer to a first memory location in memory for storing an object, including: computing an encrypted slice of a base address of the first memory location based, at least in part, on first context information associated with the object and a first key; storing the encrypted slice of the base address in first bits of the first cryptographically encoded pointer; and based on determining that the first context information is not to be statically accessed by a memory access instruction, attempt to store a first entry containing the first context information in a first table of the memory.

In Example B2, the subject matter of Example B1 can optionally include where the encrypted slice of the base address in the first cryptographically encoded pointer is used as an index to attempt to store the first entry containing the first context information in the first table in the memory.

In Example B3, the subject matter of any one of Examples B1-B2 can optionally include where the first context information includes size metadata specifying a size of the object to be stored at the first memory location and permissions metadata specifying one or more access permissions for the first cryptographically encoded pointer to access the first memory location.

In Example B4, the subject matter of any one of Examples B1-B3 can optionally include where the first entry in the first table further contains upper address bits of the base address.

In Example B5, the subject matter of any one of Examples B1-B4 can optionally include where upper address bits of the base address are stored in a control register.

In Example B6, the subject matter of any one of Examples B1-B5 can optionally include where the determining that the first context information cannot be statically accessed by a memory access instruction further includes: determining that the object is to be stored in a memory region that is not statically addressable; and indicating in the first cryptographically encoded pointer that the first context information is to be dynamically obtained from the memory.

In Example B7, the subject matter of any one of Examples B1-B6 can optionally include where the determining that the first context information cannot be statically accessed by a memory access instruction further includes: determining an instruction parameter of the first encryption instruction indicates that the first context information is to be added to the first table in the memory; and indicating in the first cryptographically encoded pointer that the first context information is to be dynamically obtained from the memory.

In Example B8, the subject matter of any one of Examples B1-B7 can optionally include where at least a portion of the first cryptographically encoded pointer is used as a first index to attempt to store the first entry in the first table in the memory.

In Example B9, the subject matter of any one of Examples B1-B8 can optionally include where the executing the first encryption instruction further includes, in response to determining that an existing entry containing second context information is stored in the first table with an existing index that is equivalent to the first index: copying the second context information from the existing entry in the first table to an evicted entry in an eviction table for storing colliding table entries; and storing the first context information in the existing entry in the first table.

In Example B10, the subject matter of any one of Examples B1-B9 can optionally include executing a second instruction to determine that the existing index of the existing entry in the first table is equivalent to a second index derived from at least a portion of a second cryptographically encoded pointer; and in response to a first determination that the second cryptographically encoded pointer is attempting to access data that is stored at least partially outside an upper boundary of a memory allocation associated with the first context information: searching the eviction table for an evicted entry with an evicted index that is equivalent to the second index; and in response to a second determination that the second context information contained in the evicted entry would allow the second cryptographically encoded pointer to access to the data, swapping the first context information in the existing entry of the first table with the second context information in the evicted entry in the evicted table.

In Example B11, the subject matter of any one of Examples B1-B10 can optionally include where the executing the second instruction further includes: obtaining memory allocation size metadata from the first context information stored in the existing entry in the first table, where the first determination that the second cryptographically encoded pointer is attempting to access data at least partially outside the upper boundary of the memory allocation associated with the first context information is based on comparing the memory allocation size metadata from the first context information stored in the existing entry in the first table with an offset in the second cryptographically encoded pointer.

In Example B12, the subject matter of any one of Examples B1-B11 can optionally include executing a second instruction to retrieve the first context information from the first table in the memory; and decode the first cryptographically encoded pointer, including: performing a cryptographic algorithm on the encrypted slice of the base address in the first cryptographically encoded pointer to compute a decrypted slice of the base address based, at least in part, on the first key and the first context information contained in the first table in the memory; and generating a linear address based, at least in part, on upper address bits of the base address, the decrypted slice of the base address, and an offset stored in a second portion of the first cryptographically encoded pointer.

Example C1 provides an apparatus, a system, a processor, a machine readable medium, a method, and/or hardware-, firmware-, and/or software-based logic, where the Example of C1 includes storing in a first register a first cryptographically encoded pointer to a memory location, where an encrypted slice of a base address of the memory location is stored in a first portion of the first cryptographically encoded pointer; executing a first instruction to decode the first cryptographically encoded pointer, including: performing a cryptographic algorithm on the encrypted slice of the base address to compute a decrypted slice of the base address based, at least in part, on a first key and a first tweak, the first tweak including context information contained in a first operand of the first instruction; and generating a plaintext linear address based, at least in part, on upper address bits of the base address, the decrypted slice of the base address, and an offset stored in a second portion of the first cryptographically encoded pointer.

In Example C2, the subject matter of Example C1 can optionally include where the first tweak includes first metadata representing a randomly generated value or a deterministically different value.

In Example C3, the subject matter of any one of Examples C1-C2 can optionally include where the first metadata is stored in a third portion of the first cryptographically encoded pointer.

In Example C4, the subject matter of any one of Examples C1-C3 can optionally include where the upper address bits are stored in a control register.

In Example C5, the subject matter of any one of Examples C1-C4 can optionally include where the context information includes size metadata specifying a size of an object to be stored at the memory location and permissions metadata specifying one or more access permissions for the first cryptographically encoded pointer to access the memory location.

In Example C6, the subject matter of any one of Examples C1-C5 can optionally include further comprising: concatenating a number of least significant bits to the decrypted slice of the base address, where each one of the least significant bits is set to zero to align the base address to a byte boundary based on the number of least significant bits.

In Example C7, the subject matter of any one of Examples C1-C6 can optionally include where the cryptographic algorithm is performed on the encrypted slice of the base address in response to: determining that the offset stored in the second portion of the first cryptographically encoded pointer is less than size metadata specified in the context information; and determining that a type of access associated with the first instruction is allowed according to permission metadata specified in the context information.

In Example C8, the subject matter of any one of Examples C1-C7 can optionally include where the executing the first instruction further includes: using the plaintext linear address generated by decoding the first cryptographically encoded pointer to access encrypted data at the memory location.

In Example C9, the subject matter of any one of Examples C1-C8 can optionally include where the executing the first instruction further includes: decrypting the encrypted data based on a second key and a second tweak, the second tweak including one or more bits derived, at least in part, from the first cryptographically encoded pointer.

In Example C10, the subject matter of any one of Examples C1-C9 can optionally include where the second tweak includes first metadata and the plaintext linear address generated by decoding the first cryptographically encoded pointer, where the first metadata is stored in a third portion of the first cryptographically encoded pointer.

In Example C11, the subject matter of any one of Examples C1-C10 can optionally include where the second tweak includes the decrypted slice of the base address.

In Example C12, the subject matter of any one of Examples C1-C11 can optionally include where the second tweak includes at least one of: tag metadata representing a randomly generated value associated with a memory allocation referenced by the first cryptographically encoded pointer; permission metadata indicating a level of access authorized for the memory location; type metadata indicating a class of the encrypted data stored in the memory location; version metadata representing a deterministically different value associated with the memory allocation referenced by the first cryptographically encoded pointer; privilege level metadata indicating a user level or a supervisor level; and crypto context identifier representing a unique value for a particular group of functions.

In Example C13, the subject matter of any one of Examples C1-C12 can optionally include storing in a second register a second cryptographically encoded pointer to a second memory location, where a second encrypted slice of a second base address of the second memory location is stored in the second cryptographically encoded pointer; executing a second instruction to decode the second cryptographically encoded pointer, including: performing the cryptographic algorithm on the second encrypted slice of the second base address to compute a second decrypted slice of the second base address based, at least in part, on the first key and a second tweak, the second tweak including second context information retrieved from memory; and generating a second plaintext linear address based, at least in part, on second upper address bits of the second base address, the second decrypted slice of the second base address, and a second offset stored in the second cryptographically encoded pointer.

Example D1 provides an apparatus, a system, a processor, a machine readable medium, a method, and/or hardware-, firmware-, and/or software-based logic, where the Example of D1 includes executing, by a trusted runtime in a multi-tenant environment, first instructions to: generate a first address key for a private memory region in the memory; and generate a first cryptographically encoded pointer to the private memory region in the memory, including: storing first context information associated with the private memory region in first bits of the first cryptographically encoded pointer; and performing a cryptographic algorithm on a slice of a first linear address of the private memory region based, at least in part, on the first address key and a first tweak, the first tweak including the first context information; and permitting a first tenant in the multi-tenant environment to access the first address key and the first cryptographically encoded pointer to the private memory region.

In Example D2, the subject matter of Example D1 can optionally include where the executing the first instructions further includes: based on determining that the first tenant is authorized to access a second tenant, permitting the first tenant to access a second address key, a second data key, and a second cryptographically encoded pointer to an authorized entrypoint address of the second tenant.

In Example D3, the subject matter of any one of Examples D1-D2 can optionally include where the executing the first instructions further includes: receiving a request from the first tenant to access a second tenant; and in response to determining that the first tenant is authorized to access the second tenant: storing a second data key of the second tenant in a data key register; storing a second address key of the second tenant in an address key register; and transferring control to the second tenant.

In Example D4, the subject matter of any one of Examples D1-D3 can optionally include the transferring control to the second tenant includes: storing, in an instruction pointer register, a second cryptographically encoded pointer to an authorized entrypoint in a second memory region allocated for the second tenant.

In Example D5, the subject matter of any one of Examples D1-D4 can optionally include executing a second instruction of the first tenant to: store a second code key of a second tenant in a code key register; and use a destination address to access an authorized entrypoint in a second memory region allocated for the second tenant; and execute one or more third instructions of the second tenant to: store a second address key of the second tenant in an address key register; and store a second data key of the second tenant in a data key register.

In Example D6, the subject matter of Example D5 can optionally include where the destination address is used to access the authorized entrypoint in the second memory region in response to determining that the authorized entrypoint contains an authorized instruction and that the destination address is aligned to a memory page boundary.

In Example D7, the subject matter of any one of Examples D1-D6 can optionally include where the core is to execute a third jump instruction of the first tenant to retrieve a second address key, a second data key, and a second code key from a security handle of a second tenant, load the second address key in an address key register, load the second data key in a data key register, load the second code key in a code key register, and use an authorized entrypoint pointer in the security handle of the second tenant to access an authorized entrypoint in a memory region associated with the second tenant.

In Example D8, the subject matter of Example D7 can optionally include where the security handle of the second tenant is stored in a private memory region associated with the first tenant.

In Example D9, the subject matter of any one of Examples D1-D8 can optionally include executing a second instruction of the first tenant to transfer control to a second tenant, including using an index stored in an operand of the second instruction to identify a descriptor in a table in the memory, where the descriptor includes at least a third cryptographically encoded pointer to an authorized entrypoint in a second private memory region allocated for the second tenant and a second code key of the second tenant; storing the second code key of the second tenant in a code key register; storing the third cryptographically encoded pointer in a register instruction pointer; and using the register instruction pointer to fetch a next instruction at the authorized entrypoint.

In Example D10, the subject matter of any one of Examples D1-D9 can optionally include storing, in a second register, a shared cryptographically encoded pointer to a shared memory region in the memory; executing the first instructions of the trusted runtime to further: generate the shared cryptographically encoded pointer to the shared memory region, including: storing shared context information associated with the shared memory region in first bits of the shared cryptographically encoded pointer; and performing the cryptographic algorithm on a slice of a second linear address to the shared memory region based, at least in part, on a shared address key and the shared context information; and permitting the first tenant and a second tenant to access the shared address key, a shared data key, and the shared cryptographically encoded pointer to the shared memory region.

In Example D11, the subject matter of Example D10 can optionally include decoding the shared cryptographically encoded pointer, including: performing the cryptographic algorithm on an encrypted slice of the second linear address to compute a decrypted slice of the second linear address based, at least in part, on the shared address key and the shared context information; generating the second linear address based, at least in part, on the decrypted slice of the second linear address; and accessing data at the second linear address in the shared memory region.

In Example D12, the subject matter of Example D11 can optionally include performing a second cryptographic algorithm on encrypted data at the second linear address in the shared memory region to compute decrypted data based, at least in part, on the shared address key and a tweak derived, at least in part, from the shared cryptographically encoded pointer.

Example E1 provides an apparatus, a system, a processor, a machine readable medium, a method, and/or hardware-, firmware-, and/or software-based logic, where the Example of E1 includes storing a first cryptographically encoded pointer to a memory region in a multi-tenant environment, where an encrypted slice of a base address of the memory region is to be stored in a first portion of the first cryptographically encoded pointer; and executing a first instruction to decode the first cryptographically encoded pointer, including: retrieving first context information associated with the first cryptographically encoded pointer; obtaining a cryptographic context index from the first context information; selecting a cryptographic context identifier based the cryptographic context index; performing a cryptographic algorithm on the encrypted slice of the base address to compute a decrypted slice of the base address based, at least in part, on a first key, the cryptographic context identifier, and at least a portion of the first context information; and generating a plaintext linear address based, at least in part, on the decrypted slice of the base address.

In Example E2, the subject matter of Example B1 can optionally include where the first context information is retrieved from either an operand of the first instruction or memory.

In Example E3, the subject matter of any one of Examples E1-E2 can optionally include where the selecting the cryptographic context identifier includes: comparing the cryptographic context index to a plurality of cryptographic context indexes used to index, respectively, a plurality of cryptographic context identifiers, where the plurality of cryptographic context identifiers are associated respectively with a plurality of memory regions in the multi-tenant environment.

In Example E4, the subject matter of any one of Examples E1-E3 can optionally include where the plurality of cryptographic context identifiers is stored in a table indexed by the plurality of cryptographic context indexes.

In Example E5, the subject matter of any one of Examples E1-E4 can optionally include where the plurality of cryptographic context identifiers includes at least one of a private cryptographic context identifier, a multicast cryptographic context identifier, and a broadcast cryptographic context identifier.

In Example E6, the subject matter of any one of Examples E1-E5 can optionally include where the private cryptographic context identifier is authorized for use by the first cryptographically encoded pointer to access a private memory region.

In Example E7, the subject matter of any one of Examples E1-E6 can optionally include where the multicast cryptographic context identifier is authorized for use by the first cryptographically encoded pointer and at least one other cryptographically encoded pointer in the multi-tenant environment to access a shared memory region.

In Example E8, the subject matter of any one of Examples E1-E7 can optionally include where the broadcast cryptographic context identifier is authorized for use by all cryptographically encoded pointers in the multi-tenant environment to access a shared memory region.

An Example Y1 provides an apparatus, the apparatus comprising means for performing the method of any one of the Examples A1 through E8 above.

In Example Y2, the subject matter of Example Y1 can optionally include that the means for performing the method comprises at least one processor and at least one memory element.

In Example Y3, the subject matter of Example Y2 can optionally where the at least one memory element comprises machine readable instructions that when executed, cause the apparatus to perform the method of any one of Examples A1-A15, B1-B12, C1-C13, D1-D12 through E1-E8 above.

In Example Y4, the subject matter of any one of Examples Y1-Y3 can optionally include that the apparatus is one of a computing system or a system-on-a-chip.

An Example X1 provides at least one machine readable storage medium comprising instructions, where the instructions when executed realize an apparatus, realize a system, or implement a method in any one of the preceding Examples A1-A15, B1-B12, C1-C13, D1-D12 through E1-E8 above.

What is claimed is:

1. A processor, comprising:
   a core including circuitry to execute a first encryption instruction to:
      generate a first cryptographically encoded pointer to a memory location in memory for storing a first object, including:
         computing an encrypted slice of a base address of the memory location based, at least in part, on first context information associated with the first object and a first key;
         storing the encrypted slice of the base address in first bits of the first cryptographically encoded pointer; and
         based on determining the first object is to be stored in a memory region that is statically addressable, indicating in the first cryptographically encoded pointer that the first context information to be used for decoding the first cryptographically encoded pointer is to be obtained from a first instruction operand in a memory access instruction.

2. The processor of claim 1, wherein upper address bits adjacent to a plaintext slice of the base address are stored in a register, wherein the computing includes encrypting the plaintext slice of the base address based on the first key and a tweak including at least the first context information.

3. The processor of claim 1, wherein the circuitry is to execute the first encryption instruction further to:
   calculate that the first object is to be stored entirely within the memory region delimited by a first address of the memory region and a second address of the memory region.

4. The processor of claim 3, wherein the second address of the memory region is equal to the first address of the memory region plus a memory region size, and wherein the memory region size is based, at least in part, on a bitwidth of the encrypted slice of the base address of the memory location.

5. The processor of claim 1, wherein first metadata is stored in second bits of the first cryptographically encoded pointer and an offset is stored in third bits of the first cryptographically encoded pointer.

6. The processor of claim 1, wherein the encrypted slice of the base address is computed based, in part, on first metadata stored in second bits of the first cryptographically encoded pointer, wherein the first metadata represents a randomly generated value or a deterministically different value.

7. The processor of claim 1, wherein the first context information includes size metadata specifying a size of the first object and first permissions metadata specifying one or more access permissions for the first cryptographically encoded pointer to access the memory location.

8. The processor of claim 1, wherein the circuitry is to execute the first encryption instruction further to:
   responsive to determining that a second instruction operand in the first encryption instruction indicates the first context information is to be stored in the memory, store the first context information in a table entry of a table in the memory, wherein the table entry is mapped to the first cryptographically encoded pointer.

9. The processor of claim 1, wherein the circuitry is to execute a second encryption instruction to:
generate a second cryptographically encoded pointer to a second memory location in the memory for a second object, including:
computing a second encrypted slice of a second base address of the second memory location based, at least in part, on second context information associated with the second object;
storing the encrypted slice of the second base address of the second memory location in the second cryptographically encoded pointer; and
based on determining the second object is to be stored in a second memory region that is not statically addressable, indicating in the second cryptographically encoded pointer that the second context information to be used for decoding the second cryptographically encoded pointer is to be dynamically obtained from memory.

10. The processor of claim 9, wherein a table in the memory contains a plurality of table entries, wherein a new table entry containing the second context information is to be indexed by at least a portion of the second cryptographically encoded pointer.

11. The processor of claim 10, wherein the circuitry is to execute the second encryption instruction further to:
attempt to store the new table entry containing the second context information in the table using the encrypted slice of the second base address as an index.

12. The processor of claim 10, wherein the circuitry to execute the second encryption instruction is further to, in response to determining that an existing table entry in the table is indexed by the at least the portion of the second cryptographically encoded pointer and contains other context information:
copy the other context information from the existing table entry in the table to a storage structure containing colliding table entries; and
store the second context information in the existing table entry in the table.

13. The processor of claim 1, wherein the circuitry is to execute a third instruction, the third instruction including:
a first operand containing the first cryptographically encoded pointer;
a second operand containing the first context information; and
a third operand containing new context information, wherein the third instruction is to generate a third cryptographically encoded pointer to the memory location, including:
computing a new base address from the first cryptographically encoded pointer obtained from the first operand of the third instruction, wherein the new base address is computed based, at least in part, on the first context information obtained from the second operand of the third instruction and the first key; and
computing a new encrypted slice of the new base address of the memory location based, at least in part, on the new context information obtained from the third operand of the third instruction.

14. The processor of claim 13, wherein the third cryptographically encoded pointer is to be generated in response to:

determining that the new context information indicates new memory bounds that are less than or equal to first memory bounds associated with the first cryptographically encoded pointer; and
determining that the new context information includes new permissions metadata that grants the same or fewer access permissions to the memory location than first permissions metadata in the first context information grants to the memory location.

15. The processor of claim 13, wherein the new context information includes new size metadata specifying a size of a target object, new permissions metadata specifying one or more access permissions for the third cryptographically encoded pointer to access the memory location, and new type metadata specifying a class of the target object.

16. A method, comprising:
executing a first encryption instruction to generate a first cryptographically encoded pointer to a memory location in memory for storing a first object, including:
computing an encrypted slice of a base address of the memory location based, at least in part, on first context information associated with the first object and a first key;
storing the encrypted slice of the base address in first bits of the first cryptographically encoded pointer; and
based on determining the first object is to be stored in a memory region that is statically addressable, indicating in the first cryptographically encoded pointer that the first context information to be used for decoding the first cryptographically encoded pointer is to be obtained from a first instruction operand in a memory access instruction.

17. The method of claim 16, wherein upper address bits adjacent to a plaintext slice of the base address are stored in a register, wherein the computing includes encrypting the plaintext slice of the base address based on the first key and a tweak including at least the first context information.

18. The method of claim 16, wherein the encrypted slice of the base address is computed based, in part, on first metadata stored in second bits of the first cryptographically encoded pointer, wherein the first metadata represents a randomly generated value or a deterministically different value.

19. A non-transitory machine readable medium comprising instructions that when executed by a processor, cause the processor to perform operations comprising:
generating a first cryptographically encoded pointer to a memory location in memory for a first object, including:
computing a first encrypted slice of a base address of the memory location based, at least in part, on first context information associated with the first object and a first key;
storing the first encrypted slice of the base address of the memory location in first bits of the first cryptographically encoded pointer; and
based on determining the first object is to be stored in a first memory region that is not statically addressable, indicating in the first cryptographically encoded pointer that the first context information to be used for decoding the first cryptographically encoded pointer is to be dynamically obtained from memory.

20. The machine readable medium of claim 19, wherein the first encrypted slice of the base address is computed based, in part, on first metadata stored in second bits of the first cryptographically encoded pointer, wherein the first metadata represents a randomly generated value or a deterministically different value.

21. The machine readable medium of claim 19, wherein a table in the memory contains a plurality of table entries, wherein a new table entry containing the first context information is to be indexed by at least a portion of the first cryptographically encoded pointer.

22. The machine readable medium of claim 21, wherein the instructions, when executed by the processor, cause the processor to perform further operations comprising:
   in response to determining that an existing table entry in the table is indexed by at least a portion of the second cryptographically encoded pointer and contains other context information:
     copying the other context information from the existing table entry in the table to a storage structure containing colliding table entries; and
     storing the first context information in the existing table entry in the table.

23. The machine readable medium of claim 19, wherein the instructions, when executed by the processor, cause the processor to perform further operations comprising:
   generating a second cryptographically encoded pointer to the memory location for storing a target object, including:
     computing a new base address from the first cryptographically encoded pointer obtained from a first operand of a second instruction, wherein the new base address is computed based, at least in part, on the first context information obtained from a second operand of the second instruction and the first key; and
     computing a new encrypted slice of the new base address of the memory location based, at least in part, on new context information obtained from a third operand of the second instruction.

24. The machine readable medium of claim 23, wherein the new context information includes at least one of:
   new size metadata that is less than first size metadata indicating a size of the first object;
   new permissions metadata that grants fewer access permissions to the memory location for the second cryptographically encoded pointer than first permissions metadata in the first context information grants to the memory location for the first cryptographically encoded pointer; and
   new type metadata specifying a new class of the target object.

25. The machine readable medium of claim 23, wherein the new base address is computed based, in part, on an offset stored in third bits of the first cryptographically encoded pointer.

* * * * *